(12) United States Patent
Nakayama et al.

(10) Patent No.: US 9,150,422 B2
(45) Date of Patent: Oct. 6, 2015

(54) POROUS METAL OXIDE, METHOD FOR PRODUCING THE SAME, AND USE OF THE SAME

(75) Inventors: Norio Nakayama, Chiba (JP); Toshihiko Takaki, Chiba (JP); Haruhiko Fukumoto, Ichihara (JP); Kaori Matoishi, Ichihara (JP); Shiro Nakatsuka, Kawasaki (JP); Naoshi Nagai, Chiba (JP); Eiichi Takahashi, Urayasu (JP); Yukiko Enomoto, Narashino (JP)

(73) Assignee: Mitsui Chemicals, Inc., Tokyo (JP)

( * ) Notice: Subject to any disclaimer, the term of this patent is extended or adjusted under 35 U.S.C. 154(b) by 1055 days.

(21) Appl. No.: 13/255,719

(22) PCT Filed: Mar. 12, 2010

(86) PCT No.: PCT/JP2010/001796
§ 371 (c)(1),
(2), (4) Date: Sep. 9, 2011

(87) PCT Pub. No.: WO2010/103856
PCT Pub. Date: Sep. 16, 2010

(65) Prior Publication Data
US 2011/0318249 A1    Dec. 29, 2011

(30) Foreign Application Priority Data

| Mar. 12, 2009 | (JP) | 2009-059002 |
| Jun. 30, 2009 | (JP) | 2009-154838 |
| Jun. 30, 2009 | (JP) | 2009-154848 |
| Jun. 30, 2009 | (JP) | 2009-154854 |
| Jun. 30, 2009 | (JP) | 2009-154863 |
| Jun. 30, 2009 | (JP) | 2009-154883 |
| Jun. 30, 2009 | (JP) | 2009-154905 |

(51) Int. Cl.
*C01G 25/02* (2006.01)
*C01B 37/00* (2006.01)
(Continued)

(52) U.S. Cl.
CPC .............. *C01B 37/00* (2013.01); *H01M 4/48* (2013.01); *H01M 4/62* (2013.01); *H01M 14/005* (2013.01); *H01G 9/2031* (2013.01); *Y02E 10/542* (2013.01)

(58) Field of Classification Search
CPC ...... C01B 37/00; C01B 33/113; C01B 13/00; C01B 13/14; C01D 15/02; C01G 23/04; C01G 23/047; C01G 25/02; C01G 49/02; C01G 45/02; C01F 7/02; C01F 11/02; H01M 4/62; H01M 4/48; H01G 9/2031; Y02E 10/542

See application file for complete search history.

(56) References Cited

U.S. PATENT DOCUMENTS

2002/0114941 A1  8/2002  Franke et al.
2005/0025690 A1  2/2005  Fukuda et al.
(Continued)

FOREIGN PATENT DOCUMENTS

CN    1170373    1/1998
CN    1809516    7/2006
(Continued)

OTHER PUBLICATIONS

Sertchook et al (NPL : "Composite particles of Polyethylene Silica", 2007, J.Am.Chem.Soc. 129, pp. 98-108).*
(Continued)

*Primary Examiner* — Melvin C Mayes
*Assistant Examiner* — Smita Patel
(74) *Attorney, Agent, or Firm* — Rankin, Hill & Clark LLP

(57) ABSTRACT

Disclosed is a porous metal oxide obtained by subjecting metal alkoxide and/or a partially hydrolyzed condensate of the metal alkoxide to a sol-gel reaction in the presence of terminally branched copolymer particles represented by the following general formula (1) and having a number average molecular weight of not more than $2.5 \times 10^4$ to obtain an organic-inorganic composite and removing the terminally branched copolymer particles from the composite.

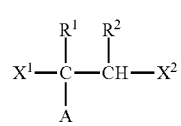

(1)

8 Claims, 35 Drawing Sheets

HEXAGONAL STRUCTURE

CUBIC STRUCTURE

(51) Int. Cl.
    *H01M 4/48*      (2010.01)
    *H01M 4/62*      (2006.01)
    *H01M 14/00*     (2006.01)
    *H01G 9/20*          (2006.01)

(56)          References Cited

U.S. PATENT DOCUMENTS

2007/0154431 A1   7/2007   Nagai et al.
2009/0060816 A1   3/2009   Fukuda et al.

FOREIGN PATENT DOCUMENTS

| JP | 07-104102 | 4/1995 |
|----|-----------|--------|
| JP | 08-173754 | 7/1996 |
| JP | 11-072602 | 3/1999 |
| JP | 2002-193649 | 7/2002 |
| JP | 2002-289681 | 10/2002 |
| JP | 2003-335506 | 11/2003 |
| JP | 2004-359543 | 12/2004 |
| JP | 2005-089240 | 4/2005 |
| JP | 2005-298324 | 10/2005 |
| JP | 2006-069824 | 3/2006 |
| JP | 2006-102587 | 4/2006 |
| JP | 2006-131870 | 5/2006 |
| JP | 2006-519095 | 8/2006 |
| JP | 2007-056158 | 3/2007 |
| JP | 2008-509800 | 4/2008 |
| JP | 2008-280986 | 11/2008 |
| JP | 2009-005683 | 1/2009 |
| JP | 2009-024151 | 2/2009 |
| JP | 2009-038337 | 2/2009 |
| WO | 96/19288 | 6/1996 |
| WO | 2004/076041 | 9/2004 |
| WO | 2006/021698 | 3/2006 |

OTHER PUBLICATIONS

Nagai (JP2006-131870, machine translation in english), 2006.*
Japanese Office Action dated Sep. 10, 2013 filed in the corresponding Japanese application No. 2011-503739.
Chinese Office Action issued on Apr. 28, 2013 in the corresponding Chinese patent application No. 201080011555.6.
Kresge, C.T. et al.; "Ordered mesoporous molecular sieves synthesized by a liquid-crystal template mechanism"; Nature, vol. 359, p. 710-712; Oct. 22, 1992.
Zhao D. et al.; "Triblock copolymer syntheses of mesoporous silica with periodic 50 to 300 angstrom pores"; Science, vol. 279, p. 548; Jan. 23, 1998.
Fan J. et al.; "Low-temperature strategy to synthesize highly ordered mesoporous silicas with very large pores"; J.Am.Chem.Soc., Aug. 10, 2005; vol. 127 No. 31, p. 10794-10795.
Alberius, R et al; "General predictive syntheses of cubic, hexagonal, and lamellar silica and titania mesostructured thin films"; Chem. Matter., vol. 14, p. 3284-3294; Jul. 13, 2002.
Wu, Chia-Wen et al.; "Formation of highly ordered mesoporous titania films consisting of crystalline nanopillars with inverse mesospace by structural transformation"; J.Am.Chem.Soc., vol. 128, p. 4544-4545; Mar. 22, 2006.
International Search Report dated Jun. 15, 2010.

* cited by examiner

HEXAGONAL
STRUCTURE

CUBIC STRUCTURE

HEXAGONAL STRUCTURE

CUBIC STRUCTURE

SURFACE: MESOPOROUS
STRUCTURE

PORE DIAMETER

CROSS SECTION:
VERTICAL ORIENTATION $TiO_2$ CRYSTALLITE

500 Kg/cm2

1000 Kg/cm2

2000 Kg/cm2

FIG. 30A
FIG. 30B
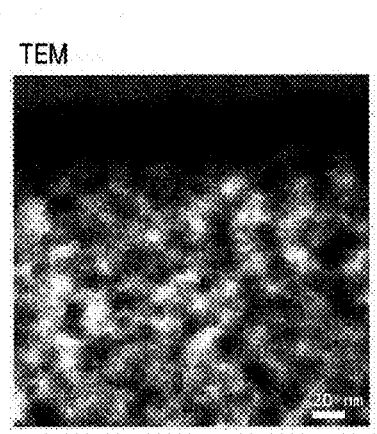
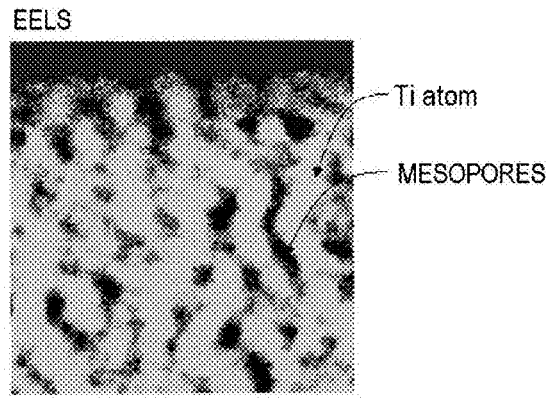

FIG. 34A
FIG. 34B
ANATASE TYPE TiO$_2$
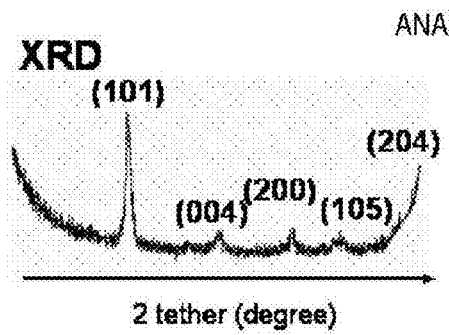
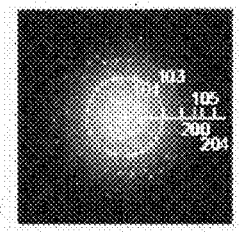
FFT of TEM image

POROUS METAL OXIDE, METHOD FOR PRODUCING THE SAME, AND USE OF THE SAME

TECHNICAL FIELD

The present invention relates to a porous metal oxide, a method for producing the porous metal oxide and use thereof.

BACKGROUND ART

In the past, a mesoporous substance with mesopores having a pore diameter of 2 to 50 nm has been synthesized from a silica based material using the property of a certain surfactant or the like which forms a micellar aggregate by self-organization in a solution and using it as the template. In 1992, with a surfactant as the template, a silica porous body with mesopores having a diameter of not less than 2 nm has been developed by Mobil Corporation (Non-Patent Document 1). Non-Patent Document 1 discloses a method of synthesizing two types of mesoporous silica, such as MCM-41 type in which cylindrical pores having a diameter of 2 to 8 nm form a two-dimensional hexagonal structure, and MCM-48 type in which pores form a three-dimensional cubic structure, by the reaction with a silica component using cethyltrimethyl ammonium bromide (CTAB) as the template.

In addition, there has been disclosed a method for producing a mesoporous silica (SBA-15) having a two-dimensional hexagonal structure and having a pore diameter of not less than 10 nm by the reaction with a triblock copolymer surfactant, Pluronic P123 (EOmPOnEOm, m=17, n=56, BASF), which is composed of hydrophilic ethylene oxide (EO) and hydrophobic propylene oxide (PO) used as the template (Non-Patent Document 2). Furthermore, formation of a mesoporous material from a crystalline metal oxide such as titania or the like having a crystalline structure has been attempted. However, when heating is conducted to change from a material composed of an amorphous material to a material having a crystalline structure, a wall film in a mesoporous material is very thin, so that pores are collapsed without keeping an amorphous mesoporous shape.

As a method of obtaining a non-silica based material, there has been disclosed a method of producing a titania thin film having both an anatase crystallite and a nanosized columnar structure by forming a titania thin film having a three-dimensional hexagonal structure in which the surfactant Pluronic P123 is present in mesopores, followed by burning it (Non-Patent Document 3). There has been disclosed a technology for forming mesoporous particles by the same method (Patent Documents 1 and 2).

Meanwhile, the following applications have been studied.

In late years, with the progress of miniaturization, high integration and high density in semiconductor elements or multi-layer wiring boards, an insulating material having a low dielectric constant contributing to shortening of the signal propagation delay time has been in demand. The relative dielectric constants of a silicon oxide film, a silicon nitride film and a polyimide resin, which have been widely used at present, are respectively about 4 to 5, 7 to 9, and 3.5 to 4. On the other hand, it has also been studied to produce a low dielectric constant material by forming a porous body (mesoporous silica) from a silica precursor solution and a surfactant. This porous body has been disclosed in Non-Patent Documents 1 and 2.

On the other hand, in recent years, with the progress of large volumes of information and higher speed of information processing, miniaturization, high integration, high speed and power saving in electronic circuits have been in demand, and an insulating material having a low dielectric constant contributing to shortening of the signal propagation delay time has been in demand. The relative dielectric constants of a silicon oxide film, a polyimide resin and a fluorine-containing resin, which have been widely used at present, are respectively about 4 to 5, 3.5 to 4, and 2 to 2.5. Furthermore, in order to reduce the dielectric constant of a film, the dielectric constant may be reduced by introducing avoid inside the film. But, at this time, there is a problem of deterioration in the film strength. A method of forming a coating film formed by dispersing hollow silica particles in a resin matrix, and applying it is also considered (Patent Document 3).

An optical material having a low refractive index is applied to an antireflection film, an optical waveguide, a lens, a prism and the like, and it is used for an anti-glare treatment which suppresses reflection from a display surface, cladding of an optical waveguide and the like. In the past, as a material having a low refractive index, there are a fluorine compound (refractive index: 1.34) such as Cytop (a product of Asahi Kasei Corporation) or the like, a compound such as magnesium fluoride (refractive index: 1.38) or the like, and a compound formed by dispersing ultrafine particles thereof in a resin or the like (Patent Documents 4 and 5).

For the purpose of improvement of reduction in weight and thermal insulation performance, a hollow glass (glass balloon) has been used as a filler in many cases. However, a material having a porosity of not less than 70% and a diameter of about 100 μm is generally used as a hollow glass, but there has been a problem of causing cracks during mixing with a resin because a thickness of the glass wall becomes thin. On the other hand, in recent years, a silica gel foam or the like has been used in many cases (Patent Documents 6 and 7).

RELATED DOCUMENTS

Patent Documents

Patent Document 1: Japanese Laid-open Patent Publication No. 2005-89240
Patent Document 2: Japanese Laid-open Patent Publication No. 2006-69824
Patent Document 3: Japanese Laid-open Patent Publication No. 2007-056158
Patent Document 4: Japanese Laid-open Patent Publication No. 1999-072602
Patent Document 5: Japanese Laid-open Patent Publication No. 1995-104102
Patent Document 6: Japanese Laid-open Patent Publication No. 2004-359543
Patent Document 7: Japanese Laid-open Patent Publication No. 2002-193649

Non-Patent Documents

Non-Patent Document 1: C. T. Kresge and 4 others, Nature, 359, pp. 710 to 712 (1992)
Non-Patent Document 2: D. Zhao and 6 others, Science, 279, 548 (1998)
Non-Patent Document 3: K. Kuroda and 3 others, Journal of the American Chemical Society, 128, pp. 4544-4545 (2006)
Non-Patent Document 4: B. F. Chmelka and 5 others, Chemistry of Materials, 14, pp. 3284-3294 (2002)
Non-Patent Document 5: D. Zhao and 7 others, Journal of the American Chemical Society, 127, pp. 10794-10795 (2005)

Disclosure Of The Invention

As described in Non-Patent Documents 1 to 3 and Patent Documents 1 and 2, a mesoporous substance formed by using a micellar structure which is formed by self-organization of surfactant as the template has widely been studied. However, in case of a surfactant which has heretofore been used, when a silica based or non-silica based material is used as the template, a mesoporous substance having a desired structure has hardly been formed because of the property of dynamic phase change from a lamellar phase to a two-dimensional hexagonal phase and a cubic phase under conditions of the dilute concentration in water, pH, temperature and the like. In particular, there has been a problem such that it was difficult to stably produce a mesoporous material having a cubic phase structure having an average pore diameter of about 5 to 30 nm. When the surfactant Pluronic P123 is used, only when the concentration in water is 29 to 32%, a mesoporous silica or titania film having mesopores of about 10 nm and having a cubic structure is formed (Non-Patent Document 4).

Furthermore, there has been disclosed a method for producing a mesoporous silica (LP-FDU-12) having a three-dimensional cubic structure and having a large pore diameter of 27 to 44.5 nm with the use of Pluronic F127 (EOmPO-nEOm, m=106, n=70, BASF) as a surfactant, TMB (1,3,5-trimethylbenzene) as an expanding agent for expanding a micelle size of the surfactant, KCl as a salt and HCl as an acid catalyst. But, similarly to Non-Patent Document 4, a regular mesoporous substance is formed only in the narrow concentration range (specifically, molar ratio of silica raw material TEOS/F127/TMB/KCl/HCl/$H_2O$: 1.00/0.0037/0.50/3.36/155) in which a surfactant forms a micellar structure. Also, in order to greatly change the pore diameter by the temperature and dilute concentration during the production, a desired structure body cannot be stably obtained (Non-Patent Document 5). Also, a porous body can be synthesized by the use of an emulsion of a polymer or latex particles synthesized by a method such as emulsion polymerization or the like, but such particles generally have a diameter of not less than 100 nm with large variations, so that a regular structure body having an average pore diameter of about 5 to 30 nm cannot be obtained.

An object of the present invention is to provide a porous metal oxide in which mesopores form a cubic phase and the average pore diameter is large, with the use of particles in which the average particle size of 50% by volume is small and the particle size is constant regardless of the dilute concentration, a method for producing the porous metal oxide, and use.

The present invention is specified by the matters described below.

[1] A porous metal oxide obtained by subjecting a metal oxide precursor selected from metal alkoxide and/or a partially hydrolyzed condensate of the metal alkoxide, metal halide, metal acetate and metal nitrate to a sol-gel reaction in the presence of terminally branched copolymer particles represented by the following general formula (1) and having a number average molecular weight of not more than $2.5 \times 10^4$ to obtain an organic-inorganic composite and removing the terminally branched copolymer particles from the composite,

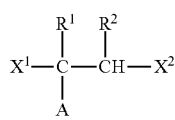

(1)

wherein, in the formula, A represents a polyolefin chain; $R^1$ and $R^2$ each represents a hydrogen atom or an alkyl group having 1 to 18 carbon atoms, and at least one of $R^1$ and $R^2$ is a hydrogen atom; $X^1$ and $X^2$ are the same or different from each other, and each represents a linear or branched polyalkylene glycol group; and $X^1$ and $X^2$ may be bonded to a carbon atom through a hydrocarbon group, an oxygen atom, a sulfur atom or a nitrogen atom.

[2] The porous metal oxide according to [1], wherein the porous metal oxide has mesopores and a pore structure thereof is a cubic phase structure.

[3] The porous metal oxide according to [2], wherein the average pore diameter of the mesopores is from 5 to 30 nm.

[4] A porous metal oxide, wherein the porosity is from 1 to 80% by volume, and a pore structure formed from the almost uniform mesopores in the range of a pore diameter of 5 to 30 nm is a cubic phase structure.

[5] The porous metal oxide according to any one of [1] to [4], comprising one or more metals selected from the group consisting of silicon, titanium, zirconium, aluminum, cobalt, lithium, iron, manganese and barium.

[6] The porous metal oxide according to any one of [1] to [5], wherein, in the terminally branched copolymer represented by the aforementioned general formula (1), $X^1$ and $X^2$ are the same or different from each other, and are each the general formula (2) or the general formula (4),

wherein, in the formula, E represents an oxygen atom or a sulfur atom; and $X^3$ represents a polyalkylene glycol group or a group represented by the following general formula (3),

wherein, in the formula, $R^3$ represents an (m+1)-valent hydrocarbon group; G may be the same or different from each other, and each represents a group represented by —$OX^4$ or —$NX^5X^6$ ($X^4$ to $X^6$ each represents a polyalkylene glycol group); and m is the bonding number of $R^3$ and G, and represents an integer of 1 to 10,

wherein, in the formula, $X^7$ and $X^8$ are the same or different from each other, and each represents a polyalkylene glycol group or a group represented by the above general formula (3).

[7] The porous metal oxide according to any one of [1] to [6], wherein the terminally branched copolymer is represented by the following general formula (1a) or (1b),

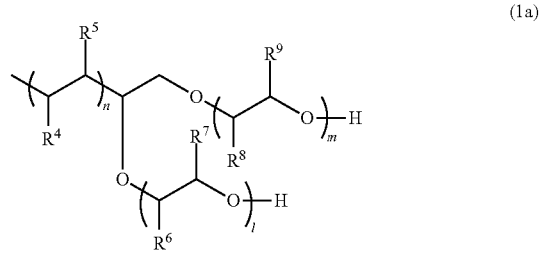

wherein, in the formula, $R^4$ and $R^5$ each represents a hydrogen atom or an alkyl group having 1 to 18 carbon atoms, and at least one of $R^4$ and $R^5$ is a hydrogen atom; $R^6$ and $R^7$ represent a hydrogen atom or a methyl group, and at least one of $R^6$ and $R^7$ is a hydrogen atom; $R^8$ and $R^9$ each represents a hydrogen atom or a methyl group, and at least one of $R^8$ and $R^9$ is a hydrogen atom; l+m represents an integer of 2 to 450; and n represents an integer of 20 to 300,

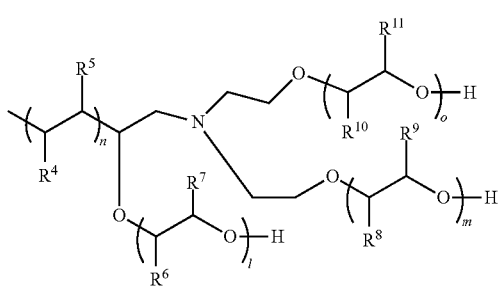

(1b)

wherein, in the formula, $R^4$ and $R^5$ each represents a hydrogen atom or an alkyl group having 1 to 18 carbon atoms, and at least one of $R^4$ and $R^5$ is a hydrogen atom; $R^6$ and $R^7$ each represents a hydrogen atom or a methyl group, and at least one of $R^6$ and $R^7$ is a hydrogen atom; $R^8$ and $R^9$ each represents a hydrogen atom or a methyl group, and at least one of $R^8$ and $R^9$ is a hydrogen atom; $R^{10}$ and $R^{11}$ each represents a hydrogen atom or a methyl group, and at least one of $R^{10}$ and $R^{11}$ is hydrogen atom; l+m+o represents an integer of 3 to 450; and n represents an integer of 20 to 300.

[8] The porous metal oxide according to any one of [1] to [7], wherein the porous metal oxide is in the form of a particle or a film.

[9] The porous metal oxide according to any one of [1] to [8], wherein the organic-inorganic composite is obtained from a mixed composition containing the following (A) to (D), (A) the above-mentioned terminally branched copolymer particles;

(B) the above-mentioned metal alkoxide and/or a partially hydrolyzed condensate of the metal alkoxide;

(C) water and/or a solvent dissolving a part of water or entire water in any proportions; and (D) a catalyst to be used for a sol-gel reaction.

[10] A porous metal oxide, wherein the porous metal oxide has mesopores having an average pore diameter of 5 to 30 nm and a pore structure thereof is a cubic phase structure.

[11] A method for producing a porous metal oxide, comprising a step of subjecting a metal oxide precursor selected from metal alkoxide and/or a partially hydrolyzed condensate of the metal alkoxide, metal halide, metal acetate and metal nitrate to a sol-gel reaction in the presence of terminally branched copolymer particles represented by the following general formula (1) and having a number average molecular weight of not more than $2.5 \times 10^4$, a step of obtaining an organic-inorganic composite by drying the reaction solution obtained in the above step, and a step of producing a porous metal oxide by removing the above-mentioned terminally branched copolymer particles from the above-mentioned organic-inorganic composite,

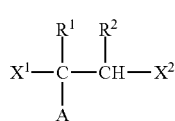

(1)

wherein, in the formula, A represents a polyolefin chain; $R^1$ and $R^2$ each represents a hydrogen atom or an alkyl group having 1 to 18 carbon atoms, and at least one of $R^1$ and $R^2$ is a hydrogen atom; $X^1$ and $X^2$ are the same or different from each other, and each represents a linear or branched polyalkylene glycol group; and $X^1$ and $X^2$ may be bonded to a carbon atom through a hydrocarbon group, an oxygen atom, a sulfur atom or a nitrogen atom.

[12] The method for producing a porous metal oxide according to [11], in which the step of subjecting the metal alkoxide and/or a partially hydrolyzed condensate of the metal alkoxide to a sol-gel reaction is a step of producing a mixed composition by mixing the terminally branched copolymer particles, the metal alkoxide and/or a partially hydrolyzed condensate of the metal alkoxide, water and/or a solvent dissolving a part of water or entire water in any proportions, and a catalyst to be used for a sol-gel reaction and at the same time, subjecting the metal alkoxide and/or a partially hydrolyzed condensate of the metal alkoxide to a sol-gel reaction in the presence of the catalyst to be used for a sol-gel reaction.

[13] The method for producing a porous metal oxide according to [11] or [12], in which the step of subjecting the metal alkoxide and/or a partially hydrolyzed condensate of the metal alkoxide to a sol-gel reaction includes a step of mixing the metal alkoxide and/or a partially hydrolyzed condensate of the metal alkoxide, water and/or a solvent dissolving a part of water or entire water in any proportions, and a catalyst to be used for a sol-gel reaction, and subjecting the metal alkoxide and/or a partially hydrolyzed condensate of the metal alkoxide to a sol-gel reaction; and a step of adding the terminally branched copolymer particles while continuing the sol-gel reaction in the above step.

[14] The method for producing a porous metal oxide according to any one of [11] to [13], in which the step of obtaining an organic-inorganic composite includes a step of drying the reaction solution by the spray dryer method, and forming a particulate organic-inorganic composite.

[15] The method for producing a porous metal oxide according to any one of [11] to [13], in which the step of obtaining an organic-inorganic composite includes a step of forming a film-like organic-inorganic composite by applying the reaction solution over a substrate and drying the resulting material.

[16] The method for producing a porous metal oxide according to any one of [11] to [15], in which, in the terminally branched copolymer represented by the above general formula (1), $X^1$ and $X^2$ are the same or different from each other, and are each the general formula (2) or the general formula (4),

(2)

wherein, in the formula, E represents an oxygen atom or a sulfur atom; and $X^3$ represents a polyalkylene glycol group or a group represented by the following general formula (3),

(3)

wherein, in the formula, $R^3$ represents an (m+1)-valent hydrocarbon group; G may be the same or different from each other, and each represents a group represented by —$OX^4$ or —$NX^5X^6$ ($X^4$ to $X^6$ each represents a polyalkylene glycol group); and m is the bonding number of $R^3$ and G, and represents an integer of 1 to 10,

(4)

wherein, in the formula, $X^7$ and $X^8$ are the same or different from each other, and each represents a polyalkylene glycol group or a group represented by the above general formula (3).

[17] The method for producing a porous metal oxide according to any one of [11] to [16], in which the terminally branched copolymer is represented by the following general formula (1a) or (1b),

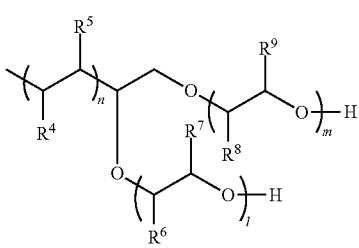

(1a)

wherein, in the formula, $R^4$ and $R^5$ each represents a hydrogen atom or an alkyl group having 1 to 18 carbon atoms, and at least one of $R^4$ and $R^5$ is a hydrogen atom; $R^6$ and $R^7$ each represents a hydrogen atom or a methyl group, and at least one of $R^6$ and $R^7$ is a hydrogen atom; $R^8$ and $R^9$ each represents a hydrogen atom or a methyl group, and at least one of $R^8$ and $R^9$ is a hydrogen atom; l+m represents an integer of 2 to 450; and n represents an integer of 20 to 300,

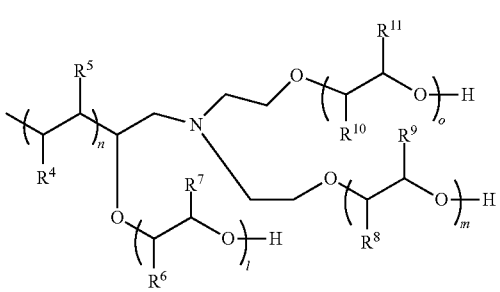

(1b)

wherein, in the formula, $R^4$ and $R^5$ each represents a hydrogen atom or an alkyl group having 1 to 18 carbon atoms, and at least one of $R^4$ and $R^5$ is a hydrogen atom; $R^6$ and $R^7$ each represents a hydrogen atom or a methyl group, and at least one of $R^6$ and $R^7$ is a hydrogen atom; $R^8$ and $R^9$ each represents a hydrogen atom or a methyl group, and at least one of $R^8$ and $R^9$ is a hydrogen atom; $R^{10}$ and $R^{11}$ each represents a hydrogen atom or a methyl group, and at least one of $R^{10}$ and $R^{11}$ is hydrogen atom; l+m+o represents an integer of 3 to 450; and n represents an integer of 20 to 300.

[18] A catalyst or a catalyst carrier comprising the porous metal oxide according to any one of [1] to [10].

[19] A material carrier comprising the porous metal oxide according to any one of [1] to [10].

[20] A solid electrolyte film comprising the porous metal oxide according to any one of [1] to [10].

[21] A deodorant comprising the porous metal oxide according to any one of [1] to [10].

[22] A filtration film comprising the porous metal oxide according to any one of [1] to [10].

[23] A separation film comprising the porous metal oxide according to any one of [1] to [10].

[24] A release-controlling material comprising the porous metal oxide according to any one of [1] to [10].

[25] An insulating film used as a substrate constituting a circuit board or an interlayer insulating film, comprising the porous metal oxide according to any one of [1] to [10].

[26] The insulating film according to [25], wherein the dielectric constant measured at 10 MHz by the static capacitor method is not more than 2.0.

[27] The insulating film according to [25] or [26], wherein the elastic modulus is not less than 8 GPa.

[28] The insulating film according to any one of [25] to [27], wherein the hardness is not less than 0.5 GPa.

[29] The insulating film according to any one of [25] to [28], wherein the surface of the porous metal oxide and the inside of pores are hydrophobized.

[30] The insulating film according to any one of [25] to [29], wherein the metal constituting the porous metal oxide is silicon.

[31] A substrate constituting a circuit board, comprising the insulating layer according to any one of [25] to [30].

[32] An interlayer insulating film comprising the insulating layer according to any one of [25] to [30].

[33] A method for producing an insulating film, including a step of subjecting the surface of the porous metal oxide and the inside of pore to a hydrophobic treatment after a step of producing a porous metal oxide in the method for producing a porous metal oxide according to any one of [11] to [16].

[34] The method for producing an insulating film according to [33], in which the hydrophobic treatment is carried out by the chemical vapor adsorption (CVA) using a silazane compound, a siloxane compound or a chlorosilane compound.

[35] A filler used for filling in a substrate constituting a circuit board or an interlayer insulating film, comprising metal oxide particles formed from the porous metal oxide according to any one of [1] to [10].

[36] The filler according to [35], wherein the pore volume of mesopores in the metal oxide particles is not less than 0.1 ml/g.

[37] The filler according to [35] or [36], wherein the specific surface area by the BET method is not less than 100 $m^2/g$.

[38] The filler according to any one of [35] to [37], wherein the dielectric constant measured at 1 MHz by the static capacitor method is not more than 2.0.

[39] The filler according to any one of [35] to [38], wherein the surface of the metal oxide particles and the inside of pores are hydrophobized.

[40] A film obtained by dispersing the filler according to any one of [35] to [39] in a matrix resin.

[41] A substrate constituting a circuit board, comprising the film according to [40].

[42] An interlayer insulating film comprising the film according to [40].

[43] A method for producing a filler, in which the step of forming a particulate organic-inorganic composite in the method for producing a porous metal oxide according to [14] is a step of forming a particulate organic-inorganic composite having a diameter of 0.1 to 100 μm by the spray dryer method using the reaction solution.

[44] An antireflection film comprising the porous metal oxide according to any one of [1] to [10].

[45] The antireflection film according to [44], wherein the refractive index at a wavelength of 590 nm is not more than 1.4.

[46] The antireflection film according to [44] or [45], wherein the elastic modulus is not less than 8 GPa.

[47] The antireflection film according to any one of [44] to [46], wherein the hardness is not less than 0.5 GPa.

[48] The antireflection film according to any one of [44] to [47], arranged on a surface of a display screen comprising a transparent base material.

[49] The antireflection film according to any one of [44] to [48], wherein the metal constituting the porous metal oxide is silicon.

[50] An optical material using the antireflection film according to any one of [44] to [49].

[51] A lightweight filler comprising metal oxide particles formed from the porous metal oxide according to any one of [1] to [10].

[52] The lightweight filler according to [51], wherein the average particle size of the metal oxide particle is from 0.1 to 100 μm.

[53] The lightweight filler according to [51] or [52], wherein the bulk specific gravity determined by the tapping method is not more than 0.2 g/ml.

[54] The lightweight filler according to anyone of [51] to [53], wherein the thermal conductivity determined by the laser flash method is not more than 0.15 W/mK.

[55] The lightweight filler according to anyone of [51] to [54], wherein the metal constituting the metal oxide particles is silicon.

[56] A method for producing a lightweight filler, in which the step of forming a particulate organic-inorganic composite in the method for producing a porous metal oxide according to [14] is a step of forming a particulate organic-inorganic composite having a diameter of 0.1 to 100 μm by the spray dryer method using the reaction solution.

[57] A resin composition using the lightweight filler according to any one of [51] to [55].

[58] A photocatalyst comprising the porous metal oxide according to any one of [1] to [4] and [6] to [10], wherein the porous metal oxide is a titania porous body.

[59] The photocatalyst according to [58], wherein mesopores in the titania porous body have a vertical orientation.

[60] The photocatalyst according to [58] or [59], wherein the transmittance in the wavelength range of 400 to 600 nm is not less than 80%.

[61] The photocatalyst according to any one of [58] to [60], wherein the photocatalyst is in the form of a film.

[62] The photocatalyst according to any one of [58] to [61], wherein the water contact angle on the photocatalyst immediately before irradiation with ultraviolet light is not more than 20 degrees.

[63] The photocatalyst according to any one of [58] to [62], wherein the water contact angle on the photocatalyst kept at a dark place for 1 day after irradiation with ultraviolet light is not more than 10 degrees.

[64] The photocatalyst according to any one of [58] to [62], used for an electrode material for a dye-sensitized solar cell.

[65] A moisture absorbing agent or a moisture controlling agent comprising the porous metal oxide according to any one of [1] to [9].

Incidentally, in the present invention, the almost uniform mesopores in the range of a pore diameter of 5 to 30 nm does not mean that the average pore diameter of mesopores is in the range of 5 to 30 nm, but it means that the measured pore diameters of mesopores are in the range of 5 to 30 nm and the pore size distribution of mesopores is in the range of 5 to 30 nm. Also, in the present invention, the metal also includes Si.

According to the present invention, with the use of particles in which the average particle size of 50% by volume is small and the particle size is constant regardless of the dilute concentration, there are provided a porous metal oxide in which mesopores form a cubic phase and the pore diameter is uniformly large, a method for producing the porous metal oxide, and use.

BRIEF DESCRIPTION OF THE DRAWINGS

FIGS. 30A and 30B are a TEM image and EELS mapping analysis results of the titania porous body in Example f1.

FIGS. 34A and 34B are the XRD measurement results and FFT transform analysis results of a TEM image in Example f1.

DESCRIPTION OF EMBODIMENTS

Figure 1A:
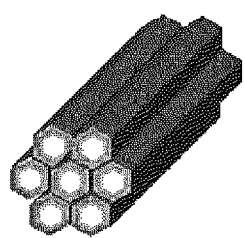
FIGS. 1A and 1B are a schematic view of a hexagonal structure and a cubic structure.
Figure 1B:
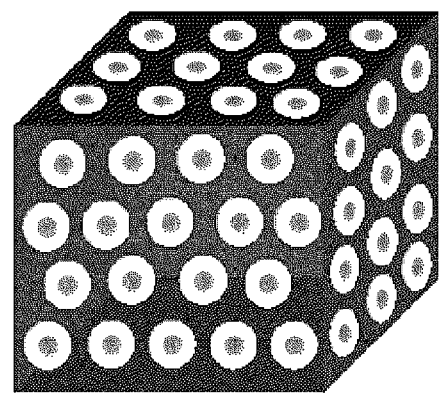

Hereinafter, the porous metal oxide of the present invention and use thereof will be described with reference to the first embodiment to the sixth embodiment.

1. First Embodiment

The porous metal oxide of the present invention has uniform mesopores, and its average pore diameter is from 5 to 30 nm and preferably from 10 to 30 nm.

In general, examples of the uniform three-dimensional regular structure include a lamellar structure, a hexagonal structure and a cubic structure as shown in schematic views of FIGS. 1A and 1B, FIGS. 2A and 2B and FIG. 3. The lamellar structure is a structure obtained by alternatively stacking a planar inorganic layer and a plate-like air layer, in which pores become a plate-like layer. The hexagonal structure is a honeycomb-formed structure of a hollow column (ideally a hexagonal prism) structure, and a porous structure with uniform pores in which uniform pores are aligned in an orderly manner in a high density. There are several forms in the cubic structure. Typical examples include Pm3n, Im3n, Fm3m, Fd3m, and further Ia3d, Pn3m and Im3n in which mesopores are bicontinuously bonded, as shown in the schematic view of FIG. 3. However, in this embodiment, with the use of the terminally branched copolymer particles dispersed in water, an organic solvent or the like as the template, it is possible to easily produce a porous metal oxide in which mesopores form a cubic phase, and the pore diameter is almost uniform in the range of 5 to 30 nm.

Furthermore, for the porous metal oxide of this embodiment, the porosity determined using the total pore volume by the nitrogen gas adsorption method is from 1 to 80% by volume and preferably from 10 to 75% by volume.

For the porous metal oxide of this embodiment, even though the porosity and the average pore diameter of mesopores are large, the pore diameter is almost uniform, and further mesopores form a cubic phase, so that the porous metal oxide is excellent in the mechanical strength and may be designed for development for various uses.

First, the terminally branched copolymer used as the template will be described.

Terminally Branched Copolymer

The terminally branched copolymer constituting polymer particles used in this embodiment has a structure represented by the following general formula (1),

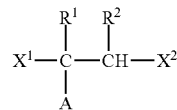

wherein, in the formula, A represents a polyolefin chain; $R^1$ and $R^2$ each represents a hydrogen atom or an alkyl group having 1 to 18 carbon atoms, and at least one of $R^1$ and $R^2$ is a hydrogen atom; $X^1$ and $X^2$ are the same or different from each other, and each represents a linear or branched polyalkylene glycol group; and $X^1$ and $X^2$ may be bonded to a carbon atom through a hydrocarbon group, an oxygen atom, a sulfur atom or a nitrogen atom.

The number average molecular weight of the terminally branched copolymer represented by the general formula (1) is not more than $2.5 \times 10^4$, preferably from $5.5 \times 10^2$ to $1.5 \times 10^4$ and more preferably from $8 \times 10^2$ to $4.0 \times 10^3$. Its number average molecular weight is represented by the sum of the number average molecular weight of the polyolefin chain represented by A, the number average molecular weight of the polyalkylene glycol group represented by $X^1$ and $X^2$, and the molecular weight of the $R^1$, $R^2$ and $C_2H$ portions.

If the number average molecular weight of the terminally branched copolymer is in the above range, it is preferable because the stability of particles in the dispersion solution tends to be excellent when the terminally branched copolymer is used as a dispersoid, the dispersion properties into water and/or an organic solvent having an affinity for water tend to be excellent, and preparation of the dispersion solution becomes easy.

The polyolefin chain represented by A in the general formula (1) is obtained by polymerizing an olefin having 2 to 20 carbon atoms. Examples of the olefin having 2 to 20 carbon atoms include α-olefins such as ethylene, propylene, 1-butene, 1-hexene and the like. In this embodiment, the polymer may be a homopolymer or copolymer of these olefins, or even a product of copolymerization with other polymerizable unsaturated compounds in the ranges in which the properties are not impaired. Among these olefins, particularly preferably used are ethylene, propylene and 1-butene.

In the general formula (1), the number average molecular weight measured by GPC, of the polyolefin chain represented by A, is from 400 to 8,000, preferably from 500 to 4,000 and further preferably from 500 to 2,000. The number average molecular weight used herein is a value calibrated with polystyrene standards.

When the number average molecular weight of the polyolefin chain represented by A is in the above range, it is preferable because crystallinity of the polyolefin portion tends to be high, the stability of the dispersion solution tends to be excellent, and preparation of the dispersion solution tends to be easy because of the low melt viscosity.

The ratio of the weight average molecular weight (Mw) and the number average molecular weight (Mn), both measured by GPC, of the polyolefin chain represented by A in the general formula (1), that is, the molecular weight distribution (Mw/Mn), is not particularly limited and may usually range from 1.0 to a few tens; however, the ratio is more preferably not more than 4.0 and further preferably not more than 3.0.

When the molecular weight distribution (Mw/Mn) of the group represented by A in the general formula (1) is in the above range, it is preferable in view of the shape of particles in the dispersion solution and uniformity of the particle size.

According to GPC, the number average molecular weight (Mn) and the molecular weight distribution (Mw/Mn) of the group represented by A may be measured using, for example, GPC-150 from Millipore Corp. under the following conditions.

Separating column: TSK GNH HT (column size: diameter of 7.5 mm, length: 300 mm)
Column temperature: 140 degrees centigrade
Mobile phase: o-dichlorobenzene (a product of Wako Pure Chemical Industries, Ltd.)
Anti-oxidant: 0.025 weight % of butylhydroxytoluene (a product of Takeda Pharmaceutical Co., Ltd.)
Flow rate: 1.0 ml/min
Sample concentration: 0.1 weight %
Sample injection amount: 500 µl
Detector: differential refractometer Incidentally, the molecular weight of the polyolefin chain represented by A may be measured by measuring the molecular weight of the polyolefin having an unsaturated group at one terminal as described later and subtracting the corresponding amount of the terminal molecular weight.

$R^1$ and $R^2$ are each a hydrogen atom or a hydrocarbon group having 1 to 18 carbon atoms, which is a substituent attached to a double bond of the olefin constituting A and preferably a hydrogen atom or an alkyl group having 1 to 18 carbon atoms. Preferred examples of the alkyl group include a methyl group, an ethyl group and a propyl group.

In the general formula (1), $X^1$ and $X^2$ are the same or different from each other, and each represents a linear or branched polyalkylene glycol group, whose respective number average molecular weights are 50 to 10,000. The branched embodiment of the branched alkylene glycol group is a branch linked through a polyvalent hydrocarbon group or a nitrogen atom, and the like. Examples thereof include a branch from a hydrocarbon group bonded to two or more nitrogen atoms, oxygen atoms or sulfur atoms in addition to the main skeleton, a branch from a nitrogen atom bonded to two alkylene groups in addition to the main skeleton, and the like.

When the number average molecular weight of the polyalkylene glycol group is in the above range, it is preferable because the dispersion properties of the dispersion solution tend to be excellent and preparation of the dispersion solution becomes easy because of the low melt viscosity.

$X^1$ and $X^2$ of the general formula (1) have the above-described structure, whereby there are obtained polymer particles composed of a terminally branched copolymer having a particle size with an average particle size of 50% by volume of from 1 to 1,000 nm without using a surfactant.

In the general formula (1), as preferred examples, $X^1$ and $X^2$ are the same or different from each other, and each represents a group represented by the following general formula (2) or the general formula (4),

  (2)

wherein, in the formula, E represents an oxygen atom or a sulfur atom; and $X^3$ represents a polyalkylene glycol group or a group the following general formula (3),

  (3)

wherein, in the formula, $R^3$ represents an (m+1)-valent hydrocarbon group; G may be the same or different from each other, and each represents a group represented by —$OX^4$ or —$NX^5X^6$ ($X^4$ to $X^6$ each represents a polyalkylene glycol group); and m is the bonding number of $R^3$ and G, and represents an integer of 1 to 10,

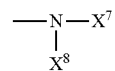  (4)

wherein, in the formula, $X^7$ and $X^8$ are the same or different from each other, and each represents a polyalkylene glycol group or a group represented by the above general formula (3).

In the general formula (3), the group represented by $R^3$ is an (m+1)-valent hydrocarbon group having 1 to 20 carbon atoms. m is 1 to 10, preferably 1 to 6 and particularly preferably 1 to 2.

A preferred example of the general formula (1) includes a terminally branched copolymer in which, in the general formula (1), one of $X^1$ and $X^2$ is a group represented by the general formula (4). A further preferred example includes a terminally branched copolymer in which one of $X^1$ and $X^2$ is a group represented by the general formula (4) and the other is a group represented by the general formula (2).

Another preferred example of the general formula (1) includes a terminally branched copolymer in which, in the general formula (1), one of $X^1$ and $X^2$ is a group represented by the general formula (2), and a further preferred example includes a terminally branched copolymer in which both $X^1$ and $X^2$ are each a group represented by the general formula (2).

A further preferred structure of $X^1$ and $X^2$ represented by the general formula (4) includes a group represented by the general formula (5),

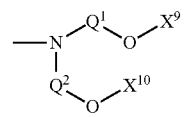  (5)

wherein, in the formula, $X^9$ and $X^{10}$ are the same or different from each other, and each represents a polyalkylene glycol group; and $Q^1$ and $Q^2$ are the same or different from each other, and each represents a divalent hydrocarbon group.

The divalent hydrocarbon group represented by $Q^1$ and $Q^2$ in the general formula (5) is preferably a divalent alkylene group, and more preferably an alkylene group having 2 to 20 carbon atoms. The alkylene group having 2 to 20 carbon atoms may have or may not have substituent(s), and examples thereof include an ethylene group, a methylethylene group, an ethylethylene group, a dimethylethylene group, a phenylethylene group, a chloromethylethylene group, a bromomethylethylene group, a methoxymethylethylene group, an aryloxymethylethylene group, a propylene group, a trimethylene group, a tetramethylene group, a hexamethylene group, a cyclohexylene group and the like. The alkylene group is preferably a hydrocarbon based alkylene group, particularly preferably an ethylene group or a methylethylene group, and further preferably an ethylene group. $Q^1$ and $Q^2$ may be one alkylene group, or two or more kinds of alkylene groups in mixture.

A further preferred structure of $X^1$ and $X^2$ represented by the general formula (2) includes a group represented by the general formula (6),

  (6)

wherein, in the formula, $X^{11}$ represents a polyalkylene glycol group.

The polyalkylene glycol group represented by $X^3$ to $X^{11}$ is a group obtained by the addition polymerization of alkylene oxide. Examples of the alkylene oxide constituting the polyalkylene glycol group represented by $X^3$ to $X^{11}$ include ethylene oxide, propylene oxide, butylene oxide, styrene oxide, cyclohexene oxide, epichlorohydrin, epibromohydrin, methyl glycidyl ether, allyl glycidyl ether and the like. Among these, preferably used are propylene oxide, ethylene oxide, butylene oxide and styrene oxide. More preferably used are propylene oxide and ethylene oxide, and particularly preferably used is ethylene oxide. The polyalkylene glycol group represented by $X^3$ to $X^{11}$ may be a group obtained by homopolymerization of these alkylene oxides, or may be a group obtained by copolymerization of two or more kinds thereof. Preferred examples of the polyalkylene glycol group include a polyethylene glycol group, a polypropylene glycol group, or a group obtained by copolymerization of polyethylene oxide and polypropylene oxide, and a particularly preferred example includes a polyethylene glycol group.

When $X^1$ and $X^2$ in the general formula (1) have the above-described structure, it is preferable because the dispersion properties of water and/or an organic solvent having an affinity for water become excellent when the terminally branched copolymer of the present invention is used as a dispersoid.

As the terminally branched copolymer which can be used in this embodiment, it is preferable to use a polymer represented by the following general formula (1a) or (1b),

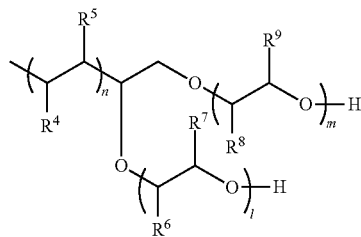

(1a)

wherein, in the formula, $R^4$ and $R^5$ each represents a hydrogen atom or an alkyl group having 1 to 18 carbon atoms, and at least one of $R^4$ and $R^5$ is a hydrogen atom; as the alkyl group, preferably used is an alkyl group having 1 to 9 carbon atoms and further preferably used is an alkyl group having 1 to 3 carbon atoms;

$R^6$ and $R^7$ each represents a hydrogen atom or a methyl group, and at least one of $R^6$ and $R^7$ is a hydrogen atom; $R^8$ and $R^9$ each represents a hydrogen atom or a methyl group, and at least one of $R^8$ and $R^9$ is a hydrogen atom; l+m represents an integer of 2 to 450 and preferably an integer of 5 to 200; and n represents an integer of 20 to 300 and preferably an integer of 25 to 200,

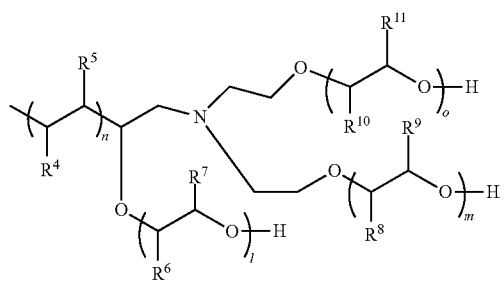

(1b)

wherein, in the formula, $R^4$ and $R^5$ each represents a hydrogen atom or an alkyl group having 1 to 18 carbon atoms, and at least one of $R^4$ and $R^5$ is a hydrogen atom; as the alkyl group, preferably used is an alkyl group having 1 to 9 carbon atoms and further preferably used is an alkyl group having 1 to 3 carbon atoms;

$R^6$ and $R^7$ each represents a hydrogen atom or a methyl group, and at least one of $R^6$ and $R^7$ is a hydrogen atom; $R^8$ and $R^9$ each represents a hydrogen atom or a methyl group, and at least one of $R^8$ and $R^9$ is a hydrogen atom; $R^{10}$ and $R^{11}$ each represents a hydrogen atom or a methyl group, and at least one of $R^{10}$ and $R^{11}$ is a hydrogen atom; l+m+o represents an integer of 3 to 450 and preferably an integer of 5 to 200; and n represents an integer of 20 to 300 and preferably an integer of 25 to 200.

As the polymer represented by the general formula (1b), further preferably used is a polymer represented by the following general formula (1c),

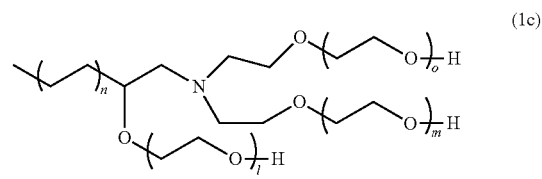

(1c)

wherein, in the formula, l+m+o and n are the same as those in the general formula (1b).

The number of ethylene units (n) of the polyethylene chain is calculated by dividing the number average molecular weight (Mn) of the polyolefin group A in the general formula (1) by the molecular weight of the ethylene unit. Furthermore, the total number of ethylene glycol units of the polyethylene glycol chain (l+m or l+m+o) is calculated on the assumption that the weight ratio of the polymer raw material to ethylene oxide in use during the addition reaction of the polyethylene glycol group is the same as the ratio of the polymer raw material to the number average molecular weight (Mn) of the polyethylene glycol group.

For example, in the terminally branched copolymer (T-2) obtained in Synthesis Example a2 of this embodiment, since the weight ratio of a polymer raw material (I-1) to ethylene oxide in use is 1:1, Mn of the polymer raw material (I-1) is 1,223 and Mn of extended ethylene glycol unit also becomes 1,223. The total number of ethylene glycol units of the PEG chain (l+m+o) may be calculated by dividing this value by the molecular weight of the ethylene glycol unit.

Meanwhile, n, l+m or l+m+o can be measured by $^1$H-NMR. For example, in the terminally branched copolymer (T-1) obtained in Synthesis Example a1 and the like, and particles in the dispersion system containing the copolymer (T-1), it may be calculated from the integral value for the methylene group of the polyolefin group A (shift value: 1.06 to 1.50 ppm) and the integral value for the alkylene group of PEG (shift value: 3.33 to 3.72 ppm) when the integral value for the methyl group at the terminal of the polyolefin group A in the general formula (1) (shift value: 0.88 ppm) is taken as the three-proton fraction.

Specifically, the number average molecular weight of the polyolefin group A and alkylene group may be calculated from the respective integral values from the facts that the molecular weight of the methyl group is 15, the molecular weight of the methylene group is 14, and the molecular weight of the alkylene group is 44. n may be calculated by dividing the number average molecular weight of the polyolefin group A obtained herein by the molecular weight of the ethylene unit, while the total number of the ethylene glycol unit of the PEG chain (l+m or l+m+o) may be calculated by dividing the number average molecular weight of the alkylene group by the molecular weight of the ethylene glycol unit.

When the polyolefin group A is composed of an ethylene-propylene copolymer, n and l+m or l+m+o may be calculated by using both the content of propylene which can be measured by IR, $^{13}$C-NMR and the like, and the integral value in $^1$H-NMR. In $^1$H-NMR, a method of using an internal standard is also effective.

Method for Producing Terminally Branched Copolymer

The terminally branched copolymer can be prepared by the following methods.

First, among the desired terminally branched copolymers, a polyolefin represented by the general formula (7) and having a double bond at one terminal is prepared as the polymer corresponding to the structure of A represented by the general formula (1),

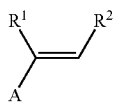

(7)

wherein, in the formula, A represents a group of an olefin having 2 to 20 carbon atoms, whose number average molecular weight is 400 to 8,000; and $R^1$ and $R^2$ each represents a hydrogen atom or an alkyl group having 1 to 18 carbon atoms, and at least one of $R^1$ and $R^2$ is a hydrogen atom.

This polyolefin can be prepared according to the following methods:

(1) A polymerization method of using a transition metal compound having a salicylaldimine ligand as described in Japanese Laid-open Patent Publication No. 2000-239312, Japanese Laid-open Patent Publication No. 2001-2731, Japanese Laid-open Patent Publication No. 2003-73412 and the like, as the polymerization catalyst;

(2) A polymerization method of using a titanium based catalyst comprising a titanium compound and an organic aluminum compound;

(3) A polymerization method of using a vanadium based catalyst comprising a vanadium compound and an organic aluminum compound; and (4) A polymerization method of using a Ziegler type catalyst comprising a metallocene compound such as zirconocene or the like, and an organic aluminum oxy compound (aluminoxane).

Among the aforementioned methods (1) to (4), particularly according to method (1), the aforementioned polyolefin can be prepared with good efficiency. In method (1), the aforementioned polyolefin having a double bond at one terminal can be prepared by polymerizing or copolymerizing the above-mentioned olefin in the presence of the aforementioned transition metal compound having a salicylaldimine ligand.

The polymerization of olefin according to method (1) can be carried out by either a liquid phase polymerization method such as solution polymerization or suspension polymerization, or a gas phase polymerization method. Detailed conditions and the like are already known, and the polyolefin can be prepared by referring to the above-described patent documents.

The molecular weight of the polyolefin obtained according to method (1) can be adjusted by adding hydrogen to the polymerization system, by varying the polymerization temperature, or by changing the kind of catalyst in use.

Subsequently, the polyolefin is epoxidized, that is, the double bonds at the terminals of the polyolefin are oxidized to obtain a polymer containing a terminal epoxy group represented by the general formula (8),

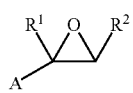

(8)

wherein, in the formula, A, $R^1$ and $R^2$ are the same as those described above.

The method for epoxidating a polyolefin is not particularly limited, but the following methods may be mentioned:

(1) Oxidation by peracid such as performic acid, peracetic acid, perbenzoic acid or the like;

(2) Oxidation by titanosilicate and hydrogen peroxide;

(3) Oxidation by a rhenium oxide catalyst such as methyltrioxorhenium, and hydrogen peroxide;

(4) Oxidation by a porphyrin complex catalyst such as manganese porphyrin, iron porphyrin or the like, and hydrogen peroxide or hypochlorite;

(5) Oxidation by a salen complex such as manganese salen or the like, and hydrogen peroxide or hypochlorite;

(6) Oxidation by a TACN complex such as manganese triazacyclononane (TACN) complex or the like, and hydrogen peroxide; and (7) Oxidation by hydrogen peroxide in the presence of a Group VI transition metal catalyst such as a tungsten compound or the like, and a phase transfer catalyst.

Among the methods (1) to (7), methods (1) and (7) are particularly preferred in view of activity.

Further, for example, an epoxy-terminated polymer having a low molecular weight Mw of about 400 to 600 that can be used is VIKOLOX™ (registered trademark, a product of Arkema Inc.).

It is possible to obtain a polymer (polymer (I)) in which various substituents $Y^1$ and $Y^2$ are introduced into α- and β-positions of the polymer end as represented by the general formula (9) by reacting various reaction reagents with the epoxy-terminated polymer represented by the general formula (8) obtained according to the aforementioned methods,

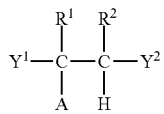

(9)

wherein, in the formula, A, $R^1$ and $R^2$ are the same as those described above; and $Y^1$ and $Y^2$ are the same or different from each other, and each represents a hydroxyl group, an amino group or the following general formulae (10a) to (10c),

(10a)

(10b)

(10c)

wherein, in the general formulae (10a) to (10c), E represents an oxygen atom or a sulfur atom; $R^3$ represents an (m+1)-valent hydrocarbon group; T may be the same or different from each other, and each represents a hydroxyl group or an amino group; and m represents an integer of 1 to 10.

For example, there is obtained a polymer in which, in the general formula (9), both of $Y^1$ and $Y^2$ are each a hydroxyl group by hydrolyzing the epoxy-terminated polymer represented by the general formula (8), while there is obtained a polymer in which one of $Y^1$ and $Y^2$ is an amino group and the other one is a hydroxyl group by reacting with ammonia.

Furthermore, there is obtained a polymer in which, in the general formula (9), one of $Y^1$ and $Y^2$ is a group represented by the general formula (10a) and the other one is a hydroxyl group by reacting the epoxy-terminated polymer represented by the general formula (8) with a reaction reagent A represented by the general formula (11a),

$$\text{HE-R}^3\text{-(T)}_m \tag{11a}$$

wherein, in the formula, E, $R^3$, T and m are the same as those described above.

Furthermore, there is obtained a polymer in which, in the general formula (9), one of $Y^1$ and $Y^2$ is a group represented by the general formula (10b) or (10c) and the other one is a hydroxyl group by reacting the epoxy-terminated polymer with a reaction reagent B represented by the general formula (11b) or (11c),

$$\text{HN}\!\!-\!\!(\text{R}^3\text{-(T)}_m)_2 \tag{11b}$$

$$\text{H}_2\text{N}\!\!-\!\!\text{R}^3\text{-(T)}_m \tag{11c}$$

wherein, in the formula, $R^3$, T and m are the same as those described above.

Examples of the reaction reagent A represented by the general formula (11a) include glycerin, pentaerythritol, butanetriol, dipentaerythritol, polypentaerythritol, dihydroxybenzene, trihydroxybenzene and the like.

Examples of the reaction reagent B represented by the general formula (11b) or (11c) include ethanolamine, diethanolamine, aminophenol, hexamethyleneimine, ethylenediamine, diaminopropane, diaminobutane, diethylenetriamine, N-(aminoethyl)propanediamine, iminobispropylamine, spermidine, spermine, triethylenetetraamine, polyethyleneimine and the like.

The addition reaction of an epoxy compound with alcohols or amines is well known, and the reaction can be easily carried out according to a usual method.

The general formula (1) can be prepared by carrying out an addition polymerization of the alkylene oxide using the polymer (I) represented by the general formula (9) as a raw material. Examples of the alkylene oxide include propylene oxide, ethylene oxide, butylene oxide, styrene oxide, cyclohexene oxide, epichlorohydrin, epibromohydrin, methyl glycidyl ether, allyl glycidyl ether and the like. These may be used in combination of two or more kinds. Among these, preferably used are propylene oxide, ethylene oxide, butylene oxide and styrene oxide, and more preferably used are propylene oxide and ethylene oxide.

For the catalyst, polymerization conditions and the like, known ring-opening polymerization methods for alkylene oxide may be used, and examples of obtaining polyol by polymerizing various monomers are disclosed in "Revised Polymer Synthesis Chemistry," written by Otsu Takayuki, Kagaku-Dojin Publishing Company, Inc., January 1971, pp. 172-180. Examples of the catalyst used in the ring-opening polymerization include, as described in the above literature, Lewis acids such as $AlCl_3$, $SbCl_5$, $BF_3$ and $FeCl_3$ for cationic polymerization; hydroxides or alkoxides of alkali metals, amines and phosphazene catalysts for anionic polymerization; and oxides, carbonates and alkoxides of alkaline earth metals, or alkoxides of Al, Zn, Fe and the like for coordinate anionic polymerization.

Here, the phosphazene catalysts may be exemplified by those compounds described in Japanese Laid-open Patent Publication No. 1998-77289, specifically the products resulting from changing the anion of commercially available tetrakis[tris(dimethylamino)phosphoranilidenamino] phosphonium chloride into an alkoxy anion by using an alkali metal alkoxide.

When the reaction solvent is used, those inert to the polymer (I) and the alkylene oxide may be used, and examples thereof include n-hexane, alicyclic hydrocarbons such as cyclohexane and the like, aromatic hydrocarbons such as toluene, xylene and the like, ethers such as dioxane and the like, and halogenated hydrocarbons such as dichlorobenzene and the like.

The amount of the catalyst to be used for the catalysts other than phosphazene catalysts is preferably in the range of 0.05 to 5 moles, and more preferably in the range of 0.1 to 3 moles, based on 1 mole of the polymer (I) as a raw material. The amount of phosphazene catalyst to be used is preferably from $1 \times 10^{-4}$ to $5 \times 10^{-1}$ moles and more preferably from $5 \times 10^{-4}$ to $1 \times 10^{-1}$ moles, based on 1 mole of the polymer (I), from the viewpoints of rate of polymerization, economic efficiency and the like.

The reaction temperature is usually from 25 to 180 degrees centigrade and preferably from 50 to 150 degrees centigrade, and although the reaction time varies depending on the reaction conditions such as the amount of catalyst in use, reaction temperature, reactivity of olefins and the like, it is usually from a few minutes to 50 hours.

The number average molecular weight of the general formula (1) may be calculated by a method of calculating it from the number average molecular weight of the polymer (I) represented by the general formula (8) as described above and the weight of the alkylene oxide to be polymerized, or a method of using NMR.

Polymer Particles

The polymer particles composed of such a terminally branched copolymer of this embodiment have a structure wherein the polyolefin chain portion represented by A in the general formula (1) is oriented in an internal direction, and are rigid particles in which this polyolefin chain portion has crystallinity.

The polymer particles of this embodiment can be dispersed again in a liquid such as a solvent or the like even after particles are taken out by drying of the dispersion solution, since the polyolefin chain portion thereof has crystallinity. The polymer particles of the this embodiment are rigid particles in which the melting point of the polyolefin chain portion contained in the particles is not less than 80 degrees centigrade and preferably not less than 90 degrees centigrade.

In Examples 52 and 53 of Patent Document (International Publication Pamphlet No. 2005/073282), there has been disclosed a method of obtaining micelles having an average particle size of from 15 to 20 nm using this terminally branched copolymer. However, the method disclosed therein is a method of fractionating the terminally branched copolymer into a toluene soluble fraction and a toluene insoluble fraction, and using the toluene soluble fraction in which the polyethylene chain portion of the terminally branched copolymer has a low molecular weight. Specifically, the terminally branched copolymer is melted under heating in the presence of toluene, and then a slurry liquid after cooling is separated by filtration and toluene is distilled off from the toluene solution and dried to obtain a polymer. The resultant polymer is mixed with water, stirred while boiling under the normal pressure, further stirred using ultrasonic waves and cooled to room temperature.

In polyethylene, there is a correlation between the molecular weight and the melting point such that the lower molecular weight indicates the lower melting point. Also, Example 52 and 53 of Patent Document (International Publication Pamphlet No. 2005/073282) disclose that the melting point of the toluene insoluble portion is not less than 100 degrees centigrade, and the melting point of the toluene soluble portion is approximately 70 degrees centigrade. Even though micelles disclosed in the Patent Document are cooled, it is possible to obtain particles having a crystallized polyethylene chain portion, whereas it is not possible to obtain rigid particles since the melting point is low for deteriorating crystallinity. Furthermore, there are some points to be improved, for example, micelles are easily formed by heating, and particle properties are lost for easily disintegrating particles.

On the other hand, the polymer particles of this embodiment are rigid particles with excellent crystallinity since the melting point of the polyolefin chain portion is in the above-described range, and disintegration of particles is suppressed even under heating at a higher temperature.

For the reason, in the production process and use situations for various uses as described later, disintegration of particles is suppressed so that the yield of the products and quality of the products are more stabilized without losing characteristics of the polymer particles of this embodiment.

Even when the polymer particles of this embodiment are dispersed in a solvent or the like, the particle size is constant regardless of the dilute concentration. Namely, the polymer particles are different from micelle particles dispersed in a liquid because the polymer particles have re-dispersion properties and uniform dispersion particle size.

Incidentally, an average particle size of 50% by volume of the polymer particles of this embodiment is preferably from 1 to 1,000 nm, preferably from 1 to 500 nm, more preferably from 1 to 100 nm and further preferably from 1 to 30 nm. The particle size of the polymer particles is measured using a dynamic light-scattering nanotrak particle size analyzer (Microtrack UPA-EX150, a product of Nikkiso Co., Ltd.). Specifically, the prepared dispersion is added dropwise to the analyzer so as to have an appropriate concentration and uniformly dispersed, and then average particle sizes of 10%, 50% and 90% by volume may be measured.

Dispersion Solution of Terminally Branched Copolymer Particles

The dispersion solution of this embodiment contains the aforementioned terminally branched copolymer in a dispersoid, wherein the dispersoid is dispersed in water and/or an organic solvent having an affinity for water as particles.

In this embodiment, the dispersion solution refers to a dispersion solution in which the terminally branched copolymer particles are dispersed, and which also includes any of the following:

(1) A dispersion solution containing the polymer particles obtained during production of the terminally branched copolymer particles;

(2) A dispersion solution obtained by further dispersing or dissolving other dispersoid, an additive or the like in the dispersion solution containing the polymer particles obtained during production of the terminally branched copolymer particles; and (3) A dispersion solution obtained by dispersing the terminally branched copolymer particles in water or an organic solvent having an affinity for water and dispersing or dissolving other dispersoid, an additive or the like.

The content of the aforementioned terminally branched copolymer in the dispersion solution of this embodiment is preferably from 0.1 to 50 weight %, more preferably from 1 to 40 weight % and further preferably from 1 to 20 weight %, based on 100 weight % of the total dispersion solution.

When the content of the terminally branched copolymer is in the above range, it is preferable because practical properties of the dispersion solution are excellent, and its viscosity can be properly maintained, and the dispersion solution becomes easily handled.

Meanwhile, an average particle size of 50% by volume of the particles in the dispersion solution of this embodiment is preferably from 1 to 1,000 nm, preferably from 1 to 500 nm, more preferably from 5 to 50 nm, and further preferably from 10 to 30 nm.

The average particle size of 50% by volume of the particle can be adjusted by varying a structure of the polyolefin portion of the aforementioned terminally branched copolymer and a structure of the terminal branched portion.

Incidentally, the average particle size of 50% by volume in this embodiment refers to a diameter of the particle at 50% of the cumulative volume when the total volume is 100%, and can be measured by using a dynamic light-scattering particle size distribution measuring apparatus or a Microtrack particle size distribution measuring apparatus.

Additionally, its shape can be observed, for example, using a transmission electron microscope (TEM) after carrying out negative staining with phosphotungstic acid.

The dispersion solution in this embodiment is obtained by dispersing the terminally branched copolymer in water and/or an organic solvent having an affinity for water.

Water is not particularly limited, and there may be used distilled water, ion exchange water, urban water, water for industrial use and the like. However, preferably used are distilled water and ion exchange water.

The organic solvent having an affinity for water is not particularly limited as long as the terminally branched copolymer can be dispersed therein, but examples thereof include ethylene glycol, tetraethylene glycol, isopropyl alcohol, acetone, acetonitrile, methanol, ethanol, dimethyl sulfoxide, dimethylformamide, dimethylimidazolidinone and the like.

Dispersion in this embodiment can be carried out in a method of physically dispersing the terminally branched copolymer in water and/or an organic solvent having an affinity for water by the mechanical shearing force.

The dispersion method is not particularly limited, but various dispersion methods may be used. Specifically, there can be mentioned a method of dispersing the terminally branched copolymer with a high-pressure homogenizer, a high-pressure homomixer, an extrusion kneader, an autoclave or the like in a molten state after mixing the terminally branched copolymer represented by the general formula (1) and water and/or an organic solvent having an affinity for water, a method of jet grinding at a high pressure, and a method of spraying from a pore. There can also be used a method of dispersing the terminally branched copolymer with a high-pressure homogenizer, a high-pressure homomixer or the like by mixing water and/or an organic solvent having an affinity for water after dissolving the aforementioned terminally branched copolymer in a solvent other than water in advance. At this time, a solvent used for dissolution of the terminally branched copolymer is not particularly limited as long as the terminally branched copolymer is dissolved, but examples thereof include toluene, cyclohexane, the aforementioned organic solvent having an affinity for water and the like. When it is not preferable that an organic solvent other than water is mixed into the dispersion solution, the organic solvent can be removed by distillation or the like.

More specifically, for example, the dispersion solution can be obtained by heating it with stirring while applying a shearing force at a temperature of not less than 100 degrees centigrade and preferably from 120 to 200 degrees centigrade in an autoclave equipped with a stirrer capable of applying a shearing force.

When the temperature is within the above range, the aforementioned terminally branched copolymer is easily dispersed because it becomes in a molten state, and the aforementioned terminally branched copolymer is hardly deteriorated by heating; therefore, such a temperature is preferable.

The time required for dispersion is different depending on the dispersion temperature or other dispersion conditions, but it is about 1 to 300 minutes.

The dispersion can be fully carried out during the aforementioned stirring time, and the aforementioned terminally branched copolymer is hardly deteriorated; therefore, such time is preferable. After the reaction, it is preferable to maintain the state of the shearing force as applied until the temperature in the dispersion solution becomes not more than 100 degrees centigrade and preferably not more than 60 degrees centigrade.

In the production of the dispersion solution in this embodiment, it is not essential to add a surfactant, but, for example, anionic surfactants, cationic surfactants, amphoteric surfactants, nonionic surfactants and the like may coexist.

Examples of the anionic surfactant include carboxylic acid salt, simple alkyl sulfonate, modified alkyl sulfonate, alkyl allyl sulfonate, alkyl sulfate ester salt, sulphonated oil, sulfuric acid ester, sulfonated fatty acid monoglyceride, sulphonated alkanol amide, sulphonated ether, alkyl phosphate ester salt, alkylbenzene phosphoric acid salt, naphthalenesulfonic acid-formalin condensate and the like.

Examples of the cationic surfactant include simple amine salt, modified amine salt, tetraalkyl quaternary ammonium salt, modified trialkyl quaternary ammonium salt, trialkylbenzyl quaternary ammonium salt, modified trialkylbenzyl quaternary ammonium salt, alkyl pyridinium salt, modified alkyl pyridinium salt, alkyl quinolinium salt, alkyl phosphonium salt, alkyl sulfonium salt and the like.

Examples of the amphoteric surfactant include betaine, sulfobetaine, sulfate betaine and the like.

Examples of the nonionic surfactant include monoglycerin fatty acid ester, polyglycol fatty acid ester, sorbitan fatty acid ester, sucrose fatty acid ester, fatty acid alkanol amide, fatty acid polyethylene glycol condensate, fatty acid amide polyethylene glycol condensate, fatty acid alcohol polyethylene glycol condensate, fatty acid amine polyethylene glycol condensate, fatty acid mercaptan polyethylene glycol condensate, alkylphenol polyethylene glycol condensate, polypropylene glycol polyethylene glycol condensate and the like.

These surfactants may be used singly or in combination of two or more kinds.

In the production of the dispersion solution of this embodiment, for the purpose of removing foreign substances or the like, a filtration step during the process may be carried out. In such a case, for example, a stainless steel filter (wire diameter: 0.035 mm, plain weave) of about 300 meshes may be arranged and pressure filtration (air pressure: 0.2 MPa) may be carried out.

The dispersion solution to be obtained according to the above-described method does not cause aggregation and precipitation even though the pH varies from 1 to 13 by adding various acids or bases, for example, acids such as hydrochloric acid, sulfuric acid, phosphoric acid and the like, or bases such as potassium hydroxide, sodium hydroxide, calcium hydroxide and the like. Furthermore, this dispersion solution does not cause aggregation and precipitation even in a wide temperature range such that heating and refluxing or freezing and thawing under the normal pressure are repeatedly carried out.

Water in the above method is not particularly limited, and distilled water, ion exchange water, urban water, water for industrial use and the like may be used. However, preferably used are distilled water and ion exchange water.

Meanwhile, the organic solvent having an affinity for water in the above method is not particularly limited as long as the dispersoid is soluble, but examples thereof include ethylene glycol, tetraethylene glycol, isopropyl alcohol, acetone, acetonitrile, methanol, ethanol, dimethyl sulfoxide, dimethylformamide, dimethylimidazolidinone and the like. When mixing of the organic solvent into the dispersion solution is not desired, the aforementioned organic solvent can be removed by distillation or the like after the preparation of the dispersion solution containing the dispersoid.

For the dispersion solution of this embodiment, when the aforementioned terminally branched copolymer is contained in an amount of 100 parts by weight, the dispersoid is contained in an amount of 0.001 to 20 parts by weight, preferably in an amount of 0.01 to 10 parts by weight and further preferably in an amount of 0.1 to 5 parts by weight.

When the content of the dispersoid is in the above range, it is preferable because physical properties of the dispersion solution are excellent in the practical point of view, and the dispersion solution hardly causes aggregation and precipitation.

Hereinafter, the method for producing a porous metal oxide using the aforementioned terminally branched copolymer particles will be described.

Method for Producing Porous Metal Oxide

The porous metal oxide of this embodiment is produced by forming an organic-inorganic composite of the terminally branched copolymer particles and metal oxide, and then removing the terminally branched copolymer particles as the template.

Specifically, the method includes the following steps:

Step (a): a step of subjecting a metal oxide precursor selected from metal alkoxide and/or a partially hydrolyzed condensate of the metal alkoxide, metal halide, metal acetate and metal nitrate to a sol-gel reaction in the presence of the aforementioned terminally branched copolymer particles;

Step (b): a step of obtaining an organic-inorganic composite by drying the reaction solution obtained in the above Step (a) and completing the sol-gel reaction; and Step (c): a step of producing a porous metal oxide by removing the terminally branched copolymer particles from the above organic-inorganic composite.

Hereinafter, respective steps will be described one by one.

Step (a)

In Step (a), specifically, a mixed composition is prepared by mixing the aforementioned terminally branched copolymer particles (A), the metal oxide precursor (B) selected from the metal alkoxide and/or a partially hydrolyzed condensate of the metal alkoxide, metal halide, metal acetate and metal nitrate, and water and/or a solvent dissolving a part of water or entire water in any proportions (C), and subjecting a metal oxide precursor to a sol-gel reaction. Further, the mixed composition may contain a catalyst to be used for a sol-gel reaction (D) for the purposes of accelerating a hydrolysis and polycondensation reaction of the metal oxide precursor.

The mixed composition is further specifically produced by adding "a catalyst to be used for a sol-gel reaction (D)" and water as necessary to the component (B) or a solution obtained by dissolving the component (B) in "water and/or a solvent dissolving a part of water or entire water in any proportions (C)" for mixing with stirring to carry out the sol-gel reaction of the component (B), and adding the polymer particles (A) while continuing this sol-gel reaction. The polymer particles (A) may be added as an aqueous dispersion solution or an organic solvent dispersion solution.

Furthermore, the mixed composition can also be produced by adding an aqueous dispersion solution of polymer particles (A) or an organic solvent dispersion solution to the component (B) or a solution obtained by dissolving the component (B) in the above solvent (C) for mixing with stirring, and then adding the catalyst (D) and further water as necessary for mixing with stirring.

It is generally good to increase the ratio of metal oxide in order to improve the mechanical strength. However, when a coating film thickness is high, there are defects such as cracks occurring during formation of a coating film and the like. Accordingly, for example, in order to form a coating film of not less than 1 μm, as the weight ratio of the terminally branched copolymer to the component (B), the component (B) is preferably from 10 to 2,500 parts by weight and further preferably from 10 to 1,800 parts by weight, based on 100 parts by weight of the terminally branched copolymer.

Metal Oxide Precursor (B)

Examples of the metal oxide precursor in this embodiment include metal alkoxide and/or a partially hydrolyzed condensate of the metal alkoxide, metal halide, metal acetate and metal nitrate.

As the metal alkoxide, compounds represented by the following formula (12) may be used.

$(R^1)xM(OR^2)y$ (12)

wherein, in the formula, $R^1$ represents a hydrogen atom, an alkyl group (methyl group, ethyl group, propyl group and the like), an aryl group (phenyl group, tolyl group and the like), a carbon-carbon double bond-containing organic group (acryloyl group, methacryloyl group, vinyl group and the like), a halogen-containing group (halogenated alkyl group such as chloropropyl group, fluoromethyl group or the like) and the like; $R^2$ represents a lower alkyl group having 1 to 6 carbon atoms and preferably having 1 to 4 carbon atoms; and in x and y, x+y is not more than 4 and x represents an integer of not more than 2.

Examples of M include Li, Na, Mg, Al, Si, K, Ca, Sc, Ti, V, Cr, Mn, Fe, Co, Ni, Cu, Zn, Rb, Sr, Y, Nb, Zr, Mo, Ag, Cd, In, Sn, Sb, Cs, Ba, La, Ta, Hf, W, Ir, Tl, Pb, Bi, rare earth metal and the like, and preferably used are metals (alkoxide) to be colorless metal oxides in the sol-gel reaction, such as, Si, Al, Zn, Zr, In, Sn, Ti, Pb, Hf, Co, Li, Ba, Fe, Mn and the like from the viewpoint of use as a coating film. Of the metals, preferably used are silicon (Si), aluminum (Al), zirconium (Zr), titanium (Ti), cobalt (Co), lithium (Li), barium (Ba), iron (Fe), manganese (Mn) and the like, and these metals may be used in combination.

Concrete examples include alkoxysilanes such as tetramethoxysilane (TMOS), tetraethoxysilane (TEOS), tetrapropoxysilane, tetraisopropoxysilane, methyltrimethoxysilane, methyltriethoxysilane, methyltripropoxysilane, methyltributoxysilane, ethyltrimethoxysilane, ethyltriethoxysilane, n-propyltrimethoxysilane, n-propyltriethoxysilane, isopropyltrimethoxysilane, isopropyltriethoxysilane, dimethyldimethoxysilane, dimethyldiethoxysilane, diphenyldimethoxysilane, diphenyldiethoxysilane, vinyltrimethoxysilane, vinyltriethoxysilane, phenyltrimethoxysilane, phenyltriethoxysilane, p-styryltrimethoxysilane, 3-methacryloxypropylmethyldimethoxysilane, 3-methacryloxypropylmethyldiethoxysilane, 3-methacryloxypropyltrimethoxysilane, 3-methacryloxypropyltriethoxysilane, 3-acryloxypropyltrimethoxysilane, 3-acryloxypropyltriethoxysilane, 3-chloropropyltriethoxysilane, trifluoromethyltrimethoxysilane, trifluoromethyltriethoxysilane and the like, and alkoxyaluminum, alkoxyzirconium, alkoxytitanium, alkoxycobalt, alkoxylithium, alkoxybarium, alkoxyiron and alkoxymanganese corresponding to these.

Furthermore, in addition to these metal alkoxides, metal alkoxide having various functional groups as R1 may also be used as shown in the following (1) to (4):

(1) compounds having an amino group and an alkoxysilyl group such as 3-aminopropyltrimethoxysilane, 3-aminopropyltriethoxysilane, 3-aminopropylmethyldimethoxysilane, 3-aminopropylmethyldiethoxysilane, N-2-(aminoethyl)-3-aminopropylmethyldimethoxysilane, N-2-(aminoethyl)-3-aminopropyltrimethoxysilane, 2-aminoethylaminomethyltrimethoxysilane, 3-aminopropyldimethylethoxysilane, 2-(2-aminoethylthioethyl)triethoxysilane, p-aminophenyltrimethoxysilane, N-phenyl-3-aminopropylmethyldimethoxysilane, N-phenyl-3-aminopropylmethyldiethoxysilane, N-phenyl-3-aminopropyltrimethoxysilane, N-phenyl-3-aminopropyltriethoxysilane and the like;

(2) compounds having a glycidyl group and an alkoxysilyl group such as 3-glycidoxypropylpropyltrimethoxysilane, 3-glycidoxypropylpropyltriethoxysilane, 3-glycidoxypropylmethyldiethoxysilane and the like;

(3) compounds having a thiol group and an alkoxysilyl group such as 3-mercaptopropylmethyldimethoxysilane, 3-mercaptopropyltrimethoxysilane and the like; and (4) compounds having a ureide group and an alkoxysilyl group such as 3-ureidepropyltrimethoxysilane and the like.

In this embodiment, as metal alkoxide, in the above formula (12), preferably used are alkoxysilane in which M is silicon, alkoxyzirconium in which M is zirconium, alkoxyaluminum in which M is aluminum, alkoxytitanium in which M is titanium, alkoxycobalt in which M is cobalt, alkoxylithium in which M is lithium, alkoxybarium in which M is barium, alkoxyiron in which M is iron and alkoxymanganese in which M is manganese.

The partially hydrolyzed condensate of the metal alkoxide is a compound obtained by polycondensation of partially hydrolyzed product of one or more of these metal alkoxides using the catalyst to be used for a sol-gel reaction (D), for example, a partially hydrolyzed polycondensation compound of metal alkoxide.

In this embodiment, as the partially hydrolyzed condensate of the metal alkoxide, preferably used are a condensate of alkoxysilane, a condensate of alkoxyzirconium, a condensate of alkoxyaluminum, a condensate of alkoxytitanium, a condensate of alkoxycobalt, a condensate of alkoxylithium, a condensate of alkoxybarium, a condensate of alkoxyiron and a condensate of alkoxymanganese.

As the metal halide, compounds represented by the following formula (13) may be used.

$(R^1)xMZy$ (13)

wherein, in the formula, $R^1$ represents a hydrogen atom, an alkyl group (methyl group, ethyl group, propyl group and the like), an alkoxy group (methoxy group, ethoxy group, propoxy group, butoxy group and the like), an aryl group (phenyl group, tolyl group and the like), a carbon-carbon double bond-containing organic group (acryloyl group, methacryloyl group, vinyl group and the like), a halogen-containing group (halogenated alkyl group such as chloropropyl group, fluoromethyl group or the like) and the like; Z represents F, Cl, Br or I; in x and y, x+y is not more than 4, and x represents an integer of not more than 2.

Examples of M include Li, Na, Mg, Al, Si, K, Ca, Sc, Ti, V, Cr, Mn, Fe, Co, Ni, Cu, Zn, Rb, Sr, Y, Nb, Zr, Mo, Ag, Cd, In, Sn, Sb, Cs, Ba, La, Ta, Hf, W, Ir, Tl, Pb, Bi, rare earth metal and the like, and preferably used are metals (halides) to be transparent metal oxides in the sol-gel reaction, such as, Si, Al, Zn, Zr, In, Sn, Ti, Pb, Hf, Co, Li, Ba, Fe, Mn and the like from the viewpoint of use as a coating film. Of the metals, preferably used are silicon, aluminum, zirconium, titanium, cobalt, lithium, barium, iron, manganese and the like, and these metals may be used in combination.

Concrete examples include tetrachlorodimethyldisilane, chloropropyldichloromethylsilane, chloromethyl(dichloro) methylsilane, di-tert-butyldichlorosilane, dibutyldichlorosilane, dichloro(methyl)-n-octylsilane, dichloro(methyl)phenylsilane, dichlorocyclohexylmethylsilane, dichlorodiethylsilane, dichlorodihexylsilane, dichlorodiisopropylsilane, dichlorodimethylsilane, dichlorodiphenylsilane, dichloroethylsilane, dichlorohexylmethylsilane, dichloromethylsilane, dichloromethylvinylsilane, tetrachlorosilane, 1,2-bis(trichlorosilyl)ethane, 3-chloropropyltrichlorosilane, allyltrichlorosilane, butyltrichlorosilane, cyclohexyltrichlorosilane, ethyltrichlorosilane, hexachlorodisilane, hexachlorodisilane, phenyltrichlorosilane, thexyltrichlorosilane, trichloro(methyl)silane, trichloro(propyl)silane, trichlorohexylsilane, trichlorosilane, trichlorovinylsilane; fluorosilanes, bromosilanes and iodosilanes corresponding to these; and halogenated aluminum, halogenated zirconium, halogenated titanium, halogenated cobalt, halogenated lithium, halogenated barium, halogenated iron, halogenated manganese and hydrates thereof corresponding to these.

Examples of the metal acetate include cobalt acetate, cobalt acetoacetate, lithium acetate, lithium acetoacetate, iron acetate, iron acetoacetate, manganese acetate, manganese acetoacetate, or hydrates of these. Examples of the metal nitrate include cobalt nitrate, lithium nitrate, iron nitrate, manganese nitrate, and hydrates thereof.

Furthermore, the metal oxide precursor (B) (hereinafter also referred to as the component (B)) may be a compound that is changed to a metal oxide compound to be described below by the sol-gel reaction with the addition of water and a catalyst.

Water and/or Solvent Dissolving Part of Water or Entire Water at Any Proportions (C)

In the composition of this embodiment, the component (C) is added for the purpose of further hydrolysis of the metal oxide precursor (B).

Meanwhile, the component (C) means both a solvent to be used to obtain an aqueous dispersion solution by using the terminally branched copolymer, and a solvent to be used for mixture of the aqueous dispersion solution, the component (B) and the catalyst to be used for a sol-gel reaction (D) (hereinafter referred to as the component (D)) as described below.

Water is not particularly limited, and there may be used distilled water, ion exchange water, urban water, water for industrial use and the like. However, preferably used are distilled water and ion exchange water.

The solvent dissolving a part of water or entire water in any proportions is an organic solvent having an affinity for water, and is not particularly limited as long as a polyolefin based terminally branched copolymer can be dispersed therein. Examples thereof include methanol, ethanol, propyl alcohol, isopropyl alcohol, acetone, acetonitrile, dimethyl sulfoxide, dimethylformamide, dimethylimidazolidinone, ethylene glycol, tetraethylene glycol, dimethylacetamide, N-methyl-2-pyrrolidone, tetrahydrofuran, dioxane, methyl ethyl ketone, cyclohexanone, cyclopentanone, 2-methoxyethanol (methyl cellosolve), 2-ethoxyethanol (ethyl cellosolve), ethyl acetate and the like. Among these, preferably used are methanol, ethanol, propyl alcohol, isopropyl alcohol, acetonitrile, dimethyl sulfoxide, dimethylformamide, acetone, tetrahydrofuran and dioxane because they have a high affinity for water.

In general, when water is used, the amount of water to be added is, for example, in the range of 1 to 1,000,000 parts by weight and preferably in the range of 10 to 10,000 parts by weight, based on 100 parts by weight of the mixture of the aforementioned components (C) and (D).

As the solvent dissolving a part of water or entire water in any proportions, the amount of the solvent to be added is usually, for example, in the range of 1 to 1,000,000 parts by weight and preferably in the range of 10 to 10,000 parts by weight, based on 100 parts by weight of the mixture of the aforementioned components (C) and (D).

Furthermore, at the time of hydrolysis polycondensation of metal alkoxides, the reaction temperature is preferably from 1 to 100 degrees centigrade and more preferably from 20 to 60 degrees centigrade, while the reaction time is preferably from 10 minutes to 72 hours and more preferably from 1 to 24 hours.

Catalyst to be used for Sol-Gel Reaction (D)

The mixed composition used in this embodiment may contain a material described in the following, which can act as a catalyst for the hydrolysis polycondensation reaction, for the purpose of promoting the reaction in a hydrolysis polycondensation reaction of metal alkoxide.

Those used as the catalyst for a hydrolysis polycondensation reaction of metal alkoxide are the catalysts used in general sol-gel reactions, which are described in "Recent Technology for Functional Thin Film Production According to Sol-Gel Method" (Hirashima, Hiroshi, Comprehensive Technology Center Co., Ltd., p. 29), "Science of Sol-Gel Method" (Sakka, Sumio, Agne Shofu, p. 154), and the like.

Examples of the catalyst (D) include an acid catalyst, an alkali catalyst, an organic tin compound, and metal alkoxide such as titanium tetraisopropoxide, diisopropoxytitanium bis (acetylacetonate), zirconium tetrabutoxide, zirconium tetrakis(acetylacetonate), aluminum triisopropoxide, aluminum trisethylacetonate, trimethoxyborane and the like.

Among these catalysts, suitably used are an acid catalyst and an alkali catalyst. Specific examples of the acid catalyst include inorganic and organic acids such as hydrochloric acid, nitric acid, sulfuric acid, phosphoric acid, acetic acid, oxalic acid, tartaric acid, toluenesulfonic acid and the like. Examples of the alkali catalyst include alkali metal hydroxides such as ammonium hydroxide, potassium hydroxide, sodium hydroxide and the like; quaternary ammonium hydroxides such as tetramethylammonium hydroxide, tetraethylammonium hydroxide, tetrabutylammonium hydroxide and the like; amines such as ammonia, triethylamine, tributylamine, morpholine, pyridine, piperidine, ethylenediamine, diethylenetriamine, ethanolamine, diethanolamine, triethanolamine and the like; and aminosilanes such as 3-aminopropyltriethoxysilane, N-(2-aminoethyl)-3-aminopropyltrimethoxysilane and the like.

From the viewpoint of the reactivity, it is preferable to use acid catalysts such as hydrochloric acid, nitric acid and the like, with which the reaction proceeds relatively mildly. The preferred amount of the catalyst to be used is from about 0.001 to 0.05 moles, preferably from about 0.001 to 0.04 moles and further preferably from about 0.001 to 0.03 moles, based on 1 mole of the metal alkoxide precursor of the aforementioned component (B).

The mixed composition in Step (a) may be used, for example, in the form of a sol-gel reactant obtained by the sol-gel reaction without removing the solvent (C) in the presence of the catalyst (D).

Step (b)

In Step (b), an organic-inorganic composite is obtained by drying the reaction solution (mixed composition) obtained in the above Step (a).

The organic-inorganic composite in Step (b) can be obtained, for example, in the form of a sol-gel reactant obtained by applying the reaction solution (mixed composition) to a base material, then heating the resultant for a predetermined time to remove the solvent (C), and completing the sol-gel reaction. Or, it can also be obtained in the form of a sol-gel reactant obtained by applying a sol-gel reactant obtained by the sol-gel reaction without removing the above solvent (C) to a base material, then heating the resultant for a predetermined time to remove the solvent (C), and completing the sol-gel reaction in the mixed composition.

Incidentally, the state of the completion of the sol-gel reaction means ideally the state of all components forming an M-O-M bond, and includes the state shifted to a solid (gel) state even though some alkoxyl groups (M-OR$^2$) or M-OH groups remain.

That is, the metal oxide is obtained from the component (B) by completion of the sol-gel reaction by heat-drying the mixed composition (reaction solution) to form a matrix mainly composed of this metal oxide. The organic-inorganic composite has a structure in which polymer fine particles formed from the terminally branched copolymer are dispersed in the matrix.

The metal oxide in the sol-gel reactant is a continuous matrix structure in the organic-inorganic composite. The metal oxide is not particularly limited as described above, but the metal oxide as a coating film is preferably a continuous matrix structure in view of improvement of mechanical properties and the like. Such a structure of the metal oxide is obtained by subjecting a metal oxide precursor to hydrolysis and polycondensation, that is, the sol-gel reaction.

In this embodiment, the composite can be made in the form of a particle or a film. Or, the composite may be laminated on a substrate or a porous support to form a laminate composite.

As a method for producing a particulate organic-inorganic composite, there are a method of forming the composite by pulverizing, classifying or the like the obtained solids after drying the mixed dispersion solution of this embodiment at a predetermined temperature, a method of forming the composite by pulverizing, classifying or the like the obtained solids after drying the mixed dispersion solution for removing a solvent at a low temperature as in the freeze-drying method, a method of obtaining white powders by spraying composite fine particles of not more than 10 µm using a spray dryer and volatilizing the solvent, and the like.

As a method for producing a film-like composite, there are used, depending on the target use, the kind of a base material and the shape, a dip coating method, a spin coating method, a spray coating method, a flow coating method, a blade coating method, a bar coating method, a die coating method, and other suitable methods. As the base material, there are used porous supports in addition to molded products of metals, glasses, ceramics, polymers and the like, sheets, films and the like.

As a method for producing a porous support and a film-like composite, there is mentioned a method of dipping the porous support in the mixed composition of this embodiment and drying the porous support while maintaining it at a predetermined temperature.

Examples of the porous support used for this embodiment include ceramics such as silica, alumina, zirconia, titania and the like; metals such as stainless steel, aluminum and the like; and porous materials such as paper, a resin and the like.

The heating temperature for completing the sol-gel reaction is from room temperature to 300 degrees centigrade and more preferably from 80 to 200 degrees centigrade. The reaction time is from 10 minutes to 72 hours and more preferably 1 to 24 hours.

Step (c)

In Step (c), a porous metal oxide is prepared by removing the terminally branched copolymer particles from the organic-inorganic composite obtained in Step (b).

A method of removing the terminally branched copolymer particles, includes a method of decomposing and removing the particles by calcination, a method of decomposing and removing the particles by irradiation with vacuum ultraviolet (VUV) light, far infrared ray, microwave, or plasma, a method of removing the particles by extraction using a solvent or water, and the like. In case of decomposing and removing by calcination, the temperature is preferably from 200 to 1,000 degrees centigrade, and more preferably 300 to 700 degrees centigrade. When the calcination temperature is very low, the terminally branched copolymer particles are not removed. On the other hand, when the temperature is very high, mesopores are collapsed in some cases because the temperature is near the melting point of the metal oxide. Calcination may be carried out at a constant temperature, or under an gradually increasing temperature from room temperature. The time of calcination is varied depending on the temperature, but it is preferably in the range of 1 to 20 hours. Calcination may be carried out in the air, or in an inert gas such as nitrogen, argon or the like. Further, it may be carried out under reduced pressure or in vacuum. When the particles are decomposed and removed by irradiation with VUV light, a VUV lamp, an excimer laser or an excimer lamp may be used. Oxidation of ozone ($O_3$) generated when a VUV light is irradiated in the air may be used. As the microwave, any frequency of 2.45 GHz or 28 GHz may be used. The output of the microwave is not particularly limited, and conditions are selected so as to remove the terminally branched copolymer particles.

When extraction is carried out using a solvent or water, examples of the solvent include ethylene glycol, tetraethylene glycol, isopropyl alcohol, acetone, acetonitrile, methanol, ethanol, cyclohexane, dimethylsulfoxide, dimethylformamide, dimethylimidazolidinone, xylene, toluene, chloroform, dichloromethane and the like. The extraction procedure may be carried out under heating. Ultrasonic wave (US) treatment may also be used together. After the extraction procedure, it is preferable to perform heat treatment under reduced pressure to remove the water and solvent remained in mesopores.

The porous metal oxide of this embodiment obtained as described above has uniform mesopores, in which the average pore diameter thereof is from 5 to 30 nm, preferably from 10 to 30 nm, and further preferably from 20 to 30 nm. The porous metal oxide of this embodiment is a mesoporous structure and has a cubic structure.

According to the production method of this embodiment, by changing the organic-inorganic ratio in the organic-inorganic composite, the porosity may be adjusted in the range of 1 to 80% by volume. Since the above terminally branched copolymer is used as the template, a pore structure can be a cubic structure formed from uniform mesopores regardless of production conditions and further the pore diameters of mesopores are constant in the range of the porosity. Thus, the porous metal oxide obtained in this embodiment is excellent in mechanical strength.

On the other hand, when a conventional surfactant is used as the template, in a porous metal oxide obtained under production conditions other than the specific surfactant concentration region (or organic-inorganic ratio) capable of having a cubic structure or a hexagonal structure, the pore diameter of mesopores is not uniform and there is a variation, so that the strength of such a porous metal oxide is lowered as compared to this embodiment having equivalent porosity.

Furthermore, the porosity of the porous metal oxide may be calculated according to the method of calculating by applying the Lorentz-Lorenz equation using the refractive index value measured with an ellipsometer in the following manner when its shape is a film, or may be calculated using the pore volume value determined by the nitrogen gas adsorption method (BET method) to be described below when its shape is a particle.

$$Vp = 1 - \frac{(n_s^2 - 1)/(n_s^2 + 2)}{(n_{MO2}^2 - 1)/(n_{MO2}^2 + 2)} \quad \text{[Equation 1]}$$

In the above equation, Vp represents the porosity (% by volume); $n_s$ represents the measured value of refractive index; and $n_{MO2}$ represents the refractive index of metal oxide (measured value of refractive index at zero porosity).

Incidentally, the reason why the porous metal oxide with mesopores forming a cubic phase structure is obtained by the use of the terminally branched polymer is not clear but guessed as follows.

In the aforementioned Step (a) of the method for producing a porous metal oxide, when a plurality of terminally branched polymer particles (A) are added while subjecting the metal oxide precursor (B) to a sol-gel reaction, a plurality of terminally branched polymer particles (A) are repelling each other by predetermined surface charges and dispersed in a cubic structure such as Fm3m, Im3n or the like, that is, the thermodynamically stabilized state spaced by a predetermined distance.

Therefore, mesopores of the metal oxide particles formed by removing the thus-dispersed terminally branched polymer particles (A) by calcination forms a cubic phase.

Here, the structure of the surface of the porous metal oxide, and the pore diameter and the average pore diameter of mesopores may be evaluated and measured using a scanning electron microscope. The pore diameter of mesopores inside the porous metal oxide may be obtained by setting up the appropriate field range according to the dispersion state of mesopores and measuring the diameters of mesopores within the field of view, using a transmission electron microscope (TEM). By averaging the diameters, its average pore diameter may be obtained. Incidentally, the average pore diameter in the porous body may be controlled, for example, by adjusting the average particle size of 50% by volume of the particles in the dispersion solution of the aforementioned terminally branched copolymer particles.

With the cubic phase structure composed of mesopores having a relatively large average pore diameter of 5 to 30 nm, the porosity in the porous body can be much larger. Further, there is expected improvement in access and material diffusibility of molecules of greater than 5 nm that is not possible in the conventional mesopores of less than 5 nm.

Use Application

The porous metal oxide of this embodiment may be suitably used for a catalyst or a catalyst carrier, a material carrier, a solid electrolyte film, a deodorant, a filtration film, a separation film, a release-controlling material or the like because the porous metal oxide has the aforementioned structure.

Catalyst or Catalyst Carrier

The porous metal oxide of this embodiment may be used not only for a reaction of a monomer having a relatively small molecular size, but also as a reaction field of polymerization of a polymer having a large molecular size, because of mesopores having a relatively large average pore diameter of 5 to 30 nm. Examples of the porous metal oxide used as a catalyst or a catalyst carrier of this embodiment are specifically illustrated, and the scope of this embodiment is not limited.

(i) Polymerization Catalyst

The porous metal oxide of this embodiment may be used as a catalyst for various reactions. Specifically, (i-1) a mixture of at least two oxides selected from $SiO_2$, $TiO_2$, $Al_2O_3$ and $ZrO_2$ by the production method of this embodiment, for example, $SiO_2$—$TiO_2$, $SiO_2$—$Al_2O_3$, $SiO_2$—$ZrO_2$ and the like;

(i-2) an Si atom forming pores of porous silica by the production method of this embodiment substituted with other metals such as Al, Ti, Ga or the like, or a crystallized zeolite, such as MFI type (ZSM-5, TS-1 or the like) zeolite, Y-type zeolite, p-type zeolite and the like;

(i-3) a porous silica or the like having acid function by immobilizing an organic group or metal triflate having a sulfonic acid group, particularly, a perfluorosulfonic acid group through a chemical bond may be used as a catalyst or a catalyst carrier, and may be, for example, used for a reaction of transesterification or the like between a carboxylic acid and alcohol; and (i-4) the average pore diameter of the porous metal oxide in this embodiment is large, that is, from about 5 to 30 nm, so that the porous metal oxide may be used not only for a reaction of a monomer having a relatively small molecular size, but also as a reaction field of polymerization of a polymer having a large molecular size. For example, by supporting a Cu (II) compound or the like, the porous metal oxide may be used as a reaction catalyst of an oxidative coupling polymerization of phenols. Examples of the Cu (II) compound include copper bromide, copper chloride and copper iodide, but the compound is not limited thereto.

(ii) Exhaust Gas Purification Catalyst of Car

The porous metal oxide may be used as an exhaust gas purification catalyst of a car by supporting an active substance of precious metals such as palladium, platinum, rhodium and the like in pore wall of porous silica according to the production method of this embodiment.

Material Carrier

In the porous metal oxide of this embodiment, not only a monomer having a relatively small molecular size, but also a pigment, an enzyme and the like having a large molecular size may be supported, because it has mesopores having a relatively large average pore diameter of 5 to 30 nm.

(i) Pigment

Since release of a pigment is suppressed over a long period of time by supporting a pigment in the porous metal oxide of this embodiment, there is provided an organic pigment-supported porous metal oxide excellent in water resistance, light resistance and color development and a composition comprising the porous body. Examples of the organic pigment include an acid dye, a basic dye, a vat dye, a direct dye, an oil-soluble dye, a reactive dye, an organic pigment, a natural pigment and the like.

Examples of the acid dye include, though not limited to, C.I. Acid Orange 7, C.I. Acid Orange 19, C.I. Acid Violet 49, C.I. Acid Black 2, C.I. Acid Black 7, C.I. Acid Black 24, C.I. Acid Black 26, C.I. Acid Black 31, C.I. Acid Black 52, C.I. Acid Black 63, C.I. Acid Black 112, C.I. Acid Black 118, C.I. Acid Blue 9, C.I. Acid Blue 22, C.I. Acid Blue 40, C.I. Acid Blue 59, C.I. Acid Blue 93, C.I. Acid Blue 102, C.I. Acid Blue 104, C.I. Acid Blue 113, C.I. Acid Blue 117, C.I. Acid Blue 120, C.I. Acid Blue 167, C.I. Acid Blue 229, C.I. Acid Blue 234, C.I. Acid Red 1, C.I. Acid Red 6, C.I. Acid Red 32, C.I. Acid Red 37, C.I. Acid Red 51, C.I. Acid Red 52, C.I. Acid Red 80, C.I. Acid Red 85, C.I. Acid Red 87, C.I. Acid Red 92, C.I. Acid Red 94, C.I. Acid Red 115, C.I. Acid Red 180, C.I. Acid Red 256, C.I. Acid Red 315, C.I. Acid Red 317, Brown No. 201, Yellow No. 4, Yellow No. 5, Yellow No. 202, Yellow No. 203, Yellow No. 402, Yellow No. 403, Yellow No. 406, Yellow No. 407, Black No. 401, Violet No. 401, Blue No. 1, Blue No. 2, Blue No. 202, Blue No. 203, Blue No. 205, Red No. 2, Red No. 3, Red No. 102, Red No. 104, Red No. 105, Red No. 106, Red No. 201, Red No. 227, Red No. 230, Red No. 231, Red No. 232, Red No. 401, Red No. 502, Red No. 503, Red No. 504, Red No. 506, Green No. 3, Green No. 201, Green No. 205, Green No. 401, Green No. 402, Orange No. 205, Orange No. 207, Orange No. 402 and the like.

Examples of the basic dye include, though not limited to, C.I. Basic Yellow 11, C.I. Basic Yellow 28, C.I. Basic Violet 3, C.I. Basic Violet 7, C.I. Basic Violet 14, C.I. Basic Violet 27, C.I. Basic Black 2, C.I. Basic Blue 1, C.I. Basic Blue 3, C.I. Basic Blue 5, C.I. Basic Blue 7, C.I. Basic Blue 9, C.I. Basic Blue 24, C.I. Basic Blue 25, C.I. Basic Blue 26, C.I. Basic Blue 28, C.I. Basic Blue 29, C.I. Basic Red 1, C.I. Basic Red 2, C.I. Basic Red 9, C.I. Basic Red 12, C.I. Basic Red 13, C.I. Basic Red 14, C.I. Basic Red 37, Red No. 213, Red No. 214 and the like.

Examples of the vat dye include, though not limited to, C.I. Vat Blue 1, Blue No. 201, Blue No. 204, Red No. 226 and the like.

Examples of the direct dye include, though not limited to, C.I. Direct Yellow 11, C.I. Direct Yellow 12, C.I. Direct Yellow 17, C.I. Direct Yellow 23, C.I. Direct Yellow 25, C.I. Direct Yellow 29, C.I. Direct Yellow 42, C.I. Direct Yellow 61, C.I. Direct Yellow 71, C.I. Direct Orange 26, C.I. Direct Orange 34, C.I. Direct Orange 39, C.I. Direct Orange 44, C.I. Direct Orange 46, C.I. Direct Orange 60, C.I. Direct Green 59, C.I. Direct Violet 47, C.I. Direct Violet 48, C.I. Direct Violet 51, C.I. Direct Brown 109, C.I. Direct Black 17, C.I. Direct Black 19, C.I. Direct Black 32, C.I. Direct Black 51, C.I. Direct Black 71, C.I. Direct Black 108, C.I. Direct Black 146, C.I. Direct Black 154, C.I. Direct Black 166, C.I. Direct Blue 1, C.I. Direct Blue 6, C.I. Direct Blue 22, C.I. Direct Blue 25, C.I. Direct Blue 71, C.I. Direct Blue 86, C.I. Direct Blue 90, C.I. Direct Blue 106, C.I. Direct Blue 203, C.I. Direct Blue 264, C.I. Direct Red 1, C.I. Direct Red 4, C.I. Direct Red 17, C.I. Direct Red 23, C.I. Direct Red 28, C.I. Direct Red 31, C.I. Direct Red 37, C.I. Direct Red 80, C.I. Direct Red 81, C.I. Direct Red 83, C.I. Direct Red 201, C.I. Direct Red 227, C.I. Direct Red 242 and the like.

Examples of the oil-soluble dye include, though not limited to, Yellow No. 201, Yellow No. 204, Yellow No. 404, Yellow No. 405, Violet No. 201, Blue No. 403, Red No. 215, Red No. 218, Red No. 223, Red No. 225, Red No. 501, Red No. 505, Green No. 202, Green No. 204, Orange No. 201, Orange No. 206, Orange No. 403 and the like.

Examples of the reactive dye include, though not limited to, C.I. Reactive Orange 16, C.I. Reactive Black 5, C.I. Reactive Blue 21, C.I. Reactive Blue 27, C.I. Reactive Blue 28, C.I. Reactive Blue 38, C.I. Reactive Red 21 and the like.

Examples of the organic pigment include, though not limited to, C.I. Pigment Yellow 14, C.I. Pigment Yellow 83, C.I. Pigment Green 7, C.I. Pigment Violet 19, C.I. Pigment Violet 23, C.I. Pigment Blue 27, C.I. Pigment Red 166, Yellow No. 205, Yellow No. 401, Blue No. 404, Red No. 201, Red No. 202, Red No. 203, Red No. 204, Red No. 205, Red No. 206, Red No. 207, Red No. 208, Red No. 219, Red No. 220, Red No. 221, Red No. 228, Red No. 404, Red No. 405, Orange No. 203, Orange No. 204, Orange No. 401 and the like.

Examples of the natural pigment include chlorophyll, β-carotene, lutein, lycopene, Gardenia jasminoides yellow pigment, Carthamus tinctorius yellow pigment, turmeric dye, ang-khak yellow pigment, palm oil carotene, ang-khak pigment, Gardenia jasminoides red pigment, Carthamus tinctorius red pigment, beet red, cochineal pigment, lac pigment, madder pigment, perilla pigment, red cabbage pigment, red daikon pigment, purple sweet potato pigment, purple corn pigment, grape skin pigment, grape juice pigment, blueberry pigment, elderberry pigment, capsicum pigment, annatto pigment, Gardenia jasminoides blue, Gardenia jasminoides yellow, Carthamus tinctorius yellow, ang-khak yellow, Spirulina pigment, phycocyanin, cacao pigment, Japanese persimmon pigment and the like.

The above organic pigments may be used singly or in combination of two or more kinds. Among these, preferably used are dyes having a good color development, and particularly preferably used are at least one selected from C.I. Acid Blue 9, C.I. Acid Blue 22, C.I. Acid Blue 40, C.I. Acid Blue 59, C.I. Acid Blue 93, C.I. Acid Blue 102, C.I. Acid Blue 104, C.I. Acid Blue 113, C.I. Acid Blue 117, C.I. Acid Blue 120, C.I. Acid Blue 167, C.I. Acid Blue 229, C.I. Acid Blue 234, C.I. Acid Red 1, C.I. Acid Red 6, C.I. Acid Red 32, C.I. Acid Red 37, C.I. Acid Red 51, C.I. Acid Red 52, C.I. Acid Red 80, C.I. Acid Red 85, C.I. Acid Red 87, C.I. Acid Red 92, C.I. Acid Red 94, C.I. Acid Red 115, C.I. Acid Red 180, C.I. Acid Red 256, C.I. Acid Red 289, C.I. Acid Red 315 and C.I. Acid Red 317 when it is used as an ink, particularly, an ink-jet ink.

(ii) Enzyme

A very high enzyme stabilizing effect is achieved by supporting an enzyme in the porous metal oxide of this embodiment. An object of immobilization of enzyme is directly to improve the stabilization of the enzyme with respect to heat, pH or the like. At this time, however, there is also a practically important requirement, that is, desired immobilization of the enzyme with high unit weight (high density) per unit weight of an immobilization carrier. A method of immobilizing an enzyme by the porous body is suitable also in view of the purpose of immobilization of the enzyme with high unit weight. Particularly, when the enzyme is desired to be immobilized with high unit weight, it is advantageous to increase the amount of an enzyme to be immobilized per single structural unit using pores having a greater inner diameter as compared to the enzyme size. The porous metal oxide of this embodiment is very useful because of mesopores having a relatively large average pore diameter of 5 to 30 nm. The kind of available enzyme in this embodiment in not limited at all. The above enzyme refers to a normal enzyme protein molecule or its activity unit (fragment of an enzyme containing active sites). Only one of enzymes may be immobilized in the structural unit, or, for example, two or more kinds of enzymes involved in a series of specific reactions may be immobilized at one time. In the latter case, two or more kinds of enzymes may be immobilized in the separate structural unit in the same porous body or the like, or may be immobilized in the same structural unit.

Solid Electrolyte Film

When the porous metal oxide of this embodiment is not subjected to a hydrophobic treatment, an Si—OH group having ion exchange capacity is present on the pore wall. So, proton conduction is exhibited by dissociation of Si—OH. Accordingly, the porous metal oxide may be used as a solid electrolyte film. Furthermore, proton conductivity is enhanced by introducing a functional group having high ion exchange capacity selected from at least one of a sulfonic acid group, a phosphoric acid group and a carboxylic acid group. A method of bonging a functional group having ion exchange capacity to the pore wall is not particularly limited. However, in the step of subjecting a metal oxide precursor to a sol-gel reaction in the presence of terminally branched copolymer particles of Step (a), alkoxide having a sulfonic acid group, a phosphoric acid group or a carboxylic acid group, or a group from which these groups can be derived may be added in advance, or may be bonded after the formation of pores. As the group from which a sulfonic acid group can be derived, a thiol group is cited. The porous metal oxide may be used for a fuel cell or the like using the prepared solid electrolyte film according to a known method.

Deodorant

The porous metal oxide of this embodiment may be used as a deodorant because it has mesopores having a relatively large average pore diameter of 5 to 30 nm and large specific surface area. In order to improve deodorizing ability and broaden the deodorizing gas spectrum, other mineral fine powders are used together as desired, or one or more of chemical agents may be supported in powders or a molding product. Examples of the aforementioned chemical agent include an alkali agent such as hydroxide, carbonate or the like of alkali metal such as Li, Na, K or the like; an acidifying agent such as hydrochloric acid, sulfuric acid, nitric acid, phosphoric acid, acid aluminum phosphate or the like; an oxidizing agent such as permanganate, chlorate, iodate, persulphaste, ferrate, percarbonate or perborate salts of alkali metals; a reducing agent such as phosphonate, hypophosphite salts or the like of alkali metals, in addition to a coloring agent, an aromatic agent or the like. Examples of the mineral fine powders which are used together include metal oxide such as alumina gel, silica gel, titanate gel, flowers of zinc, iron oxide, manganese dioxide, magnesium oxide, copper oxide, cuprous oxide, calcium oxide and the like; metal hydroxide which is an aqueous material of metal oxide; metal silicate such as magnesium silicate, calcium silicate and the like; crystalline aluminosilicate such as zeolite; amorphous aluminosilicate (aluminosilicate is generally sodium silicate, but sodium may be substituted by other metals), other silica powder and the like. The thus-obtained deodorant is filled or inserted in an air-permeable bag, container, column or the like, and air containing a malodorous substance is allowed to path through such that air is easily deodorized.

Filtration Film

The porous metal oxide of this embodiment may be used as a filtration film excellent in durability because it has mesopores having a relatively large average pore diameter of 5 to 30 nm, the filtration rate is high and the mechanical strength is high.

Separation Film

The porous metal oxide of this embodiment may be used as a separation film by carrying out a hydrophobic or hydrophilic treatment, or by bonding a group having ion exchange capacity to a pore wall.

Release-controlling Material

The porous metal oxide of this embodiment has mesopores having a relatively large average pore diameter of 5 to 30 nm, so that it may be used as a medical composition, an external composition for skin, a cosmetic material or the like which contains a chemical agent such as a biologically active substance or the like and is capable of stably controlling release over a long period of time.

The chemical agent such as a biologically active substance or the like to be included is not particularly limited, and examples include an antitumor component, an immune-suppressing component, a skin whitening component, a cell activation component, an antioxidant component, a moisture-retention component, an antivirus component, an enzyme activity inhibition component and the like.

The antitumor component is not particularly limited and may be selected from conventionally known antitumor agents. Examples thereof include alkylating agents, various antimetabolites, antitumor antibiotics, other antitumor agents, antitumor plant components, biologic response modifiers (BRM), antiangiogenic agents, cell adhesion inhibitors, matrix metalloproteinase inhibitors, hormone drugs, vitamin preparations, antibacterial antibiotics, molecular target drugs, chemotherapeutic drugs and the like. Examples of the alkylating agent include alkylating agents such as nitrogen mustard, nitrogen mustard N-oxide, chlorambucil and the like; aziridine based alkylating agents such as carboquone, thiotepa and the like; epoxide based alkylating agents such as dibromomannitol, dibromodulcitol and the like; nitrosourea based alkylating agents such as carmustine, lomustine, semustine, nimustine hydrochloride, streptozocin, chlorozotocin, ranimustine and the like; busulfan; improsulfan tosilate; dacarbazine and the like. Examples of the antimetabolites of various types include purine antimetabolites such as 6-mercaptopurine, 6-thioguanine, thioinosine and the like; pyrimidine antimetabolites such as fluorouracil, tegafur, tegafur-uracil, carmofur, doxifluridine, broxuridine, cytarabine, enocitabine and the like; folic acid antimetabolites such as methotrexate, trimetrexate and the like; and salts or complexes thereof. Examples of the antitumor antibiotics include anthracycline antitumor antibiotics such as mitomycin C, bleomycin, peplomycin, daunorubicin, aclarubicin, doxorubicin, pirarubicin, THP-adriamycin, 4'-epidoxorubicin, epirubicin and the like; chromomycin A3; actinomycin D; and salts or complexes thereof.

Examples of the other antitumor agents include cisplatin, carboplatin, tamoxifen, camptothecin, ifosfamide, cyclophosphamide, melphalan, L-asparaginase, aceglatone, sizofuran, picibanil, ubenimex and krestin and salts or complexes thereof. Further examples include procarbazine, pipobroman, neocarzinostatin, hydroxyurea and the like.

Examples of the antitumor plant components include vinca alkaloids such as vindesine, vincristine, vinblastine and the like; epipodophyllotoxines such as etoposide, teniposide and the like; and salts or complexes thereof. Examples of the BRM include tumor necrosis factors, indomethacin and the like; and salts or complexes thereof.

Examples of the antiangiogenic agents include fumagillol derivatives and salts or complexes thereof.

Examples of the cell adhesion inhibitors include substances having RGD sequences and salts or complexes thereof.

Examples of the matrix metalloproteinase inhibitors can include marimastat and batimastat, and salts or complexes thereof.

Examples of the hormone drugs include hydrocortisone, dexamethasone, methylprednisolone, prednisolone, prasterone, betamethasone, triamcinolone, oxymetholone, nandrolone, metenolone, fosfestrol, ethinylestradiol, chlormadinone and medroxyprogesterone, and salts or complexes thereof. Examples of the immune-suppressing components include immunosuppressant such as cyclosporin, FK-506, rapamycin, steroid drug, azathioprine, mizoribine, mycophenolate mofetil, anti-T-cell antibody, rapamycin, 15-deoxyspergualin and the like.

Examples of the antivirus components include idoxuridine, vidarabine, trifluridine, aciclovir, penciclovir and the like.

Examples of the enzyme activity inhibition components include tyrosinase inhibitors such as hydroquinone, kojic acid, arbutin, vitamin C and the like; matrix metalloproteinase such as fravonoid and the like; activity inhibitors of urokinase, hyaluronidase and elastase; and the like.

The skin whitening component may be combined for the purpose of improvement of dullness or stain of the skin, and examples include arbutin, ascorbic acid, ascorbate, ascorbic acid phosphate magnesium salt, ascorbic acid glucoside, cysteine, glutathione, glutathione salt, N-acylated glutathione, glutathione ester, hydroquinone, hydroquinone salt, hydroquinone glycoside, ferulic acid, ferulic acid salt, isoferulic acid, isoferulic acid salt, caffeic acid, caffeic acid salt, resorcinols such as 4-n-butyl resorcinol and the like, ergo acid, ergo acid salt, placenta extract, caffein, tannin, verapamil, tranexamic acid, glabridin, tocopherol acetate, glycyrrhizic acid, kojic acid, ellagic acid, linoleic acid, oleic acid, linolenic acid and the like. Also, a cell activation component may be bonded for the purpose of promoting turnover of the skin. Improvement of wrinkle or stain is expected by promoting turnover of the skin.

The moisture-retention component may be combined for the purpose of prevention of dry skin, and examples include bovine serum albumin, sodium chondroitin sulfate, mucopolysaccharide, hyaluronic acid and the like. Examples of the antioxidant components include vitamin C and its derivatives, polyphenols, catechins, astaxanthin, glutathione and the like.

2. Second Embodiment

Figure 2A:
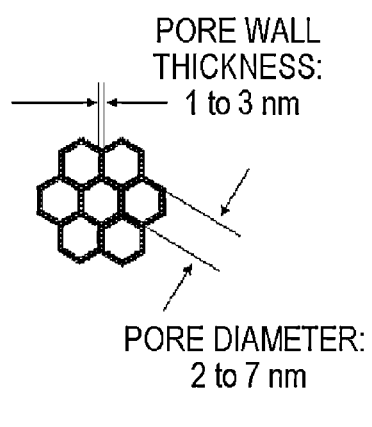
FIGS. 2A and 2B are a schematic view of a hexagonal structure and a cubic structure.
Figure 2B:
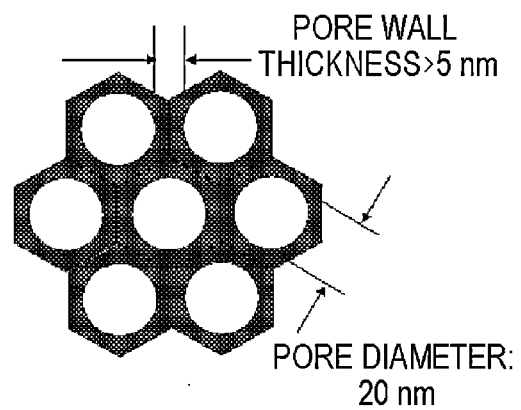

The insulating film of this embodiment comprises the porous metal oxide of the first embodiment. A film comprising the porous metal oxide in which mesopores forms a cubic phase and the average pore diameter is from 5 to 30 nm achieves high mechanical strength because its pore wall thickness is thick at the same porosity as compared to a hexagonal structure having an average pore diameter of not more than 5 nm (FIGS. 2A and 2B).

In mesoporous silica synthesized by the method described in Non-Patent Documents 1 and 2, the dielectric constant of about 2 to 2.5 can be obtained. However, in the related art described in Non-Patent Documents 1 and 2, as a method of lowering the dielectric constant to 2 or less, a method of increasing the porosity by increasing the concentration of the surfactant is considered. However, there is a problem such that the intended porosity can not be obtained due to a disintegration of a micellar aggregate structure. And there is a problem such that the mechanical strength is reduced because a film thickness among pores is thin when the above mesoporous silica has a two-dimensional hexagonal structure and when the porosity is increased. In the related art, there was a problem such that it was difficult to obtain a coating film having both properties of low dielectric constant and high mechanical strength.

By contrast, according to this embodiment, with the use of the terminally branched copolymer particles in which the average particle size of 50% by volume is small and the particle size is constant regardless of the dilute concentration, there are provided a film comprising the porous metal oxide in which pores having a cubic phase are formed and low dielectric constant is achieved, a method for producing the film and a product having this film.

Hereinafter, a method for producing a porous metal oxide using the terminally branched copolymer particles described in the first embodiment will be described.

Method for Producing Porous Metal Oxide

The porous metal oxide of this embodiment is produced by forming an organic-inorganic composite of the terminally branched copolymer particles and metal oxide, and then removing the terminally branched copolymer particles used as the template.

Specifically, the method comprises the following steps:

Step (a): a step of subjecting a metal oxide precursor selected from metal alkoxide and/or a partially hydrolyzed condensate of the metal alkoxide, metal halide, metal acetate and metal nitrate to a sol-gel reaction in the presence of the aforementioned terminally branched copolymer particles;

Step (b): a step of obtaining an organic-inorganic composite by drying the reaction solution obtained in the above Step (a) and completing the sol-gel reaction; and Step (c): a step of producing a porous metal oxide by removing the terminally branched copolymer particles from the above organic-inorganic composite.

The above Steps (a) to (c) are the same as those of the first embodiment so that description will not be repeated.

Incidentally, metal alkoxide in this embodiment may be used among those represented by the following formula (12) in the same manner as in the first embodiment.

$$(R^1)xM(OR^2)y \tag{12}$$

In this embodiment, as M, preferably used are metals (alkoxide) that are converted to colorless metal oxides in the sol-gel reaction, such as, Si, Al, Zn, Zr, In, Sn, Ti, Pb, Hf and the like from the viewpoint of use as a coating film. Of the metals, particularly preferably used is silicon.

That is, in this embodiment, as the partially hydrolyzed condensate of the metal alkoxide, preferably used is a condensate of alkoxysilane.

The thus-obtained porous metal oxide of this embodiment has uniform mesopores, and has an average pore diameter of 5 to 30 nm, preferably 10 to 30 nm, and further preferably 15 to 25 nm. The porous metal oxide of this embodiment is a mesoporous structure body and has a cubic structure. The structure and the pore diameter of the surface of the porous metal oxide may be evaluated and measured using a scanning electron microscope. The structure and the pore diameter inside the porous metal oxide may be evaluated and measured by setting up the appropriate field range according to the dispersion state of mesopores, measuring the diameters of mesopores within the field of view, and averaging the diameters, using a transmission electron microscope (TEM). In this embodiment, as a method of calculating the average pore diameter, for example, the pore diameters are measured from 20 pores optionally selected among images obtained using an electron microscope, and an average is calculated therefrom. Incidentally, the average pore diameter in the porous body may be controlled, for example, by adjusting the average particle size of 50% by volume of the particles in the dispersion solution of the aforementioned terminally branched copolymer particles.

Because of the cubic phase structure composed of mesopores having a relatively large average pore diameter of 5 to 30 nm, the porosity in the porous body can be made high, the dielectric constant is easily controlled, and the pore wall may be thick, so that high mechanical strength is achieved.

In this embodiment, it is preferable to further carry out Step (d) after Step (c).

Step (d)

The condition, in the Step (c), a hydroxyl group (silanol) remains on the film surface and pore surface. When a hydroxyl group remains, moisture is easily absorbed, and the dielectric constant value is increased (dielectric constant of water: 80). The hydrophobic treatment is carried out by the reaction of an organic silicon compound having an alkyl group which is a hydrophobic group preferentially or selectively reacting with the silanol group, with the silanol group. For the hydrophobization, an organic silicon compound having an alkyl group such as a silazane compound, a siloxane compound, a chlorosilane compound or the like is used as a hydrophobic agent.

Examples of the silazane compound include hexamethyldisilazane, hexaphenyldisilazane, diphenyltetramethyldisilazane, 1,2,3,4,5,6-hexamethylcyclotrisilazane, 1,3,5,7-tetraethyl-2,4,6,8-tetramethylcyclotetrasilazane, 1,2,3-triethyl-2,4,6-triethylcyclotrisilazane and the like. Examples of the siloxane compound include (3,3,3-trifluoropropyl)methylcyclotrisiloxane, triphenyltrimethylcyclotrisiloxane, 1,3,5,7-tetramethylcyclotetrasiloxane, octamethylcyclotetrasiloxane, 1,3,5,7-tetramethyl-1,3,5,7-tetraphenylcyclotetrasiloxane, tetraethylcyclotetrasiloxane, pentamethylcyclopentasiloxane, 1,2-bis(tetramethyldisiloxanyl)ethane, 1,3-bis(trimethylsiloxy)-1,3-dimethyldisiloxane, 1,1,3,3,5,5-hexamethyltrisiloxane, 1,1,3,3-tetraisopropyldisiloxane, 1,1,4,4-tetramethyldisilethylene and 1,1,3,3-tetramethyldisiloxane. Examples of the chlorosilane compound include trimethylchlorosilane, triethylchlorosilane, dimethylchlorosilane and the like.

The hydrophobization may be carried out in a gas phase atmosphere or in a liquid phase. When the hydrophobization is carried out in a gas phase atmosphere by gasifying a hydrophobic agent, the hydrophobization may be carried out in an airtight container or by circulating the gasified hydrophobic agent to come into contact with. The gasified hydrophobic agent may be diluted with gas. Examples of the usable gas for diluting include nitrogen, argon, hydrogen and the like. The reaction temperature is not particularly limited, and it may be not less than a temperature in which an organic silicon compound having an alkyl group that is a hydrophobic agent is reacted with a porous material, but not more than a temperature in which the hydrophobic agent is not decomposed and it does not cause a side reaction other than a desired reaction, and it is preferably in the range of 10 to 400 degrees centigrade. When the hydrophobic reaction is carried out in a liquid phase, an organic solvent may be used.

Examples of the organic solvent which can be used include alcohols such as methanol, ethanol, n-propyl alcohol, isopropyl alcohol and the like; ethers such as diethyl ether, diethylene glycol dimethyl ether, 1,4-dioxane, tetrahydrofuran and the like; and arylalkanes such as benzene, toluene, xylene and the like. When the hydrophobic reaction is carried out in an organic solvent, the concentration of the organic silicon compound having an alkyl group is not particularly limited, and it is properly selected from a wide range depending on various reaction conditions such as the kind of the organic silicon compound, the kind of the organic solvent, the reaction temperature and the like. Since solvent recovery or drying step is not necessary, the hydrophobic reaction is preferably carried out in a gas phase. The chemical vapor adsorption (CVA) method is particularly preferable.

In a method for producing a film-like porous metal oxide in this embodiment, the terminally branched copolymer particles are removed from the aforementioned film-like organic-inorganic composite. For example, a film comprising the porous metal oxide (an insulating film) is obtained by calcination of the aforementioned film-like organic-inorganic composite.

The film thickness of the porous metal oxide is, for example, measured by using an ellipsometer (JASCO M-150).

In a film comprising the porous metal oxide of this embodiment, the elastic modulus is from 8 to 30 GPa and preferably from 10 to 20 GPa. When the elastic modulus is not less than 8 GPa, in the film of this embodiment, the breaking strength may be improved, so that handling properties may be improved. At this time, the elastic modulus is measured, for example, using a nano indenter, Nano Indenter DCM, commercially available from MTS Corporation.

Meanwhile, the hardness of the porous metal oxide of this embodiment is from 0.5 to 2.0 GPa and preferably from 0.7 to 1.5 GPa. When the hardness is not less than 50 $m^2/g$, in the film of this embodiment, scratch resistance may be improved.

The dielectric constant of the porous metal oxide of this embodiment is not more than 2.5 and preferably not more than 2.0 (however, the lower limit of the dielectric constant is not less than 1). The dielectric constant may be, for example, a dielectric constant measured at 10 MHz by the static capacitor method.

The aforementioned film comprising the porous metal oxide of this embodiment having a low dielectric constant may be used as a substrate constituting a circuit board or an insulating film used as an interlayer insulating film.

With the use of the insulating film of this embodiment, the dielectric constant of a circuit board may be made low. Here, examples of the circuit board include a printed wiring board such as a flexible board, a rigid board, a BGA board, a mounting substrate or the like on which BGA or the like is mounted (incidentally, the printed wiring board of this embodiment represents a substrate in which a circuit is not formed on the surface of the board. Also, a copper foil may be formed or may not be formed on the surface of the printed wiring board). For example, the printed wiring board of this embodiment may be a printed wiring board having a thin film arranged on a base material.

In such a printed substrate, the insulating film of this embodiment may be used as a base material as it is, or the insulating film of this embodiment may be used as a thin film (an interlayer insulating film) formed though an adhesive sheet on a base material as it is. When the insulating film of this embodiment is used as an insulating layer, a conventional base material may be used for the base material. At this time, as a conventional base material, there may be used a prepreg obtained by impregnating a known resin composition in paper, glass cloth, nonwoven glass fabric, synthetic fiber or the like. Incidentally, an epoxy resin or the like may be used as an adhesive sheet (an adhesive film).

A high frequency circuit, a high frequency component, an antenna, BGA or the like may be mounted on such a printed substrate. Thus, the printed substrate of this embodiment may be used for a high frequency circuit board, an antenna substrate or the like. In the circuit board according to this embodiment, the signal propagation delay time may be shortened while maintaining the mechanical strength.

As described above, in the insulating film comprising the porous metal oxide of this embodiment (a low dielectric constant film), the dielectric constant is small and the mechanical strength is high. Thus, the porous metal oxide and the insulating film comprising the porous metal oxide may be used for various products requiring a low dielectric constant, such as a low dielectric constant and low dielectric loss material, a high frequency material, a substrate using these materials, a membrane, a film, a sheet and the like.

In this way, for the film comprising the porous metal oxide in this embodiment, the structure of the polyolefin based terminally branched copolymer particles is stable, and the structure is not disintegrated even though the concentration is increased, so that the desired porosity is achieved and low dielectric constant is achieved. Furthermore, further low dielectric constant is achieved by the hydrophobization by HMDS. The pore diameter is about 20 nm and a cubic structure is formed, so that a film among pores is thick and high mechanical strength is achieved.

3. Third Embodiment

The filler of this embodiment comprises the metal oxide particles formed from the porous metal oxide of the first embodiment which has uniform mesopores and has an average pore diameter of 5 to 30 nm.

In Patent Document 3, in case of hollow silica particles, a thickness of the pore wall is thin, the structure is easily disintegrated. Accordingly, the porosity of hollow silica particle can not be increased, and the porosity of the coating film formed by mixing it with a resin matrix is further lowered, so that satisfactory low dielectric constant is not achieved.

On the other hand, according to this embodiment, with the use of the terminally branched copolymer particles in which the average particle size of 50% by volume is small and the particle size is constant regardless of the dilute concentration, there is provided a filler in which cubic phase pores are formed, the average pore diameter is large, and low dielectric constant is achieved.

Hereinafter, a method for producing metal oxide particles (hereinafter referred to as the metal oxide particles or the porous metal oxide particles) of a mesoporous structure of this embodiment using the terminally branched copolymer particles described in the first embodiment will be illustrated.

Method for Producing Metal Oxide Particles

The metal oxide particles of this embodiment (metal oxide porous particles) are produced by forming an organic-inorganic composite of the terminally branched copolymer particles and metal oxide, and then removing the terminally branched copolymer particles used as the template.

Specifically, the method comprises the following steps:

Step (a): a step of subjecting a metal oxide precursor selected from metal alkoxide and/or a partially hydrolyzed condensate of the metal alkoxide, metal halide, metal acetate and metal nitrate to a sol-gel reaction in the presence of the aforementioned terminally branched copolymer particles;

Step (b): a step of obtaining an organic-inorganic composite by drying the reaction solution obtained in the above Step (a) and completing the sol-gel reaction; and Step (c): a step of producing metal oxide particles by removing the terminally branched copolymer particles from the above organic-inorganic composite.

The above Steps (a) and (c) are the same as those of the first embodiment so that description will not be repeated.

Incidentally, metal alkoxide in this embodiment may be used among those represented by the following formula (12) in the same manner as in the first embodiment.

$(R^1)xM(OR^2)y$  (12)

In this embodiment, as M, preferably used are metals (alkoxide) that are converted to colorless metal oxides in the sol-gel reaction, such as, Si, Al, Zn, Zr, In, Sn, Ti, Pb, Hf and the like from the viewpoint of use as a composite with a matrix resin. Of the metals, particularly preferably used is silicon.

That is, in this embodiment, as the partially hydrolyzed condensate of the metal alkoxide, preferably used is a condensate of alkoxysilane.

Step (b)

In Step (b), an organic-inorganic composite is obtained by drying the reaction solution (mixed composition) obtained in the above Step (a).

The organic-inorganic composite in Step (b) may be obtained, for example, in the form of a sol-gel reactant obtained by applying the reaction solution (mixed composition) to a base material and then heating the resultant for a predetermined time to remove the solvent (C), and completing the sol-gel reaction. Or, it can also be obtained in the form of a sol-gel reactant obtained by applying a sol-gel reactant obtained by the sol-gel reaction without removing the above solvent (C) to a base material and then heating the resultant for a predetermined time to remove the solvent (C), and completing the sol-gel reaction in the mixed composition.

Incidentally, the state of the completion of the sol-gel reaction means ideally the state of all components forming an M-O-M bond, and includes the state shifted to a solid (gel) state even though some alkoxyl groups ($M-OR^2$) or M-OH groups remain.

That is, the metal oxide is obtained from the component (B) by completion of the sol-gel reaction by heat-drying the mixed composition (reaction solution) to form a matrix mainly composed of this metal oxide. The organic-inorganic composite has a structure in which polymer fine particles formed from the terminally branched copolymer are dispersed in the matrix.

The metal oxide in the sol-gel reactant is a continuous matrix structure body in the organic-inorganic composite. The metal oxide is not particularly limited as described above, but the metal oxide as a coating film is preferably a continuous matrix structure body in view of improvement of mechanical properties and the like. Such a structure body of the metal oxide is obtained by subjecting a metal oxide precursor to hydrolysis and polycondensation, that is, to the sol-gel reaction.

When the metal oxide is dispersed in the matrix resin, it is preferable to disperse the metal oxide in the form of a particle. As a method for producing a particulate organic-inorganic composite, there are a method of forming the composite by pulverizing, classifying or the like the obtained solids after drying the mixed dispersion solution of this embodiment at a predetermined temperature, a method of forming the composite by pulverizing, classifying or the like the obtained solids after drying by removing the solvent at a low temperature as in the freeze drying method, a method of obtaining white powders by spraying using a spray dryer and volatilizing the solvent and the like.

The average particle size of the powders is preferably from 0.1 to 100 μm and more preferably from 0.5 to 50 μm from the viewpoint of dispersibility or exhibition of performances as a low dielectric constant film. It is preferable to obtain a desired particle size in advance, and it is preferable to form particles with a spray dryer. When a spray dryer is used for spray molding, the inlet temperature is preferably from 80 to 200 degrees centigrade, while the outlet temperature is preferably from room temperature to 100 degrees centigrade. The collected particles may further be heated in order to complete the sol-gel reaction. The heating temperature is from room temperature to 300 degrees centigrade and more preferably from 80 to 200 degrees centigrade. The reaction time is from 10 minutes to 72 hours and more preferably from 1 to 24 hours.

The metal oxide particles are obtained by carrying out Step (c) in the same manner as in the first embodiment after Step (b). The metal oxide particles of this embodiment have uniform mesopores, and have an average pore diameter of 5 to 30 nm, preferably 10 to 30 nm and further preferably 20 to 30 nm. The metal oxide particles of this embodiment are a mesoporous structure body, and have a cubic structure. The structure and the average pore diameter of the surface of the metal oxide particles may be evaluated and measured using a scanning electron microscope. The structure and the average pore diameter inside the metal oxide particles may be evaluated and measured by setting up the appropriate field range according to the dispersion state of mesopores, measuring diameters of mesopores within the field of view, and averaging the diameters, using a transmission electron microscope (TEM). In this embodiment, as a method of calculating the average pore diameter, for example, the pore diameters are measured from 20 pores optionally selected among images obtained using an electron microscope, and an average is calculated therefrom. Incidentally, the average pore diameter in the porous body may be controlled, for example, by adjusting the average particle size of 50% by volume of the particles in the dispersion solution of the aforementioned terminally branched copolymer particles.

Because of the cubic phase structure composed of mesopores having a relatively large average pore diameter of 5 to 30 nm, the porosity in the porous body can be made high, the dielectric constant is easily controlled, and the pore wall may be thick, so that high mechanical strength is achieved.

In the metal oxide particles of this embodiment, the pore volume of mesopores is from 0.1 to 2.0 ml/g and preferably from 0.3 to 1.5 ml/g. When the pore volume is not less than 0.1 ml/g, the dielectric constant of the metal oxide particles can be lowered. When the pore volume is not more than 2.0 ml/g, a cubic phase structure composed of mesopores is maintained, and deterioration in the physical strength (mechanical strength) can be suppressed.

Meanwhile, the specific surface area of the metal oxide particles of this embodiment is from 50 to 1,000 $m^2/g$ and preferably from 100 to 500 $m^2/g$. When the specific surface area is not less than 50 $m^2/g$, the dielectric constant of the metal oxide particles can be lowered. When the specific surface area is not more than 1,000 $m^2/g$, a cubic phase structure composed of mesopores is maintained, and deterioration in the physical strength (mechanical strength) can be suppressed.

Furthermore, in the metal oxide particles of this embodiment, the maximum peak of the pore diameter of mesopores is in the range of 10 to 30 nm. In this embodiment, the peak of the pore diameter of mesopores represents a single peak.

When the maximum peak of the pore diameter is not more than 10 nm, in the metal oxide particles of this embodiment, the pore wall can be thickened even though the pore volume is high, so that high mechanical strength is obtained. Furthermore, when the maximum peak of the pore diameter is not more than 30 nm, in the metal oxide particles of this embodiment, absorption of moisture or the like can be reduced.

The pore volume, specific surface area, pore diameter and its maximum peak can be determined by the nitrogen adsorption-desorption measurement method. Specifically, nitrogen gas is fed to the metal oxide particle surface and the inside pores connecting with the metal oxide particle surface, and the absorbed amount of nitrogen gas is determined. Subsequently, a pressure of nitrogen gas to be fed is slowly increased and the absorbed amounts of nitrogen gas are plotted against respective equilibrium pressures, whereby an adsorption isotherm curve is obtained. At this time, the specific surface area and the pore volume can be determined using the adsorption isotherm curve, for example, by the BET method or the like. The pore size distribution curve can be determined, for example, by the BJH method or the like using the adsorption isotherm curve. Then, the pore diameter of the maximum peak is calculated from the pore size distribution curve.

Here, the pore size distribution curve is a curve obtained by plotting a value by differentiating the pore volume (V) by the pore diameter (D) (dV/dD) against the pore diameter (D). In order to express the pore distribution in a wide range, a value obtained by dividing the differential pore volume dV by the log differential value d (log D) of the pore diameter, and a Log differential pore volume distribution, dV/d (log D), is obtained by plotting this value against the average pore diameter in each section.

The porosity of the metal oxide particles may be calculated according to the following equation.

Equation: $a/(a+1/b) \times 100$ (pore volume: a (ml/g), specific gravity of air: 1.0, specific gravity of metal oxide: b)

Furthermore, the filler of this embodiment is a filler used as filled in a substrate constituting a circuit board or an interlayer insulating film, wherein the filler comprises the metal oxide particles having a mesoporous structure, the metal oxide particle has a cubic phase structure, and a value (W/D) obtained by dividing the full width at half maximum (W) in the maximum peak of the log differential pore volume distribution curve by the average pore diameter (D), which is obtained by analyzing the adsorption curve of the nitrogen adsorption isotherm curve according to the BJH method, is not more than 0.5. The value (W/D) is preferably not more than 0.3. Furthermore, the full width at half maximum (W) may be an average of the full width at half maximum.

The smaller value (W/D) is indicative of sharper pore distribution. In the filler of this embodiment, when the value (W/D) is not more than 0.5, a group of mesopores is uniformly present and the distribution of mesopores becomes sharp, whereby the dielectric constant is outstandingly lowered. Microvoids are lost, so that the physical strength (mechanical strength) with the loss of the structural defect sites is also improved. On the other hand, when the value (W/D) is not more than 0.3, such an effect is further improved.

The pore diameters of the metal oxide particles of this embodiment become uniform without broadening (there is little variation). That is, pores (mesopores) of the metal oxide particles of this embodiment have substantially the same pore diameter.

It is guessed as follows. In the metal oxide particles of this embodiment, the pore diameter is large, and the pore diameter is uniform, so that almost all pores (mesopores) are considered to contribute to reduction of the relative dielectric constant of the metal oxide particles of this embodiment. So, in this embodiment, the dielectric constant can be very low as compared to the conventional ones. As a result, in this embodiment, for example, even though the pore volume is made low and the mechanical strength is secured, the dielectric constant may be lowered as compared to the conventional ones.

On the other hand, in the conventional porous particles, the pore diameter of pores is broad, so that there are a number of microscopic pores which make little contribution to low dielectric constant. So, in the conventional porous particles, it is guessed that the dielectric constant becomes higher than this embodiment in spite of the same pore volume as this embodiment.

Such a dielectric constant of the metal oxide particles of this embodiment is not more than 2.5 and preferably not more than 2.0 (however, the lower limit of the dielectric constant is not less than 1). The dielectric constant may be, for example, a dielectric constant measured at 1 MHz by the static capacitor method.

In this embodiment, it is preferable to further carry out Step (d) after Step (c).

Step (d)

In the Step (c), a hydroxyl group (silanol) remains on the film surface and pore surface. When a hydroxyl group remains, moisture is easily absorbed, and the dielectric constant value is increased (dielectric constant of water: 80). The hydrophobic treatment is carried out by the reaction of an organic silicon compound having an alkyl group which is a hydrophobic group preferentially or selectively reacting with the silanol group, with the silanol group. For the hydrophobization, an organic silicon compound having an alkyl group such as a silazane compound, a siloxane compound, a chlorosilane compound or the like is used as a hydrophobic agent.

Examples of the silazane compound include hexamethyldisilazane, hexaphenyldisilazane, diphenyltetramethylsilazane, 1,2,3,4,5,6-hexamethylcyclotrisilazane, 1,3,5,7-tetraethyl-2,4,6,8-tetramethylcyclotetrasilazane, 1,2,3-triethyl-2,4,6-triethylcyclotrisilazane and the like. Examples of the siloxane compound include (3,3,3-trifluoropropyl)methylcyclotrisiloxane, triphenyltrimethylcyclotrisiloxane, 1,3,5,7-tetramethylcyclotetrasiloxane, octamethylcyclotetrasiloxane, 1,3,5,7-tetramethyl-1,3,5,7-tetraphenylcyclotetrasiloxane, tetraethylcyclotetrasiloxane, pentamethylcyclopentasiloxane, 1,2-bis(tetramethyldisiloxanyl)ethane, 1,3-bis(trimethylsiloxy)-1,3-dimethyldisiloxane, 1,1,3,3,5,5-hexamethyltrisiloxane, 1,1,3,3-tetraisopropyldisiloxane, 1,1,4,4-tetramethyldisilethylene and 1,1,3,3-tetramethyldisiloxane. Examples of the chlorosilane compound include trimethylchlorosilane, triethylchlorosilane, dimethylchlorosilane and the like.

The hydrophobization may be carried out in a gas phase atmosphere or in a liquid phase. When the hydrophobization is carried out in a gas phase atmosphere by gasifying a hydrophobic agent, the hydrophobization may be carried out in an airtight container or by circulating the gasified hydrophobic agent to come into contact with. The gasified hydrophobic agent may be diluted with gas. Examples of the usable gas for diluting include nitrogen, argon, hydrogen and the like. The reaction temperature is not particularly limited, and it may be not less than a temperature in which an organic silicon compound having an alkyl group that is a hydrophobic agent is reacted with a porous material, but not more than a temperature in which the hydrophobic agent is not decomposed and it does not cause a side reaction other than a desired reaction, and it is preferably in the range of 10 to 400 degrees centigrade. When the hydrophobic reaction is carried out in a liquid phase, an organic solvent may be used.

Examples of the organic solvent which can be used include alcohols such as methanol, ethanol, n-propyl alcohol, isopropyl alcohol and the like; ethers such as diethyl ether, diethylene glycol dimethyl ether, 1,4-dioxane, tetrahydrofuran and the like; and arylalkanes such as benzene, toluene, xylene and the like. When the hydrophobic reaction is carried out in an organic solvent, the concentration of the organic silicon compound having an alkyl group is not particularly limited, and it is properly selected from a wide range depending on various reaction conditions such as the kind of the organic silicon compound, the kind of the organic solvent, the reaction temperature and the like.

The thus-obtained metal oxide particles can be used as a filler which is dispersed, for example, in a matrix resin in the following manner.

Matrix Resin

The matrix resin which can be used in this embodiment is not particularly limited. Examples thereof include a thermosetting resin to be cured by heating, a photocurable resin to be cured by irradiation with light such as ultraviolet light or the like, a thermoplastic resin, and the like.

Examples of the thermosetting resin and the photocurable resin include an epoxy resin, an unsaturated polyester resin, a phenol resin, a urea melamine resin, a polyurethane resin, a silicon resin, a diallyl phthalate resin, a thermosetting polyimide resin and the like.

Examples of the epoxy resin include various epoxy resins such as a glycidyl ether type epoxy resin including a bisphenol A type epoxy resin and the like, a glycidyl ester type epoxy resin, a glycidylamine type epoxy resin, a cycloaliphatic type epoxy resin, a novolac type epoxy resin, a naphthalene type epoxy resin, a dicyclopentadiene type epoxy resin and the like. Examples of the unsaturated polyester resin include various unsaturated polyester resins such as an orthophthalic acid type unsaturated polyester resin, an isophthalic acid type unsaturated polyester resin, a terephthalic acid type unsaturated polyester resin, an unsaturated alicyclic acid type unsaturated polyester resin, a saturated fatty acid type unsaturated polyester resin, a bisphenol type unsaturated polyester resin, a halogen-containing acid type unsaturated polyester resin and a halogen-containing bisphenol type unsaturated polyester resin. Examples of the phenol resin include phenol resins such as a resol type phenol resin, a novolac type phenol resin and the like.

Examples of the thermoplastic resin include a polyolefin resin, a polyvinylchloride resin, a vinylidene chloride resin, a polystyrene resin, an acrylonitrile-butadiene-styrene copolymer resin, an acrylonitrile-styrene copolymer resin, a styrene-based block copolymer resin, a methacrylic resin, a polyvinyl alcohol resin, a polyamide resin, a polyacetal resin, a polycarbonate resin, a modified polyphenylene ether resin, a thermoplastic polyester resin, a fluorine-containing resin, a polyphenylene sulfide resin, a polysulfone resin, an amorphous arylate resin, a polyetherimide resin, a polyether sulfone resin, a polyetherketone resin, a liquid crystal polymer resin, a polyamide imide resin, a thermoplastic polyimide resin, a syndio polystyrene resin and the like.

Examples of the polyolefin resin include a polyethylene resin, a polypropylene resin, an α-olefin copolymer resin, a polybutene-1 resin, a polymethylpentene resin, a cyclic olefin polymer resin, an ethylene-vinyl acetate copolymer resin, an ethylene-methacrylic acid copolymer resin, an ionomer and the like.

Examples of the polyamide resin include nylon 6, nylon 66, nylon 11, nylon 12 and the like.

Examples of the thermoplastic polyester resin include a polyethylene terephthalate resin, a polybutylene terephthalate resin, a polybutylene succinate resin, a polylactic acid resin and the like.

Examples of the fluorine-containing resin include a polytetrafluoroethylene resin, a perfluoroalkoxyalkane resin, a perfluoroethylene-propene copolymer resin, an ethylene-tetrafluoroethylene copolymer resin, a polyvinylidene fluoride resin, a polychlorotrifluoroethylene resin, an ethylene-chlorotrifluoroethylene copolymer resin, a tetrafluoroethylene-perfluorodioxol copolymer resin, a polyvinyl fluoride resin and the like.

Among the aforementioned matrix resins, preferably used are an epoxy resin, a phenol resin and a polyimide resin from the viewpoint of low dielectric constant. The matrix resins may be used singly or in combination of two or more kinds.

The weight average molecular weight of the matrix resin is preferably from 200 to 100,000 and more preferably from 500 to 10,000.

The content of the matrix resin is preferably from 30 to 98 mass %, more preferably from 50 to 95 mass % and further preferably from 60 to 90 mass % from the viewpoint of exhibition of performances of a low dielectric constant film.

A method of dispersing into a matrix resin is not particularly limited and a known method may be applied. For example, the following dispersion methods may be used:

(1) a method of obtaining a masterbatch in which the metal oxide particles (a filler) are dispersed in the matrix resin by melt-kneading the matrix resin and metal oxide particles (a filler) in the presence of a solvent and/or a dispersing agent as necessary using a kneading machine (examples of the kneading machine include a bead mill mixer, a 3-roll mill mixer, a homogenizer mixer, a labo-plastomill mixer and the like); and (2) a method of subjecting metal oxide particles (a filler) dispersed in water to a wet treatment with the addition of a treatment agent, and then adding and mixing a solvent-replaced organosol.

Among these methods, from the viewpoint of dispersion stability, preferably used is a method of subjecting metal oxide particles (a filler) dispersed in water to a wet treatment with the addition of a treatment agent, and then adding and mixing a solvent-replaced organosol. As the treatment agent used for a wet treatment, an organic silicon compound is used. Concrete examples include methyltrimethoxysilane, dimethyldimethoxysilane, phenyltrimethoxysilane, diphenyldimethoxysilane, methyltriethoxysilane, dimethyldiethoxysilane, phenyltriethoxysilane, diphenyldiethoxysilane, isobutyltrimethoxysilane, vinyltrimethoxysilane, vinyltriethoxysilane, vinyltris(β-methoxyethoxy)silane, 3,3,3-trifluoropropyltrimethoxysilane, methyl-3,3,3-trifluoropropyldimethoxysilane, β-(3,4-epoxycyclohexyl)ethyltrimethoxysilane, γ-glycidoxymethyltrimethoxysilane, γ-glycidoxymethyltriethoxysilane, γ-glycidoxyethyltrimethoxysilane, γ-glycidoxyethyltriethoxysilane, γ-glycidoxypropyltrimethoxysilane, γ-glycidoxypropyltrimethoxysilane, γ-glycidoxypropyltriethoxysilane, γ-glycidoxypropyltriethoxysilane, γ-(β-glycidoxyethoxy)propyltrimethoxysilane, γ-(meth)acryloxymethyltrimethoxysilane, γ-(meth)acryloxymethyltriethoxysilane, γ-(meth)acryloxyethyltrimethoxysilane, γ-(meth)acryloxyethyltriethoxysilane, γ-(meth)acryloxypropyltrimethoxysilane, γ-(meth)acryloxypropyltrimethoxysilane, γ-(meth)acryloxypropyltriethoxysilane, γ-(meth)acryloxypropyltriethoxysilane, butyltrimethoxysilane, isobutyltriethoxysilane, hexyltriethoxysilane, octyltriethoxysilane, decyltriethoxysilane, butyltriethoxysilane, isobutyltriethoxysilane, hexyltriethoxysilane, octyltriethoxysilane, decyltriethoxysilane, 3-ureido-isopropylpropyltriethoxysilane, perfluorooctylethyltrimethoxysilane, perfluorooctylethyltriethoxysilane, perfluorooctylethyltriisopropoxysilane, trifluoropropyltrimethoxysilane, γ-mercaptopropyltrimethoxysilane, trimethylsilanol, methyltrichlorosilane and the like, and a mixture thereof.

Furthermore, the metal oxide particles having a low dielectric constant of this embodiment may be used as a filler. The filler of this embodiment is used as filled, for example, in a substrate constituting a circuit board or an interlayer insulating film. With the use of the filler of this embodiment, a circuit board may have a low dielectric constant. Here, examples of the circuit board include a printed wiring board such as a flexible board, a rigid board, a BGA board, or a mounting substrate on which BGA or the like is mounted (incidentally, the printed wiring board of this embodiment represents a substrate in which a circuit is not formed on the surface of the board. Also, a copper foil may be formed or may not be formed on the surface of the printed wiring board).

As the printed substrate, there may be used a board comprising a prepreg in which a resin composition is impregnated in a base material, a board forming a prepreg through an adhesive sheet on the board comprising a prepreg, a board of a film (sheet) base in which the filler of this embodiment is dispersed in a matrix resin, a board forming the film through an adhesive sheet on the board comprising a prepreg, and the like.

Here, as the base material, there are used paper, glass cloth, nonwoven glass fabric, synthetic fiber and the like. As the resin composition, there may be used a resin composition obtained by dispersing the filler of this embodiment in the above matrix resin. As the adhesive sheet (an adhesive film), there may be used an epoxy resin or the like.

A high frequency circuit, a high frequency component, an antenna, BGA or the like may be mounted on such a printed substrate. The printed substrate of this embodiment may be used for a high frequency circuit board, an antenna substrate or the like. Furthermore, the filler of this embodiment may also be used for an encapsulation material for encapsulating a high frequency component or the like. Accordingly, in the circuit board according to this embodiment, the signal propagation delay time can be shortened while maintaining the mechanical strength.

As described above, in the metal oxide particles of this embodiment (filler), the dielectric constant is small and the mechanical strength is high. Thus, the metal oxide particles and the resin composition obtained by mixing the metal oxide particles to the matrix resin may be used for various products requiring a low dielectric constant, such as a low dielectric constant and low dielectric loss material, a high frequency material, a substrate using these materials, a membrane, a film, a sheet, an encapsulation material, a potting material and the like.

4. Fourth Embodiment

The antireflection film of this embodiment comprises the porous metal oxide of the first embodiment which has uniform mesopores and has an average pore diameter of 5 to 30 nm.

In a fluorine compound, magnesium fluoride or the like described in Patent Documents 4 and 5, the refractive index was merely about 1.3, but it was not possible to obtain lower refractive index than that. Furthermore, the refractive index thereof was a value inherent to a substance, and the refractive index was not controlled on demand.

On the other hand, according to this embodiment, with the use of the terminally branched copolymer particles in which the average particle size of 50% by volume is small and the particle size is constant regardless of the dilute concentration, there are provided an antireflection film comprising the porous metal oxide in which mesopores form a cubic phase and the average pore diameter is large, a method for producing the antireflection film and an optical material using the antireflection film.

The terminally branched copolymer particles in this embodiment are stably present in water or in an organic solvent, in the concentration of 0 to 40 wt %, and the ratio of the terminally branched copolymer particles to the metal oxide precursor is changed on demand, so that there is provided an antireflection film comprising the porous metal oxide wherein the refractive index can be adjusted on demand.

The antireflection film of this embodiment achieves high mechanical strength because its pore wall is thick at the same porosity as compared to a hexagonal structure having an average pore diameter of not more than 10 nm (FIGS. 2A and 2B).

Hereinafter, a method for producing a porous metal oxide using the terminally branched copolymer particles described in the first embodiment will be described.

Method for Producing Porous Metal Oxide

The porous metal oxide of this embodiment is produced by forming an organic-inorganic composite of the terminally branched copolymer particles and metal oxide, and then removing the terminally branched copolymer particles used as the template.

Specifically, the method comprises the following steps:

Step (a): a step of subjecting a metal oxide precursor selected from metal alkoxide and/or a partially hydrolyzed condensate of the metal alkoxide, metal halide, metal acetate and metal nitrate to a sol-gel reaction in the presence of the aforementioned terminally branched copolymer particles;

Step (b): a step of obtaining an organic-inorganic composite by drying the reaction solution obtained in the above Step (a) and completing the sol-gel reaction; and Step (c): a step of producing a porous metal oxide by removing the terminally branched copolymer particles from the above organic-inorganic composite.

The above Steps (a) to (c) are the same as those of the first embodiment so that description will not be repeated.

Incidentally, metal alkoxide in this embodiment may be used among those represented by the following formula (12) in the same manner as in the first embodiment.

$$(R^1)_x M(OR^2)_y \tag{12}$$

In this embodiment, as M, preferably used are metals (alkoxide) that is converted to colorless metal oxides in the sol-gel reaction, such as, Si, Al, Zn, Zr, In, Sn, Ti, Pb, Hf and the like from the viewpoint of use as a coating film. Of the metals, particularly preferably used is silicon.

That is, in this embodiment, as the partially hydrolyzed condensate of the metal alkoxide, preferably used is a condensate of alkoxysilane.

The thus-obtained porous metal oxide of this embodiment has uniform mesopores, and has an average pore diameter of 5 to 30 nm, preferably 10 to 30 nm and further preferably 20 to 30 nm. The porous metal oxide of this embodiment is a mesoporous structure body, and has a cubic structure. The structure and the pore diameter of the surface of the porous metal oxide may be evaluated and measured using a scanning electron microscope. The structure and the pore diameter inside the porous metal oxide may be evaluated and measured by setting up the appropriate field range according to the dispersion state of mesopores, measuring diameters of mesopores within the field of view, and averaging the diameters, using a transmission electron microscope (TEM). In the present invention, as a method of calculating the average pore diameter, for example, the pore diameters are measured from 20 pores optionally selected among images obtained using an electron microscope, and an average is calculated therefrom. Incidentally, the average pore diameter in the porous body may be controlled, for example, by adjusting the average particle size of 50% by volume of the particles in the dispersion solution of the aforementioned terminally branched copolymer particles.

Because of the cubic phase structure composed of mesopores having a relatively large average pore diameter of 5 to 30 nm, the porosity in the porous body can be made high, the refractive index is easily controlled, and the pore wall may be thick, so that high mechanical strength is achieved.

In this embodiment, it is preferable to further carry out Step (d) after Step (c).

Step (d)

In the Step (c), a hydroxyl group (silanol) remains on the film surface and pore surface. When a hydroxyl group remains, moisture is easily absorbed, and the refractive index value varies in some cases. Then, preferably used is a method in which the hydrophobic treatment is carried out by the reaction of an organic silicon compound having an alkyl group which is a hydrophobic group preferentially or selectively reacting with the silanol group, with the silanol group. For the hydrophobization, an organic silicon compound having an alkyl group such as a silazane compound, a siloxane compound, a chlorosilane compound or the like is used as a hydrophobic agent.

Examples of the silazane compound include hexamethyldisilazane, hexaphenyldisilazane, diphenyltetramethylsilazane, 1,2,3,4,5,6-hexamethylcyclotrisilazane, 1,3,5,7-tetraethyl-2,4,6,8-tetramethylcyclotetrasilazane, 1,2,3-triethyl-2,4,6-triethylcyclotrisilazane and the like. Examples of the siloxane compound include (3,3,3-trifluoropropyl)methylcyclotrisiloxane, triphenyltrimethylcyclotrisiloxane, 1,3,5,7-tetramethylcyclotetrasiloxane, octamethylcyclotetrasiloxane, 1,3,5,7-tetramethyl-1,3,5,7-tetraphenylcyclotetrasiloxane, tetraethylcyclotetrasiloxane, pentamethylcyclopentasiloxane, 1,2-bis(tetramethyldisiloxanyl)ethane, 1,3-bis(trimethylsiloxy)-1,3-dimethyldisiloxane, 1,1,3,3,5,5-hexamethyltrisiloxane, 1,1,3,3-tetraisopropyldisiloxane, 1,1,4,4-tetramethyldisilethylene and 1,1,3,3-tetramethyldisiloxane. Examples of the chlorosilane compound include trimethylchlorosilane, triethylchlorosilane, dimethylchlorosilane and the like.

The hydrophobization may be carried out in a gas phase or a liquid phase. When the hydrophobization is carried out by gasifying a hydrophobic agent, under gas phase condition, the hydrophobization may be carried out in an airtight container or by circulating the gasified hydrophobic agent to come into contact with. The gasified hydrophobic agent may be diluted with gas. Examples of the usable gas for diluting include nitrogen, argon, hydrogen and the like. The reaction temperature is not particularly limited, and it may be not less than a temperature in which an organic silicon compound having an alkyl group that is a hydrophobic agent is reacted with a porous material, but not more than a temperature in which the hydrophobic agent is not decomposed and it does not cause a side reaction other than a desired reaction, and it is preferably in the range of 10 to 400 degrees centigrade. When the hydrophobic reaction is carried out in a liquid phase, an organic solvent may be used.

Examples of the organic solvent which can be used include alcohols such as methanol, ethanol, n-propyl alcohol, isopropyl alcohol and the like; ethers such as diethyl ether, diethylene glycol dimethyl ether, 1,4-dioxane, tetrahydrofuran and the like; and arylalkanes such as benzene, toluene, xylene and the like. When the hydrophobic reaction is carried out in an organic solvent, the concentration of the organic silicon compound having an alkyl group is not particularly limited, and it is properly selected from a wide range depending on various reaction conditions such as the kind of the organic silicon compound, the kind of the organic solvent, the reaction temperature and the like. Since solvent recovery or drying step is not necessary, the hydrophobic reaction is preferably carried out in a gas phase. The chemical vapor adsorption (CVA) method is particularly preferable.

In a method for producing a film-like porous metal oxide in this embodiment, the terminally branched copolymer particles are removed from the aforementioned organic-inorganic composite. For example, an antireflection film comprising the porous metal oxide (hereinafter simply referred to as the antireflection film) is obtained by calcination of the aforementioned film-like organic-inorganic composite.

The film thickness of the antireflection film is not particularly limited, but it may be from 10 to 1,000 nm and more preferably from 20 to 500 nm. When it is not less than 10 nm, film-forming properties can be improved. When it is not more than 1,000 nm, transparency of the film can be improved.

The film thickness of the antireflection film is measured, for example, using an ellipsometer (JASCO M-150).

The refractive index of the antireflection film of this embodiment is not more than 1.4 and preferably not more than 1.3 (however, the lower limit of the refractive index is not less than 1). The refractive index may be, for example, a refractive index measured at 590 nm using an ellipsometer (JASCO M-150).

In this embodiment, in order to control the refractive index, (1) the pore volume of mesopores in the antireflection film is controlled or (2) the average pore diameter (peak value of the pore diameter) of mesopores of the porous metal oxide of this embodiment is controlled.

Specifically, in (1), the composition ratio of the terminally branched copolymer particles (A) and the above metal oxide precursor (B) is controlled during Step (a). In (2), the average particle size of 50% by volume of particles in the dispersion solution of the terminally branched copolymer particles is controlled.

In (1), when the composition ratio of the terminally branched copolymer particles (A) is increased, the pore volume ratio of mesopores contained in the film of this embodiment is increased. Thus, the volume ratio of mesopores (refractive index: 1) in the film is increased, while the refractive index of the entire film is lowered.

In (2), when the average particle size of 50% by volume is increased, the average pore diameter (peak value of the pore diameter) is increased. Thus, pores (refractive index: 1) in the film become larger, so that the refractive index of the entire film is lowered.

In this way, in this embodiment, a film comprising the porous metal oxide with the low refractive index can be obtained.

The transmittance in the wavelength range of 400 to 600 nm of the antireflection film of this embodiment is not less than 80% and preferably not less than 85%.

When it is not less than 80%, light transparency is secured. On the other hand, when it is not less than 85%, high light transparency is secured and at the same time, design or color for target applications of this embodiment is not damaged. The transmittance may be measured by the use of an ultraviolet and visible spectrophotometer.

Herein, the antireflection film of this embodiment may be applied to a window glass for vehicles, a window glass for buildings, a glass for display cases, a mirror, a lens, and a building material such as a wall material or the like.

The elastic modulus of the antireflection film of this embodiment is from 8 to 30 GPa and preferably from 10 to 20 GPa.

When the elastic modulus is not less than 8 GPa, the breaking strength of the antireflection film of this embodiment is improved, so that handling properties may be improved. At this time, the elastic modulus is measured, for example, using a nano indenter, Nano Indenter DCM, commercially available from MTS Corporation.

Furthermore, the hardness of the antireflection film of this embodiment is from 0.5 to 2.0 GPa and preferably from 0.7 to 1.5 GPa.

When the hardness is not less than 50 $m^2$/g, scratch resistance of the antireflection film of this embodiment may be improved.

As described above, in the film comprising the porous metal oxide of this embodiment (antireflection film), the refractive index is small and the mechanical strength is also high. The antireflection film of this embodiment is arranged on the surface of a display screen comprising a transparent base material. Thus, the transparent base material (an optical material) on which a film comprising the porous metal oxide is arranged is not particularly limited as long as it is a product having a transparent base material requiring low reflection resistance.

Examples of the optical material include electrical products such as glass to prevent reflection for absorbing sunlight with good efficiency, a personal computer, a television, a video player, a video recorder, a display and the like. Examples of the display include displays such as a liquid crystal, CRT, plasma and the like. Furthermore, the antireflection film of this embodiment may also be applied to a touch panel, a window glass, a glass for shop window, a TV tube display surface, an instrument cover glass, a watch cover glass, a light polarizing film, spectacle lenses, camera lenses, a front image surface of a cathode-ray tube and the like.

The antireflection film of this embodiment may be used as a single layer or multiple layers. In addition, the antireflection film of this embodiment may also be used as a part of laminated body with a high refractive index material.

5. Fifth Embodiment

The lightweight filler of this embodiment comprises the porous metal oxide of the first embodiment, and comprising the metal oxide particles which has uniform mesopores, and has a pore structure of a cubic phase structure.

The silica gel foam described in Patent Documents 6 and 7 was very light, but the surface of a ceramic such as silica gel or the like was usually made hydrophilic due to a hydroxyl group. So, there was a problem such that it had a bad affinity particularly with a hydrophobic resin such as a polyolefin resin or the like and became a relatively fragile resin composition. Furthermore, since a thickness of a silica skeleton constituting silica gel was the same as that of silica gel, so that there was also a problem such that so much thermal insulation was not expected.

On the other hand, according to this embodiment, with the use of particles in which the average particle size of 50% by volume is small and the particle size is constant regardless of the dilute concentration, there is provided a lightweight filler in which cubic phase pores having high mechanical strength are formed and the average pore diameter is large.

Hereinafter, a method for producing metal oxide particles (hereinafter referred to as the metal oxide particles) of a mesoporous structure of this embodiment using the terminally branched copolymer particles described in the first embodiment will be illustrated.

Method for Producing Metal Oxide Particles

The metal oxide particles of this embodiment are produced by forming an organic-inorganic composite of the terminally branched copolymer particles and metal oxide, and then removing the terminally branched copolymer particles used as the template.

Specifically, the method comprises the following steps:

Step (a): a step of subjecting a metal oxide precursor selected from metal alkoxide and/or a partially hydrolyzed condensate of the metal alkoxide, metal halide, metal acetate and metal nitrate to a sol-gel reaction in the presence of the aforementioned terminally branched copolymer particles;

Step (b): a step of obtaining an organic-inorganic composite by drying the reaction solution obtained in the above Step (a) and completing the sol-gel reaction; and Step (c): a step of producing metal oxide particles by removing the terminally branched copolymer particles from the above organic-inorganic composite.

The above Steps (a) and (c) are the same as those of the first embodiment so that description will not be repeated.

Incidentally, metal alkoxide in this embodiment may be used among those represented by the following formula (12) in the same manner as in the first embodiment.

$(R^1)xM(OR^2)y$ (12)

In this embodiment, as M, preferably used are metals (alkoxide) that is converted to colorless metal oxides in the sol-gel reaction, such as, Si, Al, Zn, Zr, In, Sn, Ti, Pb, Hf and the like from the viewpoint of use as a composite with a matrix resin. Of the metals, particularly preferably used is silicon.

That is, in this embodiment, as the partially hydrolyzed condensate of the metal alkoxide, preferably used is a condensate of alkoxysilane.

Step (b)

In Step (b), an organic-inorganic composite is obtained by drying the reaction solution (mixed composition) obtained in the above Step (a).

The organic-inorganic composite in Step (b) may be obtained, for example, in the form of a sol-gel reactant obtained by applying the reaction solution (mixed composition) to a base material and then heating the resultant for a predetermined time to remove the solvent (C), and completing the sol-gel reaction. Or, it can also be obtained in the form of a sol-gel reactant obtained by applying a sol-gel reactant obtained by the sol-gel reaction without removing the above solvent (C) to a base material and then heating the resultant for a predetermined time to remove the solvent (C), and completing the sol-gel reaction in the mixed composition.

Incidentally, the state of the completion of the sol-gel reaction means ideally the state of all components forming an M-O-M bond, and includes the state shifted to a solid (gel) state even though some alkoxyl groups (M-OR$^2$) or M-OH groups remain.

That is, the metal oxide is obtained from the component (B) by completion of the sol-gel reaction by heat-drying the mixed composition (reaction solution) to form a matrix mainly composed of this metal oxide. The organic-inorganic composite has a structure in which polymer fine particles formed from the terminally branched copolymer are dispersed in the matrix.

The metal oxide in the sol-gel reactant is a continuous matrix structure body in the organic-inorganic composite. The metal oxide is not particularly limited as described above, but the metal oxide as particles is preferably a continuous matrix structure body in view of improvement of mechanical properties and the like. Such a structure body of the metal oxide is obtained by subjecting a metal oxide precursor to hydrolysis and polycondensation, that is, to the sol-gel reaction.

When the metal oxide is dispersed in the matrix resin, it is preferable to disperse the metal oxide in the form of a particle. As a method for producing a particulate organic-inorganic composite, there is a method of forming the composite by pulverizing, classifying or the like the obtained solids after drying the mixed dispersion solution of this embodiment at a predetermined temperature, a method of forming the composite by pulverizing, classifying or the like the obtained solids after drying by removing the solvent at a low temperature as in the freeze drying method, a method of obtaining white powders by spraying using a spray dryer and volatilizing the solvent and the like. The average particle size of the powders is preferably from 0.1 to 100 μm and more preferably from 0.5 to 50 μm from the viewpoint of dispersibility or exhibition of performances as a filler. It is preferable to obtain a desired particle size in advance, and it is preferable to form particles with a spray dryer. When a spray dryer is used for spray molding, the inlet temperature is preferably from 80 to 200 degrees centigrade, while the outlet temperature is preferably from room temperature to 100 degrees centigrade. The collected particles may further be heated in order to complete the sol-gel reaction. The heating temperature is from room temperature to 300 degrees centigrade and more preferably from 80 to 200 degrees centigrade. The reaction time is from 10 minutes to 72 hours and more preferably from 1 to 24 hours.

The metal oxide particles of this embodiment obtained by carrying out Step (c) in the same manner as in the first embodiment after Step (b) have mesopores and have a pore structure of a cubic phase structure. The average pore diameter of mesopores is from 5 to 30 nm, preferably from 10 to 30 nm and further preferably from 15 to 30 nm.

Here, the structure and the average pore diameter of the surface of the metal oxide particles may be evaluated and measured using a scanning electron microscope. The average pore diameter inside the metal oxide particles may be evaluated and measured by setting up the appropriate field range according to the dispersion state of mesopores, measuring diameters of mesopores within the field of view, and averaging the diameters, using a transmission electron microscope (TEM). The structure inside the metal oxide particles may be observed with a transmission electron microscope (TEM) or an X-ray analysis device. Incidentally, the average pore diameter in the porous body may be controlled, for example, by adjusting the average particle size of 50% by volume of the particles in the dispersion solution of the aforementioned terminally branched copolymer particles.

Because of the cubic phase structure composed of mesopores having a relatively large average pore diameter of 5 to 30 nm, the porosity in the porous body can be made high, properties of bulk specific gravity and thermal insulation (thermal conductivity) are easily controlled, and the pore wall may be thick, so that high mechanical strength is achieved.

In this embodiment, it is preferable to further carry out Step (d) after Step (c).

Step (d)

In the Step (c), a hydroxyl group (silanol) remains on the particle surface and pore surface. When a hydroxyl group remains, moisture is easily absorbed, and the bulk specific gravity or the thermal conductivity value is increased. The hydrophobic treatment is carried out by the reaction of an organic silicon compound having an alkyl group which is a hydrophobic group preferentially or selectively reacting with the silanol group, with the silanol group. For the hydrophobization, an organic silicon compound having an alkyl group such as a silazane compound, a siloxane compound, a chlorosilane compound or the like is used as a hydrophobic agent.

Examples of the silazane compound include hexamethyldisilazane, hexaphenyldisilazane, diphenyltetramethylsilazane, 1,2,3,4,5,6-hexamethylcyclotrisilazane, 1,3,5,7-tetraethyl-2,4,6,8-tetramethylcyclotetrasilazane, 1,2,3-triethyl-2,4,6-triethylcyclotrisilazane and the like. Examples of the siloxane compound include (3,3,3-trifluoropropyl)methylcyclotrisiloxane, triphenyltrimethylcyclotrisiloxane, 1,3,5,7- tetramethylcyclotetrasiloxane, octamethylcyclotetrasiloxane, 1,3,5,7-tetramethyl-1,3,5,7-tetraphenylcyclotetrasiloxane, tetraethylcyclotetrasiloxane, pentamethylcyclopentasiloxane, 1,2-bis(tetramethyldisiloxanyl)ethane, 1,3-bis(trimethylsiloxy)-1,3-dimethyldisiloxane, 1,1,3,3,5,5-hexamethyltrisiloxane, 1,1,3,3-tetraisopropyldisiloxane, 1,1,4,4-tetramethyldisilethylene and 1,1,3,3-tetramethyldisiloxane. Examples of the chlorosilane compound include trimethylchlorosilane, triethylchlorosilane, dimethylchlorosilane and the like.

The hydrophobization may be carried out in a gas phase or a liquid phase. When the hydrophobization is carried out by gasifying a hydrophobic agent, under gas phase condition, it may be carried out in an airtight container or by circulating the gasified hydrophobic agent to come into contact with. The gasified hydrophobic agent may be diluted with gas. Examples of the usable gas for diluting include nitrogen, argon, hydrogen and the like. The reaction temperature is not particularly limited, and it may be not less than a temperature in which an organic silicon compound having an alkyl group that is a hydrophobic agent is reacted with a porous material, but not more than a temperature in which the hydrophobic agent is not decomposed and it does not cause a side reaction other than a desired reaction, and it is preferably in the range of 10 to 400 degrees centigrade. When the hydrophobic reaction is carried out in a liquid phase, an organic solvent may be used. Examples of the organic solvent which can be used include alcohols such as methanol, ethanol, n-propyl alcohol, isopropyl alcohol and the like; ethers such as diethyl ether, diethylene glycol dimethyl ether, 1,4-dioxane, tetrahydrofuran and the like; and arylalkanes such as benzene, toluene, xylene and the like. When the hydrophobic reaction is carried out in an organic solvent, the concentration of the organic silicon compound having an alkyl group is not particularly limited, and it is properly selected from a wide range depending on various reaction conditions such as the kind of the organic silicon compound, the kind of the organic solvent, the reaction temperature and the like.

The thus-obtained metal oxide particles may be used as a lightweight filler which is dispersed, for example, in a matrix resin in the following manner.

Matrix Resin

The matrix resin which can be used in this embodiment is not particularly limited. Examples thereof include a thermosetting resin curable by heating, a photocurable resin curable by irradiation with light such as ultraviolet light or the like, a thermoplastic resin, and the like.

Examples of the thermosetting resin and the photocurable resin include an epoxy resin, an unsaturated polyester resin, a phenol resin, a urea melamine resin, a polyurethane resin, a silicon resin, a diallyl phthalate resin, a thermosetting polyimide resin and the like.

Examples of the epoxy resin include various epoxy resins such as a glycidyl ether type epoxy resin including a bisphenol A type epoxy resin and the like, a glycidyl ester type epoxy resin, a glycidylamine type epoxy resin, a cycloaliphatic type epoxy resin, a novolac type epoxy resin, a naphthalene type epoxy resin, a dicyclopentadiene type epoxy resin and the like. Examples of the unsaturated polyester resin include various unsaturated polyester resins such as an orthophthalic acid type unsaturated polyester resin, an isophthalic acid type unsaturated polyester resin, a terephthalic acid type unsaturated polyester resin, an unsaturated alicyclic acid type unsaturated polyester resin, a saturated fatty acid type unsaturated polyester resin, a bisphenol type unsaturated polyester resin, a halogen-containing acid type unsaturated polyester resin and a halogen-containing bisphenol type unsaturated polyester resin. Examples of the phenol resin include phenol resins such as a resol type phenol resin, a novolac type phenol resin and the like.

Examples of the thermoplastic resin include a polyolefin resin, a polyvinylchloride resin, a vinylidene chloride resin, a polystyrene resin, an acrylonitrile-butadiene-styrene copolymer resin, an acrylonitrile-styrene copolymer resin, a styrene-based block copolymer resin, a methacrylic resin, a polyvinyl alcohol resin, a polyamide resin, a polyacetal resin, a polycarbonate resin, a modified polyphenylene ether resin, a thermoplastic polyester resin, a fluorine-containing resin, a polyphenylene sulfide resin, a polysulfone resin, an amorphous arylate resin, a polyetherimide resin, a polyether sulfone resin, a polyetherketone resin, a liquid crystal polymer resin, a polyamide imide resin, a thermoplastic polyimide resin, a syndio polystyrene resin and the like.

Examples of the polyolefin resin include a polyethylene resin, a polypropylene resin, an α-olefin copolymer resin, a polybutene-1 resin, a polymethylpentene resin, a cyclic olefin polymer resin, an ethylene-vinyl acetate copolymer resin, an ethylene-methacrylic acid copolymer resin, an ionomer and the like.

Examples of the polyamide resin include nylon 6, nylon 66, nylon 11, nylon 12 and the like.

Examples of the thermoplastic polyester resin include a polyethylene terephthalate resin, a polybutylene terephthalate resin, a polybutylene succinate resin, a polylactic acid resin and the like.

Examples of the fluorine-containing resin include a polytetrafluoroethylene resin, a perfluoroalkoxyalkane resin, a perfluoroethylene-propene copolymer resin, an ethylene-tetrafluoroethylene copolymer resin, a polyvinylidene fluoride resin, a polychlorotrifluoroethylene resin, an ethylene-chlorotrifluoroethylene copolymer resin, a tetrafluoroethylene-perfluorodioxol copolymer resin, a polyvinyl fluoride resin and the like.

Among the aforementioned matrix resins, preferably used are an epoxy resin, a phenol resin, a polyimide resin and a polyolefin resin from the viewpoint of dispersibility or general-purpose use of the lightweight filler. The matrix resins may be used singly or in combination of two or more kinds.

The weight average molecular weight of the matrix resin is preferably from 200 to 100,000 and more preferably from 500 to 10,000.

The content of the matrix resin is preferably from 30 to 98 mass %, more preferably from 50 to 95 mass % and further preferably from 60 to 90 mass %, from the viewpoint of exhibition of performances of lightweightness and thermal insulation.

A method of dispersing into a matrix resin is not particularly limited and a known method may be applied. For example, the following dispersion methods may be used:

(1) a method of obtaining a masterbatch in which the metal oxide particles (a lightweight filler) are dispersed in the matrix resin by melt-kneading the matrix resin and metal oxide particles (a lightweight filler) in the presence of a solvent and/or a dispersing agent as necessary using a kneading machine (examples of the kneading machine include a bead mill mixer, a 3-roll mill mixer, a homogenizer mixer, a laboplastomill mixer and the like); and (2) a method of subjecting metal oxide particles (a lightweight filler) dispersed in water to a wet treatment with the addition of a treatment agent, and then adding and mixing a solvent-replaced metal oxide particle (a lightweight filler) organosol.

In the method of subjecting metal oxide particles (a lightweight filler) dispersed in water to a wet treatment with the addition of a treatment agent, and then adding and mixing a solvent-replaced organosol, as the treatment agent used for a wet treatment, an organic silicon compound is used. Concrete examples include methyltrimethoxysilane, dimethyldimethoxysilane, phenyltrimethoxysilane, diphenyldimethoxysilane, methyltriethoxysilane, dimethyldiethoxysilane, phenyltriethoxysilane, diphenyldiethoxysilane, isobutyltrimethoxysilane, vinyltrimethoxysilane, vinyltriethoxysilane, vinyltris (β-methoxyethoxy)silane, 3,3,3-trifluoropropyltrimethoxysilane, methyl-3,3,3-trifluoropropyldimethoxysilane, β-(3,4-epoxycyclohexyl)ethyltrimethoxysilane, γ-glycidoxymethyltrimethoxysilane, γ-glycidoxymethyltriethoxysilane, γ-glycidoxyethyltrimethoxysilane, γ-glycidoxyethyltriethoxysilane, γ-glycidoxypropyltrimethoxysilane, γ-glycidoxypropyltrimethoxysilane, γ-glycidoxypropyltriethoxysilane, γ-glycidoxypropyltriethoxysilane, γ-(β-glycidoxyethoxy)propyltrimethoxysilane, γ-(meth)acryloxymethyltrimethoxysilane, γ-(meth)acryloxymethyltriethoxysilane, γ-(meth)acryloxyethyltrimethoxysilane, γ-(meth)acryloxyethyltriethoxysilane, γ-(meth)acryloxypropyltrimethoxysilane, γ-(meth)acryloxypropyltrimethoxysilane, γ-(meth)acryloxypropyltriethoxysilane, butyltrimethoxysilane, isobutyltriethoxysilane, hexyltriethoxysilane, octyltriethoxysilane, decyltriethoxysilane, butyltriethoxysilane, isobutyltriethoxysilane, hexyltriethoxysilane, octyltriethoxysilane, decyltriethoxysilane, 3-ureido-isopropylpropyltriethoxysilane, perfluorooctylethyltrimethoxysilane, perfluorooctylethyltriethoxysilane, perfluorooctylethyltriisopropoxysilane, trifluoropropyltrimethoxysilane, γ-mercaptopropyltrimethoxysilane, trimethylsilanol, methyltrichlorosilane and the like, and a mixture thereof.

The bulk specific gravity of the thus-prepared lightweight filler is small and the thermal conductivity is small, so that the resin composition obtained by mixing the lightweight filler to the resin is very light and has high thermal insulation and strength, and may be used for various products requiring a light and/or thermal insulating resin, such as a cleaner, a refrigerator, an electric kettle, a rice cooker, a bidet toilet and the like.

According to this embodiment, with the use of particles in which the average particle size of 50% by volume is small and the particle size is constant regardless of the dilute concentration, there is provided a lightweight filler in which cubic phase pores having high mechanical strength are formed and the average pore diameter is large. A resin composition with improvement of reduction in weight, strengthening, thermal insulation or the like is achieved, for example, by mixing this lightweight filler to a resin. This resin composition may be used for various products requiring a light, thermal insulating or heat shielding resin, such as a cleaner, a refrigerator, an electric kettle, a rice cooker, a bidet toilet and the like.

The resin composition of the present invention is expected to have an electromagnetic shielding effect, sound absorption effect or acoustic effect. Furthermore, when only a porous structure body is used without mixing with a resin, it is used for various applications such as an excellent heat insulating material, an acoustic absorbent material, an electromagnetic shielding material and the like.

6. Sixth Embodiment

The photocatalyst of this embodiment comprises the porous metal oxide of the first embodiment. The porous metal oxide is a titania porous body having a mesoporous structure.

That is, according to this embodiment, with the use of the terminally branched copolymer particles in which the average particle size of 50% by volume is small and the particle size is constant regardless of the dilute concentration, there are provided a photocatalyst comprising a titania porous body having a mesoporous structure, a method for producing the photocatalyst and use.

Hereinafter, a method for producing a titania porous body using the terminally branched copolymer particles described in the first embodiment will be illustrated.

Method for Producing Titania Porous Body

The porous metal oxide of the present invention is produced by forming an organic-inorganic composite of the terminally branched copolymer particles and metal oxide, and then removing the terminally branched copolymer particles used as the template.

Specifically, the method includes the following steps:

Step (a): a step of subjecting a titanium oxide precursor selected from titanium alkoxide and/or a partially hydrolyzed condensate of the titanium alkoxide, titanium halide and titanium acetate to a sol-gel reaction in the presence of the aforementioned terminally branched copolymer particles;

Step (b): a step of obtaining an organic-inorganic composite by drying the reaction solution obtained in the above Step (a) and completing the sol-gel reaction; and Step (c): a step of producing a porous metal oxide by removing the terminally branched copolymer particles from the above organic-inorganic composite.

The above Steps (a) to (c) are the same as the first embodiment, except that the above compound is used as a titanium oxide precursor, so that description will not be repeated.

The thus-obtained titania porous body of the present invention has uniform mesopores, and has an average pore diameter of 5 to 30 nm, preferably 10 to 30 nm and further preferably 20 to 30 nm. Furthermore, mesopores may be connected with each other. The porous metal oxide of the present invention is a mesoporous structure body. The structure and the pore diameter of the surface of the titania porous body may be evaluated and measured using a scanning electron microscope. The structure and the pore diameter inside the porous metal oxide may be evaluated and measured by setting up the appropriate field range according to the dispersion state of mesopores, measuring diameters of mesopores within the field of view, and averaging the diameters, using a transmission electron microscope (TEM). In the present invention, as a method of calculating the average pore diameter, for example, the pore diameters are measured from 20 pores optionally selected among images obtained using an electron microscope, and an average is calculated therefrom. Incidentally, the average pore diameter in the porous body may be controlled, for example, by adjusting the average particle size of 50% by volume of the particles in the dispersion solution of the aforementioned terminally branched copolymer particles.

Figure 4A:
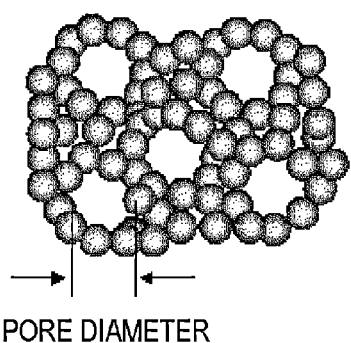
FIGS. 4A and 4B are a schematic view of a surface and a cross section in a method for producing a titania porous body according to the embodiment.
Figure 4B:
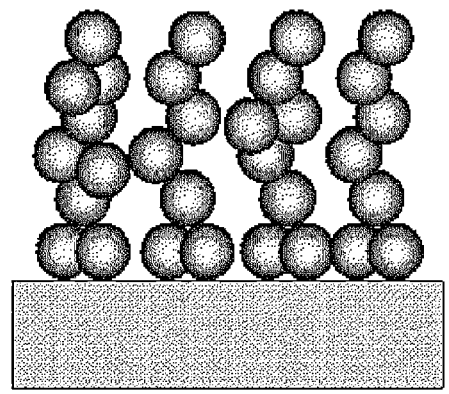

FIGS. 4A and 4B are schematic views illustrating a mesoporous structure body of a titania porous body obtained in the present invention. There are pores having an average pore diameter of 5 to 30 nm on the surface area. In the vertical direction, pores are connected through a process of shrinkage of a film and a process of crystallization of titania, mesochannels are aligned in the vertical direction.

Titania may be amorphous or crystalline, but crystalline titania is preferable in view of stability. The titania is in the crystal structure of an anatase type, a rutile type, a brookite type or the like depending on the calcination temperature.

Here, a preferable type of the titania porous body of the present invention is anatase from the viewpoint of the transmittance of visible light. The titania porous body of the present invention has a vertical orientation, so that the exposed area also becomes large and excellent photocatalyst activity is exhibited.

In a method for producing a film-like titania porous body according to the present invention, the terminally branched copolymer particles are removed from the aforementioned film-like organic-inorganic composite. For example, a titania porous body film is obtained by calcination of the aforementioned film-like organic-inorganic composite.

The film thickness of the titania porous body film is not particularly limited, but it may be from 10 to 1,000 nm and more preferably from 20 to 500 nm. When it is not less than 10 nm, film-forming properties can be improved. When it is not more than 1,000 nm, transparency of the film can be improved.

The film thickness of the titania porous body is measured, for example, using an ellipsometer (JASCO M-150).

The transmittance in the wavelength range of 400 to 600 nm of the titania porous body of the present invention is not less than 80% and preferably not less than 85%.

When it is not less than 80%, light transparency is secured. On the other hand, when it is not less than 85%, high light transparency is secured and at the same time, design or color for target applications of the present invention is not damaged. The transmittance may be measured by the use of an ultraviolet and visible spectrophotometer.

Herein, the titania porous body of the present invention may be applied to a window glass for vehicles, a window glass for buildings, a glass for display cases, a mirror, a lens, and a building material such as a wall material or the like.

The liquid contact angle on the titania porous body of the present invention immediately before or after irradiation with light becomes not more than 20 degrees. On the other hand, the liquid contact angle on the titania porous body of the present invention kept at a dark place for 1 or 2 days after irradiation with light becomes not more than 10 degrees. As light, ultraviolet light, visible light and the like may be used. As a liquid, water (pure water, urban water, rainwater) and the like may be used. The titania porous body of the present invention has excellent hydrophilicity, antifogging properties, durability of a super hydrophilic effect and the like. In the present invention, the contact angle is measured, for example, using CA-X150 (a product of Kyowa Interface Science Co., Ltd.).

With respect to such a photocatalyst effect of the titania porous body of the present invention, when the pore in the titania porous body is made large, (1) photocatalyst efficiency can be improved, (2) the time of a catalyst effect (life) can also be prolonged (durability of a catalyst effect is improved), or (3) super hydrophilicity can be improved.

Use Application

The titania porous body of the present invention has the aforementioned structure and properties, so that it may be suitably used for a highly efficient photocatalyst material, a photo-induced hydrophilic material, a pigment-sensitized solar cell electrode material or the like.

Photocatalytic functions of titania are already widely known phenomena. When the photocatalyst is irradiated with a light having an energy larger than a band gap of titania, the photocatalyst is excited, electrons are generated in a conduction band, and positive holes are generated in a valence band. Also, it is known that the generated electrons reduce surface oxygen to generate super oxide anions ($O^{2-}$), that the positive holes oxidize surface hydroxyl groups to generate hydroxyl radicals (OH), and that these reactive activated oxygen species exhibit strong oxidative decomposition function and highly efficiently decompose organic substances adhering to the photocatalyst surface. Another known function of the photocatalyst is that the surface of the photocatalyst expresses super-hydrophilicity in which a water contact angle becomes not more than 10 degrees when the photocatalyst is excited with light.

The titania porous body of the present invention comprises mesopores having a relatively large pore diameter of 5 to 30 nm, so that it is possible to make the porosity in the porous body large. Since its specific surface area is larger than the non-porous titania surface, an organic compound which pollutes the environment, such as a toxic substance in the air such as bad smell, NOx, Sox or the like, an organic solvent dissolved in water, an agricultural chemical or the like is absorbed with good efficiency, and they can be fast and continuously decomposed and removed by redox activity of electrons and positive holes generated on a titanium oxide thin film on the surface by irradiation with sunlight or an artificial light from a fluorescent lamp, an incandescent lamp, a black light, a UV lamp, a mercury lamp, a xenon lamp, a halogen lamp, a metal halide lamp or the like. In order to further improve performance of the photocatalyst of the present invention, a metal coating film such as platinum, rhodium, ruthenium, palladium, silver, copper, zinc or the like may be coated on its surface. As a method of coating a metal coating film thereof on the surface, there are exemplified a photo-deposition method, a CVD method, and a PVD method such as sputtering, vacuum deposition or the like. In this case, since the titania surface is coated by successfully dispersing a metal because it is porous, the catalytic action of a metal can be particularly effectively achieved.

Furthermore, with the use of an electrode material formed by absorbing a pigment to the titania surface by applying the oxidizing power of the titania, a pigment-sensitized solar cell generating electricity by photoelectric conversion of light energy of irradiation light has also been well known. However, since pigment molecules having a larger molecular size can be absorbed inside the pores as well by the use of the titania porous body of the present invention, photoelectric conversion efficiency is obviously improved.

In this manner, the titania porous body of the present invention functions as an excellent photocatalyst.

7. Seventh Embodiment

The moisture absorbing agent or a moisture controlling agent (hereinafter referred to as the moisture absorbing agent) of this embodiment comprises the porous metal oxide of the first embodiment, and comprises metal oxide particles which has uniform mesopores and has a pore structure of a cubic phase structure.

From the past, as the moisture absorbing agent or the moisture controlling agent, use of a certain hygroscopic metal salt or a porous material having a number of pores on the surface has been known. As the hygroscopic metal salt, there are known, for example, lithium chloride, lithium bromide and the like. An aqueous solution of metal salt thereof has been used as a moisture absorbing agent of an absorption heat pump because of easy absorption and emission of water vapor. Also, as the hygroscopic porous material, there are known silica gel, activated carbon, zeolite and the like, which have been suitably used for the environment (initial moisture atmosphere) subjected to moisture absorption preferably by adjusting the pore diameter, the pore volume and the like.

However, since the absorption capacity of the porous material itself is not that great, the porous material and the aforementioned hygroscopic metal salt are composited. As the moisture absorbing agent, for example, of a building material, a honeycomb type dry dehumidifier or the like, there are used silica gel, zeolite and the like containing lithium salt or the like. However, lithium salt is very highly hygroscopic, but the absorption rate is slow in a usual solid state. Since the lithium salt is easily deliquesced and the produced aqueous solution has high viscosity, movement of absorbed moisture is slow. Because of this, there was a problem such that the inherent moisture absorption capacity was not fully exhibited even with the use of lithium salt as a moisture absorbing agent. In the moisture absorbing agent obtained by forming a composite of lithium salt and a porous material such as silica gel, zeolite or the like, there was a problem such that lithium salt or the like was deliquesced depending on the use conditions, and the produced aqueous solution of lithium salt overflows out of pores.

When this phenomenon arises, lithium salt that is a hygroscopic material falls away from the porous carrier, so that there were problems such that not only hygroscopic performance is deteriorated, but also it is difficult to repeatedly carry out adsorption and desorption of moisture. In order to improve the hygroscopic capacity with the use of silica gel without containing lithium chloride or the like free from such problems, there have been attempted to make the porosity large to increase the specific surface area. However, since pores of silica gel are not regular, there is also a problem such that the mechanical strength is greatly lowered by increasing the porosity. On the other hand, according to this embodiment, by the use of particles in which the average particle size of 50% by volume is small and the particle size is constant regardless of the dilute concentration, there is provided a hygroscopic material in which cubic phase pores having high mechanical strength are formed and the average pore diameter is large.

Hereinafter, a method for producing metal oxide particles (hereinafter referred to as the metal oxide particles) of a mesoporous structure of this embodiment using the terminally branched copolymer particles described in the first embodiment will be illustrated.

Method for Producing Metal Oxide Particles

The metal oxide particles of this embodiment are produced by forming an organic-inorganic composite of the terminally branched copolymer particles and metal oxide, and then removing the terminally branched copolymer particles used as the template.

Specifically, the method comprises the following steps:

Step (a): a step of subjecting a metal oxide precursor selected from metal alkoxide and/or a partially hydrolyzed condensate of the metal alkoxide, metal halide, metal acetate and metal nitrate to a sol-gel reaction in the presence of the aforementioned terminally branched copolymer particles;

Step (b): a step of obtaining an organic-inorganic composite by drying the reaction solution obtained in the above Step (a) and completing the sol-gel reaction; and Step (c): a step of producing metal oxide particles by removing the terminally branched copolymer particles from the above organic-inorganic composite.

The above Steps (a) and (c) are the same as those of the first embodiment so that description will not be repeated.

Incidentally, metal alkoxide in this embodiment may be used among those represented by the following formula (12) in the same manner as in the first embodiment.

$$(R^1)xM(OR^2)y \quad (12)$$

In this embodiment, as M, preferably used are metals (alkoxide) that is converted to colorless metal oxides in the sol-gel reaction, such as, Si, Al, Zn, Zr, In, Sn, Ti, Pb, Hf and the like from the viewpoint of use as a composite with a matrix resin. Of the metals, particularly preferably used is silicon.

That is, in this embodiment, as the partially hydrolyzed condensate of the metal alkoxide, preferably used is a condensate of alkoxysilane.

Step (b)

In Step (b), an organic-inorganic composite is obtained by drying the reaction solution (mixed composition) obtained in the above Step (a).

The organic-inorganic composite in Step (b) can be obtained, for example, in the form of a sol-gel reactant obtained by applying the reaction solution (mixed composition) to a base material and then heating the resultant for a predetermined time to remove the solvent (C), and completing the sol-gel reaction. Or, it can also be obtained in the form of a sol-gel reactant obtained by applying a sol-gel reactant obtained by the sol-gel reaction without removing the above solvent (C) to a base material and then heating the resultant for a predetermined time to remove the solvent (C), and completing the sol-gel reaction in the mixed composition.

Incidentally, the state of the completion of the sol-gel reaction means ideally the state of all components forming an M-O-M bond, and includes the state shifted to a solid (gel) state even though some alkoxyl groups (M-OR$^2$) or M-OH groups remain.

That is, the metal oxide is obtained from the component (B) by completion of the sol-gel reaction by heat-drying the mixed composition (reaction solution) to form a matrix mainly composed of this metal oxide. The organic-inorganic composite has a structure in which polymer fine particles formed from the terminally branched copolymer are dispersed in the matrix.

The metal oxide in the sol-gel reactant is a continuous matrix structure body in the organic-inorganic composite. The metal oxide is not particularly limited as described above, but the metal oxide as particles is preferably a continuous matrix structure body in view of improvement of mechanical properties and the like. Such a structure body of the metal oxide is obtained by subjecting a metal oxide precursor to hydrolysis and polycondensation, that is, to the sol-gel reaction.

When the metal oxide is dispersed in the matrix resin, it is preferable to disperse the metal oxide in the form of a particle. As a method for producing a particulate organic-inorganic composite, there are a method of forming the composite by pulverizing, classifying or the like the obtained solids after drying the mixed dispersion solution of this embodiment at a predetermined temperature, a method of forming the composite by pulverizing, classifying or the like the obtained solids after drying by removing the solvent at a low temperature as in the freeze drying method, and a method of obtaining white powders by spraying using a spray dryer and volatilizing the solvent. The average particle size of the powders is preferably from 0.1 to 100 μm and more preferably from 0.5 to 50 μm from the viewpoint of dispersibility or exhibition of performances as a filler. It is preferable to obtain a desired particle size in advance, and it is preferable to form particles with a spray dryer. When a spray dryer is used for spray molding, the inlet temperature is preferably from 80 to 200 degrees centigrade, while the outlet temperature is preferably from room temperature to 100 degrees centigrade. The collected particles may further be heated in order to complete the sol-gel reaction. The heating temperature is from room temperature to 300 degrees centigrade and more preferably from 80 to 200 degrees centigrade. The reaction time is from 10 minutes to 72 hours and more preferably from 1 to 24 hours.

The metal oxide particles of this embodiment obtained by carrying out Step (c) in the same manner as in the first embodiment after Step (b), have mesopores and have a pore structure of a cubic phase structure. The average pore diameter of mesopores is from 5 to 30 nm, preferably from 10 to 30 nm and further preferably from 15 to 30 nm.

Here, the structure and the average pore diameter of the surface of the metal oxide particles may be evaluated and measured using a scanning electron microscope. The average pore diameter inside the metal oxide particles may be evaluated and measured by setting up the appropriate field range according to the dispersion state of mesopores, measuring diameters of mesopores within the field of view, and averaging the diameters, using a transmission electron microscope (TEM). The structure inside the metal oxide particles may be observed with a transmission electron microscope (TEM) or an X-ray analysis device. Incidentally, the average pore diameter in the porous body may be controlled, for example, by adjusting the average particle size of 50% by volume of the particles in the dispersion solution of the aforementioned terminally branched copolymer particles.

Because of the cubic phase structure composed of mesopores having a relatively large average pore diameter of 5 to 30 nm, the porosity in the porous body can be made high, moisture absorption is easily controlled, and the pore wall can be thick, so that high mechanical strength is achieved.

EXAMPLES

The porous metal oxide and use of the porous metal oxide of the present invention will be illustrated below in detail with reference to Examples A to G. However, the scope of the present invention is not restricted to these Examples and the like.

Example A

Synthesis Example of Terminally Branched Copolymer

The number average molecular weight (Mn), the weight average molecular weight (Mw) and the molecular weight distribution (Mw/Mn) were measured using GPC according to the method as described herein. Furthermore, for the melting point (Tm), the peak top temperature obtained by measuring with DSC was used. Incidentally, the melting point of the polyalkylene glycol portion is also confirmed under the measurement conditions, but melting point indicates the melting point of the polyolefin portion unless otherwise particularly noted. The measurement by $^1$H-NMR was carried out at 120 degrees centigrade after completely dissolving the polymer in deuterated-1,1,2,2-tetrachloroethane, which functioned both as the lock solvent and the solvent, in a sample tube for measurement. For the chemical shift, the peak of deuterated-1,1,2,2-tetrachloroethane was set at 5.92 ppm, and the chemical shift values of other peaks were determined on this basis. For the particle size of the particles in the dispersion solution, the average particle size of 50% by volume was measured with a Microtrack UPA (a product of Honeywell, Inc.). The shape of the particles in the dispersion solution was observed under the condition of 100 kV with a transmission electron microscope (TEM, H-7650, a product of Hitachi, Ltd.), after diluting the sample by 200 to 500 times and performing negative staining with phosphotungstic acid.

Synthesis Example a1

Synthesis of Polyolefin Based Terminally Branched Copolymer (T-1)

In Accordance with the Following Procedure (for Example, Refer to Synthesis Example 2 of Japanese Laid-open Patent Publication No. 2006-131870), an epoxy-terminated ethylenic polymer (E-1) was synthesized.

To a 2,000-ml stainless steel autoclave sufficiently purged with nitrogen, 1,000 ml of heptane was charged at room temperature, and the system was heated to 150 degrees centigrade. Subsequently, the autoclave was pressurized with ethylene to 30 kg/cm$^2$G with ethylene to maintain the temperature. 0.5 ml (0.5 mmol) of a hexane solution (1.00 mmol/ml in terms of aluminum) of MMAO (a product of Tosoh Finechem Corporation) was fed with pressure, and then 0.5 ml (0.0001 mmol) of a toluene solution (0.0002 mmol/ml) of a compound of the following formula was fed with pressure to initiate polymerization. Under ethylene gas atmosphere, polymerization was carried out at 150 degrees centigrade for 30 minutes, and then the polymerization was terminated by feeding a small amount of methanol with pressure. The obtained polymer solution was added to 3 liters of methanol containing a small amount of hydrochloric acid to precipitate out the polymer. The polymer was washed with methanol, and then dried at 80 degrees centigrade under reduced pressure for 10 hours, whereby a double bond-terminated ethylenic polymer (P-1) was obtained.

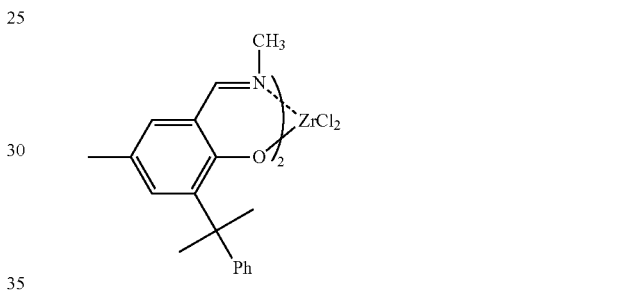

100 g of the double bond-terminated ethylenic polymer (P-1) (Mn: 850, vinyl group: 108 mmol), 300 g of toluene, 0.85 g (2.6 mmol) of Na WO$_4$, 0.60 g (1.3 mmol) of CH$_3$(nC$_8$H$_{17}$)$_3$ NHSO$_4$ and 0.11 g (1.3 mmol) of phosphoric acid were introduced into a 500-ml separable flask, and the system was heated under reflux for 30 minutes with stirring, whereby the polymer was fully melted. The internal temperature was set to 90 degrees centigrade, and then 37 g (326 mmol) of 30% aqueous hydrogen peroxide was added dropwise over 3 hours, and then stirred at the internal temperature of 90 to 92 degrees centigrade for 3 hours. Thereafter, 34.4 g (54.4 mmol) of an aqueous solution of 25% sodium thiosulfate was added and stirred for 30 minutes while maintaining the temperature at 90 degrees centigrade, and it was confirmed that peroxide in the reaction system was completely decomposed with a peroxide test strip. Subsequently, 200 g of dioxane was added thereto at the internal temperature of 90 degrees centigrade to crystallize the product, and the solids were collected by filtration and washed with dioxane. The obtained solids were stirred in an aqueous solution of 50% methanol at room temperature, and the solids were collected by filtration and washed with methanol. Further, the aforementioned solids were stirred in 400 g of methanol, collected by filtration and washed with methanol. The solids were dried at room temperature under reduced pressure of 1 to 2 hPa, whereby 96.3 g of an epoxy-terminated ethylenic polymer (E-1) as a white solid (yield: 99%, conversion rate of olefin: 100%) was obtained.

The resulting epoxy-terminated ethylenic polymer (E-1) showed Mw=2,058, Mn=1,118, and Mw/Mn=1.84 (GPC) (content of terminal epoxy group: 90 mol %).

$^1$H-NMR: δ (C2D2C14) 0.88 (t, 3H, J=6.92 Hz), 1.18-1.66 (m), 2.38 (dd, 1H, J=2.64, 5.28 Hz), 2.66 (dd, 1H, J=4.29, 5.28 Hz), 2.80-2.87 (m, 1H)

Melting point (Tm): 121 degrees centigrade

Mw=2,058, Mn=1,118, Mw/Mn=1.84 (GPC)

84 parts by weight of the epoxy-terminated ethylenic polymer (E-1), 39.4 parts by weight of diethanolamine and 150 parts by weight of toluene were introduced into a 1,000-mL flask, and the system was stirred at 150 degrees centigrade for 4 hours. Thereafter, acetone was added while cooling the mixture to precipitate the reaction product, and the solids were collected by filtration. The obtained solids were stirred and washed with an aqueous acetone solution one time and further with acetone three times, and then the solids were collected by filtration. Thereafter, the solids were dried at room temperature under reduced pressure to obtain a polymer (I-1) (Mn: 1,223, in the general formula (9), A: a group formed by polymerization of ethylene (Mn: 1,075), $R^1$ and $R^2$: a hydrogen atom, one of $Y^1$ and $Y^2$: a hydroxyl group, the other of $Y^1$ and $Y^2$: a bis(2-hydroxyethyl)amino group).

$^1$H-NMR: δ (C2D2C14) 0.88 (t, 3H, J=6.6 Hz), 0.95-1.92 (m), 2.38-2.85 (m, 6H), 3.54-3.71 (m, 5H)

Melting point (Tm): 121 degrees centigrade 20.0 parts by weight of the polymer (I-1) and 100 parts by weight of toluene were introduced into a 500-mL flask equipped with a nitrogen inlet tube, a thermometer, a condenser tube and a stirring rod, and the system was heated in an oil bath at 125 degrees centigrade with stirring to completely dissolve the solids. After cooling to 90 degrees centigrade, 0.323 parts by weight of 85% KOH that had been dissolved in 5.0 parts by weight of water in advance was added to the flask, and the contents were mixed under reflux condition for 2 hours. Subsequently, the temperature in the flask was slowly increased to 120 degrees centigrade, and water and toluene were distilled off. Water and toluene in the flask were further distilled off by reducing the pressure in the flask while supplying minimal nitrogen into the flask, increasing the internal temperature to 150 degrees centigrade, and then keeping the temperature for 4 hours. After cooling to room temperature, the solids solidified in the flask were broken and taken out.

18.0 parts by weight of the obtained solids and 200 parts by weight of dehydrated toluene were introduced into a 1.5-L stainless steel pressurized reactor equipped with a heating device, a stirring rod, a thermometer, a manometer and a safety valve, and after purging the gas phase with nitrogen, the system was heated to 130 degrees centigrade with stirring. After 30 minutes, 9.0 parts by weight of ethylene oxide was added thereto. After further maintaining at 130 degrees centigrade for 5 hours, the contents were cooled to room temperature to obtain a reactant. The solvent was removed by drying from the resulting reactant to obtain a terminally branched copolymer (T-1) (Mn: 1,835, in the general formula (1), A: a group formed by polymerization of ethylene (Mn: 1,075), $R^1$ and $R^2$: a hydrogen atom, one of $X^1$ and $X^2$: a group represented by the general formula (6) ($X^{11}$: a polyethylene glycol group), the other of $X^1$ and $X^2$: a group represented by the general formula (5) ($Q^1$ and $Q^2$: an ethylene group, $X^9$ and $X^{10}$: a polyethylene glycol group)).

$^1$H-NMR: δ (C2D2C14) 0.88 (3H, t, J=6.8 Hz), 1.06-1.50 (m), 2.80-3.20 (m), 3.33-3.72 (m)

Melting point (Tm): −16 degrees centigrade (polyethylene glycol), 116 degrees centigrade Synthesis Example a2

A terminally branched copolymer (T-2) (Mn: 2,446) was obtained in the same method as in Synthesis Example a1, except that the amount of ethylene oxide in use was changed to 18.0 parts by weight.

Melting point (Tm): 27 degrees centigrade (polyethylene glycol), 118 degrees centigrade Synthesis Example a3

A terminally branched copolymer (T-3) (Mn: 3,669) was obtained in the same method as in Synthesis Example a1, except that the amount of ethylene oxide in use was changed to 36.0 parts by weight.

Melting point (Tm): 50 degrees centigrade (polyethylene glycol), 116 degrees centigrade Synthesis Example a4

A terminally branched copolymer (T-4) (Mn: 6,115) was obtained in the same method as in Synthesis Example A1, except that the amount of ethylene oxide in use was changed to 72.0 parts by weight.

Melting point (Tm): 55 degrees centigrade (polyethylene glycol), 116 degrees centigrade Preparation Example of Aqueous Dispersion of Terminally Branched Copolymer Preparation Example a1

Preparation of Aqueous Dispersion Solution of 10 Weight % Polyolefin Based Terminally Branched Copolymer (T-1)

Figure 5:
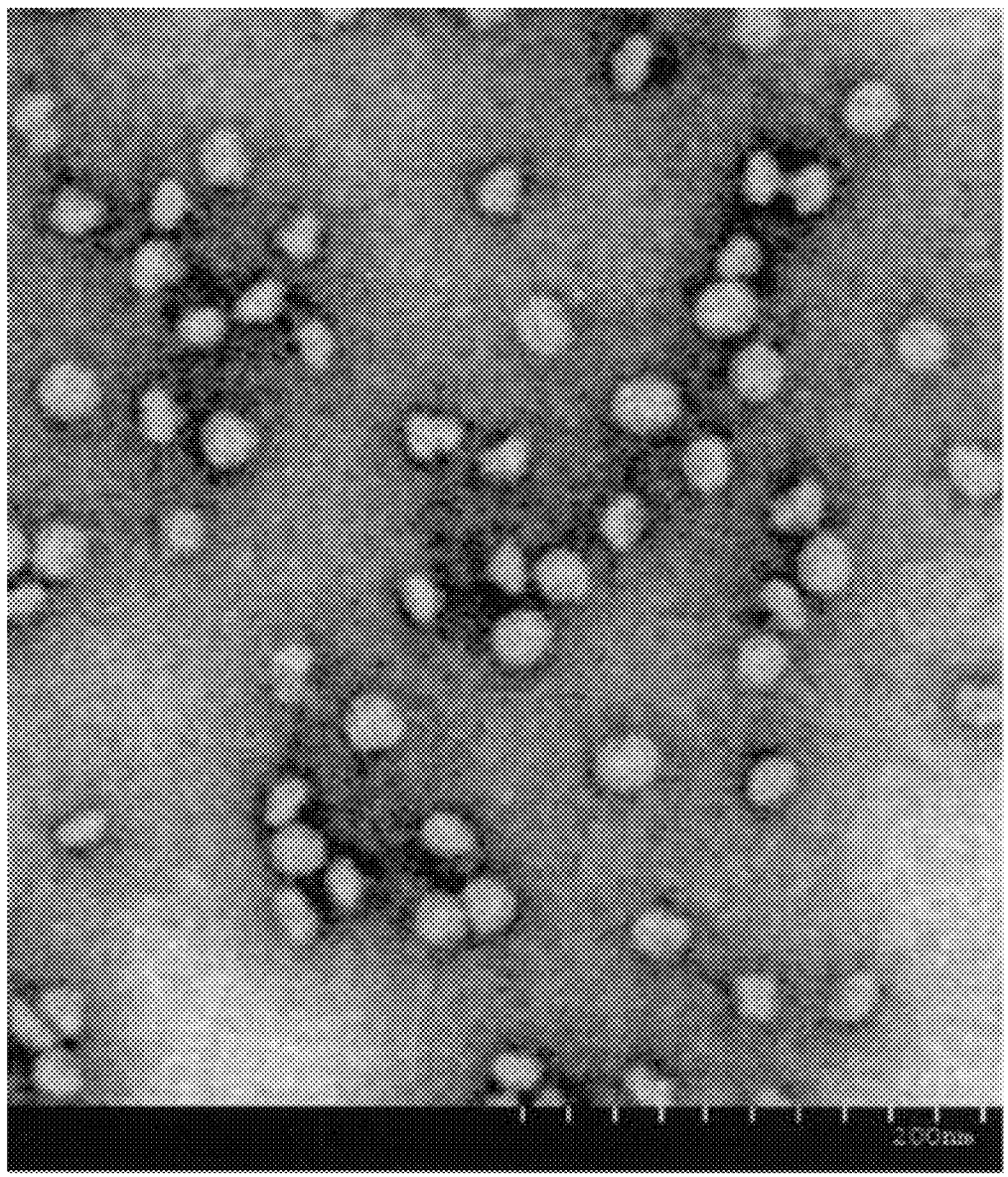
FIG. 5 illustrates a TEM image of particles of a terminally branched copolymer (T-1) obtained in Preparation Example a1.

10 parts by weight of the polyolefin based terminally branched copolymer (T-1) constituting the polymer particles (A) of Synthesis Example a1 and 40 parts by weight of distilled water as the solvent (C) were introduced into a 100-ml autoclave, and the system was heated with stirring at a rate of 800 rpm at 140 degrees centigrade for 30 minutes, and then cooled to room temperature while stirring. The average particle size of 50% by volume of the obtained dispersion system was 0.018 μm (average particle size of 10% by volume: 0.014 μm, average particle size of 90% by volume: 0.022 μm). Observation results of the obtained dispersion system with a transmission electron microscope are shown in FIG. 5. Incidentally, the particle size measured from FIG. 5 was 0.015 to 0.030 μm. Furthermore, 75 parts by weight of distilled water was added to 75 parts by weight of this T-1 aqueous dispersion solution (solid content: 20 weight %), whereby a 10 weight % T-1 aqueous dispersion solution was obtained.

Preparation Examples a2 to a4

10 weight % T-2 to T-4 aqueous dispersion solutions were obtained in the same method as in Preparation Example a1, except that the polyolefin based terminally branched copolymer (T-1) was changed to (T-2) to (T-4).

(T-2): The average particle size of 50% by volume of the obtained dispersion system was 0.017 μm (average particle size of 10% by volume: 0.013 μm, average particle size of 90% by volume: 0.024 μm).

(T-3): The average particle size of 50% by volume of the obtained dispersion system was 0.015 μm (average particle size of 10% by volume: 0.012 μm, average particle size of 90% by volume: 0.028 μm).

(T-4): The average particle size of 50% by volume of the obtained dispersion system was 0.019 μm (average particle size of 10% by volume: 0.014 μm, average particle size of 90% by volume: 0.049 μm).

Example a1

Preparation of Solution of Polyolefin Based Terminally Branched Copolymer and TMOS Dehydrated Condensate 0.25 parts by weight of methanol as the solvent was added to 0.5 parts by weight of tetramethoxysilane (TMOS) and the contents were stirred at room temperature. Furthermore, 0.5 parts by weight of an aqueous solution of 0.1N hydrochloric acid as the catalyst was added dropwise, and then stirred at 50 degrees centigrade for 1 hour, whereby a TMOS dehydrated condensate was obtained.

An aqueous solution of 0.1N hydrochloric acid was further added dropwise to the obtained TMOS dehydrated condensate (to have the pH of 3 after addition of the polyolefin based terminally branched copolymer) and the contents were stirred at room temperature. An aqueous dispersion (solid content: 10 weight %) of the polyolefin based terminally branched copolymer (T-1) was further added dropwise thereto and stirred at room temperature, whereby a solution of the polyolefin based terminally branched copolymer and the TMOS dehydrated condensate was prepared. Incidentally, a solution was prepared with parts by weight in Table a1, such that the weight ratio of the polyolefin based terminally branched copolymer to silica (in terms of $SiO_2$) was from 30/70 to 70/30.

The content of silica refers to the ratio of silica contained in the composite film, and it was calculated in the following method.

The content of silica was calculated on the assumption that 100 weight % of TMOS as the component (B) in the above Example a1 was reacted to become $SiO_2$. For example, the calculation was performed on the assumption that, when the component (B) was TMOS, 100% thereof was reacted to become $SiO_2$.

Thus, from
TMOS: Mw=152,
$SiO_2$: Mw=60,
$SiO_2$/TMOS=60/152=0.395.

That is, the value obtained by multiplying the amount of TMOS by 0.395 is the $SiO_2$ content in the film.

Formation of Composite Film of Polyolefin Based Terminally Branched Copolymer and Silica The obtained solution was spin-coated on a silicon substrate and a quartz substrate, and heated at 110 degrees centigrade for 1.5 hours to obtain a composite film of the polyolefin based terminally branched copolymer and silica having a film thickness of 150 to 400 nm.

Formation of Silica Porous Body

The obtained composite film of the polyolefin based terminally branched copolymer and silica was calcinated at 500 degrees centigrade for 1 hour using the electric furnace, whereby a silica porous body having a thickness of 100 to 400 nm was obtained.

Incidentally, the film thickness of the composite film and the film thickness of the silica porous body were measured using an ellipsometer (JASCO M-150). The results are shown in Table a1.

Examples a2 to a4

Respective solutions were prepared with parts by weight in Table a1 in the same manner as in Example a1, except that the polyolefin based terminally branched copolymer (T-1) was changed to (T-2) to (T-4). A composite film of the polyolefin based terminally branched copolymer and silica was prepared, and then calcinated at 500 degrees centigrade for 1 hour, whereby a silica porous body having a film thickness of 100 to 400 nm was obtained. The film thickness of the composite film and the film thickness of the silica porous body were measured using an ellipsometer (JASCO M-150). The results are shown in Table a1.

Example a5

Preparation of Solution of Polyolefin Based Terminally Branched Copolymer and TMOS Dehydrated Condensate 15 parts by weight of methanol was added to 10 parts by weight of tetramethoxysilane (TMOS) and the contents were stirred at room temperature. Furthermore, 15 parts by weight of 0.1N hydrochloric acid was added dropwise, and then stirred at room temperature for 1.5 hours. Thereafter, 30 parts by weight of the 10 weight % T-1 aqueous dispersion solution containing the copolymer as the component (A) and 30 parts by weight of distilled water were added thereto, and stirred at room temperature for 5 minutes to give a solution 5A. On the other hand, 15 parts by weight of methanol was added to 10 parts by weight of tetramethoxysilane (TMOS) as the component (B) and the contents were stirred at room temperature. Thereafter, 10 parts by weight of 0.1N hydrochloric acid was added dropwise thereto, and stirred at room temperature for 1 hour to give a solution 5B. Incidentally, the solutions 5A and 5B are each a solution containing the components (B) and (D).

The solutions 5A and 5B were mixed at a weight ratio of 8/2 and further stirred at room temperature for 5 minutes to obtain a composition.

Formation of Composite Film of Polyolefin Based Terminally Branched Copolymer and Silica The obtained solution was spin-coated on a silicon substrate and a quartz substrate, and heated at 110 degrees centigrade for 1.5 hours to obtain a composite film of the polyolefin based terminally branched copolymer and silica having a film thickness of 200 nm (weight ratio of the polyolefin based terminally branched copolymer to silica in terms of $SiO_2$: 27/73).

Formation of Silica Porous Body

The obtained composite film of the polyolefin based terminally branched copolymer and silica was calcinated at 350 degrees centigrade for 3 hours under a nitrogen stream using an inert oven, whereby a silica porous body having a film thickness of 180 nm was obtained.

Example a6

Preparation of Solution of Polyolefin Based Terminally Branched Copolymer and TTIP Dehydrated Condensate 1.32 parts by weight of an aqueous hydrochloric acid solution (37%) as the catalyst was added dropwise to 2.0 parts by weight of titanium tetraisopropoxide (TTIP), and then stirred at room temperature for 10 minutes to obtain a dehydrated condensate. 2.4 parts by weight of the aqueous dispersion (solid content: 10 weight %) of the polyolefin based terminally branched copolymer (T-1) was added dropwise to the obtained TTIP dehydrated condensate, and the contents were stirred at room temperature to prepare a solution of the polyolefin based terminally branched copolymer and TTIP dehydrated condensate (weight ratio of the polyolefin based terminally branched copolymer to titania in terms of $TiO_2$: 30/70).

Incidentally, a solution was prepared with parts by weight in Table a2, such that the weight ratio of the polyolefin based terminally branched copolymer to titania (in terms of $TiO_2$) was from 15/85 to 50/50.

Formation of Composite Film of Polyolefin Based Terminally Branched Copolymer and Titania The obtained solution was spin-coated on a silicon substrate and a quartz substrate, and heated at 50 degrees centigrade for 30 minutes and further heated at 110 degrees centigrade for 1.5 hours, whereby a composite film of the polyolefin based terminally branched copolymer and titania having a film thickness of 400 nm was obtained.

Formation of Titania Porous Body

The obtained composite film of the polyolefin based terminally branched copolymer and titania was calcinated at 500 degrees centigrade for 1 hour using the electric furnace, whereby a titania porous body having a film thickness of 100 to 250 nm was obtained. Incidentally, the film thickness of the composite film and the film thickness of the titania porous body were measured using an ellipsometer (JASCO M-150). The results are shown in Table a2.

Example a7

Preparation of Solution of Polyolefin Based Terminally Branched Copolymer and (TMOS/TTIP=1/9) Dehydrated Condensate 0.386 parts by weight of the TMOS dehydrated condensate prepared according to the method described in Example a1 was mixed to 3.32 parts by weight of the TTIP dehydrated condensate prepared according to the method described in Example a6 at room temperature, whereby a dehydrated condensate containing the TMOS dehydrated condensate and the TTIP dehydrated condensate at a molar ratio of 1/9 was prepared. 3.0 parts by weight of an aqueous dispersion (solid content: 10 weight %) of the polyolefin based terminally branched copolymer (T-1) was further added dropwise to the obtained dehydrated condensate (TMOS/TTIP=1/9), and stirred at room temperature, whereby a solution of the polyolefin based terminally branched copolymer and (TMOS/TTIP=1/9) dehydrated condensate was prepared (weight ratio of the polyolefin based terminally branched copolymer and ($SiO_2/TiO_2=1/9$): 30/70).

Formation of Composite Film of Polyolefin Based Terminally Branched Copolymer and Silica-Titania The obtained solution was spin-coated on a silicon substrate and a quartz substrate, and heated at 50 degrees centigrade for 30 minutes and further heated at 110 degrees centigrade for 1.5 hours, whereby a composite film of the polyolefin based terminally branched copolymer and titania having a film thickness of 400 nm was obtained.

Formation of Silica-Titania Porous Body

The obtained composite film of the polyolefin based terminally branched copolymer and silica-titania was calcinated at 500 degrees centigrade for 1 hour using the electric furnace, whereby a silica-titania porous body having a thickness of 350 nm was obtained.

Example a8

Preparation of Solution of Polyolefin Based Terminally Branched Copolymer and NPZ Dehydrated Condensate 1.0 weight part of ethanol was added to 1.43 parts by weight of a zirconium propoxide (NPZ)-n-propanol solution (70 weight %) and the contents were stirred, and then 0.66 parts by weight of an aqueous hydrochloric acid solution (37%) as the catalyst was added dropwise thereto. Immediately after dropwise addition, a white solid material was produced, but the solid material was dissolved while stirring at room temperature. Thus, an NPZ dehydrated condensate was obtained. 1.6 parts by weight of an aqueous dispersion (solid content: 10 weight %) of the polyolefin based terminally branched copolymer (T-1) was further added dropwise to the obtained NPZ dehydrated condensate, and stirred at room temperature, whereby a solution of the polyolefin based terminally branched copolymer and NPZ dehydrated condensate was prepared (weight ratio of the polyolefin based terminally branched copolymer and zirconia in terms of $ZrO_2$: 30/70).

Formation of Composite Film of Polyolefin Based Terminally Branched Copolymer and Zirconia The obtained solution was spin-coated on a silicon substrate and a quartz substrate, and heated at 50 degrees centigrade for 30 minutes and further heated at 110 degrees centigrade for 1.5 hours, whereby a composite film of the polyolefin based terminally branched copolymer and zirconia having a film thickness of 400 nm was obtained.

Formation of Zirconia Porous Body

The obtained composite film of the polyolefin based terminally branched copolymer and zirconia was calcinated at 500 degrees centigrade for 1 hour using the electric furnace, whereby a zirconia porous body having a thickness of 350 nm was obtained.

Example a9

Preparation of Solution of Polyolefin Based Terminally Branched Copolymer and AIP Dehydrated Condensate 3.0 parts by weight of ethanol was added to 1.02 parts by weight of aluminum. triisopropoxide (AIP) and stirred, and then 1.25 parts by weight of an aqueous nitric acid solution (60 to 61%) as the catalyst was added dropwise thereto. Immediately after dropwise addition, the solution was clouded, but after stirring for 1 hour, but it became transparent. Thus, an AIP dehydrated condensate was obtained. 2.2 parts by weight of an aqueous dispersion (solid content: 10 weight %) of the polyolefin based terminally branched copolymer (T-1) was further added dropwise to the obtained AIP dehydrated condensate, and stirred at room temperature, whereby a solution of the polyolefin based terminally branched copolymer and AIP dehydrated condensate was prepared (weight ratio of the polyolefin based terminally branched copolymer and alumina in terms of $Al_2O_3$: 30/70).

Formation of Composite Film of Polyolefin Based Terminally Branched Copolymer and Alumina The obtained solution was spin-coated on a silicon substrate and a quartz substrate, and heated at 50 degrees centigrade for 30 minutes and further heated at 110 degrees centigrade for 1.5 hours, whereby a composite film of the polyolefin based terminally branched copolymer and alumina having a film thickness of 400 nm was obtained.

Formation of Alumina Porous Body

The obtained composite film of the polyolefin based terminally branched copolymer and alumina was calcinated at 700 degrees centigrade for 1 hour using the electric furnace, whereby an alumina porous body having a thickness of 350 nm was obtained.

Example a10

Preparation of Solution of Polyolefin Based Terminally Branched Copolymer and $ZrCl_4$ Dehydrated Condensate 14 parts by weight of ethanol was added to 1.50 parts by weight of zirconium tetrachloride ($ZrCl_4$) and stirred, and then 3.34 parts by weight of an aqueous dispersion (solid content: 10 weight %) of the polyolefin based terminally branched copolymer (T-1) was further added dropwise thereto, and stirred at room temperature, whereby a solution of the polyolefin based terminally branched copolymer and $ZrCl_4$ dehydrated condensate was prepared (weight ratio of the polyolefin based terminally branched copolymer to zirconia in terms of $ZrO_2$: 30/70).

Formation of Composite Film of Polyolefin Based Terminally Branched Copolymer and Zirconia The obtained solution was spin-coated on a silicon substrate and a quartz substrate, and heated at 50 degrees centigrade for 30 minutes and further heated at 110 degrees centigrade for 1.5 hours, whereby a composite film of the polyolefin based terminally branched copolymer and zirconia having a film thickness of 300 nm was obtained.

Formation of Zirconia Porous Body

The obtained composite film of the polyolefin based terminally branched copolymer and zirconia was calcinated at 600 degrees centigrade for 3 hours using the electric furnace, whereby a zirconia porous body having a thickness of 250 nm was obtained.

Example a11

Preparation of Solution of Polyolefin Based Terminally Branched Copolymer and BaAc-TTIP Dehydrated Condensate 10.49 parts by weight of acetic acid was added to 4.0 parts by weight of barium acetate (BaAc), and the contents were stirred until barium acetate was dissolved at 60 degrees centigrade and then cooled in an ice bath. 4.45 parts by weight of titanium tetraisopropoxide (TTIP) was added dropwise (BaAc/TTIP molar ratio=1) thereto, and the contents were further stirred at room temperature for 1 hour. 2.2 parts by weight of a solution (solid content: 10 weight %) obtained by freeze drying an aqueous dispersion of the polyolefin based terminally branched copolymer (T-1) to recover a solid material in advance and re-dispersing it in isopropanol was added dropwise to 2.47 parts by weight of the obtained BaAc-TTIP dehydrated condensate solution, and stirred at room temperature, whereby a solution of the polyolefin based terminally branched copolymer and BaAc-TTIP dehydrated condensate was prepared (weight ratio of the polyolefin based terminally branched copolymer and barium titanate in terms of $BaTiO_3$: 30/70).

Formation of Composite Film of Polyolefin Based Terminally Branched Copolymer and Barium Titanate The obtained solution was spin-coated on a silicon substrate and a quartz substrate, and heated at 150 degrees centigrade for 1 hour and further heated at 200 degrees centigrade for 1 hour under a nitrogen atmosphere, whereby a composite film of the polyolefin based terminally branched copolymer and barium titanate was obtained.

Formation of Barium Titanate Porous Body

The obtained composite film of the polyolefin based terminally branched copolymer and barium titanate was calcinated at 700 degrees centigrade for 1 hour using the electric furnace, whereby a barium titanate porous body having a thickness of 250 nm was obtained.

Example a12

Preparation of Solution of Polyolefin Based Terminally Branched Copolymer and TMOS Dehydrated Condensate 15 parts by weight of methanol was added to 10 parts by weight of tetramethoxysilane (TMOS) and stirred at room temperature. Furthermore, 15 parts by weight of 0.1N hydrochloric acid was added dropwise thereto, and then the contents were stirred at room temperature for 1.5 hours. Thereafter, 30 parts by weight of the weight % T-1 dispersion solution containing the copolymer as the component (A) and 30 parts by weight of distilled water were added thereto, and stirred at room temperature for 5 minutes to give a solution 10A. On the other hand, 15 parts by weight of methanol was added to 10 parts by weight of tetramethoxysilane (TMOS) as the component (B), and stirred at room temperature. Thereafter, 10 parts by weight of 0.1N hydrochloric acid was added dropwise thereto, and stirred at room temperature for 1 hour to give a solution 10B. Incidentally, the solutions 10A and 10B are each a solution containing the components (B) and (D).

The solutions 10A and 10B were mixed at a weight ratio of 8/2, and further stirred at room temperature for 5 minutes to obtain a composition (weight ratio of the polyolefin based terminally branched copolymer to silica in terms of $SiO_2$: 27/73).

Formation of Composite Fine Particles of Polyolefin Based Terminally Branched Copolymer and Silica This composition was poured into a spray dryer apparatus (Pulvis Basic Unit Model GB-21, commercially available from Yamato Science Co., Ltd.) at a flow rate of 6 cc/min and pressurized (2.6 kg/cm$^2$) under a heating atmosphere at 120 degrees centigrade for spraying, whereby composite fine particles of the polyolefin based terminally branched copolymer and silica were obtained.

Formation of Porous Silica Particles

The obtained composite fine particles of the polyolefin based terminally branched copolymer and silica were calcinated at 500 degrees centigrade for 3 hours under a nitrogen stream using an inert oven, whereby porous silica particles having a particle size of 1 to 10 μm were obtained.

Example a13

Preparation of Solution of Polyolefin Based Terminally Branched Copolymer and TMOS Dehydrated Condensate 15 parts by weight of methanol as the solvent was added to 10 parts by weight of tetramethoxysilane (TMOS) and stirred at room temperature, and 10 parts by weight of an aqueous solution of 0.1N hydrochloric acid as the catalyst was further added dropwise thereto, and then the contents were stirred at 50 degrees centigrade for 1 hour, whereby a TMOS dehydrated condensate was obtained.

16 parts by weight of an aqueous solution of 0.1N hydrochloric acid was further added dropwise to the obtained TMOS dehydrated condensate (in order to have the pH of 3 after addition of the polyolefin based terminally branched copolymer), and then stirred at room temperature. 39 parts by weight of an aqueous dispersion (solid content: 10 weight %) of the polyolefin based terminally branched copolymer (T-1)

was further added dropwise thereto, and stirred at room temperature, whereby a solution of the polyolefin based terminally branched copolymer and TMOS dehydrated condensate was prepared (weight ratio of the polyolefin based terminally branched copolymer to silica in terms of $SiO_2$: 50/50).

Formation of Composite Particles of Polyolefin Based Terminally Branched Copolymer and Silica Composite fine particles of the polyolefin based terminally branched copolymer and silica were obtained using this composition with a spray dryer apparatus in the same manner as in Example a10.

Formation of Porous Silica Particles

The obtained composite particles of the polyolefin based terminally branched copolymer and silica were calcinated using the electric furnace in the same method as in Example a1, whereby porous silica particles were obtained.

Example a14

Preparation of Solution of Polyolefin Based Terminally Branched Copolymer and TMOS Dehydrated Condensate 15 parts by weight of methanol as the solvent was added to 10 parts by weight of tetramethoxysilane (TMOS) and stirred at room temperature, and 1.0 weight part of an aqueous solution of 1N hydrochloric acid as the catalyst was further added dropwise thereto, and then the contents were stirred at 50 degrees centigrade for 1 hour, whereby a TMOS dehydrated condensate was obtained.

2.5 parts by weight of an aqueous solution of 1N hydrochloric acid was further added dropwise to the obtained TMOS dehydrated condensate (in order to have the pH of 3 after addition of the polyolefin based terminally branched copolymer), and then stirred at room temperature. 58.5 parts by weight of an aqueous dispersion (solid content: 10 weight %) of the polyolefin based terminally branched copolymer (T-1) was further added dropwise thereto, and stirred at room temperature, whereby a solution of the polyolefin based terminally branched copolymer and TMOS dehydrated condensate was prepared (weight ratio of the polyolefin based terminally branched copolymer to silica in terms of $SiO_2$: 60/40).

Formation of Composite Particles of Polyolefin Based Terminally Branched Copolymer and Silica Composite fine particles of the polyolefin based terminally branched copolymer and silica were obtained using this composition with a spray dryer apparatus in the same method as in Example a10.

Formation of Porous Silica Particles

The obtained composite particles of the polyolefin based terminally branched copolymer and silica were calcinated using the electric furnace in the same method as in Example a1, whereby porous silica particles were obtained.

Example a15

Preparation of Solution of Polyolefin Based Terminally Branched Copolymer and TMOS Dehydrated Condensate 15 parts by weight of methanol as the solvent was added to 10 parts by weight of tetramethoxysilane (TMOS) and stirred at room temperature, and 1.0 weight part of an aqueous solution of 1N hydrochloric acid as the catalyst was further added dropwise thereto, and then the contents were stirred at 50 degrees centigrade for 1 hour, whereby a TMOS dehydrated condensate was obtained.

3.4 parts by weight of an aqueous solution of 1N hydrochloric acid was further added dropwise to the obtained TMOS dehydrated condensate (in order to have the pH of 3 after addition of the polyolefin based terminally branched copolymer), and then stirred at room temperature. 72.4 parts by weight of an aqueous dispersion (solid content: 10 weight %) of the polyolefin based terminally branched copolymer (T-1) was further added dropwise thereto, and stirred at room temperature, whereby a solution of the polyolefin based terminally branched copolymer and TMOS dehydrated condensate was prepared (weight ratio of the polyolefin based terminally branched copolymer to silica in terms of $SiO_2$: 65/35).

Formation of Composite Particles of Polyolefin Based Terminally Branched Copolymer and Silica Composite fine particles of the polyolefin based terminally branched copolymer and silica were obtained using this composition with a spray dryer apparatus in the same method as in Example a1.

Formation of Porous Silica Particles

The obtained composite particles of the polyolefin based terminally branched copolymer and silica were calcinated using the electric furnace in the same method as in Example a1, whereby porous silica particles were obtained.

Example a16

Preparation of Solution of Polyolefin Based Terminally Branched Copolymer and TMOS Dehydrated Condensate 15 parts by weight of methanol as the solvent was added to 10 parts by weight of tetramethoxysilane (TMOS) and stirred at room temperature, and 1.0 weight part of an aqueous 1M oxalic acid solution was further added dropwise thereto, and then the contents were stirred at room temperature for 30 minutes, whereby a TMOS dehydrated condensate was obtained. 79.4 parts by weight of an aqueous dispersion (solid content: 10 weight %) of the polyolefin based terminally branched copolymer (T-1) was further added dropwise thereto, and stirred at room temperature, whereby a solution of the polyolefin based terminally branched copolymer and TMOS dehydrated condensate was prepared (weight ratio of the polyolefin based terminally branched copolymer to silica in terms of $SiO_2$: 35/65).

Formation of Composite Particles of Polyolefin Based Terminally Branched Copolymer and Silica Composite fine particles of the polyolefin based terminally branched copolymer and silica were obtained using this composition with a spray dryer apparatus in the same method as in Example a1.

Formation of Porous Silica Particles

The obtained composite particles of the polyolefin based terminally branched copolymer and silica were calcinated using the electric furnace in the same method as in Example a1, whereby porous silica particles were obtained.

Example a17

Preparation of Solution of Polyolefin Based Terminally Branched Copolymer and TMOS Dehydrated Condensate 15 parts by weight of methanol as the solvent was added to 10 parts by weight of tetramethoxysilane (TMOS) and stirred at room temperature, and 1.5 parts by weight of an aqueous 1M oxalic acid solution was further added dropwise thereto, and then the contents were stirred at room temperature for 30 minutes, whereby a TMOS dehydrated condensate was obtained. 70.5 parts by weight of an aqueous dispersion (solid content: 10 weight %) of the polyolefin based terminally branched copolymer (T-1) was further added dropwise thereto, and stirred at room temperature, whereby a solution of the polyolefin based terminally branched copolymer and TMOS dehydrated condensate was prepared (weight ratio of the polyolefin based terminally branched copolymer to silica in terms of $SiO_2$: 45/55).

Formation of Composite Particles of Polyolefin Based Terminally Branched Copolymer and Silica Composite fine particles of the polyolefin based terminally branched copolymer and silica were obtained using this composition with a spray dryer apparatus in the same method as in Example a1.

Formation of Porous Silica Particles

The obtained composite particles of the polyolefin based terminally branched copolymer and silica were calcinated using the electric furnace in the same method as in Example a1, whereby porous silica particles were obtained.

Example a18

Preparation of Solution of Polyolefin Based Terminally Branched Copolymer and TMOS Dehydrated Condensate 15 parts by weight of methanol as the solvent was added to 10 parts by weight of tetramethoxysilane (TMOS) and stirred at room temperature, and 2.2 parts by weight of an aqueous 1M oxalic acid solution was further added dropwise thereto, and then the contents were stirred at room temperature for 30 minutes, whereby a TMOS dehydrated condensate was obtained. 71.4 parts by weight of an aqueous dispersion (solid content: 10 weight %) of the polyolefin based terminally branched copolymer (T-1) was further added dropwise thereto, and stirred at room temperature, whereby a solution of the polyolefin based terminally branched copolymer and TMOS dehydrated condensate was prepared (weight ratio of the polyolefin based terminally branched copolymer to silica in terms of $SiO_2$: 55/35).

Formation of Composite Particles of Polyolefin Based Terminally Branched Copolymer and Silica Composite fine particles of the polyolefin based terminally branched copolymer and silica were obtained using this composition with a spray dryer apparatus in the same method as in Example a1.

Formation of Porous Silica Particles

The obtained composite particles of the polyolefin based terminally branched copolymer and silica were calcinated using the electric furnace in the same method as in Example a1, whereby porous silica particles were obtained.

Example a19

Preparation of Solution of Polyolefin Based Terminally Branched Copolymer and TMOS Dehydrated Condensate 15 parts by weight of methanol as the solvent was added to 10 parts by weight of tetramethoxysilane (TMOS) and stirred at room temperature, and 2.6 parts by weight of an aqueous 1M oxalic acid solution was further added dropwise thereto, and then the contents were stirred at room temperature for 30 minutes, whereby a TMOS dehydrated condensate was obtained. 73.1 parts by weight of an aqueous dispersion (solid content: 10 weight %) of the polyolefin based terminally branched copolymer (T-1) was further added dropwise thereto, and stirred at room temperature, whereby a solution of the polyolefin based terminally branched copolymer and TMOS dehydrated condensate was prepared (weight ratio of the polyolefin based terminally branched copolymer to silica in terms of $SiO_2$: 65/35).

Formation of Composite Particles of Polyolefin Based Terminally Branched Copolymer and Silica Composite fine particles of the polyolefin based terminally branched copolymer and silica were obtained using this composition with a spray dryer apparatus in the same method as in Example a1.

Formation of Porous Silica Particles

The obtained composite particles of the polyolefin based terminally branched copolymer and silica were calcinated using the electric furnace in the same method as in Example a1, whereby porous silica particles were obtained.

Example a20

Preparation of Solution of Polyolefin Based Terminally Branched Copolymer and TMOS Dehydrated Condensate 15 parts by weight of methanol as the solvent was added to 10 parts by weight of tetramethoxysilane (TMOS) and stirred at room temperature, and 3.5 parts by weight of an aqueous 1M oxalic acid solution was further added dropwise thereto, and then the contents were stirred at room temperature for 30 minutes, whereby a TMOS dehydrated condensate was obtained. 77.0 parts by weight of an aqueous dispersion (solid content: 10 weight %) of the polyolefin based terminally branched copolymer (T-1) was further added dropwise thereto and stirred at room temperature, whereby a solution of the polyolefin based terminally branched copolymer and TMOS dehydrated condensate was prepared (weight ratio of the polyolefin based terminally branched copolymer to silica in terms of $SiO_2$: 75/25).

Formation of Composite Particles of Polyolefin Based Terminally Branched Copolymer and Silica Composite fine particles of the polyolefin based terminally branched copolymer and silica were obtained using this composition with a spray dryer apparatus in the same method as in Example a1.

Formation of Porous Silica Particles

The obtained composite particles of the polyolefin based terminally branched copolymer and silica were calcinated using the electric furnace in the same method as in Example a1, whereby porous silica particles were obtained.

Example a21

Preparation of Solution of Polyolefin Based Terminally Branched Copolymer and CoAc—LiAc Dehydrated Condensate 40.3 parts by weight of ethanol as the solvent was added to 5.3 parts by weight of cobalt acetate (CoAc) and 2.0 parts by weight of lithium acetate (LiAc), and the contents were stirred at room temperature. A solution obtained by dispersing 1.26 parts by weight of a polymer obtained by freeze drying an aqueous dispersion of the polyolefin based terminally branched copolymer (T-1) to recover a solid material in advance in 40.3 parts by weight of ethanol was added thereto, and stirred at 50 degrees centigrade for 2 hours, whereby a solution of the polyolefin based terminally branched copolymer and CoAc—LiAc dehydrated condensate was prepared (weight ratio of the polyolefin based terminally branched copolymer to lithium cobaltate in terms of $LiCoO_3$: 30/70).

Formation of Composite Particles of Polyolefin Based Terminally Branched Copolymer and $LiCoO_3$ Precursor This composition was dried at a temperature of 80 degrees centigrade under reduced pressure and gelated, and further dried at a temperature of 120 degrees centigrade under reduced pressure, whereby composite fine particles of the polyolefin based terminally branched copolymer and lithium cobaltate ($LiCoO_3$) precursor were obtained.

Formation of Porous Lithium Cobaltate Particles

The obtained composite fine particles of the polyolefin based terminally branched copolymer and lithium cobaltate precursor were calcinated at 350 degrees centigrade for 1 hour, at 450 degrees centigrade for 1 hour and further heated at 750 degrees centigrade for 1 hour using the electric furnace, whereby porous lithium cobaltate particles were obtained.

Example a22

Preparation of Solution of Polyolefin Based Terminally Branched Copolymer and Iron (III) Nitrate-LiAc-$H_3PO_4$ Dehydrated Condensate 0.73 parts by weight of aqueous phosphoric acid ($H_3PO_4$: 85%) was added to 0.42 parts by weight of iron (III) nitrate nonahydrate, 2.61 parts by weight of lithium acetate (LiAc) and 2.0 parts by weight of water, and the contents were stirred at room temperature. Furthermore, 3.0 parts by weight of an aqueous dispersion (solid content: 10 weight %) of the polyolefin based terminally branched copolymer (T-1) was added dropwise thereto and stirred at room temperature, whereby a solution of the polyolefin based terminally branched copolymer and iron (III) nitrate-LiAc—$H_3PO_4$ dehydrated condensate was prepared (weight ratio of the polyolefin based terminally branched copolymer to $LiFePO_4$: 30/70).

Formation of Composite Particles of Polyolefin Based Terminally Branched Copolymer and $LiFePO_4$ Precursor This composition was dried at a temperature of 80 degrees centigrade under reduced pressure and gelated, and further dried at a temperature of 120 degrees centigrade under reduced pressure, whereby composite fine particles of the polyolefin based terminally branched copolymer and lithium iron phosphate ($LiFePO_4$) precursor were obtained.

Formation of Porous Lithium Iron Phosphate Particles

The obtained composite fine particles of the polyolefin based terminally branched copolymer and lithium iron phosphate precursor were calcinated at from room temperature to 750 degrees centigrade (2 degrees centigrade/min)+750 degrees centigrade for 3 hours under an argon atmosphere using a tube furnace, whereby porous lithium iron phosphate particles were obtained.

Example a23

Preparation of Solution of Polyolefin Based Terminally Branched Copolymer and Mn (II) Nitrate-LiNitrate-$H_3PO_4$ Dehydrated Condensate 0.73 parts by weight of aqueous phosphoric acid ($H_3PO_4$: 85%) was added to 1.87 parts by weight of manganese (II) nitrate hexahydrate, 0.44 parts by weight of lithium nitrate ($LiNO_3$) and 2.0 parts by weight of water, and the contents were stirred at room temperature. Furthermore, 3.0 parts by weight of an aqueous dispersion (solid content: 10 weight %) of the polyolefin based terminally branched copolymer (T-1) was added dropwise thereto and stirred at room temperature, whereby a solution of the polyolefin based terminally branched copolymer and Mn (II) nitrate-$LiNO_3$—$H_3PO_4$ dehydrated condensate was prepared (weight ratio of the polyolefin based terminally branched copolymer to $LiMnPO_4$: 30/70).

Formation of Composite Particles of Polyolefin Based Terminally Branched Copolymer and $LiMnPO_4$ Precursor This composition was dried at a temperature of 80 degrees centigrade under reduced pressure and gelated, and further dried at a temperature of 120 degrees centigrade under reduced pressure, whereby composite fine particles of the polyolefin based terminally branched copolymer and lithium manganese phosphate ($LiMnPO_4$) precursor were obtained.

Formation of Porous Lithium Manganese Phosphate Particles

The obtained composite fine particles of the polyolefin based terminally branched copolymer and lithium manganese phosphate precursor were calcinated at from room temperature to 750 degrees centigrade (2 degrees centigrade/min)+ 750 degrees centigrade for 3 hours under an argon atmosphere using a tube furnace, whereby porous lithium manganese phosphate particles were obtained.

Comparative Example a1

0.25 parts by weight of methanol as the solvent was added to 0.5 parts by weight of tetramethoxysilane (TMOS) and stirred at room temperature. Furthermore, 0.5 parts by weight of an aqueous solution of 0.1N hydrochloric acid as the catalyst was added dropwise, and then stirred at 50 degrees centigrade for 1 hour, whereby a TMOS dehydrated condensate solution was obtained. The obtained solution was spin-coated on a silicon substrate and a quartz substrate, and heated at 110 degrees centigrade for 1.5 hours.

Comparative Example a2

1.32 parts by weight of an aqueous hydrochloric acid solution (37%) was added to 2 parts by weight of titanium tetraisopropoxide (TTIP), and stirred at room temperature for 10 minutes, whereby a TTIP dehydrated condensate solution was obtained. The obtained solution was spin-coated on a silicon substrate and heated at 110 degrees centigrade for 1.5 hours, whereby a titania film was obtained.

Comparative Example a3

Preparation of Solution of Surfactant Pluronic P123 and TEOS Dehydrated Condensate 1.2 parts by weight of ethanol as the solvent was added to 1.04 parts by weight of tetraethoxysilane (TEOS), and stirred at room temperature. Furthermore, 0.54 parts by weight of an aqueous solution of 0.01N hydrochloric acid as the catalyst was added thereto, and then stirred at 20 degrees centigrade for 20 minutes, whereby a TEOS dehydrated condensate was obtained. Meanwhile, a solution obtained by dissolving 0.275 parts by weight of Pluronic P123 in 0.8 parts by weight of additional ethanol was added dropwise thereto and stirred at room temperature, whereby a solution of P123 and TEOS dehydrated condensate was prepared.

Formation of Composite Film of Surfactant Pluronic P123 and Silica

The obtained solution was spin-coated on a silicon substrate and a quartz substrate, and dried at 35 degrees centigrade for 10 minutes, whereby a composite film of P123 and silica having a film thickness of 200 nm was obtained (weight ratio of P123 to $SiO_2$: 45/55).

Formation of Silica Porous Body

The obtained composite film of the polyolefin based terminally branched copolymer and silica was calcinated at 400 degrees centigrade for 1 hour using the electric furnace, whereby a silica porous body having a thickness of 150 nm was obtained.

Comparative Example a4

Preparation of Solution of Surfactant Pluronic P123 and TEOS Dehydrated Condensate 1.2 parts by weight of ethanol as the solvent was added to 1.04 parts by weight of tetraethoxysilane (TEOS), and stirred at room temperature. Furthermore, 0.54 parts by weight of an aqueous solution of 0.01N hydrochloric acid as the catalyst was added thereto, and then stirred at 20 degrees centigrade for 20 minutes, whereby a TEOS dehydrated condensate was obtained. Meanwhile, a solution obtained by dissolving 0.17 parts by weight of Pluronic P123 in 0.8 parts by weight of ethanol was added dropwise thereto and stirred at room temperature, whereby a solution of P123 and TEOS dehydrated condensate was prepared.

Formation of Composite Film of Surfactant Pluronic P123 and Silica

The obtained solution was spin-coated on a silicon substrate and a quartz substrate, and dried at 35 degrees centigrade for 10 minutes, whereby a composite film of P123 and silica having a film thickness of 200 nm was obtained (weight ratio of P123 to $SiO_2$: 35/65).

Formation of Silica Porous Body

The obtained composite film of the polyolefin based terminally branched copolymer and silica was calcinated at 400 degrees centigrade for 1 hour using the electric furnace, whereby a silica porous body having a thickness of 150 nm was obtained.

Comparative Example a5

Preparation of Solution of Surfactant Pluronic P123 and TTIP Dehydrated Condensate 0.74 parts by weight of an aqueous hydrochloric acid solution (37%) as the catalyst was added dropwise to 1.05 parts by weight of titanium tetraisopropoxide (TTIP), and then stirred at room temperature for 10 minutes, whereby a TTIP dehydrated condensate was obtained. Furthermore, a solution obtained by dissolving 0.275 parts by weight of Pluronic P123 in 1.6 parts by weight of additional ethanol was added dropwise thereto and stirred at room temperature, whereby a solution of P123 and TEOS dehydrated condensate was prepared.

Formation of Composite Film of Surfactant Pluronic P123 and Titania

The obtained solution was spin-coated on a silicon substrate and a quartz substrate, and heated at 50 degrees centigrade for 30 minutes and further heated at 110 degrees centigrade for 1.5 hours, whereby a composite film of P123 and titania having a film thickness of 400 nm was obtained (weight ratio of P123 to $TiO_2$: 30/70).

Formation of Titania Porous Body

The obtained composite film of the polyolefin based terminally branched copolymer and titania was calcinated at 500 degrees centigrade for 1 hour using the electric furnace, whereby a titania porous body having a thickness of 350 nm was obtained.

Comparative Example a6

Preparation of Solution of Surfactant Pluronic P123 and TEOS Dehydrated Condensate 12 parts by weight of ethanol as the solvent was added to 10.4 parts by weight of tetraethoxysilane (TEOS), and stirred at room temperature. Furthermore, 5.4 parts by weight of an aqueous solution of 0.01N hydrochloric acid as the catalyst was added thereto, and then stirred at 20 degrees centigrade for 20 minutes, whereby a TEOS dehydrated condensate was obtained. Meanwhile, a solution obtained by dissolving 2.75 parts by weight of Pluronic P123 in 8 parts by weight of additional ethanol was added dropwise thereto and stirred at room temperature, whereby a solution of P123 and TEOS dehydrated condensate was prepared (weight ratio of Pluronic P123 to silica in terms of $SiO_2$: 45/55).

Formation of Composite Particles of Surfactant Pluronic P123 and Silica

Composite fine particles of the polyolefin based terminally branched copolymer and silica were obtained using this composition with a spray dryer apparatus in the same method as in Example a1.

Formation of Porous Silica Particles

Composite particles of the surfactant Pluronic P123 and silica were calcinated using the electric furnace in the same method as in Example a1, whereby porous silica particles were obtained.

Comparative Example a7

Preparation of Solution of Surfactant Pluronic P123 and TEOS Dehydrated Condensate 12 parts by weight of ethanol as the solvent was added to 10.4 parts by weight of tetraethoxysilane (TEOS), and stirred at room temperature. Furthermore, 5.4 parts by weight of an aqueous solution of 0.01N hydrochloric acid as the catalyst was added thereto, and then stirred at 20 degrees centigrade for 20 minutes, whereby a TEOS dehydrated condensate was obtained. Meanwhile, a solution obtained by dissolving 3.0 parts by weight of Pluronic P123 in 8 parts by weight of additional ethanol was added dropwise thereto and stirred at room temperature, whereby a solution of P123 and TEOS dehydrated condensate was prepared (weight ratio of Pluronic P123 to silica in terms of $SiO_2$: 50/50).

Preparation of Composite Particles of Surfactant Pluronic P123 and Silica

Composite fine particles of the polyolefin based terminally branched copolymer and silica were obtained using this composition with a spray dryer apparatus in the same method as in Example a1.

Formation of Porous Silica Particles

Composite particles of the surfactant Pluronic P123 and silica were calcinated using the electric furnace in the same method as in Example a1, whereby porous silica particles were obtained.

Comparative Example a8

Non-porous silica particles (Admafine SO—C2: commercially available from Admatex Co., Ltd., average particle size: 0.4 to 0.6 μm) were used.

Comparative Example a9

Lithium iron phosphate particles were obtained in the same method as in Example 22, except that an aqueous dispersion of the polyolefin based terminally branched copolymer (T-1) was not added.

Porous bodies obtained in Examples a1 to a23 and Comparative Examples a1 to a9 as described above were evaluated in the following manner.

1. Film Quality

Films each prepared in Examples a1 to a11 and Comparative Examples a1 to a5 were observed with naked eyes and with an optical microscope (450 magnifications).

The evaluation results are shown in the following Table a2. The evaluation criteria are as follows.

⊙: No defects such as cracks or the like were found by observation with naked eyes and observation with an optical microscope.

○: No defects such as cracks or the like were found by observation with naked eyes, but defects were found by observation with an optical microscope in a part of the film.

Δ: No defects such as cracks or the like were found by observation with naked eyes, but defects were found by observation with an optical microscope in the entire film.

TABLE a1

| | Polyolefin based terminally branched copolymer/silica composite film, porous silica film precursor solution | | | | | | Film thickness | |
|---|---|---|---|---|---|---|---|---|
| | Polyolefin based terminally branched copolymer/silica (weight ratio) | TMOS dehydrated condensate | | 0.1N | | Polyolefin based terminally | of polyolefin based | |
| | | TMOS (parts by weight) | MeOH (parts by weight) | 0.1N aqueous hydrochloric acid (parts by weight) | aqueous hydrochloric acid (pH control) (parts by weight) | branched copolymer (10 wt % aqueous solution) (parts by weight) | terminally branched copolymer/silica composite film (nm) | Film thickness of silica porous body (nm) |
| Example a1 | 30/70 | 0.5 | 0.25 | 0.5 | 0 | T-1  0.8 | 389 | 352 |
| | 40/60 | | | | 0.4 | 1.3 | 240 | 216 |
| | 50/50 | | | | 0.8 | 1.95 | 224 | 191 |
| | 60/40 | | | | 1.4 | 2.92 | 236 | 172 |
| | 70/30 | | | | 2 | 4.56 | 183 | 116 |
| Example a2 | 30/70 | 0.5 | 0.25 | 0.5 | 0 | T-2  0.8 | 347 | 274 |
| | 40/60 | | | | 0.4 | 1.3 | 265 | 205 |
| | 50/50 | | | | 0.8 | 1.95 | 247 | 190 |
| | 60/40 | | | | 1.4 | 2.92 | 236 | 168 |
| | 70/30 | | | | 2 | 4.56 | 183 | 114 |
| Example a3 | 30/70 | 0.5 | 0.25 | 0.5 | 0 | T-3  0.8 | 326 | 244 |
| | 40/60 | | | | 0.4 | 1.3 | 241 | 180 |
| | 50/50 | | | | 0.8 | 1.95 | 216 | 162 |
| | 60/40 | | | | 1.4 | 2.92 | 230 | 157 |
| | 70/30 | | | | 2 | 4.56 | 190 | 115 |
| Example a4 | 30/70 | 0.5 | 0.25 | 0.5 | 0 | T-4  0.8 | 361 | 274 |
| | 40/60 | | | | 0.4 | 1.3 | 285 | 189 |
| | 50/50 | | | | 0.8 | 1.95 | 258 | 167 |
| | 60/40 | | | | 1.4 | 2.92 | 268 | 162 |
| | 70/30 | | | | 2 | 4.56 | 225 | 117 |

TABLE a2

| | Polyolefin based terminally branched copolymer/titania composite film, porous titania film precursor solution | | | | Film thickness | |
|---|---|---|---|---|---|---|
| | Polyolefin based terminally branched copolymer/titania (weight ratio) | TMOS dehydrated condensate | | Polyolefin based | of polyolefin based | |
| | | TTIP (parts by weight) | Aqueous hydrochloric acid (37%) (parts by weight) | terminally branched copolymer (10 wt % aqueous solution) (parts by weight) | terminally branched copolymer/titania composite film (nm) | Film thickness of titania porous body (nm) |
| Example a6 | 15/85 | 2.0 | 1.32 | T-1  1.0 | 297 | 201 |
| | 20/80 | | | 1.4 | 396 | 245 |
| | 30/70 | | | 2.4 | 411 | 210 |
| | 40/60 | | | 3.7 | 373 | 161 |
| | 50/50 | | | 5.6 | 380 | 119 | x: Defects such as cracks or the like were observed with naked eyes.

2. Transmittance

For the films each prepared on a quartz substrate in Examples a1 to a11 and Comparative Examples a1 to a5, the transmittance was measured in the wavelength range of 400 to 600 nm using a UV spectrophotometer UV2200, commercially available from Shimadzu Corporation. The results are shown in Table a3.

⊙: Transmittance is not less than 85% in the wavelength range of 400 to 600 nm.

○: Transmittance is not less than 80% and less than 85% in the wavelength range of 400 to 600 nm.

Δ: Transmittance is not less than 70% and less than 80% in the wavelength range of 400 to 600 nm.

x: Transmittance is less than 70% in the wavelength range of 400 to 600 nm.

|  | Organic compound (template)/ metal oxide (weight ratio) | Organic compound (template) | Metal oxide species | Evaluation results | |
|---|---|---|---|---|---|
|  |  |  |  | Film quality | Transmittance |
| Example a1 | 30/70 | T-1 | $SiO_2$ | ⊙ | ⊙ |
|  | 40/60 |  |  | ⊙ | ⊙ |
|  | 50/50 |  |  | ⊙ | ⊙ |
|  | 60/40 |  |  | ⊙ | ⊙ |
|  | 70/30 |  |  | ⊙ | ⊙ |
| Example a2 | 30/70 | T-2 | $SiO_2$ | ⊙ | ⊙ |
|  | 40/60 |  |  | ⊙ | ⊙ |
|  | 50/50 |  |  | ⊙ | ⊙ |
|  | 60/40 |  |  | ⊙ | ⊙ |
|  | 70/30 |  |  | ⊙ | ⊙ |
| Example a3 | 30/70 | T-3 | $SiO_2$ | ⊙ | ⊙ |
|  | 40/60 |  |  | ⊙ | ⊙ |
|  | 50/50 |  |  | ⊙ | ⊙ |
|  | 60/40 |  |  | ⊙ | ⊙ |
|  | 70/30 |  |  | ⊙ | ⊙ |
| Example a4 | 30/70 | T-4 | $SiO_2$ | ⊙ | ⊙ |
|  | 40/60 |  |  | ⊙ | ⊙ |
|  | 50/50 |  |  | ⊙ | ⊙ |
|  | 60/40 |  |  | ⊙ | ⊙ |
|  | 70/30 |  |  | ⊙ | ⊙ |
| Example a5 | 23/73 | T-1 | $SiO_2$ | ⊙ | ⊙ |
| Example a6 | 15/85 | T-1 | $TiO_2$ | ⊙ | ⊙ |
|  | 20/80 |  |  | ⊙ | ⊙ |
|  | 30/70 |  |  | ⊙ | ⊙ |
|  | 40/60 |  |  | ⊙ | ⊙ |
|  | 50/50 |  |  | ⊙ | ⊙ |
| Example a7 | 30/70 | T-1 | $SiO_2$—$TiO_2$ | ⊙ | ⊙ |
| Example a8 | 30/70 | T-1 | $ZrO_2$ | ○ | ○ |
| Example a9 | 30/70 | T-1 | $Al_2O_3$ | ⊙ | ⊙ |
| Example a10 | 30/70 | T-1 | $ZrO_2$ | ○ | ○ |
| Example a11 | 30/70 | T-1 | $BaTiO_3$ | ⊙ | ⊙ |
| Comparative Example a1 | 0/100 | — | $SiO_2$ | x | ○ |
| Comparative Example a2 | 0/100 | — | $TiO_2$ | x | ○ |
| Comparative Example a3 | 45/55 | Pluronic P123 | $SiO_2$ | ⊙ | ○ |
| Comparative Example a4 | 35/65 | Pluronic P123 | $SiO_2$ | ⊙ | ○ |
| Comparative Example a5 | 30/70 | Pluronic P123 | $TiO_2$ | ⊙ | ○ |

In all Examples a1 to a11, both film quality and transmittance were excellent. On the other hand, micro cracks were observed in Comparative Examples a1 and a2. In Comparative Example a3 to a5, the film quality was excellent, whereas the transmittance was low.

3. Refractive Index

For the films each prepared on a silicon substrate in Examples a1 to a4, Example a6 and Comparative Examples a1 and a2, the refractive index at 590 nm was measured using an ellipsometer (JASCO M-150). The results are shown in Tables a4 and a5.

4. Porosity

Porosities of Examples a1 to a4 and Example a6 were determined according to the Lorentz-Lorenz equation using values measured for evaluation described in (3. Refractive Index). At this time, the refractive index value in Comparative Example a1 was taken as the $SiO_2$ refractive index at the zero porosity state, while the refractive index value in Comparative Example a2 was taken as the $TiO_2$ refractive index value at the zero porosity state.

TABLE a4

| Polyolefin based terminally branched copolymer/silica (weight ratio) | Example a1 500° C. 1 hr | | Example a2 500° C. 1 hr | | Example a3 500° C. 1 hr | |
|---|---|---|---|---|---|---|
|  | Refractive index | Porosity | Refractive index | Porosity | Refractive index | Porosity |
| 30/70 | 1.25 | 41.1 | 1.29 | 32.4 | 1.33 | 23.9 |
| 40/60 | 1.22 | 47.8 | 1.21 | 50 | 1.29 | 32.4 |
| 50/50 | 1.18 | 56.8 | 1.18 | 56.8 | 1.22 | 47.8 |
| 60/40 | 1.15 | 63.8 | 1.17 | 59.1 | 1.17 | 59.1 |
| 70/30 | 1.13 | 68.5 | 1.14 | 66.1 | 1.13 | 68.5 |
| 0/100 |  |  |  |  |  |  |

| Polyolefin based terminally branched copolymer/silica (weight ratio) | Example a4 500° C. 1 hr | | Comparative Example a1 500° C. 1 hr | |
|---|---|---|---|---|
|  | Refractive index | Porosity | Refractive index | Porosity |
| 30/70 | 1.36 | 17.6 | — | — |
| 40/60 | 1.36 | 17.6 | — | — |
| 50/50 | 1.28 | 34.5 | — | — |

TABLE a4-continued

| | | | | |
|---|---|---|---|---|
| 60/40 | 1.21 | 50 | — | — |
| 70/30 | 1.16 | 61.5 | — | — |
| 0/100 | — | — | 1.45 | 0 |

TABLE a5

| Polyolefin based terminally branched copolymer (T-1)/titania (weight ratio) | Example a6 500° C. 1 hr | | Comparative Example a2 500° C. 1 hr | |
|---|---|---|---|---|
| | Refractive index | Porosity | Refractive index | Porosity |
| 15/85 | 1.91 | 23.9 | — | — |
| 20/80 | 1.85 | 27.5 | — | — |
| 30/70 | 1.75 | 33.9 | — | — |
| 40/60 | 1.68 | 38.7 | — | — |
| 50/50 | 1.65 | 40.8 | — | — |
| 0/100 | — | — | 2.41 | 0 |

5. Mechanical Strength of Film

The weight ratio of the polyolefin based terminally branched copolymer to $SiO_2$ (50/50) in Example a1, and the mechanical strength of the film prepared on a silicon substrate in Comparative Example a3 were measured using a nano indenter, Nano Indenter DCM, commercially available from MTS Corporation. The results are shown in Table a6. The elastic modulus and hardness value were calculated using the values in the region at an indentation depth of not more than 1/10 film thickness.

TABLE a6

| | Elastic modulus (GPa) | Hardness (GPa) |
|---|---|---|
| Example a1 | 11.2 | 0.73 |
| Comparative Example a3 | 6.3 | 0.43 |

6. Evaluation of Porous Structure of Film

Films prepared in Examples a1 to a11 and Comparative Examples a1 to a5 were observed in the following method.

(1) Mesoporous Structure of Film Surface

Figure 6:
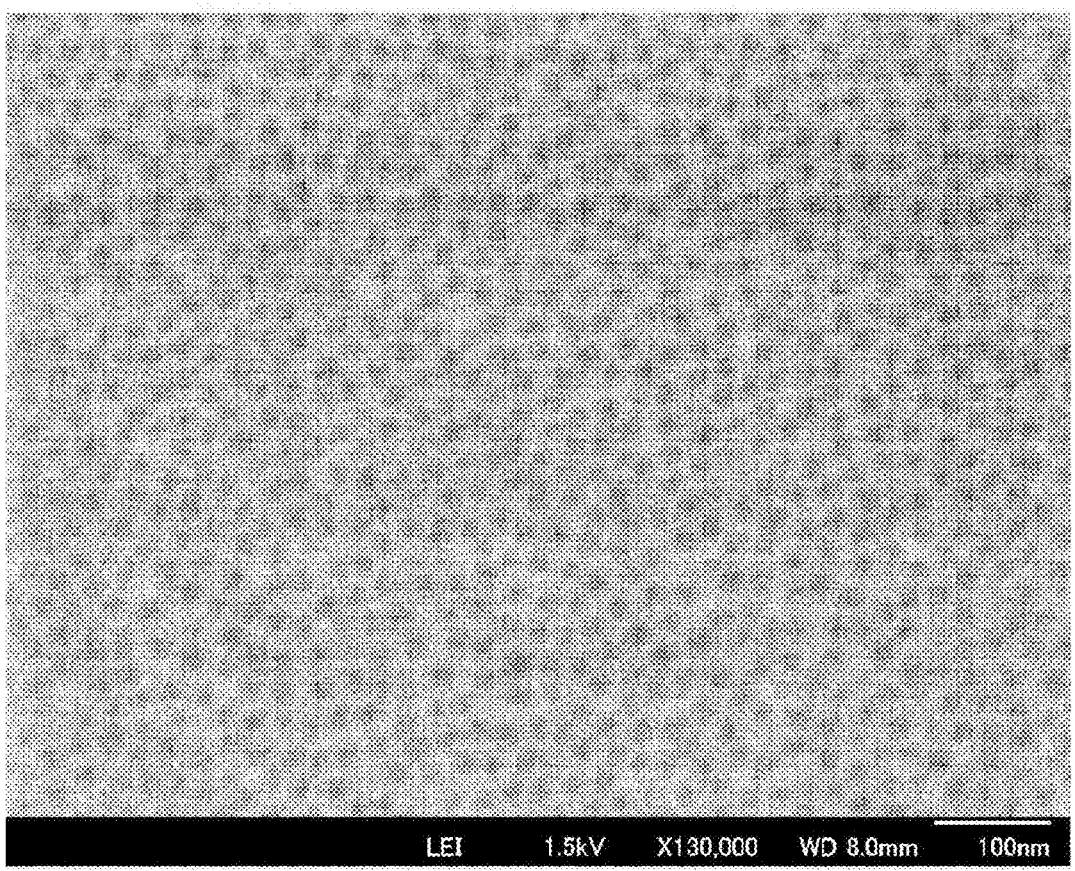
FIG. 6 illustrates a SEM image of a surface of a porous film prepared in Example a5.

Surfaces of the films prepared in Examples a1 to a11 and Comparative Examples a1 to a5 were observed under the condition of 1.5 kV using a scanning electron microscope (SEM, JSM-6701F, commercially available from JEOL). The evaluation results are shown in the following Table a7 according to the following criteria. Furthermore, a SEM image of the film surface in Example a5 is shown in FIG. 6.

Evaluation of Mesoporous Structure of Film Surface

○: A mesoporous structure having a diameter of 5 to 30 nm is present.

Δ: Although a mesoporous structure is present, the average pore diameter is out of the range of 5 to 30 nm.

x: No mesoporous structure is present.

(2) Reference Average Pore Diameter of Mesopores of Film Surface

The reference average pore diameter of mesopores of the film surface was calculated from an average value obtained by measuring pore diameters of optionally selected 20 pores under the condition of 1.5 kV using a scanning electron microscope (SEM, JSM-6701F, commercially available from JEOL). The results are shown in the following Table a7.

(3) Mesoporous Structure Inside Film

Figure 7:
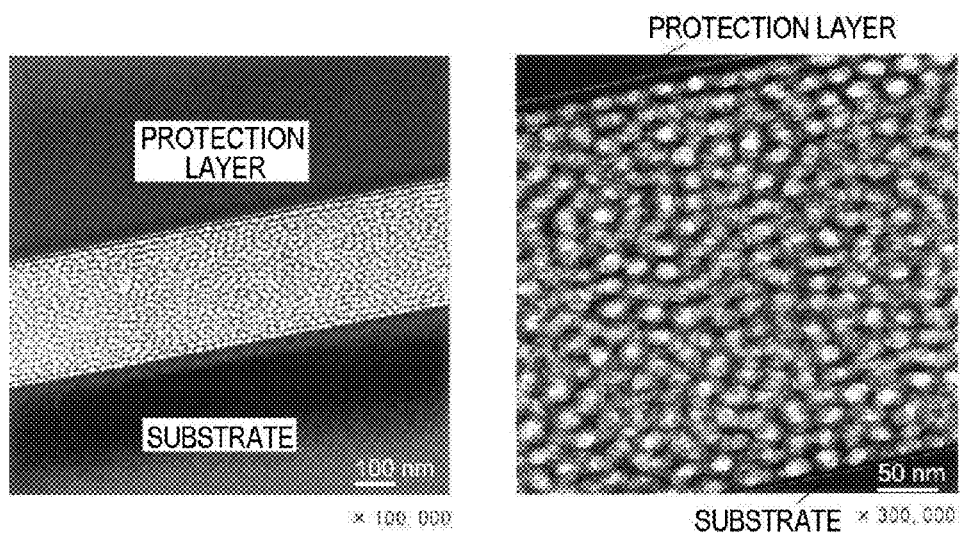
FIG. 7 illustrates a TEM image inside the porous film prepared in Example a5.

The films prepared in Examples a1 to a11 and Comparative Examples a1 to a5 were fixed with a resin, and cut into pieces by focused ion beam (FIB) processing. Subsequently, the shape of the cross section of this film was observed under the condition of 200 kV using a transmission electron microscope (TEM, H-7650, commercially available from Hitachi, Ltd.). The evaluation results are shown in the following Table a7. A TEM image inside the film of Example a5 is illustrated in FIG. 7.

Evaluation of Mesoporous Structure Inside Film

○: A mesoporous structure having a diameter of 5 to 30 nm is present and forms a cubic phase structure.

Δ: Although a mesoporous structure is present, the average pore diameter is out of the range of 5 to 30 nm or a cubic phase structure is not formed.

x: No mesoporous structure is present.

Figure 3:
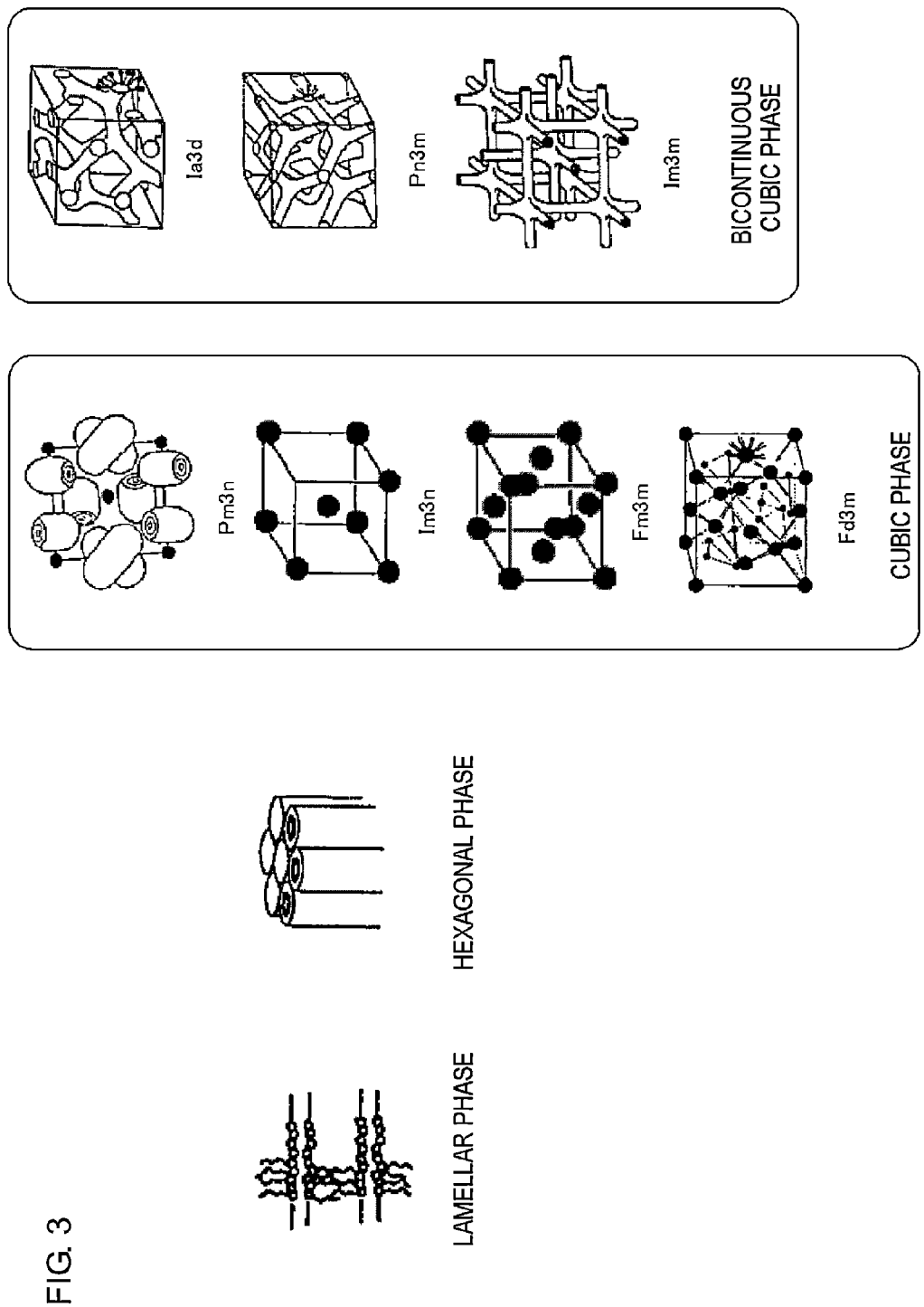
FIG. 3 illustrates a schematic view of a three-dimensional regular structure.

Furthermore, the cubic phase structure refers to any one of Pm3n, Im3n, Fm3m, Fd3m, and further Ia3d, Pn3m and Im3n in which mesopores are bicontinuously bonded, as shown in the schematic view of FIG. 3.

(4) Mesopores Inside Film

The average pore diameter of mesopores inside the film was calculated from an average value obtained by measuring pore diameters of optionally selected 20 pores under the condition of 200 kV using a transmission electron microscope (TEM, H-7650, commercially available from Hitachi, Ltd.). As a result, as shown in the following Table a7, a cubic phase structure having mesopores of an average pore diameter of 5 to 30 nm was formed.

TABLE a7

| | Organic compound (template)/ metal oxide (weight ratio) | Organic com- pound (template) | Metal oxide species | Evaluation results | | | |
|---|---|---|---|---|---|---|---|
| | | | | Mesoporous Structure of Film Surface (SEM) | | Mesoporous structure inside film and particles (TEM) | |
| | | | | Mesoporous structure | Pore size (nm) | Mesoporous structure | Phase/ Pore size (nm) |
| Example a1 | 30/70 | T-1 | $SiO_2$ | ○ | 20 | ○ | cubic/20 |
| | 40/60 | | | ○ | 20 | ○ | cubic/20 |
| | 50/50 | | | ○ | 20 | ○ | cubic/20 |
| | 60/40 | | | ○ | 20 | ○ | cubic/20 |
| | 70/30 | | | ○ | 20 | ○ | cubic/20 |

TABLE a7-continued

| | Organic compound (template)/ metal oxide (weight ratio) | Organic compound (template) | Metal oxide species | Mesoporous Structure of Film Surface (SEM) Mesoporous structure | Pore size (nm) | Mesoporous structure inside film and particles (TEM) Mesoporous structure | Phase/ Pore size (nm) |
|---|---|---|---|---|---|---|---|
| Example a2 | 30/70 | T-2 | SiO$_2$ | ○ | 20 | ○ | cubic/20 |
| | 40/60 | | | ○ | 20 | ○ | cubic/20 |
| | 50/50 | | | ○ | 20 | ○ | cubic/20 |
| | 60/40 | | | ○ | 20 | ○ | cubic/20 |
| | 70/30 | | | ○ | 20 | ○ | cubic/20 |
| Example a3 | 30/70 | T-3 | SiO$_2$ | ○ | 20 | ○ | cubic/20 |
| | 40/60 | | | ○ | 20 | ○ | cubic/20 |
| | 50/50 | | | ○ | 20 | ○ | cubic/20 |
| | 60/40 | | | ○ | 20 | ○ | cubic/20 |
| | 70/30 | | | ○ | 20 | ○ | cubic/20 |
| Example a4 | 30/70 | T-4 | SiO$_2$ | ○ | 20 | ○ | cubic/20 |
| | 40/60 | | | ○ | 20 | ○ | cubic/20 |
| | 50/50 | | | ○ | 20 | ○ | cubic/20 |
| | 60/40 | | | ○ | 20 | ○ | cubic/20 |
| | 70/30 | | | ○ | 20 | ○ | cubic/20 |
| Example a5 | 23/73 | T-1 | SiO$_2$ | ○ | 20 | ○ | cubic/20 |
| Example a6 | 15/85 | T-1 | TiO$_2$ | ○ | 25 | ○ | cubic/30 |
| | 20/80 | | | ○ | 25 | ○ | cubic/30 |
| | 30/70 | | | ○ | 25 | ○ | cubic/30 |
| | 40/60 | | | ○ | 25 | ○ | cubic/30 |
| | 50/50 | | | ○ | 25 | ○ | cubic/30 |
| Example a7 | 30/70 | T-1 | SiO$_2$—TiO$_2$ | ○ | 25 | ○ | cubic/30 |
| Example a8 | 30/70 | T-1 | ZrO$_2$ | ○ | 20 | ○ | cubic/20 |
| Example a9 | 30/70 | T-1 | Al$_2$O$_3$ | ○ | 20 | ○ | cubic/20 |
| Example a10 | 30/70 | T-1 | ZrO$_2$ | ○ | 20 | ○ | cubic/20 |
| Example a11 | 30/70 | T-1 | BaTiO$_3$ | ○ | 20 | ○ | cubic/20 |
| Comparative Example a1 | 0/100 | — | SiO$_2$ | x | — | x | — |
| Comparative Example a2 | 0/100 | — | TiO$_2$ | x | — | x | — |
| Comparative Example a3 | 45/55 | Pluronic P123 | SiO$_2$ | ○ | 10 | Δ | hexagonal |
| Comparative Example a4 | 35/65 | Pluronic P123 | SiO$_2$ | ○ | 10 | ○ | cubic/10 |
| Comparative Example a5 | 30/70 | Pluronic P123 | TiO$_2$ | ○ | 10 | Δ | hexagonal |

Figure 9:
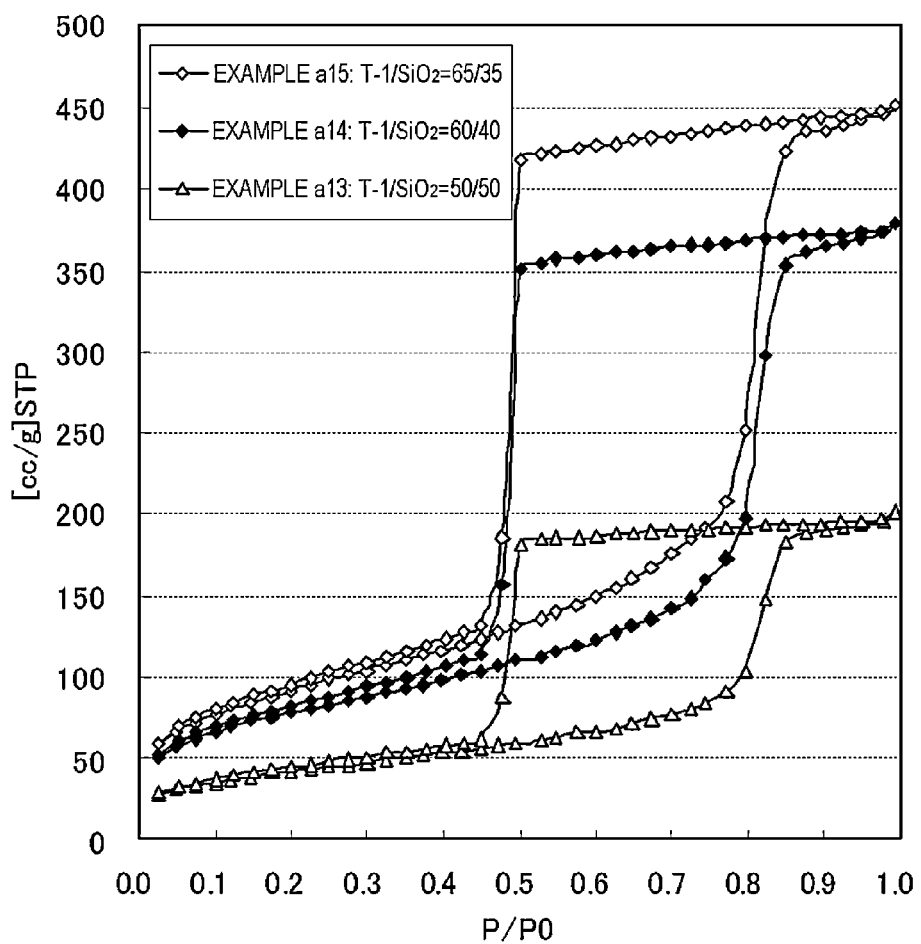
FIG. 9 is a graph illustrating a nitrogen adsorption isotherm curve of porous particles prepared in Examples a13 to a15 by the BET method.
Figure 10:
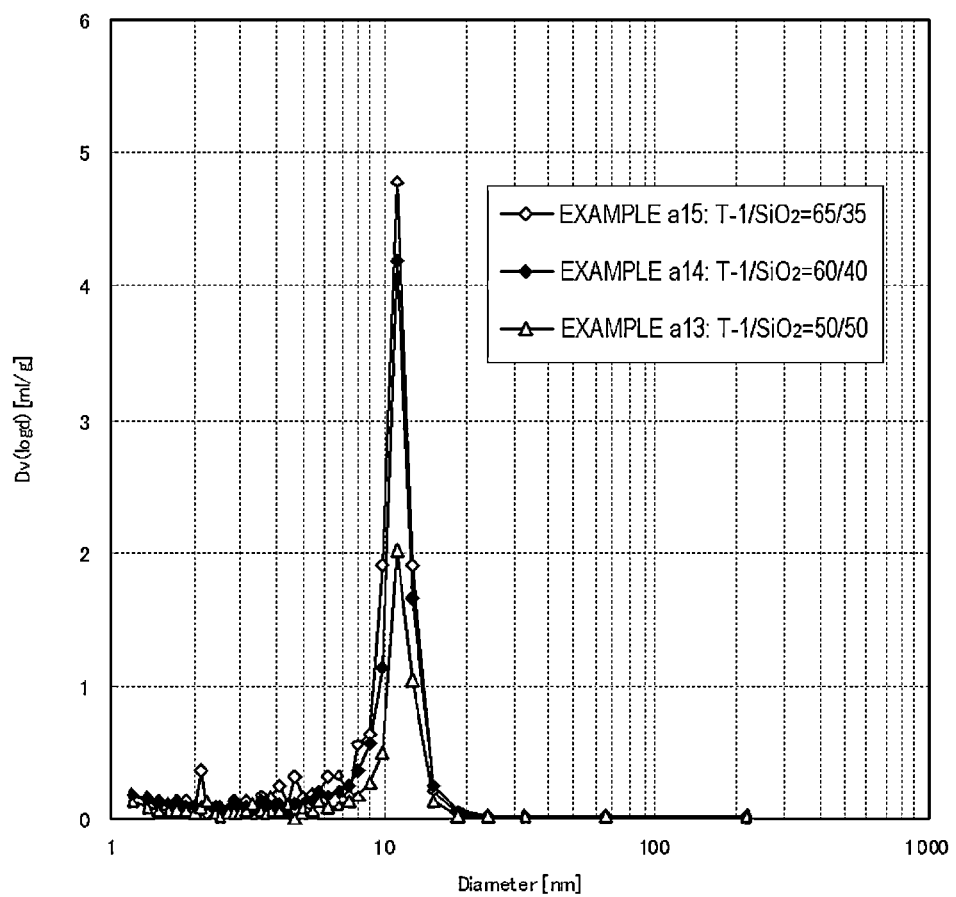
FIG. 10 is a graph illustrating a pore distribution curve of the porous particles prepared in Examples a13 to a15 by the BJH method.
Figure 11:
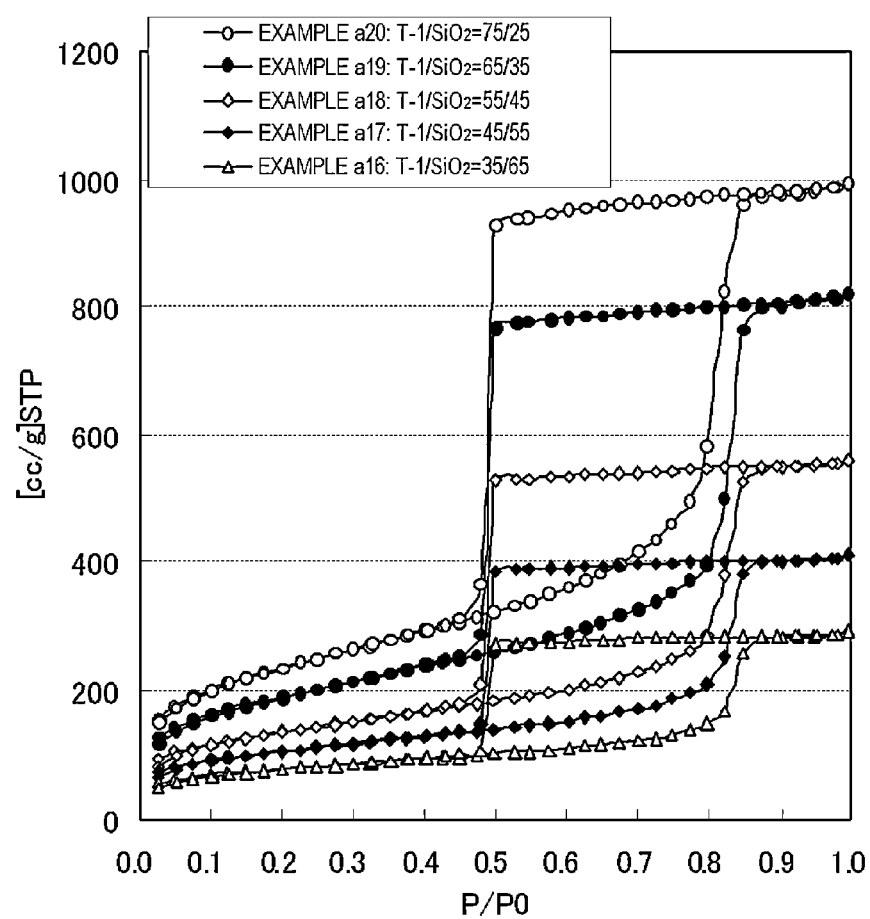
FIG. 11 is a graph illustrating a nitrogen adsorption isotherm curve of porous particles prepared in Examples a16 to a20 by the BET method.
Figure 12:
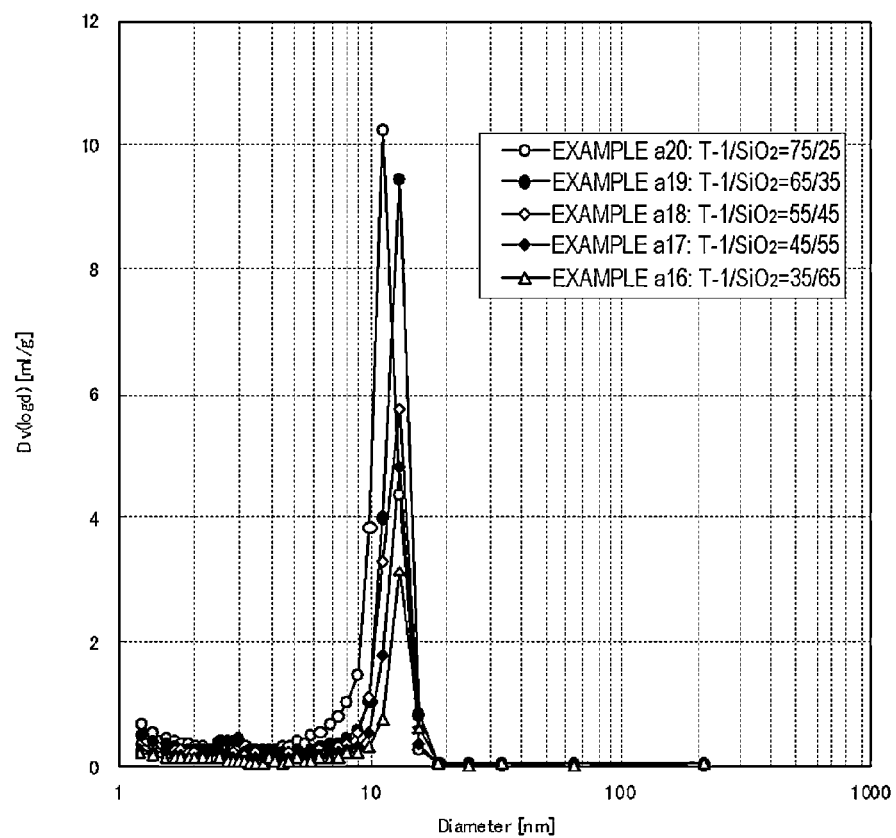
FIG. 12 is a graph illustrating a pore distribution curve of the porous particles prepared in Examples a16 to a20 by the BJH method.

7. Evaluation of Porous Structure of Particles (1) Mesoporous Structure Inside Particles The nitrogen adsorption-desorption measurement of particles prepared in Examples a12 to a20 and Comparatives Example a6 and a7 was carried out using autosorb 3 (commercially available from Quantachrome Instruments). The specific surface area and pore volume were calculated in accordance with the Brunauer-Emmett-Teller (BET) method, and the pore size distribution was calculated from an adsorption curve of a nitrogen adsorption isotherm by the Barrett-Joyner-Halenda (BJH) method. The calculated results are shown in the following Table a8. The nitrogen adsorption isotherms and the pore size distributions of Examples a13 to a15 are shown in FIGS. 9 and 10, while the nitrogen adsorption isotherms and the pore size distributions of Examples a16 to a20 are shown in FIGS. 11 and 12. The porosity value was calculated from the specific gravity of air of 1.0 and the specific gravity of silica of 0.5 using the pore volume value.

(2) Evaluation of Porous Structure—1

Figure 13:
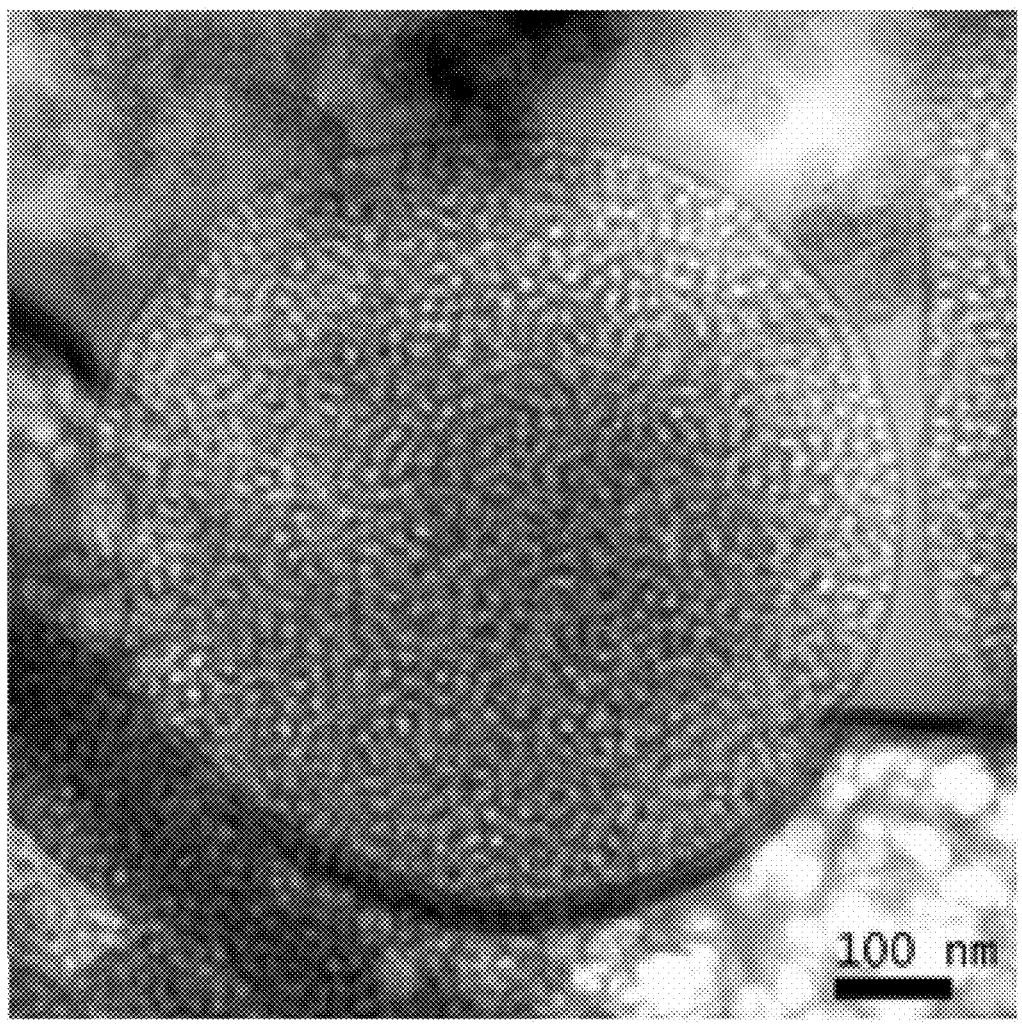
FIG. 13 is a TEM image of the porous particles prepared in Example a13.

The particles prepared in Examples a12 to a20 and Comparative Examples a6 and a7 were fixed with a resin, and cut into pieces by focused ion beam (FIB) processing. Subsequently, the shape of the cross section of this particle was observed under the condition of 200 kV using a transmission electron microscope (TEM, H-7650, commercially available from Hitachi, Ltd.). The evaluation results are shown in the following Table a8. A TEM image of the particles prepared in Example a13 is shown in FIG. 13.

Evaluation of Mesoporous Structure Inside Film or Inside Particles

○: A mesoporous structure having a diameter of 5 to 30 nm is present and forms a cubic phase structure.

Δ: Although a mesoporous structure is present, a pore diameter is out of the range of 5 to 30 nm or a cubic phase structure is not formed.

x: No mesoporous structure is present.

(3) Evaluation of Porous Structure—2

Figure 14:
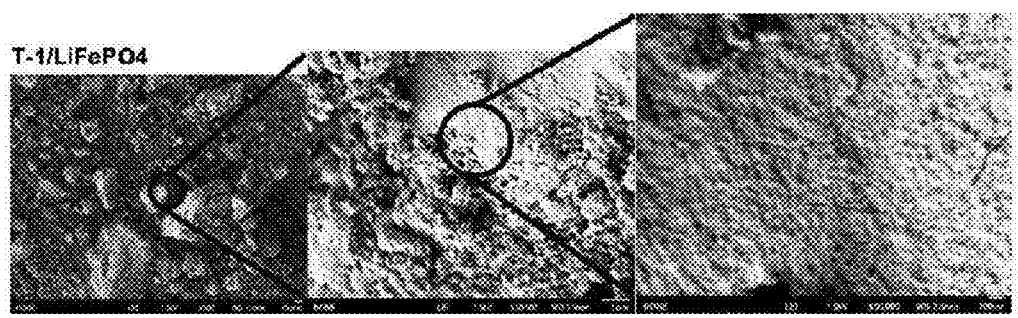
FIG. 14 is a SEM image of the porous particle prepared in Example a22 and its surface.
Figure 15:
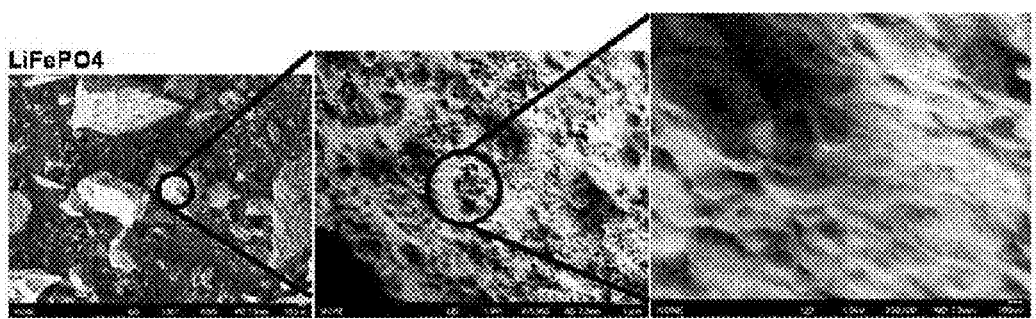
FIG. 15 is a SEM image of the particle prepared in Comparative Example a9 and its surface.

Surfaces of the particles prepared in Examples a21 to a23 and Comparative Example a9 were observed under the condition of 1.5 kV using a scanning electron microscope (SEM, JSM-6701F, commercially available from JEOL). The evaluation results are shown in the following Table a9 according to the following criteria. Furthermore, SEM images of particle surfaces of Example a22 and Comparative Example a9 are shown in FIGS. 14 and 15.

Evaluation of Mesoporous Structure of Film Surface

○: A mesoporous structure having a diameter of 5 to 30 nm is present.

Δ: Although a mesoporous structure is present, an average pore diameter is out of the range of 5 to 30 nm.

x: No mesoporous structure is present.

(3) Evaluation of Breaking Strength

Figure 8:
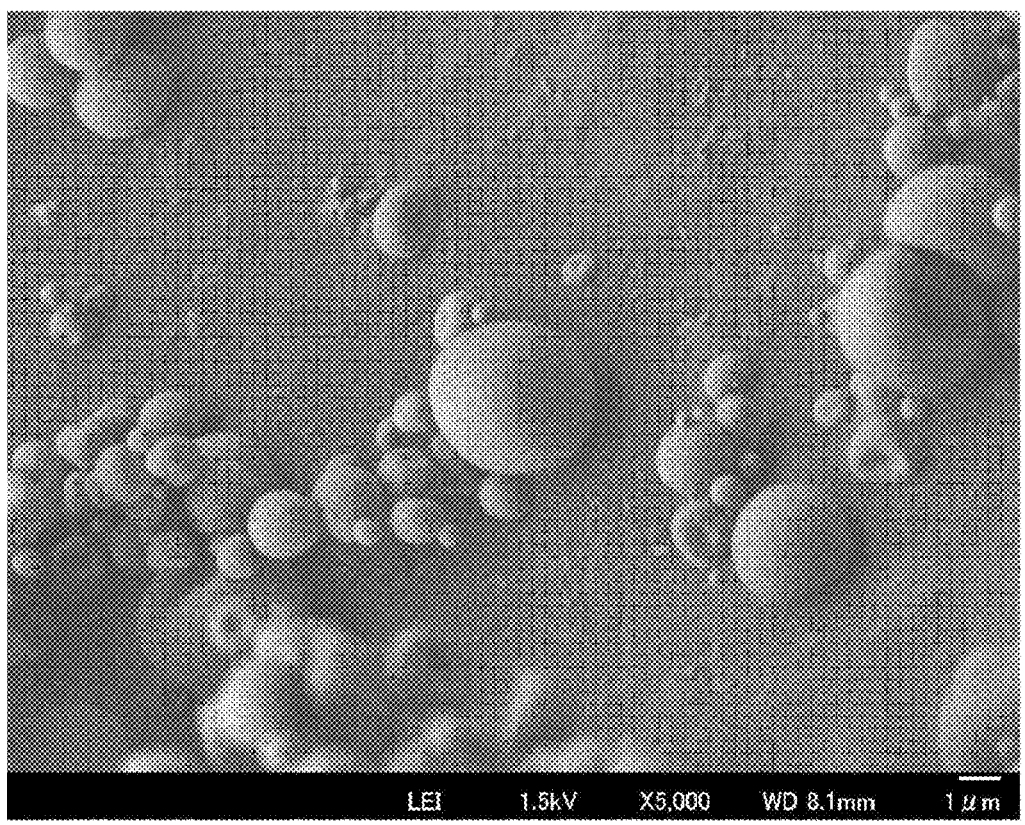
FIG. 8 illustrates a SEM image of porous particles prepared in Example a13.

Loads of 500 kg/cm², 1,000 kg/cm², 2,000 kg/cm² were added to porous particles prepared in Examples a12 to a20 and Comparative Examples a6 and a7, and particles in Comparative Example a8, which were uniformly packed in 1 cm², and the shape retention ratio was observed under the condition of 1.5 kV using a scanning electron microscope (SEM, JSM-6701F, commercially available from JEOL). A SEM image of particles prepared in Example a13 is shown in FIG. 8.

○: Shape retention ratio of not less than 80%
Δ: Shape retention ratio of from 50% to 80%
x: Shape retention ratio of not more than 50%

Figure 16:
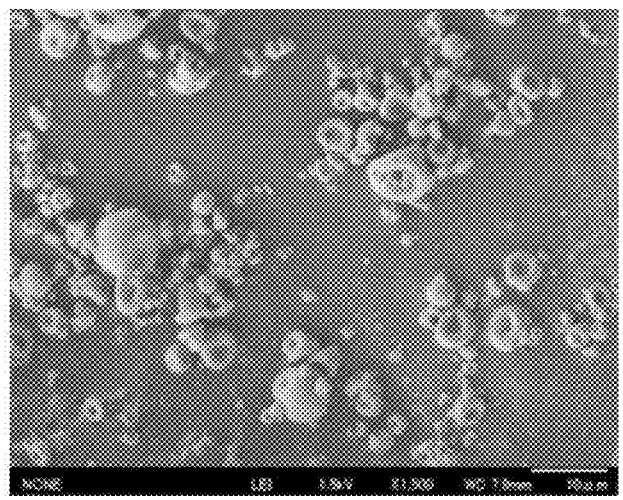
FIG. 16 illustrates a SEM image of the particles after a breaking test in Example a13.
Figure 16:
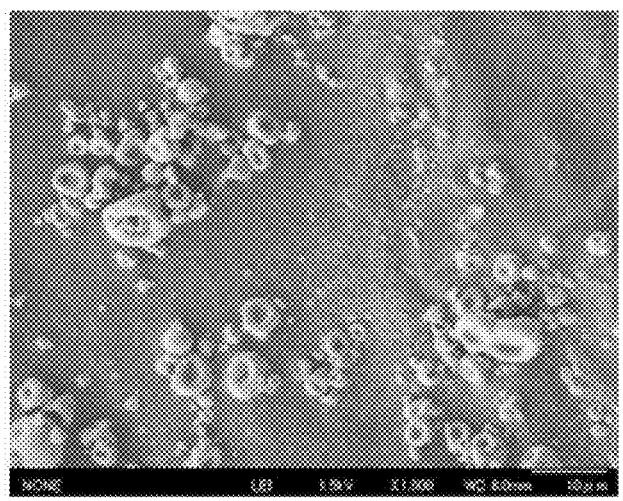
Figure 16:
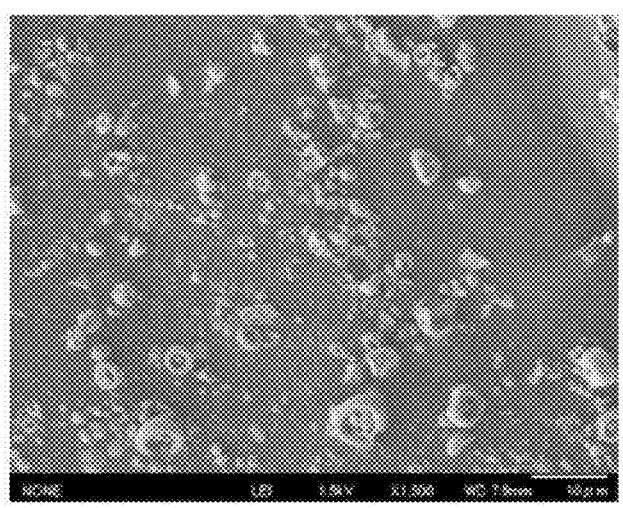

The evaluation results are shown in the following Table a8. A SEM image of the particles after breaking test in Example a13 is shown in FIG. 16.

TABLE a8

| | (1) Pore properties (nitrogen adsorption-desorption measurement) | | | | |
|---|---|---|---|---|---|
| | Particle size (μm) | Specific surface area (m²/g) | Pore volume (ml/g) | Pore diameter peak | Porosity (%) |
| Example a12 | 1 to 10 | — | 0.014 | 11 nm | 2.7 |
| Example a13 | 1 to 10 | 153 | 0.33 | 11 nm | 40 |
| Example a14 | 1 to 10 | 280 | 0.59 | 11 nm | 50 |
| Example a15 | 1 to 10 | 330 | 0.71 | 11 nm | 59 |
| Example a16 | 1 to 10 | 278 | 0.45 | 12.5 nm | 47 |
| Example a17 | 1 to 10 | 380 | 0.64 | 12.5 nm | 56 |
| Example a18 | 1 to 10 | 490 | 0.87 | 12.5 nm | 64 |
| Example a19 | 1 to 10 | 690 | 1.27 | 12.5 nm | 72 |
| Example a20 | 1 to 10 | 854 | 1.54 | 10.5 nm | 75 |
| Comparative Example a6 | 1 to 10 | 723 | 0.62 | 4 to 7 nm (broad) | 55 |
| Comparative Example a7 | 1 to 30 | 652 | 0.53 | 2 to 8 nm (broad) | 51 |
| Comparative Example a8 | 0.4 to 0.6 | Not carried out | | | |

| | (2) Mesoporous structure inside particles (TEM) | | (3) Breaking strength (kg/cm²) | | |
|---|---|---|---|---|---|
| | Mesoporous structure | Phase/pore size (nm) | 500 | 1000 | 2000 |
| Example a12 | ○ | cubic/10-20 nm | ○ | ○ | Δ |
| Example a13 | ○ | cubic/10-20 nm | ○ | ○ | Δ |
| Example a14 | ○ | cubic/10-20 nm | ○ | ○ | Δ |
| Example a15 | ○ | cubic/10-20 nm | ○ | ○ | Δ |
| Example a16 | ○ | cubic/10-20 nm | ○ | ○ | Δ |
| Example a17 | ○ | cubic/10-20 nm | ○ | ○ | Δ |
| Example a18 | ○ | cubic/10-20 nm | ○ | ○ | Δ |
| Example a19 | ○ | cubic/10-20 nm | ○ | ○ | Δ |
| Example a20 | ○ | cubic/10-20 nm | ○ | ○ | Δ |
| Comparative Example a6 | Δ | — | ○ | Δ | x |
| Comparative Example a7 | Δ | — | ○ | Δ | x |
| Comparative Example a8 | Not carried out | | ○ | ○ | Δ |

TABLE a9

| | | Mesoporous structure over particle surface (SEM) | |
|---|---|---|---|
| | Particle size (μm) | Mesoporous structure | Phase/pore size (nm) |
| Example a21 | 10 to 500 | ○ | cubic/10-20 nm |
| Example a22 | 10 to 500 | ○ | cubic/10-20 nm |
| Example a23 | 10 to 500 | ○ | cubic/10-20 nm |

TABLE a9-continued

| | | Mesoporous structure over particle surface (SEM) | |
|---|---|---|---|
| | Particle size (μm) | Mesoporous structure | Phase/pore size (nm) |
| Comparative Example a9 | 10 to 500 | x | — |

8. X-Ray Diffraction Measurement

Figure 17:
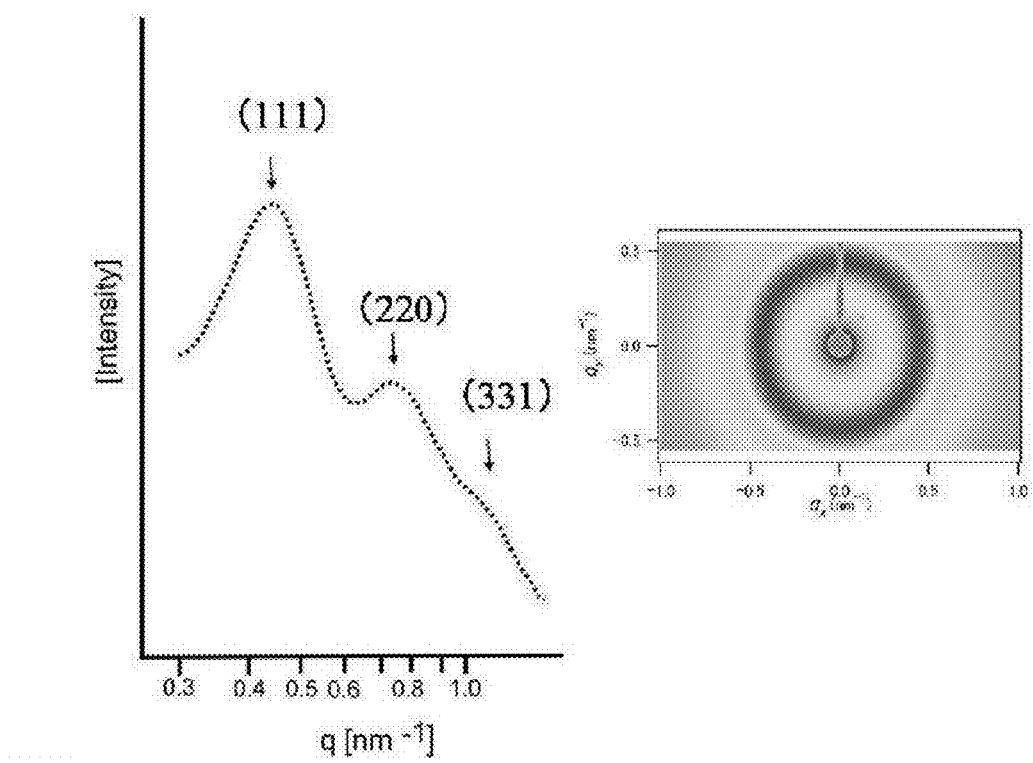
FIG. 17 illustrates a SAXS diffraction pattern of the porous particles prepared in Example a15.
Figure 18:
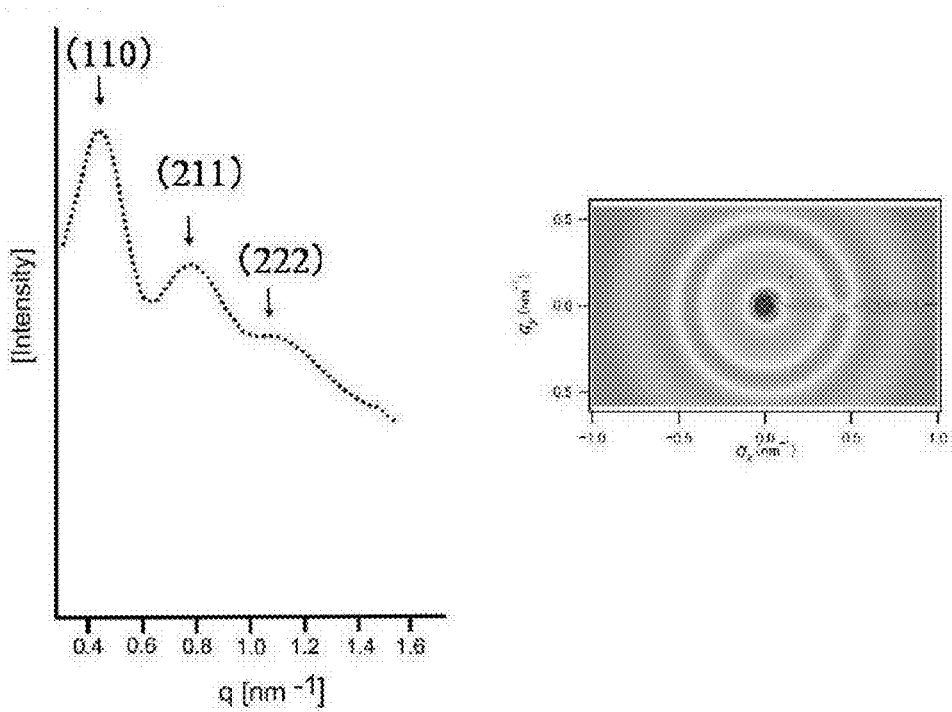
FIG. 18 illustrates a SAXS diffraction pattern of the porous particles prepared in Example a19.

A film comprising the silica porous body obtained in Example a1 (weight ratio of the polyolefin based terminally branched copolymer to $SiO_2$: 27/73), and particles obtained in Example a15 (weight ratio of the polyolefin based terminally branched copolymer to $SiO_2$: 65/35) and Example a19 (weight ratio of the polyolefin based terminally branched copolymer to $SiO_2$: 65/35) were used as a sample, and small-angle X-ray diffraction (SAXS) measurement was carried out. SAXS diffraction images in Examples a15 and a19 are shown in FIGS. 17 and 18.

It was confirmed that the resulting diffraction image had a plurality of annular patterns.

From this fact, it was found that silica porous bodies obtained in Examples a1, a15 and a19 each had a cubic phase structure.

Meanwhile, from the analysis results of the above annular patterns, cubic phase structures in Examples a1 and a15 were considered to be an Fm3m structure. The same results were obtained for porous bodies prepared in Examples a2 to a10 and Examples a12 to a14. The cubic phase structure in Example a19 was considered to be an Im3n structure. The same results were obtained for porous bodies prepared in Examples a16 to a18 and Example a19.

As described above, when the polyolefin based terminally branched copolymer particles were used as the template, a cubic phase structure with mesopores having a particle size of 20 to 30 nm was formed regardless of the kind and the ratio of metal oxides. Furthermore, by changing the organic-inorganic ratio in the organic-inorganic composite, the porosity determined using the total pore volume determined by the nitrogen gas adsorption method may be changed in the range of 1 to 80% by volume, and the pore structure of mesopores and the average pore diameter of mesopores were not varied in the range of the porosity. The same results were obtained for $ZrO_2$, $Al_2O_3$, $LiCoO_3$, $LiFePO_4$ and $LiMnPO_4$ which were oxides of zirconium, aluminum, cobalt, lithium, iron, manganese and barium (metal oxides).

On the other hand, when Pluronic P123 was used as the template, a phase structure was changed depending on the ratio to the metal oxide, and when the organic-inorganic ratio in the organic-inorganic composite was changed, the average pore diameter was changed.

Example B

Synthesis Example of Terminally Branched Copolymer

The number average molecular weight (Mn), the weight average molecular weight (Mw) and the molecular weight distribution (Mw/Mn) were measured using GPC according to the method as described herein. For the melting point (Tm), the peak top temperature obtained by measuring with DSC was used. Incidentally, the melting point of the polyalkylene glycol portion is also confirmed under the measurement conditions, but melting point indicates the melting point of the polyolefin portion unless otherwise particularly noted. The measurement by $^1$H-NMR was carried out at 120 degrees centigrade after completely dissolving the polymer in deuterated-1,1,2,2-tetrachloroethane, which functioned both as the lock solvent and the solvent, in a sample tube for measurement. For the chemical shift, the peak of deuterated-1,1,2,2-tetrachloroethane was set at 5.92 ppm, and the chemical shift values of other peaks were determined on this basis. For the particle size of the particles in the dispersion solution, the average particle size of 50% by volume was measured with a Microtrack UPA (a product of Honeywell, Inc.). The shape of the particles in the dispersion solution was observed under the condition of 100 kV using a transmission electron microscope (TEM, H-7650, commercially available from Hitachi, Ltd.), after diluting the sample by 200 to 500 times and performing negative staining with phosphotungstic acid.

Synthesis Example b1

Synthesis of Polyolefin Based Terminally Branched Copolymer (T-1)

In accordance with the following procedure (see, for example, Synthesis Example 2 of Japanese Laid-open Patent Publication No. 2006-131870), an epoxy-terminated ethylenic polymer (E-1) was synthesized.

To a 2000-ml stainless steel autoclave thoroughly purged with nitrogen, 1,000 ml of heptane was charged at room temperature, and the system was heated to 150 degrees centigrade. Subsequently, the autoclave was pressurized with ethylene to 30 kg/cm$^2$G and the temperature was maintained. To the autoclave, 0.5 ml (0.5 mmol) of a hexane solution (1.00 mmol/ml in terms of aluminum atoms) of MMAO (a product of Tosoh Finechem Corporation) was fed with pressure, and then 0.5 ml (0.0001 mmol) of a toluene solution (0.0002 mmol/ml) of a compound of the following formula was fed with pressure to initiate polymerization. Under ethylene gas atmosphere, polymerization was carried out at 150 degrees centigrade for 30 minutes, and then the polymerization was terminated by feeding a small amount of methanol with pressure. The obtained polymer solution was added to 3 liters of methanol containing a small amount of hydrochloric acid to precipitate out the polymer. The polymer was washed with methanol, and then dried at 80 degrees centigrade under reduced pressure for 10 hours, whereby a double bond-terminated ethylenic polymer (P-1) was obtained.

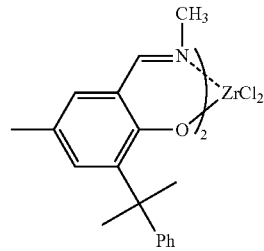

100 g of the double bond-terminated ethylenic polymer (P-1) (108 mmol of vinyl group in terms of Mn of 850), 300 g of toluene, 0.85 g (2.6 mmol) of Na$_2$WO$_4$, 0.60 g (1.3 mmol) of CH$_3$(nC$_8$H$_{17}$)$_3$NHSO$_4$ and 0.11 g (1.3 mmol) of phosphoric acid were introduced into a 500-mL separable flask, and the system was heated under reflux with stirring for 30 minutes to completely melt the polymer product. After adjusting the internal temperature to 90 degrees centigrade, 37 g (326 mmol) of aqueous 30% hydrogen peroxide was added dropwise over 3 hours, and then stirred at an internal temperature of 90 to 92 degrees centigrade for 3 hours. Thereafter, with the temperature being maintained at 90 degrees centigrade, 34.4 g (54.4 mmol) of an aqueous solution of 25% sodium thiosulfate was added and stirred for 30 minutes, and it was confirmed that the peroxide in the reaction system was completely decomposed with a peroxide test paper. Subsequently, at an internal temperature of 90 degrees centigrade, 200 g of dioxane was added to crystallize the product, and the solids were collected by filtration and washed with dioxane. The obtained solids were stirred in an aqueous solution of 50% methanol at room temperature, and the solids were collected by filtration and washed with methanol. The solids were further stirred in 400 g of methanol, collected by filtration and washed with methanol. The solids were dried at room temperature under reduced pressure of 1 to 2 hPa, whereby 96.3 g of an epoxy-terminated ethylenic polymer (E-1) as a white solid (yield: 99%, conversion rate of olefin: 100%) was obtained.

In the obtained epoxy-terminated ethylenic polymer (E-1), Mw=2,058, Mn=1,118 and Mw/Mn=1.84 (GPC) (content of terminal epoxy group: 90 mol %).

$^1$H-NMR: δ (C2D2C14) 0.88 (t, 3H, J=6.92 Hz), 1.18-1.66 (m), 2.38 (dd, 1H, J=2.64, 5.28 Hz), 2.66 (dd, 1H, J=4.29, 5.28 Hz), 2.80-2.87 (m, 1H)

Melting point (Tm): 121 degrees centigrade

Mw=2,058, Mn=1,118, Mw/Mn=1.84 (GPC)

84 parts by weight of the epoxy-terminated ethylenic polymer (E-1), 39.4 parts by weight of diethanolamine and 150 parts by weight of toluene were introduced into a 1,000-mL flask, and the system was stirred at 150 degrees centigrade for 4 hours. Thereafter, acetone was added while cooling the mixture to precipitate the reaction product, and the solids were collected by filtration. The obtained solids were stirred and washed with an aqueous acetone solution one time and further with acetone three times, and then the solids were collected by filtration. Thereafter, the solids were dried at room temperature under reduced pressure to obtain a polymer (I-1) (Mn: 1,223, in the general formula (9), A: a group formed by polymerization of ethylene (Mn: 1,075), $R^1=R^2=$a hydrogen atom, one of $Y^1$ and $Y^2$: a hydroxyl group, the other of $Y^1$ and $Y^2$: a bis(2-hydroxyethyl)amino group).

$^1$H-NMR: δ (C2D2C14) 0.88 (t, 3H, J=6.6 Hz), 0.95-1.92 (m), 2.38-2.85 (m, 6H), 3.54-3.71 (m, 5H)

Melting point (Tm): 121 degrees centigrade 20.0 parts by weight of the polymer (I-1) and 100 parts by weight of toluene were introduced into a 500-mL flask equipped with a nitrogen inlet tube, a thermometer, a condenser tube and a stirring rod, and the system was heated in an oil bath at 125 degrees centigrade with stirring to completely dissolve the solids. After cooling to 90 degrees centigrade, 0.323 parts by weight of 85% KOH that had been dissolved in 5.0 parts by weight of water in advance was added to the flask, and the contents were mixed under reflux condition for 2 hours. Subsequently, the temperature in the flask was slowly increased to 120 degrees centigrade, and water and toluene were distilled off. Water and toluene in the flask were further distilled off by reducing the pressure in the flask while supplying minimal nitrogen into the flask, increasing the internal temperature to 150 degrees centigrade, and then keeping the temperature for 4 hours. After cooling to room temperature, the solids solidified in the flask were broken and taken out.

18.0 parts by weight of the obtained solids and 200 parts by weight of dehydrated toluene were introduced into a 1.5-L stainless steel pressurized reactor equipped with a heating device, a stirring rod, a thermometer, a manometer and a safety valve, and after purging the gas phase with nitrogen, the system was heated to 130 degrees centigrade with stirring. After 30 minutes, 9.0 parts by weight of ethylene oxide was added thereto. After further maintaining at 130 degrees centigrade for 5 hours, the system was cooled to room temperature to obtain a reactant. The solvent was removed by drying from the resulting reactant to obtain a terminally branched copolymer (T-1) (Mn: 1,835, in the general formula (1), A: a group formed by polymerization of ethylene (Mn: 1,075), $R^1=R^2=$a hydrogen atom, one of $X^1$ and $X^2$: a group represented by the general formula (6) ($X^{11}$: a polyethylene glycol group), the other of $X^1$ and $X^2$: a group represented by the general formula (5) ($Q^1$ and $Q^2$: an ethylene group, $X^9$ and $X^{10}$: a polyethylene glycol group)).

$^1$H-NMR: δ (C2D2C14) 0.88 (3H, t, J=6.8 Hz), 1.06-1.50 (m), 2.80-3.20 (m), 3.33-3.72 (m)

Melting point (Tm): −16 degrees centigrade (polyethylene glycol), 116 degrees centigrade Synthesis Example b2

A terminally branched copolymer (T-2) (Mn: 2,446) was obtained in the same method as in Synthesis Example b1, except that the amount of ethylene oxide in use was changed to 18.0 parts by weight.

Melting point (Tm): 27 degrees centigrade (polyethylene glycol), 118 degrees centigrade Preparation Example of Aqueous Dispersion of Terminally Branched Copolymer Preparation Example B1

Preparation of Aqueous Dispersion Solution of 10 weight % Polyolefin Based Terminally Branched Copolymer (T-1)

10 parts by weight of the polyolefin based terminally branched copolymer (T-1) constituting the polymer particles (A) in Synthesis Example b1 and 40 parts by weight of distilled water as the solvent (C) were charged to a 100-ml autoclave, and the system was heated with stirring at a rate of 800 rpm at 140 degrees centigrade for 30 minutes, and then cooled to room temperature while stirring. The average particle size of 50% by volume of the obtained dispersion system was 0.018 μm (average particle size of 10% by volume: 0.014 μm, average particle size of 90% by volume: 0.022 μm). The particle size of the obtained dispersion system measured by using a transmission electron microscope was from 0.015 to 0.030 μm. Furthermore, 75 parts by weight of distilled water was added to 75 parts by weight of this T-1 aqueous dispersion solution (solid content: 20 weight %), whereby a 10 weight % T-1 aqueous dispersion solution was obtained.

Example b1

Preparation of Solution of Polyolefin Based Terminally Branched Copolymer and TMOS Dehydrated Condensate 0.25 parts by weight of methanol as the solvent was added to 0.5 parts by weight of tetramethoxysilane (TMOS), and stirred at room temperature. 0.5 parts by weight of an aqueous solution of 0.1N hydrochloric acid as the catalyst was further added dropwise thereto, and then stirred at 50 degrees centigrade for 1 hour, whereby a TMOS dehydrated condensate was obtained.

An aqueous solution of 0.1N hydrochloric acid was further added dropwise to the obtained TMOS dehydrated condensate (to have the pH of 3 after addition of the polyolefin based terminally branched copolymer), and then stirred at room temperature. 1.95 parts by weight of an aqueous dispersion (solid content: 10 weight %) of the polyolefin based terminally branched copolymer (T-1) was further added dropwise thereto and stirred at room temperature, whereby a solution of the polyolefin based terminally branched copolymer and the TMOS dehydrated condensate was prepared (weight ratio of the polyolefin based terminally branched copolymer to silica in terms of $SiO_2$: 50/50).

The silica content represents the proportion of silica contained in the composite film, and was calculated in the following method.

The silica content was calculated on the assumption that 100 weight % of TMOS as the component (B) in the above Example b1 reacted to become $SiO_2$. For example, the calculation was performed on the assumption that when the component (B) was TMOS, 100% thereof reacted to become $SiO_2$ content.

Thus, from

TMOS: Mw=152, $SiO_2$: Mw=60, $SiO_2$/TMOS=60/152=0.395.

That is, the value obtained by multiplying the amount of TMOS by 0.395 is the $SiO_2$ content in the film.

Formation of Composite Film of Polyolefin Based Terminally Branched Copolymer and Silica The obtained solution was spin-coated on a 5-inch silicon substrate, a 5-cm quartz substrate and a 5-cm ITO film-attached blue plate glass substrate, and heated at 110 degrees centigrade for 1.5 hours, whereby a composite film of the polyolefin based terminally branched copolymer and silica having a film thickness of 580 nm was obtained.

Formation of Silica Porous Body

The obtained composite film of the polyolefin based terminally branched copolymer and silica was calcinated at 500 degrees centigrade for 1 hour using the electric furnace, whereby a silica porous body having a thickness of 380 nm was obtained.

Furthermore, the film thickness of the composite film and the film thickness of the silica porous body were measured using an ellipsometer (JASCO M-150).

Hydrophobic treatment of Silica Porous Body

The hydrophobic treatment was carried out by the chemical vapor adsorption (CVA) method using hexamethyldisilazane (HMDS). For CVA, 0.3 g of HMDS and a silica porous body were put into a 300-ml PTFE pressure-resistant container, and reacted at 80 degrees centigrade for 2 hours.

Example b2

A film comprising a silica porous body having a thickness of 380 nm on a silicon substrate was obtained in the same method as in Example b1, except that the polyolefin based terminally branched copolymer (T-1) was changed to (T-2).

Comparative Example b1

Preparation of Solution of Surfactant Pluronic P123 and TEOS Dehydrated Condensate 1.2 parts by weight of ethanol as the solvent was added to 1.04 parts by weight of tetraethoxysilane (TEOS), and stirred at room temperature. Furthermore, 0.54 parts by weight of an aqueous solution of 0.01N hydrochloric acid as the catalyst was added thereto, and then stirred at 20 degrees centigrade for 20 minutes, whereby a TEOS dehydrated condensate was obtained. Meanwhile, a solution obtained by dissolving 0.275 parts by weight of Pluronic P123 in 0.8 parts by weight of additional ethanol was added dropwise thereto and stirred at room temperature, whereby a solution of P123 and TEOS dehydrated condensate was prepared.

Formation of Composite Film of Surfactant Pluronic P123 and Silica

The obtained solution was spin-coated on a silicon substrate, a quartz substrate and an ITO film-attached glass substrate, and dried at 35 degrees centigrade for 10 minutes, whereby a composite film of P123 and silica having a film thickness of 590 nm was obtained (weight ratio of P123 to $SiO_2$: 45/55).

Formation of Silica Porous Body

The obtained composite film of the polyolefin based terminally branched copolymer and silica was calcinated at 400 degrees centigrade for 1 hour using the electric furnace, whereby a silica porous body having a thickness of 380 nm was obtained.

Porous bodies of Examples b1 and b2 and Comparative Example b1 obtained as described above were evaluated in the following method.

1. Dielectric Constant

For films each prepared on an ITO film-attached glass substrate in Examples b1 and b2 and Comparative Example b1, the relative dielectric constant was measured at 10 MHz using a jig (a product of Keycom Corporation) and an impedance-material analyzer HP4291B (a product of Hewlett-Packard Company) according to the capacitive method.

2. Mechanical Strength of Film

For films each prepared on a silicon substrate in Examples b1 and b2 and Comparative Example b1, the mechanical strength was measured with a nano indenter, Nano Indenter DCM, commercially available from MTS Corporation. The results are shown in Table b1. The elastic modulus and hardness value were calculated using the values in the region at an indentation depth of not more than 1/10 film thickness.

3. Evaluation of Porous Structure

Films each prepared in Examples b1 and b2 and Comparative Example b1 were observed in the following method.

(1) Mesoporous Structure of Film Surface

Surfaces of the films prepared in Examples b1 and b2 and Comparative Example b1 were observed under the condition of 1.5 kV using a scanning electron microscope (SEM, JSM-6701F, commercially available from JEOL). The evaluation results are shown in the following Table b1 according to the following criteria.

Evaluation of Mesoporous Structure of Film Surface

◯: A mesoporous structure having an average pore diameter of 5 to 30 nm is present.

Δ: Although a mesoporous structure is present, the average pore diameter is out of the range of 5 to 30 nm.

x: No mesoporous structure is present.

(2) Mesoporous Structure Inside Film

The films and particles prepared in Examples b1 and b2 and Comparative Example b1 were fixed with a resin, and cut into pieces by focused ion beam (FIB) processing. Subsequently, the shape of the cross section was observed under the condition of 200 kV using a transmission electron microscope (TEM, H-7650, commercially available from Hitachi, Ltd.). The evaluation results are shown in the following Table b1.

Evaluation of Mesoporous Structure Inside Film

◯: A mesoporous structure having an average pore diameter of 5 to 30 nm is present and forms a cubic phase structure.

Δ: Although a mesoporous structure is present, the average pore diameter is be out of the range of 5 to 30 nm or a cubic phase structure is not formed.

x: No mesoporous structure is present.

(3) Mesopores Inside Film

The average pore diameter of mesopores inside the film was calculated from an average value obtained by measuring pore diameters of randomly selected 20 pores under the condition of 200 kV using a transmission electron microscope (TEM, H-7650, commercially available from Hitachi, Ltd.).

In Example b1, a cubic phase structure with mesopores having an average pore diameter of 18 nm was formed. In Example b2, a cubic phase structure with mesopores having an average pore diameter of 25 nm was formed.

(4) X-Ray Diffraction Measurement

The X-ray diffraction measurement was carried out using the film comprising a silica porous body obtained in Example b1 as a sample.

It was confirmed that the resulting diffraction image had a plurality of annular patterns.

From this fact, it was found that the silica porous body obtained in Example b1 had a cubic phase structure.

Meanwhile, from the analysis results of the above annular patterns, a cubic phase structure in Example b1 was considered to be an Fm3m structure. The same result was obtained for the silica porous body in Example b2.

TABLE b1

|  | Film thickness | Dielectric constant (10 MHz) | Mechanical strength | | Porous structure | |
|---|---|---|---|---|---|---|
|  |  |  | Elastic modulus | Hardness | Film surface | Inside film |
| Example b1 | 380 nm | 1.5 | 11.2 GPa | 0.73 GPa | ◯ | ◯ |
| Example b2 | 380 nm | 1.3 | 12.5 GPa | 0.82 GPa | ◯ | ◯ |
| Comparative Example b1 | 370 nm | 2.1 | 6.3 GPa | 0.43 GPa | Δ | Δ |

Example C

Synthesis Example of Terminally Branched Copolymer

The number average molecular weight (Mn), the weight average molecular weight (Mw) and the molecular weight distribution (Mw/Mn) were measured using GPC according to the method as described herein. For the melting point (Tm), the peak top temperature obtained by measuring with DSC was used. Incidentally, the melting point of the polyalkylene glycol portion is also confirmed under the measurement conditions, but melting point indicates the melting point of the polyolefin portion unless otherwise particularly noted. The measurement by $^1$H-NMR was carried out at 120 degrees centigrade after completely dissolving the polymer in deuterated-1,1,2,2-tetrachloroethane, which functioned both as the lock solvent and the solvent, in a sample tube for measurement. For the chemical shift, the peak of deuterated-1,1,2,2-tetrachloroethane was set at 5.92 ppm, and the chemical shift values of other peaks were determined on this basis. For the particle size of the particles in the dispersion solution, the average particle size of 50% by volume was measured with a Microtrack UPA (a product of Honeywell, Inc.). The shape of the particles in the dispersion solution was observed under the condition of 100 kV with a transmission electron microscope (TEM, H-7650, commercially available from Hitachi, Ltd.), after diluting the sample by 200 to 500 times and performing negative staining with phosphotungstic acid.

Synthesis Example c1

Synthesis of Polyolefin Based Terminally Branched Copolymer (T-1)

In accordance with the following procedure (see, for example, Synthesis Example 2 of Japanese Laid-open Patent Publication No. 2006-131870), an epoxy-terminated ethylenic polymer (E-1) was synthesized.

To a 2,000-ml stainless steel autoclave thoroughly purged with nitrogen, 1,000 ml of heptane was charged at room temperature, and the system was heated to 150 degrees centigrade. Subsequently, the autoclave was pressurized with ethylene to 30 kg/cm$^2$G and the temperature was maintained. To the autoclave, 0.5 ml (0.5 mmol) of a hexane solution (1.00 mmol/ml in terms of aluminum atoms) of MMAO (a product of Tosoh Finechem Corporation) was fed with pressure, and then 0.5 ml (0.0001 mmol) of a toluene solution (0.0002 mmol/ml) of a compound of the following formula was fed with pressure to initiate polymerization. Under ethylene gas atmosphere, polymerization was carried out at 150 degrees centigrade for 30 minutes, and then the polymerization was terminated by feeding a small amount of methanol with pressure. The obtained polymer solution was added to 3 liters of methanol containing a small amount of hydrochloric acid to precipitate out the polymer. The polymer was washed with methanol, and then dried at 80 degrees centigrade under reduced pressure for 10 hours, whereby a double bond-terminated ethylenic polymer (P-1) was obtained.

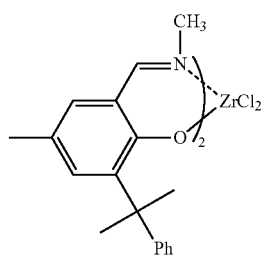

100 g of the double bond-terminated ethylenic polymer (P-1) (108 mmol of vinyl group in terms of Mn 850), 300 g of toluene, 0.85 g (2.6 mmol) of Na WO$_4$, 0.60 g (1.3 mmol) of CH$_3$(nC$_8$H$_{17}$)$_3$NHSO$_4$ and 0.11 g (1.3 mmol) of phosphoric acid were introduced into a 500-mL separable flask, and the system was heated under reflux with stirring for 30 minutes to completely melt the polymer product. After adjusting the internal temperature to 90 degrees centigrade, 37 g (326 mmol) of aqueous 30% hydrogen peroxide was added dropwise over 3 hours and then stirred at an internal temperature of 90 to degrees centigrade for 3 hours. Thereafter, with the temperature being maintained at 90 degrees centigrade, 34.4 g (54.4 mmol) of an aqueous solution of 25% sodium thiosulfate was added and stirred for 30 minutes, and it was confirmed that the peroxide in the reaction system was completely decomposed with a peroxide test paper. Subsequently, at an internal temperature of 90 degrees centigrade, 200 g of dioxane was added to crystallize the product, and the solids were collected by filtration and washed with dioxane. The obtained solids were stirred in an aqueous solution of 50% methanol at room temperature, and the solids were collected by filtration and washed with methanol. The solids were further stirred in 400 g of methanol, collected by filtration and washed with methanol. The solids were dried at room temperature under reduced pressure of 1 to 2 hPa, whereby 96.3 g of an epoxy-terminated ethylenic polymer (E-1) as a white solid (yield: 99%, conversion rate of olefin: 100%) was obtained.

The obtained epoxy-terminated ethylenic polymer (E-1) showed Mw=2,058, Mn=1,118 and Mw/Mn=1.84 (GPC) (content of terminal epoxy group: 90 mol %).

$^1$H-NMR: δ (C2D2C14) 0.88 (t, 3H, J=6.92 Hz), 1.18-1.66 (m), 2.38 (dd, 1H, J=2.64, 5.28 Hz), 2.66 (dd, 1H, J=4.29, 5.28 Hz), 2.80-2.87 (m, 1H)

Melting point (Tm): 121 degrees centigrade
Mw=2,058, Mn=1,118, Mw/Mn=1.84 (GPC)

84 parts by weight of the epoxy-terminated ethylenic polymer (E-1), 39.4 parts by weight of diethanolamine and 150 parts by weight of toluene were introduced into a 1,000-mL flask, and the system was stirred at 150 degrees centigrade for 4 hours. Thereafter, acetone was added while cooling the mixture to precipitate the reaction product, and the solids were collected by filtration. The obtained solids were stirred and washed with an aqueous acetone solution one time and further with acetone three times, and then the solids were collected by filtration. Thereafter, the solids were dried at room temperature under reduced pressure to obtain a polymer (I-1) (Mn: 1,223, in the general formula (9), A: a group formed by polymerization of ethylene (Mn: 1,075), $R^1=R^2=$a hydrogen atom, one of $Y^1$ and $Y^2$: a hydroxyl group, the other of $Y^1$ and $Y^2$: a bis(2-hydroxyethyl)amino group).

$^1$H-NMR: δ (C2D2C14) 0.88 (t, 3H, J=6.6 Hz), 0.95-1.92 (m), 2.38-2.85 (m, 6H), 3.54-3.71 (m, 5H)

Melting point (Tm): 121 degrees centigrade 20.0 parts by weight of the polymer (I-1) and 100 parts by weight of toluene were introduced into a 500-mL flask equipped with a nitrogen inlet tube, a thermometer, a condenser tube and a stirring rod, and the system was heated in an oil bath at 125 degrees centigrade with stirring to completely dissolve the solids. After cooling to 90 degrees centigrade, 0.323 parts by weight of 85% KOH that had been dissolved in 5.0 parts by weight of water in advance was added to the flask, and the contents were mixed under reflux condition for 2 hours. Subsequently, the temperature in the flask was slowly increased to 120 degrees centigrade, and water and toluene were distilled off. Water and toluene in the flask were further distilled off by reducing the pressure in the flask while supplying minimal nitrogen into the flask, increasing the internal temperature to 150 degrees centigrade, and then keeping the temperature for 4 hours. After cooling to room temperature, the solids solidified in the flask were broken and taken out.

18.0 parts by weight of the obtained solids and 200 parts by weight of dehydrated toluene were introduced into a 1.5-L stainless steel pressurized reactor equipped with a heating device, a stirring rod, a thermometer, a manometer and a safety valve, and after purging the gas phase with nitrogen, the system was heated to 130 degrees centigrade with stirring. After 30 minutes, 9.0 parts by weight of ethylene oxide was added thereto. After further maintaining at 130 degrees centigrade for 5 hours, the contents were cooled to room temperature to obtain a reactant. The solvent was removed by drying from the resulting reactant to obtain a terminally branched copolymer (T-1) (Mn: 1,835, in the general formula (1), A: a group formed by polymerization of ethylene (Mn: 1,075), $R^1$ and $R^2$: a hydrogen atom, one of $X^1$ and $X^2$: a group represented by the general formula (6) ($X^{11}$: a polyethylene glycol group), the other of $X^1$ and $X^2$: a group represented by the general formula (5) ($Q^1$ and $Q^2$: an ethylene group, $X^9$ and $X^{10}$: a polyethylene glycol group)).

$^1$H-NMR: δ (C2D2C14) 0.88 (3H, t, J=6.8 Hz), 1.06-1.50 (m), 2.80-3.20 (m), 3.33-3.72 (m)

Melting point (Tm): −16 degrees centigrade (polyethylene glycol), 116 degrees centigrade Preparation Example of Aqueous Dispersion of Terminally Branched Copolymer Preparation Example c1

Preparation of Aqueous Dispersion Solution of 10 weight % Polyolefin Based Terminally Branched Copolymer (T-1)

10 parts by weight of the polyolefin based terminally branched copolymer (T-1) constituting the polymer particles (A) of Synthesis Example c1 and 40 parts by weight of distilled water as the solvent (C) were charged to a 100-ml autoclave, and the system was heated with stirring at a rate of 800 rpm at 140 degrees centigrade for 30 minutes, and then cooled to room temperature while stirring. The average particle size of 50% by volume of the obtained dispersion system was 0.018 μm (average particle size of 10% by volume: 0.014 μm, average particle size of 90% by volume: 0.022 μm). The particle size of the obtained dispersion system measured by using a transmission electron microscope was from 0.015 to 0.030 μm. Furthermore, 75 parts by weight of distilled water was added to 75 parts by weight of this T-1 aqueous dispersion solution (solid content: 20 weight %), whereby a 10 weight % T-1 aqueous dispersion solution was obtained.

Example c1

Preparation of Solution of Polyolefin Based Terminally Branched Copolymer and TMOS Dehydrated Condensate 15 parts by weight of methanol as the solvent was added to 10 parts by weight of tetramethoxysilane (TMOS), and stirred at room temperature. 10 parts by weight of an aqueous solution of 0.1N hydrochloric acid as the catalyst was further added dropwise thereto, and then stirred at 50 degrees centigrade for 1 hour, whereby a TMOS dehydrated condensate was obtained.

16 parts by weight of an aqueous solution of 0.1N hydrochloric acid was further added dropwise to the obtained TMOS dehydrated condensate (to have the pH of 3 after addition of the polyolefin based terminally branched copolymer), and then stirred at room temperature. 39 parts by weight of an aqueous dispersion (solid content: 10 weight %) of the polyolefin based terminally branched copolymer (T-1) was further added dropwise thereto and stirred at room temperature, whereby a solution of the polyolefin based terminally branched copolymer and TMOS dehydrated condensate was prepared (weight ratio of the polyolefin based terminally branched copolymer to silica in terms of $SiO_2$: 50/50).

The silica content represents the proportion of silica contained in the composite film, and was calculated in the following method.

The silica content was calculated on the assumption that 100 weight % of TMOS as the component (B) in the above Example c1 reacted to become $SiO_2$.

Thus, from
TMOS: Mw=152,
$SiO_2$: Mw=60,
$SiO_2$/TMOS=60/152=0.395.

That is, the value obtained by multiplying the amount of TMOS by 0.395 is the $SiO_2$ content in the film.

Formation of Composite Particles of Polyolefin Based Terminally Branched Copolymer and Silica This composition was poured into a spray dryer apparatus (a spray dryer, ADL311S-A, a product of Yamato Scientific Co., Ltd.) at a flow rate of 6 cc/min and pressurized (2.6 kg/cm) at a nozzle outlet temperature of 120 degrees centigrade for spraying, whereby composite fine particles of the polyolefin based terminally branched copolymer and silica were obtained.

Formation of Porous Silica Particles (Filler)

The obtained composite particles of the polyolefin based terminally branched copolymer and silica was calcinated at 500 degrees centigrade for 1 hour using the electric furnace, whereby porous silica particles were obtained.

Furthermore, the particle size of porous silica particles was observed under the condition of 1.5 kV using a scanning electron microscope (SEM, JSM-6701F, commercially available from JEOL).

Hydrophobic treatment of Porous Silica Particles

The hydrophobic treatment was carried out by the chemical vapor adsorption (CVA) method using hexamethyldisilazane (HMDS). For CVA, 0.3 g of HMDS and 1.0 g of porous silica particles were put into a 300-ml PTFE pressure-resistant container, and reacted at 80 degrees centigrade for 2 hours.

Example c2

Porous silica particles were obtained in the same manner as in Example c1, except that the hydrophobic treatment of porous silica particles was not carried out.

Example c3

Preparation of Solution of Polyolefin Based Terminally Branched Copolymer and TMOS Dehydrated Condensate 15 parts by weight of methanol as the solvent was added to 10 parts by weight of tetramethoxysilane (TMOS), and stirred at room temperature. Furthermore, 1.0 weight part of an aqueous solution of 1N hydrochloric acid as the catalyst was added dropwise thereto, and then stirred at 50 degrees centigrade for 1 hour, whereby a TMOS dehydrated condensate was obtained.

2.5 parts by weight of an aqueous solution of 1N hydrochloric acid was further added dropwise to the obtained TMOS dehydrated condensate (to have the pH of 3 after addition of the polyolefin based terminally branched copolymer), and then stirred at room temperature. 58.5 parts by weight of an aqueous dispersion (solid content: 10 weight %) of the polyolefin based terminally branched copolymer (T-1) was further added dropwise thereto and stirred at room temperature, whereby a solution of the polyolefin based terminally branched copolymer and TMOS dehydrated condensate was prepared (weight ratio of the polyolefin based terminally branched copolymer to silica in terms of $SiO_2$: 60/40).

Formation of Composite Particles of Polyolefin Based Terminally Branched Copolymer and Silica Composite fine particles of the polyolefin based terminally branched copolymer and silica were obtained using this composition with a spray dryer apparatus in the same manner as in Example c1.

Formation of Porous Silica Particles

The obtained composite particles of the polyolefin based terminally branched copolymer and silica were calcinated at 500 degrees centigrade for 1 hour using the electric furnace, whereby porous silica particles were obtained.

Hydrophobic treatment of Porous Silica Particles

The hydrophobic treatment was carried out in the same manner as in Example c1.

Example c4

Porous silica particles were obtained in the same manner as in Example c3, except that the hydrophobic treatment of porous silica particles was not carried out.

Example c5

Preparation of Solution of Polyolefin Based Terminally Branched Copolymer and TMOS Dehydrated Condensate 15 parts by weight of methanol as the solvent was added to 10 parts by weight of tetramethoxysilane (TMOS), and stirred at room temperature. Furthermore, 1.0 weight part of an aqueous solution of 1N hydrochloric acid as the catalyst was added dropwise thereto, and then stirred at 50 degrees centigrade for 1 hour, whereby a TMOS dehydrated condensate was obtained.

3.4 parts by weight of an aqueous solution of 1N hydrochloric acid was further added dropwise to the obtained TMOS dehydrated condensate (to have the pH of 3 after addition of the polyolefin based terminally branched copolymer), and then stirred at room temperature. 72.4 parts by weight of an aqueous dispersion (solid content: 10 weight %) of the polyolefin based terminally branched copolymer (T-1) was further added dropwise thereto and stirred at room temperature, whereby a solution of the polyolefin based terminally branched copolymer and TMOS dehydrated condensate was prepared (weight ratio of the polyolefin based terminally branched copolymer to silica in terms of $SiO_2$: 65/35).

Formation of Composite Particles of Polyolefin Based Terminally Branched Copolymer and Silica Composite fine particles of the polyolefin based terminally branched copolymer and silica were obtained using this composition with a spray dryer apparatus in the same manner as in Example c1.

Formation of Porous Silica Particles

The obtained composite particles of the polyolefin based terminally branched copolymer and silica were calcinated using the electric furnace in the same method as in Example c1, whereby porous silica particles were obtained.

Hydrophobic treatment of Porous Silica Particles

The hydrophobic treatment was carried out in the same method as in Example c1.

Example c6

Porous silica particles were obtained in the same method as in Example c5, except that the hydrophobic treatment of porous silica particles was not carried out.

Comparative Example c1

Preparation of Solution of Surfactant Pluronic P123 and TEOS Dehydrated Condensate 12 parts by weight of ethanol as the solvent was added to 10.4 parts by weight of tetraethoxysilane (TEOS), and stirred at room temperature. Furthermore, 5.4 parts by weight of an aqueous solution of 0.01N hydrochloric acid as the catalyst was added dropwise thereto, and then stirred at 20 degrees centigrade for 20 minutes, whereby a TEOS dehydrated condensate was obtained. Meanwhile, a solution obtained by dissolving 2.75 parts by weight of Pluronic P123 in 8 parts by weight of additional ethanol was added dropwise thereto and stirred at room temperature, whereby a solution of P123 and TEOS dehydrated condensate was prepared (weight ratio of Pluronic P123 to silica in terms of $SiO_2$: 45/55).

Formation of Composite Particles of Surfactant Pluronic P123 and Silica

Composite fine particles of the polyolefin based terminally branched copolymer and silica were obtained using this composition with a spray dryer apparatus in the same method as in Example c1.

Formation of Porous Silica Particles

The composite particles of the surfactant Pluronic P123 and silica were calcinated using the electric furnace in the same as in Example c1, whereby porous silica particles were obtained.

Hydrophobic treatment of Porous Silica Particles

The hydrophobic treatment was carried out in the same method as in Example c1.

Comparative Example c2

Porous silica particles were obtained in the same method as in Comparative Example c1, except that the hydrophobic treatment of porous silica particles was not carried out.

Comparative Example c3

Non-porous silica particles (Admafine SO—C2: commercially available from Admatex Co., Ltd., average particle size: 0.4 to 0.6 μm) were used in Comparative Example c3.

Comparative Example c4

Non-porous silica particles of Comparative Example c3 were subjected to the hydrophobic treatment in the same method as in Example c1.

Porous bodies in Examples c1 to c6 and Comparative Example c1 obtained as described above were evaluated as follows.

1. Dielectric Constant

The dielectric constants of porous silica particles prepared in Examples c1 to c6 and Comparative Examples c1 and c2 and non-porous silica particles in Comparative Example c3 and c4 were measured in the following manner. Measurement was carried out by a four-terminal method according to a self-balancing bridge method. Teflon ring electrodes (main electrode diameter: 37 mm, guard electrode inner diameter: 39 mmφ, outer diameter: 55 mmφ) were filled with porous silica particles, set to a spring loaded electrode, and a load of 4 kgf was applied to measure the dielectric constant measured at 1 MHz under the conditions of a test atmosphere of 23 degrees centigrade and a humidity of 50% RH using a testing apparatus (PRECISION LCRmeter, HP4282A). The measurement results are shown in the following Table c1.

2. Pore Properties

Figure 20:
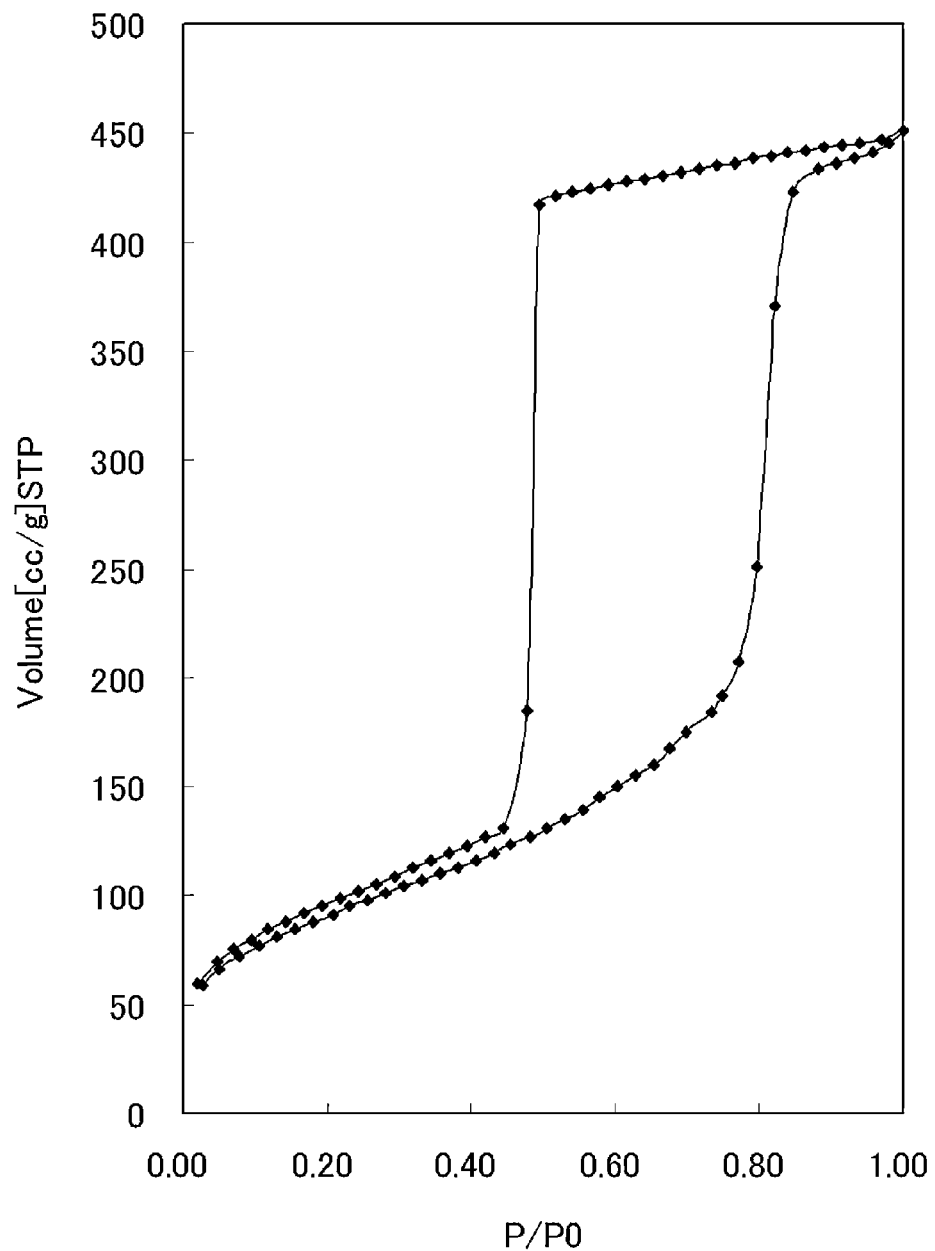
FIG. 20 is a graph illustrating a nitrogen adsorption isotherm curve of porous particles obtained in Example c6 by the BET method.
Figure 21:
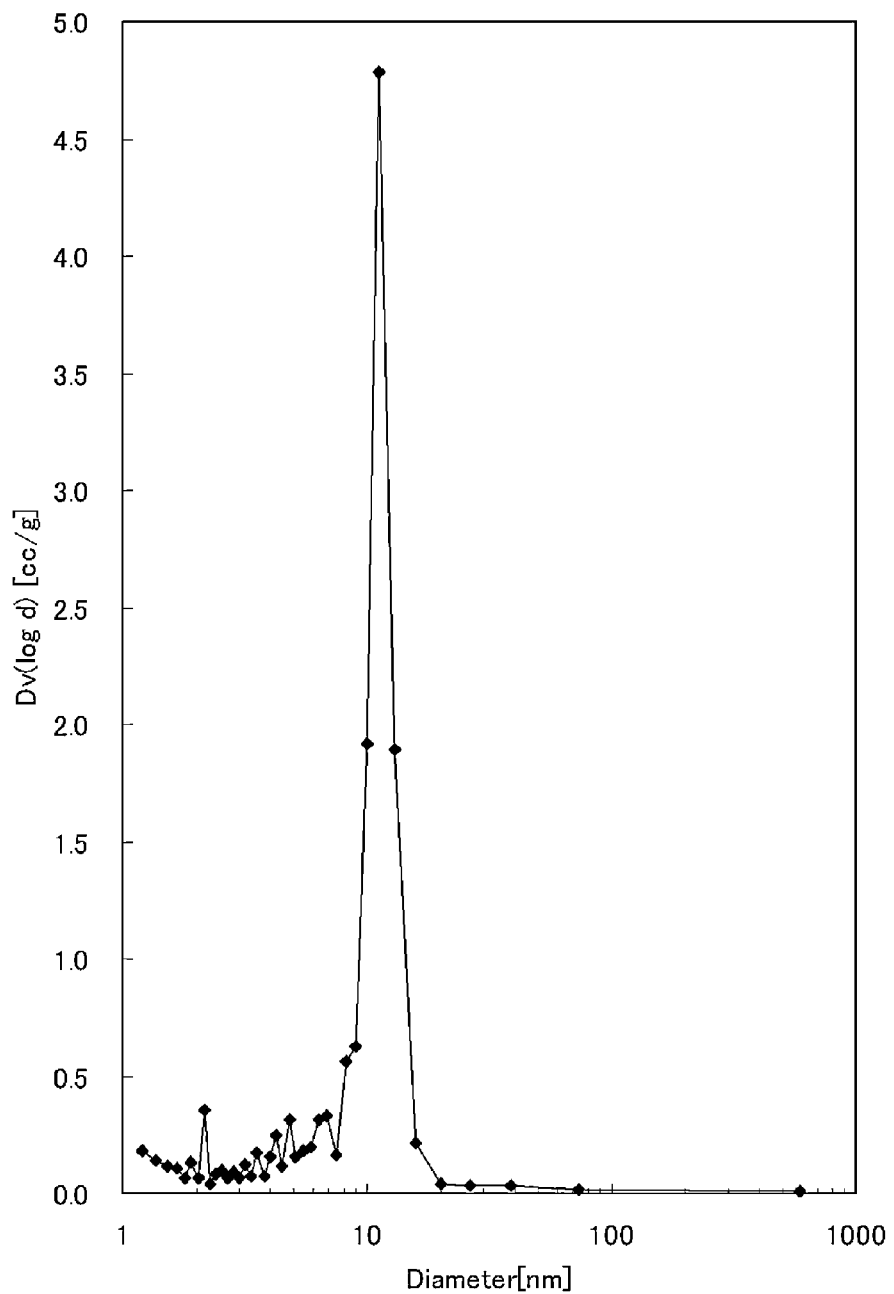
FIG. 21 is a graph illustrating a pore distribution curve of the porous particles obtained in Example c6 by the BJH method.

The porous silica particles prepared in Examples c1 to c6 and Comparative Examples c1 and c2 were subjected to a nitrogen adsorption-desorption measurement using autosorb 3 (a product of Quantachrome Instruments). The following Table c1 shows the specific surface areas and pore volumes measured by the Brunauer-Emmett-Teller (BET) method; the porosities calculated using pore volume values; the results from calculation of the pore distribution by the Barrett-Joyner-Halenda (BJH) method; and the values obtained by dividing the full width at half maximum at a maximum peak in a log differential pore volume distribution curve which was obtained by analyzing an adsorption curve of a nitrogen adsorption isotherm curve according to the BJH method by the average pore diameter. As typical examples, FIG. 20 shows a nitrogen adsorption isotherm curve of porous particles obtained in Example c6 by the BET method and FIG. 21 shows a pore distribution curve by the BJH method. Peaks of the differential pore volume distribution curve in Examples c1 to c6 were single peaks. On the other hand, peaks of the differential pore volume distribution curve in Comparative Examples c1 and c2 were multiple peaks.

Figure 19:
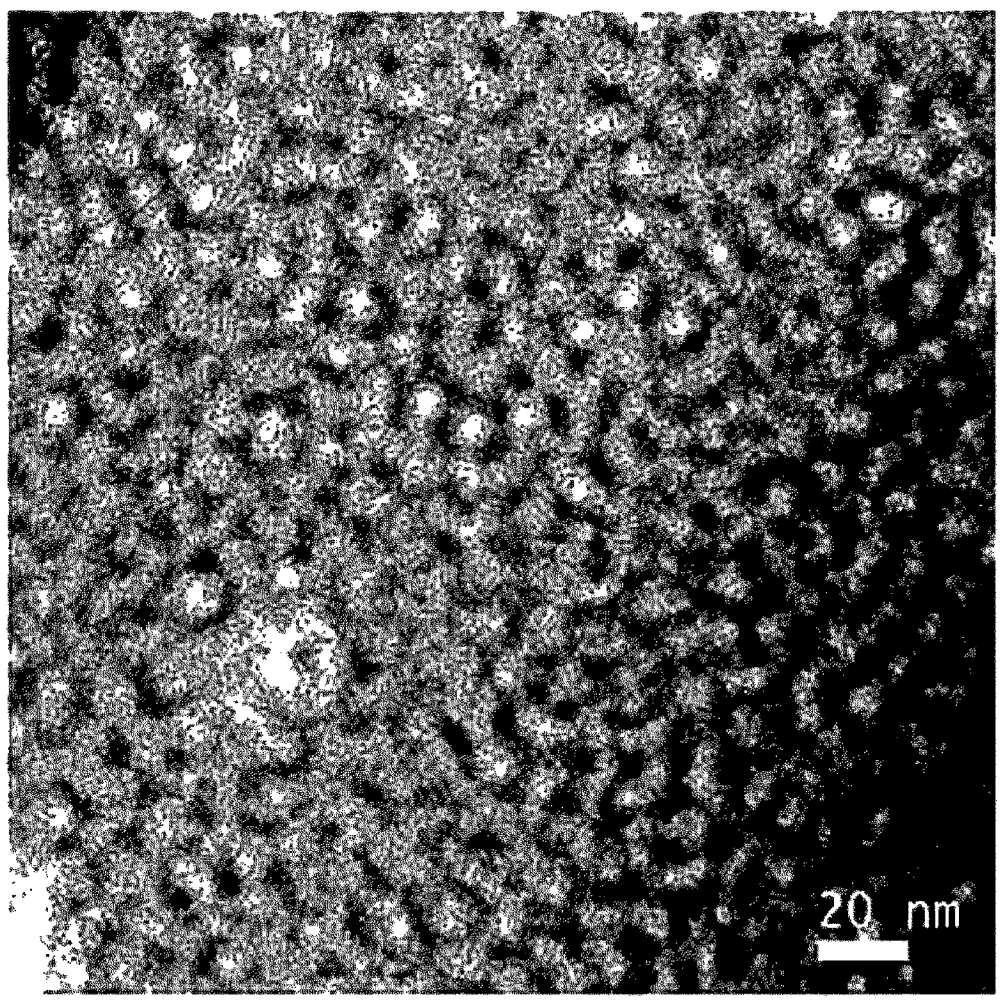
FIG. 19 is a TEM image of a cross section of porous particles prepared in Example c1.

3. Evaluation of Porous Structure (1) Evaluation of Mesoporous Structure Inside Film or Inside Particles The particles prepared in Examples c1 to c6 and Comparative Examples c1 and c2 were fixed with a resin, and cut into pieces by focused ion beam (FIB) processing. Subsequently, the shape of the cross section of this particle was observed under the condition of 200 kV using a transmission electron microscope (TEM, H-7650, commercially available from Hitachi, Ltd.). The evaluation results are shown in the following Table c1. FIG. 19 illustrates a TEM image of a cross section of porous particles obtained in Example c1.

○: A mesoporous structure having an average pore diameter of 5 to 30 nm is present and forms a cubic phase structure.

Δ: Although a mesoporous structure is present, the average pore diameter is out of the range of 5 to 30 nm or a cubic phase structure is not formed.

x: No mesoporous structure is present.

(2) Mesopores Inside Film

The average pore diameter of mesopores inside the film was calculated from an average value obtained by measuring pore diameters of randomly selected 20 pores under the condition of 200 kV using a transmission electron microscope (TEM, H-7650, commercially available from Hitachi, Ltd.).

In Examples c1 to c4, a cubic phase structure with mesopores having an average pore diameter of 25 nm was formed. In Examples c5 and c6, a cubic phase structure with mesopores having an average pore diameter of 19 nm was formed.

(3) X-Ray Diffraction Measurement

The X-ray diffraction measurement was carried out using powders comprising porous silica particles obtained in Example c1 as a sample.

It was confirmed that the resulting diffraction image had a plurality of annular patterns.

From this fact, it was found that porous silica particles obtained in Example c1 had a cubic phase structure.

Meanwhile, from the analysis results of the above annular patterns, a cubic phase structure in Example c1 was considered to be an Fm3m structure. The same results were obtained for porous silica particles obtained in Examples c2 to c6.

4. Evaluation of Breaking Strength

Loads of 500 kg/cm², 1,000 kg/cm² and 2,000 kg/cm² were added to porous particles prepared in Examples c1 to c6 and Comparative Examples c1 and c2, and particles in Comparative Examples c3 and c4, which were uniformly packed in 1 cm², and the shape retention ratio was observed under the condition of 1.5 kV using a scanning electron microscope (SEM, JSM-6701F, commercially available from JEOL). The results are shown in Table c1.

○: Shape retention ratio is not less than 80%.

Δ: Shape retention ratio is not less than 50% and less than 80%.

x: Shape retention ratio is less than 50%.

TABLE c1

| | Particle size (μm) | Hydrophobic treatment | 1. Dielectric constant |
|---|---|---|---|
| Example c1 | 1 to 5 | Yes | 1.92 |
| Example c2 | 1 to 5 | No | 1.63 |
| Example c3 | 1 to 5 | Yes | 1.88 |
| Example c4 | 1 to 5 | No | 1.52 |
| Example c5 | 1 to 5 | Yes | 1.76 |
| Example c6 | 1 to 5 | No | 1.38 |
| Comparative Example c1 | 1 to 5 | Yes | 2.63 |
| Comparative Example c2 | 1 to 5 | No | 1.92 |
| Comparative Example c3 | 0.4 to 0.6 | No | 4.92 |
| Comparative Example c4 | 0.4 to 0.6 | Yes | 4.28 |

| 2. Pore properties (nitrogen adsorption-desorption measurement) | | | | |
|---|---|---|---|---|
| | Specific surface area ($m^2/g$) | Pore volume (ml/g) | Porosity (%) | Pore diameter peak | Full width at half maximum in maximum peak of log differential pore volume distribution curve/average pore diameter |

| | Specific surface area ($m^2/g$) | Pore volume (ml/g) | Porosity (%) | Pore diameter peak | Full width at half maximum / average pore diameter |
|---|---|---|---|---|---|
| Example c1 | 148 | 0.32 | 39.0 | 11 nm | 0.27 |
| Example c2 | 153 | 0.33 | 40.0 | 11 nm | 0.28 |
| Example c3 | 272 | 0.55 | 52.4 | 11 nm | 0.23 |
| Example c4 | 280 | 0.59 | 54.1 | 11 nm | 0.23 |
| Example c5 | 324 | 0.68 | 57.6 | 11 nm | 0.23 |
| Example c6 | 330 | 0.71 | 58.7 | 11 nm | 0.23 |
| Comparative Example c1 | 696 | 0.63 | 55.8 | 4 to 6 nm (broad) | — |
| Comparative Example c2 | 723 | 0.62 | 55.4 | 4 to 6 nm (broad) | — |
| Comparative Example c3 | | | | | |
| Comparative Example c4 | | | | | |

| | 3. Porous structure | 4. Breaking strength ($kg/cm^2$) 500 | 1000 | 2000 |
|---|---|---|---|---|
| Example c1 | ○ | ○ | ○ | Δ |
| Example c2 | ○ | ○ | ○ | Δ |
| Example c3 | ○ | ○ | ○ | Δ |
| Example c4 | ○ | ○ | ○ | Δ |
| Example c5 | ○ | ○ | ○ | Δ |
| Example c6 | ○ | ○ | ○ | Δ |
| Comparative Example c1 | Δ | ○ | Δ | x |
| Comparative Example c2 | Δ | ○ | Δ | x |
| Comparative Example c3 | — | ○ | ○ | Δ |
| Comparative Example c4 | — | ○ | ○ | Δ |

Example D

Synthesis Example of Terminally Branched Copolymer

The number average molecular weight (Mn), the weight average molecular weight (Mw) and the molecular weight distribution (Mw/Mn) were measured using GPC according to the method as described herein. For the melting point (Tm), the peak top temperature obtained by measuring with DSC was used. Incidentally, the melting point of the polyalkylene glycol portion is also confirmed under the measurement conditions, but the melting point indicates the melting point of the polyolefin portion unless otherwise particularly noted. The measurement by $^1$H-NMR was carried out at 120 degrees centigrade after completely dissolving the polymer in deuterated-1,1,2,2-tetrachloroethane, which functioned both as the lock solvent and the solvent, in a sample tube for measurement. For the chemical shift, the peak of deuterated-1,1,2,2-tetrachloroethane was set at 5.92 ppm, and the chemical shift values of other peaks were determined on this basis. For the particle size of the particles in the dispersion solution, the average particle size of 50% by volume was measured with a Microtrack UPA (a product of Honeywell, Inc.). The shape of the particles in the dispersion solution was observed under the condition of 100 kV with a transmission electron microscope (TEM, H-7650, commercially available from Hitachi, Ltd.), after diluting the sample by 200 to 500 times and performing negative staining with phosphotungstic acid.

Synthesis Example d1

Synthesis of Polyolefin Based Terminally Branched Copolymer (T-1)

In accordance with the following procedure (see, for example, Synthesis Example 2 of Japanese Laid-open Patent Publication No. 2006-131870), an epoxy-terminated ethylenic polymer (E-1) was synthesized.

To a 2000-ml stainless steel autoclave thoroughly purged with nitrogen, 1,000 ml of heptane was charged at room temperature, and the system was heated to 150 degrees centigrade. Subsequently, the autoclave was pressurized with ethylene to 30 kg/cm$^2$G and the temperature was maintained. To the autoclave, 0.5 ml (0.5 mmol) of a hexane solution (1.00 mmol/ml in terms of aluminum atoms) of MMAO (a product of Tosoh Finechem Corporation) was fed with pressure, and then 0.5 ml (0.0001 mmol) of a toluene solution (0.0002 mmol/ml) of a compound of the following formula was fed with pressure to initiate polymerization. Under an ethylene gas atmosphere, polymerization was carried out at 150 degrees centigrade for 30 minutes, and then the polymerization was terminated by feeding a small amount of methanol with pressure. The obtained polymer solution was added to 3 liters of methanol containing a small amount of hydrochloric acid to precipitate out the polymer. The polymer was washed with methanol, and then dried at 80 degrees centigrade under reduced pressure for 10 hours, whereby a double bond-terminated ethylenic polymer (P-1) was obtained.

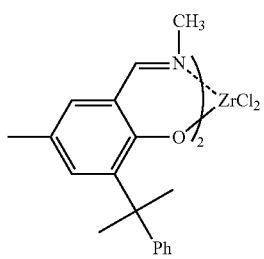

100 g of the double bond-terminated ethylenic polymer (P-1) (108 mmol of vinyl group in terms of Mn 850), 300 g of toluene, 0.85 g (2.6 mmol) of Na WO$_4$, 0.60 g (1.3 mmol) of CH$_3$(nC$_8$H$_{17}$)$_3$NHSO$_4$ and 0.11 g (1.3 mmol) of phosphoric acid were introduced into a 500-mL separable flask, and the system was heated under reflux with stirring for 30 minutes to completely melt the polymer product. After adjusting the internal temperature to 90 degrees centigrade, 37 g (326 mmol) of aqueous 30% hydrogen peroxide was added dropwise over 3 hours and then stirred at an internal temperature of 90 to 92 degrees centigrade for 3 hours. Thereafter, with the temperature being maintained at 90 degrees centigrade, 34.4 g (54.4 mmol) of an aqueous solution of 25% sodium thiosulfate was added and stirred for 30 minutes, and it was confirmed that the peroxide in the reaction system was completely decomposed with a peroxide test paper. Subsequently, at an internal temperature of 90 degrees centigrade, 200 g of dioxane was added to crystallize the product, and the solids were collected by filtration and washed with dioxane. The obtained solids were stirred in an aqueous solution of 50% methanol at room temperature, and the solids were collected by filtration and washed with methanol. The aforementioned solids were further stirred in 400 g of methanol, collected by filtration and washed with methanol. The solids were dried at room temperature under reduced pressure of 1 to 2 hPa, whereby 96.3 g of an epoxy-terminated ethylenic polymer (E-1) as a white solid (yield: 99%, conversion rate of olefin: 100%) was obtained.

The obtained epoxy-terminated ethylenic polymer (E-1) showed Mw=2,058, Mn=1,118 and Mw/Mn=1.84 (GPC) (content of terminal epoxy group: 90 mol %).

$^1$H-NMR: δ (C2D2C14) 0.88 (t, 3H, J=6.92 Hz), 1.18-1.66 (m), 2.38 (dd, 1H, J=2.64, 5.28 Hz), 2.66 (dd, 1H, J=4.29, 5.28 Hz), 2.80-2.87 (m, 1H)

Melting point (Tm): 121 degrees centigrade

Mw=2,058, Mn=1,118, Mw/Mn=1.84 (GPC)

84 parts by weight of the epoxy-terminated ethylenic polymer (E-1), 39.4 parts by weight of diethanolamine and 150 parts by weight of toluene were introduced into a 1,000-mL flask, and the system was stirred at 150 degrees centigrade for 4 hours. Thereafter, acetone was added while cooling the mixture to precipitate the reaction product, and the solids were collected by filtration. The obtained solids were stirred and washed with an aqueous acetone solution one time and further with acetone three times, and then the solids were collected by filtration.

Thereafter, the solids were dried at room temperature under reduced pressure to obtain a polymer (I-1) (Mn: 1,223, in the general formula (9), A: a group formed by polymerization of ethylene (Mn: 1,075), R$^1$=R$^2$=a hydrogen atom, one of Y$^1$ and Y$^2$: a hydroxyl group, the other of Y$^1$ and Y$^2$: a bis(2-hydroxyethyl)amino group).

$^1$H-NMR: δ (C2D2C14) 0.88 (t, 3H, J=6.6 Hz), 0.95-1.92 (m), 2.38-2.85 (m, 6H), 3.54-3.71 (m, 5H)

Melting point (Tm): 121 degrees centigrade 20.0 parts by weight of the polymer (I-1) and 100 parts by weight of toluene were introduced into a 500-mL flask equipped with a nitrogen inlet tube, a thermometer, a condenser and a stirring rod, and the system was heated in an oil bath at 125 degrees centigrade with stirring to completely dissolve the solids. After cooling to 90 degrees centigrade, 0.323 parts by weight of 85% KOH that had been dissolved in 5.0 parts by weight of water in advance was added to the flask, and the contents were mixed under reflux condition for 2 hours. Subsequently, the temperature in the flask was slowly increased to 120 degrees centigrade, and water and toluene were distilled off. Water and toluene in the flask were further distilled off by reducing the pressure in the flask while supplying minimal nitrogen into the flask, increasing the internal temperature to 150 degrees centigrade, and then keeping the temperature for 4 hours. After cooling to room temperature, the solids solidified in the flask were broken and taken out.

18.0 parts by weight of the obtained solids and 200 parts by weight of dehydrated toluene were introduced into a 1.5-L stainless steel pressurized reactor equipped with a heating device, a stirring rod, a thermometer, a manometer and a safety valve, and after purging the gas phase with nitrogen, the system was heated to 130 degrees centigrade with stirring. After 30 minutes, 9.0 parts by weight of ethylene oxide was added thereto. After further maintaining at 130 degrees centigrade for 5 hours, the contents were cooled to room temperature to obtain a reactant. The solvent was removed by drying from the resulting reactant to obtain a terminally branched copolymer (T-1) (Mn: 1,835, in the general formula (1), A: a group formed by polymerization of ethylene (Mn: 1,075), R$^1$ and R$^2$: a hydrogen atom, one of X$^1$ and X$^2$: a group represented by the general formula (6) (X$^{11}$: a polyethylene glycol group), the other of X$^1$ and X$^2$: a group represented by the general formula (5) (Q$^1$ and Q$^2$: an ethylene group, X$^9$ and X$^{10}$: a polyethylene glycol group)).

$^1$H-NMR: δ (C2D2C14) 0.88 (3H, t, J=6.8 Hz), 1.06-1.50 (m), 2.80-3.20 (m), 3.33-3.72 (m)

Melting point (Tm): −16 degrees centigrade (polyethylene glycol), 116 degrees centigrade Synthesis Example d2

A terminally branched copolymer (T-2) (Mn=2,446) was obtained in the same manner as in Synthesis Example d1, except that the amount of ethylene oxide in use was changed to 18.0 parts by weight.

Melting point (Tm): 27 degrees centigrade (polyethylene glycol), 118 degrees centigrade Synthesis Example d3

A terminally branched copolymer (T-3) (Mn=3,669) was obtained in the same manner as in Synthesis Example d1, except that the amount of ethylene oxide in use was changed to 36.0 parts by weight.

Melting point (Tm): 50 degrees centigrade (polyethylene glycol), 116 degrees centigrade Synthesis Example d4

A terminally branched copolymer (T-4) (Mn=6,115) was obtained in the same manner as in Synthesis Example d1, except that the amount of ethylene oxide in use was changed to 72.0 parts by weight.

Melting point (Tm): 55 degrees centigrade (polyethylene glycol), 116 degrees centigrade Preparation Example of Aqueous Dispersion of Terminally Branched Copolymer Preparation Example d1

Preparation of Aqueous Dispersion Solution of 10 weight % Polyolefin Based Terminally Branched Copolymer (T-1)

10 parts by weight of the polyolefin based terminally branched copolymer (T-1) constituting the polymer particles (A) of Synthesis Example d1 and 40 parts by weight of distilled water as the solvent (C) were charged to a 100-ml autoclave, and the system was heated with stirring at a rate of 800 rpm at 140 degrees centigrade for 30 minutes, and then cooled to room temperature while stirring. The average particle size of 50% by volume of the obtained dispersion system was 0.018 µm (average particle size of 10% by volume: 0.014 µm, average particle size of 90% by volume: 0.022 µm). The particle size of the obtained dispersion system measured by using a transmission electron microscope was from 0.015 to 0.030 µm. Furthermore, 75 parts by weight of distilled water was added to 75 parts by weight of this T-1 aqueous dispersion solution (solid content: 20 weight %), whereby a 10 weight % T-1 aqueous dispersion solution was obtained.

Preparation Examples d2 to d4

10 weight % of aqueous dispersion solutions of T-2 to T-4 were obtained in the same manner as in Preparation Example d1, except that the polyolefin based terminally branched copolymer (T-1) was changed to (T-2) to (T-4).

(T-2): The average particle size of 50% by volume of the obtained dispersion system was 0.017 µm (average particle size of 10% by volume: 0.013 µm, average particle size of 90% by volume: 0.024 µm).

(T-3): The average particle size of 50% by volume of the obtained dispersion system was 0.015 µm (average particle size of 10% by volume: 0.012 µm, average particle size of 90% by volume: 0.028 µm).

(T-4): The average particle size of 50% by volume of the obtained dispersion system was 0.019 µm (average particle size of 10% by volume: 0.014 µm, average particle size of 90% by volume: 0.049 µm).

Example d1

Preparation of Solution of Polyolefin Based Terminally Branched Copolymer and TMOS Dehydrated Condensate 0.25 parts by weight of methanol as the solvent was added to 0.5 parts by weight of tetramethoxysilane (TMOS), and stirred at room temperature. Furthermore, 0.5 parts by weight of an aqueous solution of 0.1N hydrochloric acid as the catalyst was added dropwise thereto, and then stirred at 50 degrees centigrade for 1 hour, whereby a TMOS dehydrated condensate was obtained.

Figure 22:
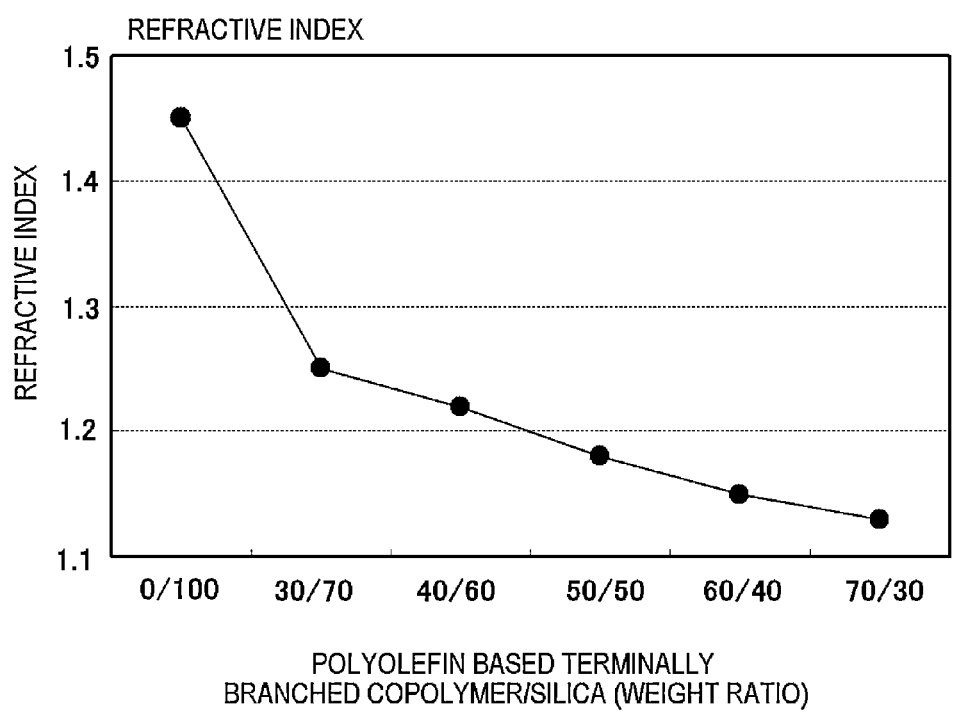
FIG. 22 illustrates a change in the refractive index when the ratio of the polyolefin based terminally branched copolymer to silica is changed in Example d1.

An aqueous solution of 0.1N hydrochloric acid was further added dropwise to the obtained TMOS dehydrated condensate (to have the pH of 3 after addition of the polyolefin based terminally branched copolymer), and then stirred at room temperature. An aqueous dispersion (solid content: 10 weight %) of the polyolefin based terminally branched copolymer (T-1) was further added dropwise thereto and stirred at room temperature, whereby a solution of the polyolefin based terminally branched copolymer and the TMOS dehydrated condensate was prepared. The solution was prepared with parts by weight in Table d1 such that the weight ratio of the polyolefin based terminally branched copolymer to silica (in terms of $SiO_2$) was from 30/70 to 70/30. FIG. 22 illustrates a change in the refractive index when the ratio of the polyolefin based terminally branched copolymer to silica was changed in Example d1.

The silica content represents the proportion of silica contained in the composite film, and was calculated in the following method.

The silica content was calculated on the assumption that 100 weight % of TMOS as the component (B) in the above Example d1 reacted to become $SiO_2$.

Thus, from

TMOS: Mw=152, $SiO_2$: Mw=60, $SiO_2$/TMOS=60/152=0.395.

That is, the value obtained by multiplying the amount of TMOS by 0.395 is the $SiO_2$ content in the film.

Formation of Composite Film of Polyolefin Based Terminally Branched Copolymer and Silica The obtained solution was spin-coated on a silicon substrate and a glass substrate, and heated at 110 degrees centigrade for 1.5 hours, whereby a composite film of the polyolefin based terminally branched copolymer and silica having a film thickness of 150 to 400 nm was obtained.

Formation of Silica Porous Body

The obtained composite film of the polyolefin based terminally branched copolymer and silica was calcinated at 500 degrees centigrade for 1 hour using the electric furnace, whereby a film formed from a silica porous body having a thickness of 100 to 400 nm was obtained.

Furthermore, the film thickness of the composite film and the film thickness of the silica porous body were measured using an ellipsometer (JASCO M-150).

Examples d2 to d4

Solutions were prepared with parts by weight in Table d1 in the same manner as in Example d1, except that the polyolefin based terminally branched copolymer (T-1) was changed to (T-2)~(T-4) to prepare a composite film of the polyolefin based terminally branched copolymer and silica. Then, the composite film was calcinated at 500 degrees centigrade for 1 hour, whereby a film comprising a silica porous body having a film thickness of 100 to 400 nm was obtained.

Comparative Example d1

0.25 parts by weight of methanol as the solvent was added to 0.5 parts by weight of tetramethoxysilane (TMOS), and stirred at room temperature. 0.5 parts by weight of an aqueous solution of 0.1N hydrochloric acid as the catalyst was further added dropwise thereto, and then stirred at 50 degrees centigrade for 1 hour, whereby a solution of the TMOS dehydrated condensate was obtained. The obtained solution was spin-coated on a silicon substrate and a glass substrate, and heated at 110 degrees centigrade for 1.5 hours.

Comparative Example d2

Preparation of Solution of Surfactant Pluronic P123 and TEOS Dehydrated Condensate 1.2 parts by weight of ethanol as the solvent was added to 1.04 parts by weight of tetraethoxysilane (TEOS), and stirred at room temperature. 0.54 parts by weight of an aqueous solution of 0.01N hydrochloric acid as the catalyst was further added thereto, and then stirred at 20 degrees centigrade for 20 minutes, whereby a TEOS dehydrated condensate was obtained. Meanwhile, a solution obtained by dissolving 0.275 parts by weight of Pluronic P123 in 0.8 parts by weight of additional ethanol was added dropwise thereto and stirred at room temperature, whereby a solution of P123 and TEOS dehydrated condensate was prepared.

Formation of Composite Film of Surfactant Pluronic P123 and Silica

The obtained solution was spin-coated on a silicon substrate and a glass substrate, and dried at 35 degrees centigrade for 10 minutes, whereby a composite film of P123 and silica having a film thickness of 200 nm was obtained (weight ratio of P123 to $SiO_2$: 45/55).

Formation of Silica Porous Body

The obtained composite film of the polyolefin based terminally branched copolymer and silica was calcinated at 400 degrees centigrade for 1 hour using the electric furnace, whereby a porous silica film having a thickness of 150 nm was obtained.

Comparative Example d3

Preparation of Solution of Surfactant Pluronic P123 and TEOS Dehydrated Condensate 1.2 parts by weight of ethanol as the solvent was added to 1.04 parts by weight of tetraethoxysilane (TEOS), and stirred at room temperature. 0.54 parts by weight of an aqueous solution of 0.01N hydrochloric acid as the catalyst was further added dropwise thereto, and then stirred at 20 degrees centigrade for 20 minutes, whereby a TEOS dehydrated condensate was obtained. Meanwhile, a solution obtained by dissolving 0.17 parts by weight of Pluronic P123 in 0.8 parts by weight of additional ethanol was added dropwise thereto and stirred at room temperature, whereby a solution of P123 and TEOS dehydrated condensate was prepared.

Formation of Composite Film of Surfactant Pluronic P123 and Silica

The obtained solution was spin-coated on a silicon substrate and a glass substrate, and dried at 35 degrees centigrade for 10 minutes, whereby a composite film of P123 and silica having a film thickness of 200 nm was obtained (weight ratio of P123 to $SiO_2$: 35/65).

Formation of Silica Porous Body

The obtained composite film of the polyolefin based terminally branched copolymer and silica was calcinated at 400 degrees centigrade for 1 hour using the electric furnace, whereby a porous silica film having a thickness of 150 nm was obtained.

TABLE d1

| | Polyolefin based terminally branched copolymer/silica composite film, porous silica film precursor solution | | | | | | Film | |
|---|---|---|---|---|---|---|---|---|
| | Polyolefin based terminally branched copolymer/silica (weight ratio) | TMOS dehydrated condensate | | 0.1N aqueous hydrochloric acid (pH control) (parts by weight) | Polyolefin based terminally branched copolymer (10 wt % aqueous solution) (parts by weight) | | thickness of polyolefin based terminally branched copolymer/silica composite film (nm) | Film thickness of silica porous body (nm) |
| | | TMOS (parts by weight) | MeOH (parts by weight) | 0.1N aqueous hydrochloric acid (parts by weight) | | | | |
| Example d1 | 30/70 | 0.5 | 0.25 | 0.5 | 0 | T-1 | 0.8 | 389 | 352 |
| | 40/60 | | | | 0.4 | | 1.3 | 240 | 216 |
| | 50/50 | | | | 0.8 | | 1.95 | 224 | 191 |
| | 60/40 | | | | 1.4 | | 2.92 | 236 | 172 |
| | 70/30 | | | | 2 | | 4.56 | 183 | 116 |
| Example d2 | 30/70 | 0.5 | 0.25 | 0.5 | 0 | T-2 | 0.8 | 347 | 274 |
| | 40/60 | | | | 0.4 | | 1.3 | 265 | 205 |
| | 50/50 | | | | 0.8 | | 1.95 | 247 | 190 |
| | 60/40 | | | | 1.4 | | 2.92 | 236 | 168 |
| | 70/30 | | | | 2 | | 4.56 | 183 | 114 |

TABLE d1-continued

| | Polyolefin based terminally branched copolymer/silica (weight ratio) | TMOS (parts by weight) | MeOH (parts by weight) | 0.1N aqueous hydrochloric acid (parts by weight) | 0.1N aqueous hydrochloric acid (pH control) (parts by weight) | Polyolefin based terminally branched copolymer (10 wt % aqueous solution) (parts by weight) | | thickness of polyolefin based terminally branched copolymer/ silica composite film (nm) | Film thickness of silica porous body (nm) |
|---|---|---|---|---|---|---|---|---|---|
| Example d3 | 30/70 | 0.5 | 0.25 | 0.5 | 0 | T-3 | 0.8 | 326 | 244 |
| | 40/60 | | | | 0.4 | | 1.3 | 241 | 180 |
| | 50/50 | | | | 0.8 | | 1.95 | 216 | 162 |
| | 60/40 | | | | 1.4 | | 2.92 | 230 | 157 |
| | 70/30 | | | | 2 | | 4.56 | 190 | 115 |
| Example d4 | 30/70 | 0.5 | 0.25 | 0.5 | 0 | T-4 | 0.8 | 361 | 274 |
| | 40/60 | | | | 0.4 | | 1.3 | 285 | 189 |
| | 50/50 | | | | 0.8 | | 1.95 | 258 | 167 |
| | 60/40 | | | | 1.4 | | 2.92 | 268 | 162 |
| | 70/30 | | | | 2 | | 4.56 | 225 | 117 |

Porous bodies in Examples d1 to d4 and Comparative Examples d1 to d3 obtained as described above were evaluated in the following manner.

1. Film Quality

Films each prepared in Examples d1 to d4 and Comparative Examples d1 to d3 were observed with naked eyes and with an optical microscope (450 magnifications).

The evaluation results are shown in the following Table d2. The evaluation criteria are as follows.

⊙: No defects such as cracks or the like were found by observation with naked eyes and observation with an optical microscope.

○: No defects such as cracks or the like were found by observation with naked eyes, but defects were found by observation with an optical microscope in a part of the film.

Δ: No defects such as cracks or the like were found by observation with naked eyes, but defects were found by observation with an optical microscope in the entire film.

x: Defects such as cracks or the like were observed with naked eyes.

2. Transmittance

For the films each prepared on a glass substrate in Examples d1 to d4 and Comparative Examples d1 to d3, the transmittance was measured in the wavelength range of 400 to 600 nm using a UV spectrophotometer UV2200, commercially available from Shimadzu Corporation. The evaluation results are shown in the following Table d2.

⊙: Transmittance is not less than 85% in the wavelength range of 400 to 600 nm.

○: Transmittance is not less than 80% and less than 85% in the wavelength range of 400 to 600 nm.

Δ: Transmittance is not less than 70% and less than 80% in the wavelength range of 400 to 600 nm x: Transmittance is less than 70% in the wavelength range of 400 to 600 nm.

TABLE d2

| | Organic compound (template)/ metal oxide (weight ratio) | Organic compound (template) | Metal oxide species | Evaluation results Film quality | Transmittance |
|---|---|---|---|---|---|
| Example d1 | 30/70 | T-1 | $SiO_2$ | ⊙ | ⊙ |
| | 40/60 | | | ⊙ | ⊙ |
| | 50/50 | | | ⊙ | ⊙ |
| | 60/40 | | | ⊙ | ⊙ |
| | 70/30 | | | ⊙ | ⊙ |
| Example d2 | 30/70 | T-2 | $SiO_2$ | ⊙ | ⊙ |
| | 40/60 | | | ⊙ | ⊙ |
| | 50/50 | | | ⊙ | ⊙ |
| | 60/40 | | | ⊙ | ⊙ |
| | 70/30 | | | ⊙ | ⊙ |
| Example d3 | 30/70 | T-3 | $SiO_2$ | ⊙ | ⊙ |
| | 40/60 | | | ⊙ | ⊙ |
| | 50/50 | | | ⊙ | ⊙ |
| | 60/40 | | | ⊙ | ⊙ |
| | 70/30 | | | ⊙ | ⊙ |
| Example d4 | 30/70 | T-4 | $SiO_2$ | ⊙ | ⊙ |
| | 40/60 | | | ⊙ | ⊙ |
| | 50/50 | | | ⊙ | ⊙ |
| | 60/40 | | | ⊙ | ⊙ |
| | 70/30 | | | ⊙ | ⊙ |
| Comparative Example d1 | 0/100 | — | $SiO_2$ | x | ○ |
| Comparative Example d2 | 45/55 | Pluronic P123 | $SiO_2$ | ⊙ | ○ |
| Comparative Example d3 | 35/65 | Pluronic P123 | $SiO_2$ | ⊙ | ○ |

In all Examples d1 to d4, both film quality and transmittance were excellent. On the other hand, in Comparative Examples d1 and d2, micro crack was observed. In Comparative Example d3, the film quality was excellent, whereas the transmittance was low.

3. Refractive Index

In Examples d1 to d4 and Comparative Example d1, the refractive index in 590 nm of the film prepared on a silicon substrate was measured using an ellipsometer (JASCO M-150). The results are shown in Table d3.

TABLE d3

| Polyolefin based terminally branched copolymer/silica (weight ratio) | Example d1 500° C. 1 hr | Example d2 500° C. 1 hr | Example d3 500° C. 1 hr | Example d4 500° C. 1 hr | Comparative Example d1 500° C. 1 hr |
|---|---|---|---|---|---|
| 30/70 | 1.25 | 1.29 | 1.33 | 1.36 | — |
| 40/60 | 1.22 | 1.21 | 1.29 | 1.36 | — |
| 50/50 | 1.18 | 1.18 | 1.22 | 1.28 | — |
| 60/40 | 1.15 | 1.17 | 1.17 | 1.21 | — |
| 70/30 | 1.13 | 1.14 | 1.13 | 1.16 | — |
| 0/100 | — | — | — | — | 1.45 |

4. Mechanical Strength of Film

The weight ratio of the polyolefin based terminally branched copolymer to $SiO_2$ of 50/50 in Example d1 and the mechanical strength of the film formed on a silicon substrate in Comparative Example d3 were measured using a nano indenter, Nano Indenter DCM, commercially available from MTS Corporation. The results are shown in Table d4. The elastic modulus and the hardness value were calculated using the values in the region at an indentation depth of not more than 1/10 film thickness.

TABLE d4

| | Elastic modulus (GPa) | Hardness (GPa) |
|---|---|---|
| Example d1 | 11.2 | 0.73 |
| Comparative Example d3 | 6.3 | 0.43 |

5. Evaluation of Porous Structure

Films and particles prepared in Examples d1 to d4 and Comparative Examples d1 to d3 were observed in the following manner.

(1) Mesoporous Structure of Film Surface

Figure 23:
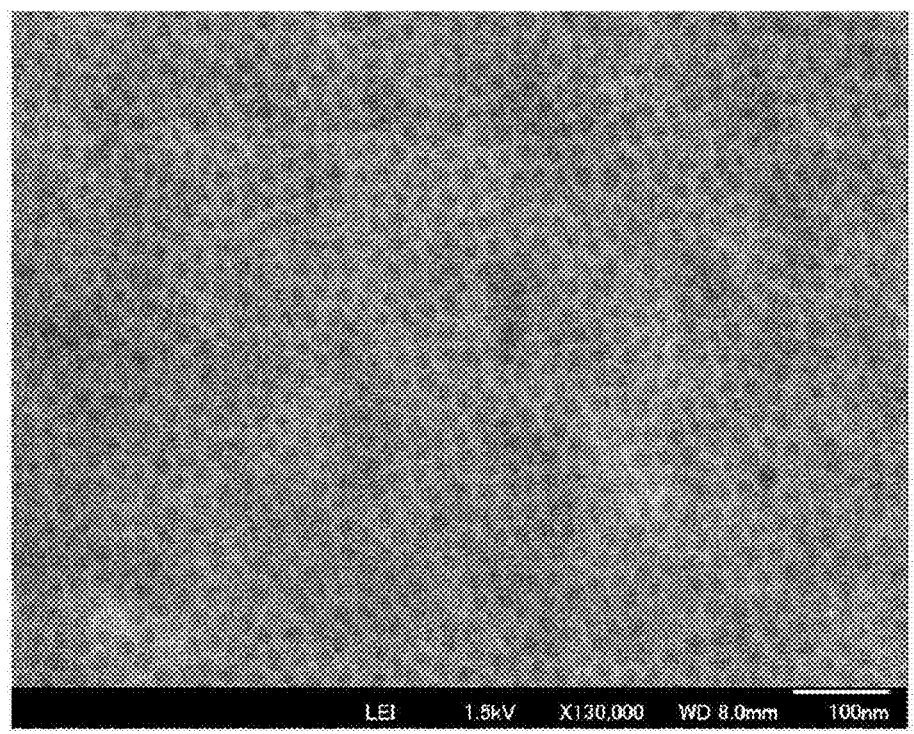
FIG. 23 illustrates a SEM image of a surface of a film prepared in Example d1 (weight ratio of polyolefin based terminally branched copolymer to $SiO_2$: 70/30).

Surfaces of the films prepared in Examples d1 to d4 and Comparative Examples d1 to d3 were observed under the condition of 1.5 kV using a scanning electron microscope (SEM, JSM-6701F, commercially available from JEOL). The evaluation results are shown in the following Table d5 according to the following criteria. Also, a SEM image of the film surface in Example d1 is shown in FIG. 23.

Evaluation of Mesoporous Structure of Film Surface

◯: A mesoporous structure having an minimum average pore diameter of 5 to 30 nm is present.

Δ: Although a mesoporous structure is present, the minimum average pore diameter is out of the range of 5 to 30 nm.

x: No mesoporous structure is present.

(2) Pore Diameter of Mesopores of Film Surface

The pore diameter of mesopores of the film surface was calculated from an average value obtained by measuring pore diameters of randomly selected 20 pores under the condition of 1.5 kV using a scanning electron microscope (SEM, JSM-6701F, commercially available from JEOL). The results are shown in Table d5.

(3) Mesoporous Structure Inside Film

Figure 24:
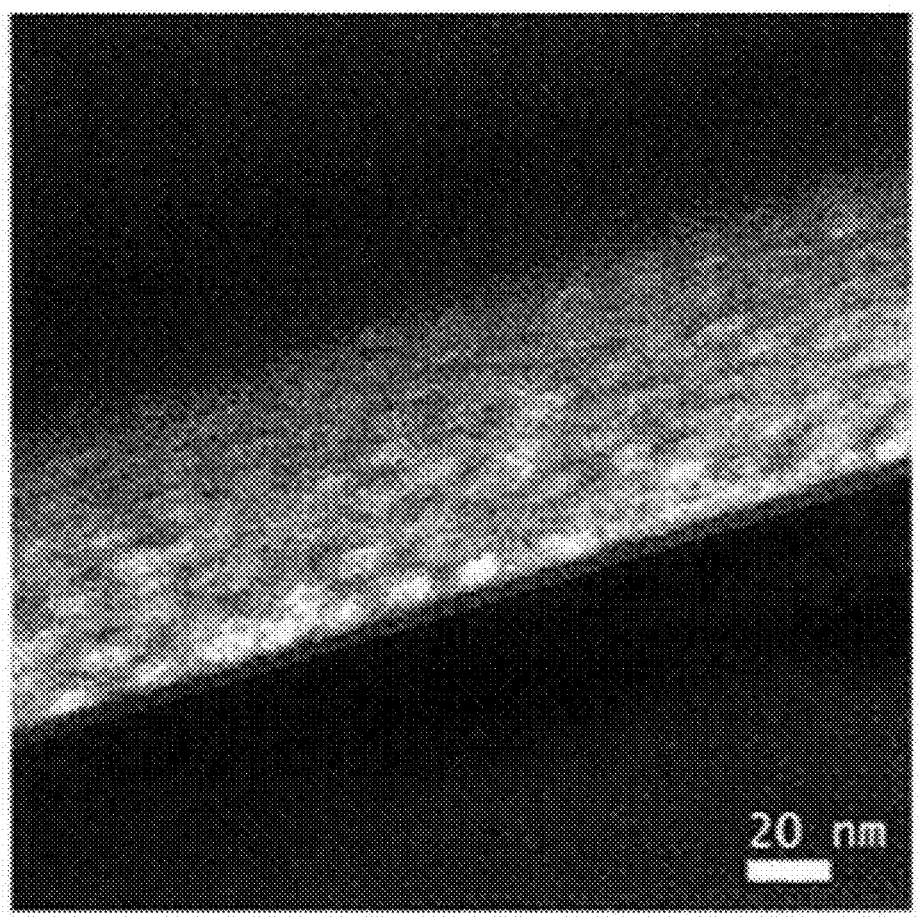
FIG. 24 illustrates a TEM image inside the film prepared in Example d1 (weight ratio of polyolefin based terminally branched copolymer to $SiO_2$: 70/30).

The films prepared in Examples d1 to d4 and Comparative Examples d1 to d3 were fixed with a resin, and cut into pieces by focused ion beam (FIB) processing. Subsequently, the shape of the cross section of this film was observed under the condition of 200 kV using a transmission electron microscope (TEM, H-7650, commercially available from Hitachi, Ltd.). The evaluation results are shown in the following Table d5. A TEM image of Example d1 (weight ratio of the polyolefin based terminally branched copolymer to $SiO_2$: 70/30) is shown in FIG. 24.

Evaluation of Mesoporous Structure Inside Film

◯: A mesoporous structure having an average pore diameter of 5 to 30 nm is present and forms a cubic phase structure.

Δ: Although a mesoporous structure is present, the average pore diameter is out of the range of 5 to 30 nm or a cubic phase structure is not formed.

x: No mesoporous structure is present.

(4) Mesopores Inside Film

The pore diameter of mesopores inside the film was calculated from an average value obtained by measuring pore diameters of randomly selected 20 pores under the condition of 200 kV using a transmission electron microscope (TEM, H-7650, commercially available from Hitachi, Ltd.). As a result, as shown in the following Table d5, a cubic phase structure with mesopores having a pore diameter of 5 to 30 nm was formed.

(3) X-Ray Diffraction Measurement

A film comprising the silica porous body obtained in Example d1 (weight ratio of the polyolefin based terminally branched copolymer to $SiO_2$: 50/50) was used as a sample, and small-angle X-ray diffraction (SAXS) measurement was carried out.

It was confirmed that the resulting diffraction image had a plurality of annular patterns.

From this fact, it was found that the silica porous body obtained in Example d1 had a cubic phase structure.

Meanwhile, from the analysis results of the above annular patterns, the cubic phase structure of Example d1 was considered to be an Fm3m structure. The same results were obtained for other porous bodies obtained in Example d1 to d4.

TABLE d5

| | Organic compound (template)/ metal oxide (weight ratio) | Organic compound (template) | Metal oxide species | Mesoporous Structure of Film Surface (SEM) | | Mesoporous structure inside film and particles (TEM) | |
|---|---|---|---|---|---|---|---|
| | | | | Mesoporous structure | Pore size (nm) | Mesoporous structure | Phase/pore size (nm) |
| Example d1 | 30/70 | T-1 | $SiO_2$ | o | 20 | o | cubic/20 |
| | 40/60 | | | o | 20 | o | cubic/20 |
| | 50/50 | | | o | 20 | o | cubic/20 |
| | 60/40 | | | o | 20 | o | cubic/20 |
| | 70/30 | | | o | 20 | o | cubic/20 |
| Example d2 | 30/70 | T-2 | $SiO_2$ | o | 20 | o | cubic/20 |
| | 40/60 | | | o | 20 | o | cubic/20 |
| | 50/50 | | | o | 20 | o | cubic/20 |
| | 60/40 | | | o | 20 | o | cubic/20 |
| | 70/30 | | | o | 20 | o | cubic/20 |
| Example d3 | 30/70 | T-3 | $SiO_2$ | o | 20 | o | cubic/20 |
| | 40/60 | | | o | 20 | o | cubic/20 |
| | 50/50 | | | o | 20 | o | cubic/20 |
| | 60/40 | | | o | 20 | o | cubic/20 |
| | 70/30 | | | o | 20 | o | cubic/20 |
| Example d4 | 30/70 | T-4 | $SiO_2$ | o | 20 | o | cubic/20 |
| | 40/60 | | | o | 20 | o | cubic/20 |
| | 50/50 | | | o | 20 | o | cubic/20 |
| | 60/40 | | | o | 20 | o | cubic/20 |
| | 70/30 | | | o | 20 | o | cubic/20 |
| Comparative Example d1 | 0/100 | — | $SiO_2$ | x | — | x | — |
| Comparative Example d2 | 45/55 | Pluronic P123 | $SiO_2$ | o | 10 | Δ | hexagonal |
| Comparative Example d3 | 35/65 | Pluronic P123 | $SiO_2$ | o | 10 | o | cubic/10 |

Reference Example d1

Figure 25:
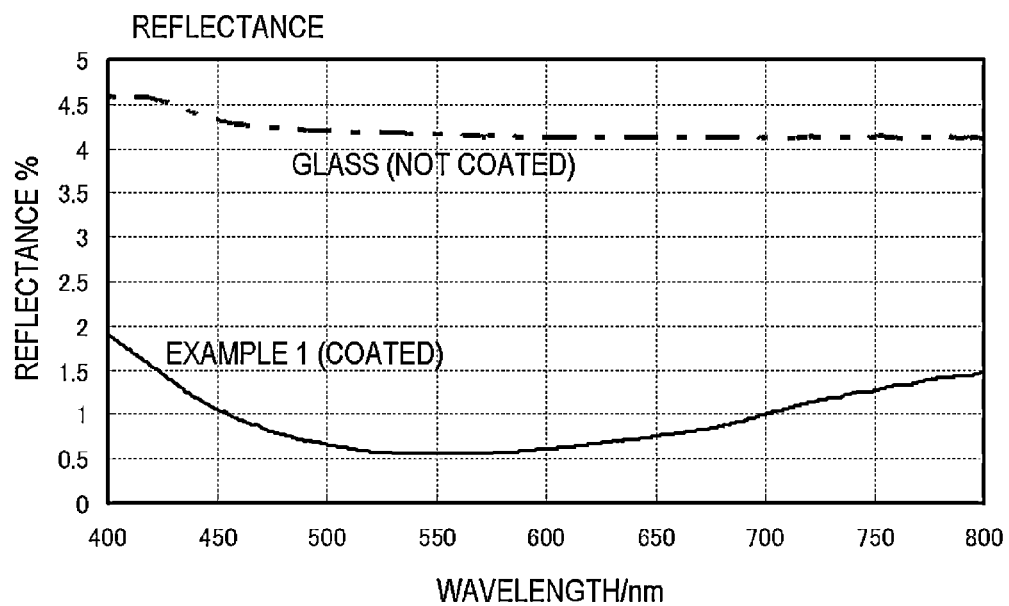
FIG. 25 illustrates a reflectance spectrum of a glass plate when the porous film is formed on a glass substrate by the method in Example d1.

According to the method of Examples d1 to d4 (weight ratio of the polyolefin based terminally branched copolymer to silica: 50/50), a porous film was formed on a glass substrate. The number of rotations for spin coating was adjusted so as to have a film thickness of around 100 nm. The reflectance of the obtained glass plate was measured and as a result, antireflection performance of a very high level of about 0.5% was found in the wavelength range of 500 to 600 nm. A spectrum of the obtained reflectance in the porous film of Example d1 is shown in FIG. 25. The porous film of the present invention may also be used as an antireflection film.

When the polyolefin based terminally branched copolymer particles were used as the template, a cubic phase structure with mesopores having a particle size of 20 to 30 nm was formed, regardless of the kind and the ratio of metal oxides. On the other hand, when Pluronic P123 was used as the template, a phase structure was changed by the ratio of metal oxides.

Example E

Synthesis Example of Terminally Branched Copolymer

The number average molecular weight (Mn), the weight average molecular weight (Mw) and the molecular weight distribution (Mw/Mn) were measured using GPC according to the method as described herein. For the melting point (Tm), the peak top temperature obtained by measuring with DSC was used. Incidentally, the melting point of the polyalkylene glycol portion is also confirmed under the measurement conditions, but melting point indicates the melting point of the polyolefin portion unless otherwise particularly noted. The measurement by $^1$H-NMR was carried out at 120 degrees centigrade after completely dissolving the polymer in deuterated-1,1,2,2-tetrachloroethane, which functioned both as the lock solvent and the solvent, in a sample tube for measurement. For the chemical shift, the peak of deuterated-1,1,2,2-tetrachloroethane was set at 5.92 ppm, and the chemical shift values of other peaks were determined on this basis. For the particle size of the particles in the dispersion solution, the average particle size of 50% by volume was measured with a Microtrack UPA (a product of Honeywell, Inc.). The shape of the particles in the dispersion solution was observed under the condition of 100 kV with a transmission electron microscope (TEM, H-7650, commercially available from Hitachi, Ltd.), after diluting the sample by 200 to 500 times and performing negative staining with phosphotungstic acid.

Synthesis Example e1

Synthesis of Polyolefin Based Terminally Branched Copolymer (T-1)

In accordance with the following procedure (see, for example, Synthesis Example 2 of Japanese Laid-open Patent Publication No. 2006-131870), an epoxy-terminated ethylenic polymer (E-1) was synthesized.

To a 2000-ml stainless steel autoclave thoroughly purged with nitrogen, 1,000 ml of heptane was charged at room temperature, and the system was heated to 150 degrees centigrade. Subsequently, the autoclave was pressurized with ethylene to 30 kg/cm$^2$G and the temperature was maintained. To the autoclave, 0.5 ml (0.5 mmol) of a hexane solution (1.00 mmol/ml in terms of aluminum atoms) of MMAO (a product of Tosoh Finechem Corporation) was fed with pressure, and then 0.5 ml (0.0001 mmol) of a toluene solution (0.0002 mmol/ml) of a compound of the following formula was fed with pressure to initiate polymerization. Under an ethylene gas atmosphere, polymerization was carried out at 150 degrees centigrade for 30 minutes, and then the polymerization was terminated by feeding a small amount of methanol with the pressure. The obtained polymer solution was added to 3 liters of methanol containing a small amount of hydrochloric acid to precipitate out the polymer. The polymer was washed with methanol, and then dried at 80 degrees centigrade under reduced pressure for 10 hours, whereby a double bond-terminated ethylenic polymer (P-1) was obtained.

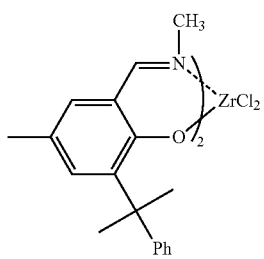

100 g of the double bond-terminated ethylenic polymer (P-1) (108 mmol of vinyl group in terms of Mn 850), 300 g of toluene, 0.85 g (2.6 mmol) of Na WO$_4$, 0.60 g (1.3 mmol) of CH$_3$(nC$_8$H$_{17}$)$_3$NHSO$_4$ and 0.11 g (1.3 mmol) of phosphoric acid were introduced into a 500-mL separable flask, and the system was heated under reflux with stirring for 30 minutes to completely melt the polymer product. After adjusting the internal temperature to 90 degrees centigrade, 37 g (326 mmol) of aqueous 30% hydrogen peroxide was added dropwise over 3 hours and then stirred at an internal temperature of 90 to degrees centigrade for 3 hours. Thereafter, with the temperature being maintained at 90 degrees centigrade, 34.4 g (54.4 mmol) of an aqueous solution of 25% sodium thiosulfate was added and stirred for 30 minutes, and it was confirmed that the peroxide in the reaction system was completely decomposed with a peroxide test paper. Subsequently, at an internal temperature of 90 degrees centigrade, 200 g of dioxane was added to crystallize the product, and the solids were collected by filtration and washed with dioxane. The obtained solids were stirred in an aqueous solution of 50% methanol at room temperature, and the solids were collected by filtration and washed with methanol. The aforementioned solids were further stirred in 400 g of methanol, collected by filtration and washed with methanol. The solids were dried at room temperature under reduced pressure of 1 to 2 hPa, whereby 96.3 g of an epoxy-terminated ethylenic polymer (E-1) as a white solid (yield: 99%, conversion rate of olefin: 100%) was obtained.

The obtained epoxy-terminated ethylenic polymer (E-1) showed Mw=2,058, Mn=1,118 and Mw/Mn=1.84 (GPC) (content of terminal epoxy group: 90 mol %).

$^1$H-NMR: δ (C2D2C14) 0.88 (t, 3H, J=6.92 Hz), 1.18-1.66 (m), 2.38 (dd, 1H, J=2.64, 5.28 Hz), 2.66 (dd, 1H, J=4.29, 5.28 Hz), 2.80-2.87 (m, 1H)

Melting point (Tm): 121 degrees centigrade
Mw=2,058, Mn=1,118, Mw/Mn=1.84 (GPC)

84 parts by weight of the epoxy-terminated ethylenic polymer (E-1), 39.4 parts by weight of diethanolamine and 150 parts by weight of toluene were introduced into a 1,000-mL flask, and the system was stirred at 150 degrees centigrade for 4 hours. Thereafter, acetone was added while cooling the mixture to precipitate the reaction product, and the solids were collected by filtration. The obtained solids were stirred and washed with an aqueous acetone solution one time and further with acetone three times, and then the solids were collected by filtration. Thereafter, the solids were dried at room temperature under reduced pressure to obtain a polymer (I-1) (Mn: 1,223, in the general formula (9), A: a group formed by polymerization of ethylene (Mn: 1,075), $R^1=R^2$=a hydrogen atom, one of $Y^1$ and $Y^2$: a hydroxyl group, the other of $Y^1$ and $Y^2$: a bis(2-hydroxyethyl)amino group).

$^1$H-NMR: δ (C2D2C14) 0.88 (t, 3H, J=6.6 Hz), 0.95-1.92 (m), 2.38-2.85 (m, 6H), 3.54-3.71 (m, 5H)

Melting point (Tm): 121 degrees centigrade 20.0 parts by weight of the polymer (I-1) and 100 parts by weight of toluene were introduced into a 500-mL flask equipped with a nitrogen inlet tube, a thermometer, a condenser tube and a stirring rod, and the system was heated in an oil bath at 125 degrees centigrade with stirring to completely dissolve the solids. After cooling to 90 degrees centigrade, 0.323 parts by weight of 85% KOH that had been dissolved in 5.0 parts by weight of water in advance was added to the flask, and the contents were mixed under reflux condition for 2 hours. Subsequently, the temperature in the flask was slowly increased to 120 degrees centigrade, and water and toluene were distilled off. Water and toluene in the flask were further distilled off by reducing the pressure in the flask while supplying minimal nitrogen into the flask, increasing the internal temperature to 150 degrees centigrade, and then keeping the temperature for 4 hours. After cooling to room temperature, the solids solidified in the flask were broken and taken out.

18.0 parts by weight of the obtained solids and 200 parts by weight of dehydrated toluene were introduced into a 1.5-L stainless steel pressurized reactor equipped with a heating device, a stirring rod, a thermometer, a manometer and a safety valve, and after purging the gas phase with nitrogen, the system was heated to 130 degrees centigrade with stirring. After 30 minutes, 9.0 parts by weight of ethylene oxide was added thereto. After further maintaining at 130 degrees centigrade for 5 hours, the contents were cooled to room temperature to obtain a reactant. The solvent was removed by drying from the resulting reactant to obtain a terminally branched copolymer (T-1) (Mn: 1,835, in the general formula (1), A: a group formed by polymerization of ethylene (Mn: 1,075), $R^1$ and $R^2$: a hydrogen atom, one of $X^1$ and $X^2$: a group represented by the general formula (6) ($X^{11}$: a polyethylene glycol group), the other of $X^1$ and $X^2$: a group represented by the general formula (5) ($Q^1$ and $Q^2$: an ethylene group, $X^9$ and $X^{10}$: a polyethylene glycol group)).

$^1$H-NMR: δ (C2D2C14) 0.88 (3H, t, J=6.8 Hz), 1.06-1.50 (m), 2.80-3.20 (m), 3.33-3.72 (m)

Melting point (Tm): −16 degrees centigrade (polyethylene glycol), 116 degrees centigrade Synthesis Example e2

A terminally branched copolymer (T-2) (Mn: 2,446) was obtained in the same method as in Synthesis Example e1, except that the amount of ethylene oxide in use was changed to 18.0 parts by weight.

Melting point (Tm): 27 degrees centigrade (polyethylene glycol), 118 degrees centigrade Preparation Example of Aqueous Dispersion of Terminally Branched Copolymer

Preparation Example e1

Preparation of Aqueous Dispersion Solution of 10 weight % Polyolefin Based Terminally Branched Copolymer (T-1)

10 parts by weight of the polyolefin based terminally branched copolymer (T-1) constituting the polymer particles (A) of Synthesis Example e1 and 40 parts by weight of distilled water as the solvent (C) were charged to a 100-ml autoclave, and the system was heated with stirring at a rate of 800 rpm at 140 degrees centigrade for 30 minutes, and then cooled to room temperature while stirring. The average particle size of 50% by volume of the obtained dispersion system was 0.018 μm (average particle size of 10% by volume: 0.014 μm, average particle size of 90% by volume: 0.022 μm). The particle size of the obtained dispersion system measured by using a transmission electron microscope was from 0.015 to 0.030 μm. Furthermore, 75 parts by weight of distilled water was added to 75 parts by weight of this T-1 aqueous dispersion solution (solid content: 20 weight %), whereby a 10 weight % T-1 aqueous dispersion solution was obtained.

Preparation Example e2

10 weight % of an aqueous dispersion solution of T-2 was obtained in the same method as in Preparation Example e1, except that the polyolefin based terminally branched copolymer (T-1) was changed to (T-2). The average particle size of 50% by volume of the obtained dispersion system was 0.017 μm (average particle size of 10% by volume: 0.013 μm, average particle size of 90% by volume: 0.024 μm).

Example e1

Preparation of Solution of Polyolefin Based Terminally Branched Copolymer and TMOS Dehydrated Condensate 15 parts by weight of methanol as the solvent was added to 10 parts by weight of tetramethoxysilane (TMOS), and stirred at room temperature. Furthermore, 10 parts by weight of an aqueous solution of 0.1N hydrochloric acid as the catalyst was added dropwise thereto, and then stirred at 50 degrees centigrade for 1 hour, whereby a TMOS dehydrated condensate was obtained.

16 g of an aqueous solution of 0.1N hydrochloric acid was further added dropwise to the obtained TMOS dehydrated condensate (to have the pH of 3 after addition of the polyolefin based terminally branched copolymer), and then stirred at room temperature. 39 parts by weight of an aqueous dispersion (solid content: 10 weight %) of the polyolefin based terminally branched copolymer (T-1) was further added dropwise thereto and stirred at room temperature, whereby a solution of the polyolefin based terminally branched copolymer and TMOS dehydrated condensate was prepared (weight ratio of the polyolefin based terminally branched copolymer to silica in terms of $SiO_2$: 50/50).

The silica content represents the proportion of silica contained in the composite particles, and was calculated in the following method.

The silica content was calculated on the assumption that 100 weight % of TMOS as the component (B) in the above Example e1 reacted to become $SiO_2$.

Thus, from
TMOS: Mw=152,
$SiO_2$: Mw=60,
$SiO_2$/TMOS=60/152=0.395.

That is, the value obtained by multiplying the amount of TMOS by 0.395 is the $SiO_2$ content in the particles.

Formation of Composite Particles of Polyolefin Based Terminally Branched Copolymer and Silica This composition was poured into a spray dryer apparatus (a spray dryer, ADL311S-A, a product of Yamato Scientific Co., Ltd.) at a flow rate of 6 cc/min and pressurized (2.6 kg/cm) at a nozzle outlet temperature of 120 degrees centigrade for spraying, whereby composite fine particles of the polyolefin based terminally branched copolymer and silica were obtained.

Formation of Porous Silica Particles (Lightweight Filler)

The obtained composite particles of the polyolefin based terminally branched copolymer and silica were calcinated at 500 degrees centigrade for 1 hour using the electric furnace, whereby porous silica particles were obtained.

Furthermore, the particle size of porous silica particles was observed under the condition of 1.5 kV using a scanning electron microscope (SEM, JSM-6701F, commercially available from JEOL).

Example e2

Preparation of Solution of Polyolefin Based Terminally Branched Copolymer and TMOS Dehydrated Condensate 15 parts by weight of methanol as the solvent was added to 10 parts by weight of tetramethoxysilane (TMOS), and stirred at room temperature. Furthermore, 1 weight part of an aqueous solution of 1N hydrochloric acid as the catalyst was added dropwise thereto, and then stirred at 50 degrees centigrade for 1 hour, whereby a TMOS dehydrated condensate was obtained.

26 g of an aqueous solution of 1N hydrochloric acid was further added dropwise to the obtained TMOS dehydrated condensate (to have the pH of 3 after addition of the polyolefin based terminally branched copolymer), and then stirred at room temperature. 58.5 parts by weight of an aqueous dispersion (solid content: 10 weight %) of the polyolefin based terminally branched copolymer (T-1) was further added dropwise thereto and stirred at room temperature, whereby a solution of the polyolefin based terminally branched copolymer and TMOS dehydrated condensate was prepared (weight ratio of the polyolefin based terminally branched copolymer to silica in terms of $SiO_2$: 60/40).

Formation of Composite Particles of Polyolefin Based Terminally Branched Copolymer and Silica Composite fine particles of the polyolefin based terminally branched copolymer and silica were obtained using this composition with a spray dryer apparatus in the same method as in Example e1.

Formation of Porous Silica Particles (Lightweight Filler)

The obtained composite particles of the polyolefin based terminally branched copolymer and silica were calcinated using the electric furnace in the same method as in Example e1, whereby porous silica particles were obtained.

Example e3

Preparation of Solution of Polyolefin Based Terminally Branched Copolymer and TMOS Dehydrated Condensate 15 parts by weight of methanol as the solvent was added to 10 parts by weight of tetramethoxysilane (TMOS), and stirred at room temperature. Furthermore, 1 weight part of an aqueous solution of 1N hydrochloric acid as the catalyst was added dropwise thereto, and then stirred at 50 degrees centigrade for 1 hour, whereby a TMOS dehydrated condensate was obtained.

3.4 g of an aqueous solution of 1N hydrochloric acid was further added dropwise to the obtained TMOS dehydrated condensate (to have the pH of 3 after addition of the polyolefin based terminally branched copolymer), and then stirred at room temperature. 72.4 parts by weight of an aqueous dispersion (solid content: 10 weight %) of the polyolefin based terminally branched copolymer (T-1) was further added dropwise thereto and stirred at room temperature, whereby a solution of the polyolefin based terminally branched copolymer and TMOS dehydrated condensate was prepared (weight ratio of the polyolefin based terminally branched copolymer to silica in terms of $SiO_2$: 65/35).

Formation of Composite Particles of Polyolefin Based Terminally Branched Copolymer and Silica Composite particles of the polyolefin based terminally branched copolymer and silica were obtained using this composition with the spray dryer apparatus in the same method as in Example e1.

Formation of Porous Silica Particles (Lightweight Filler)

The obtained composite particles of the polyolefin based terminally branched copolymer and silica were calcinated using an electric furnace in the same method as in Example e1, whereby porous silica particles were obtained.

Example e4

Preparation of Solution of Polyolefin Based Terminally Branched Copolymer and TMOS Dehydrated Condensate 15 parts by weight of methanol as the solvent was added to 10 parts by weight of tetramethoxysilane (TMOS), and stirred at room temperature. Furthermore, 10 parts by weight of an aqueous solution of 0.1N hydrochloric acid as the catalyst was added dropwise thereto, and then stirred at 50 degrees centigrade for 1 hour, whereby a TMOS dehydrated condensate was obtained.

16 g of an aqueous solution of 0.1N hydrochloric acid was further added dropwise to the obtained TMOS dehydrated condensate (to have the pH of 3 after addition of the polyolefin based terminally branched copolymer), and then stirred at room temperature. 39 parts by weight of an aqueous dispersion (solid content: 10 weight %) of the polyolefin based terminally branched copolymer (T-2) was further added dropwise thereto and stirred at room temperature, whereby a solution of the polyolefin based terminally branched copolymer and TMOS dehydrated condensate was prepared.

Formation of Composite Particles of Polyolefin Based Terminally Branched Copolymer and Silica Composite fine particles of the polyolefin based terminally branched copolymer and silica were obtained using this composition with a spray dryer apparatus in the same method as in Example e1 (weight ratio of the polyolefin based terminally branched copolymer to silica in terms of $SiO_2$: 50/50).

Formation of Porous Silica Particles (Lightweight Filler)

The obtained composite particles of the polyolefin based terminally branched copolymer and silica were calcinated using the electric furnace in the same method as in Example e1, whereby porous silica particles were obtained.

Comparative Example e1

Preparation of Solution of Surfactant Pluronic P123 and TEOS Dehydrated Condensate 12 parts by weight of ethanol as the solvent was added to 10.4 parts by weight of tetraethoxysilane (TEOS), and stirred at room temperature. Furthermore, 5.4 parts by weight of an aqueous solution of 0.01N hydrochloric acid as the catalyst was added dropwise thereto, and then stirred at 20 degrees centigrade for 20 minutes, whereby a TEOS dehydrated condensate was obtained. Meanwhile, a solution obtained by dissolving 2.75 parts by weight of Pluronic P123 in 8 parts by weight of additional ethanol was added dropwise thereto and stirred at room temperature, whereby a solution of P123 and TEOS dehydrated condensate was prepared.

Formation of Composite Particles of Surfactant Pluronic P123 and Silica

Composite fine particles of the polyolefin based terminally branched copolymer and silica were obtained using this composition with a spray dryer apparatus in the same method as in Example e1.

Formation of Porous Silica Particles

Composite particles of the surfactant Pluronic P123 and silica were calcinated using an electric furnace in the same method as in Example e1, whereby porous silica particles were obtained (weight ratio of Pluronic P123 to $SiO_2$: 45/55).

Comparative Example e2

A non-porous spherical silica filler (Admafine S0-C2: commercially available from Admatex Co., Ltd., average particle size: 0.4 to 0.6 μm) was used in Comparative Example e2.

Comparative Example e3

Hollow ceramic beads G40 (commercially available from Superior Products Inc., average particle size: 40 μm) were used in Comparative Example e3.

The lightweight fillers in Examples e1 to e4 obtained as described above, the porous filler in Comparative Example e1, the silica filler in Comparative Example e2, and the hollow filler in Comparative Example e3 were evaluated in the following manner.

1. Measurement of Bulk Specific Gravity

The bulk densities of the lightweight fillers in Example e1 to e4, the porous filler in Comparative Example e1, the silica filler in Comparative Example e2 and the hollow filler in Comparative Example e3 were determined by the tapping method. Namely, the filler was put into a known volume container and tapped until the volume of the filler became constant. The bulk density was determined from the filling weight of the filler and the volume after tapping.

2. Measurement of Thermal Conductivity

The thermal conductivities at 25 degrees centigrade of the lightweight fillers in Example e1 to e4, the porous filler in Comparative Example e1, the silica filler in Comparative Example e2 and the hollow filler in Comparative Example e3 were determined by the laser flash method, using a pelletized sample having a thickness of 1 mm and a diameter of 10 mm.

3. Evaluation of Porous Structure

The mesoporous structure inside the particles of the lightweight fillers in Examples e1 to e4 and the porous filler in Comparative Example e1 was observed in the following method.

(1) Measurement of Average Pore Diameter

The lightweight fillers in Examples e1 to e4 and the porous filler in Comparative Example e1 were fixed with a resin, and cut into pieces by focused ion beam (FIB) processing. Subsequently, the shape of the cross section was observed under the condition of 200 kV using a transmission electron microscope (TEM, H-7650, commercially available from Hitachi, Ltd.).

The evaluation results are shown in the following Table e1.

(2) X-Ray Diffraction Measurement

The X-ray diffraction measurement was carried out using the lightweight filler of Example e1 as a sample.

It was confirmed that the resulting diffraction image had a plurality of annular patterns.

From this fact, it was found that the lightweight filler of Example e1 had a cubic phase structure.

Meanwhile, from the analysis results of the above annular patterns, a cubic phase structure in Example e1 was considered to be an Fm3m structure. The same results were obtained for the lightweight fillers of Examples e2 to e4.

Evaluation of Mesoporous Structure Inside Particles

○: A mesoporous structure having an average pore diameter of 5 to 30 nm is present and forms a cubic phase structure.

Δ: Although a mesoporous structure is present, the average pore diameter is out of the range of 5 to 30 nm or a cubic phase structure is not formed.

x: No mesoporous structure is present.

Furthermore, the cubic phase structure refers to any one of Pm3n, Im3n, Fm3m, Fd3m, and further Ia3d, Pn3m and Im3n in which mesopores are bicontinuously bonded, as shown in the schematic view of FIG. 3.

4. Evaluation of Breaking Strength

Loads of 500 kg/cm$^2$, 1,000 kg/cm$^2$ and 2,000 kg/cm$^2$ were added to the lightweight fillers in Examples e1 to e4, the porous filler in Comparative Example e1, the silica filler in Comparative Example e2 and the hollow filler in Comparative Example e3, which were uniformly packed in 1 cm$^2$, and the shape retention ratio was observed under the condition of 1.5 kV using a scanning electron microscope (SEM, JSM-6701F, commercially available from JEOL).

Figure 26:
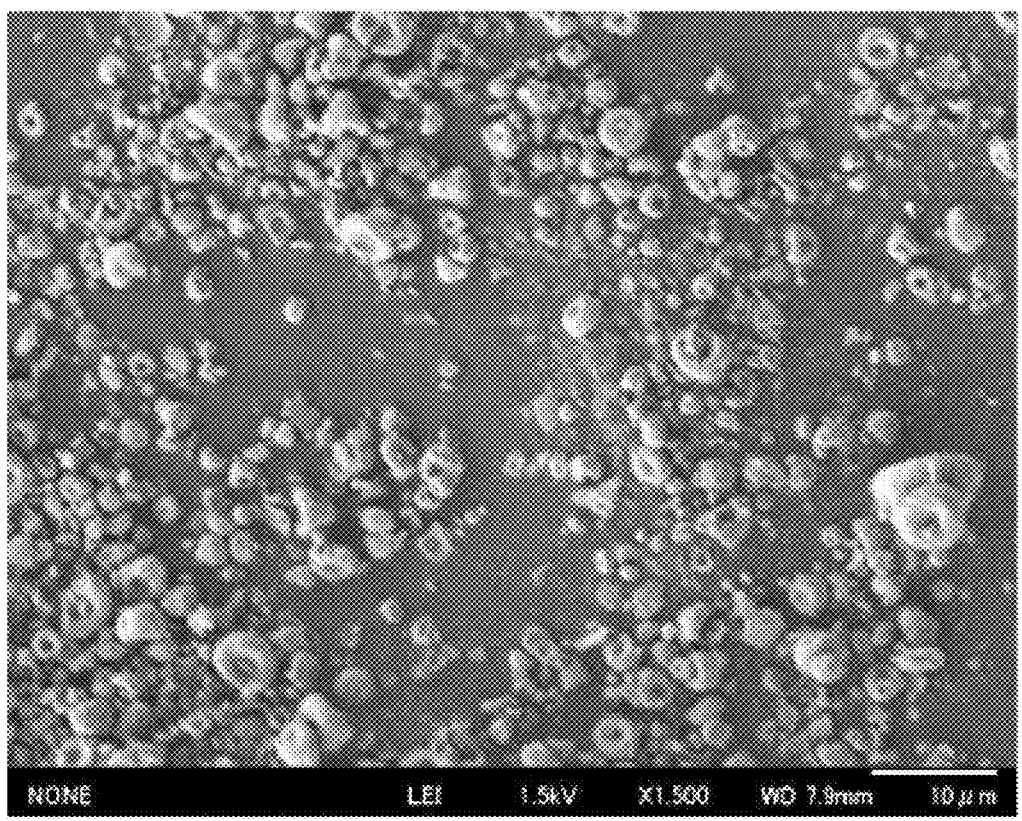
FIG. 26 illustrates the state after a breaking strength test at 2,000 kg/cm² of a lightweight filler prepared in Example e1.
Figure 27:
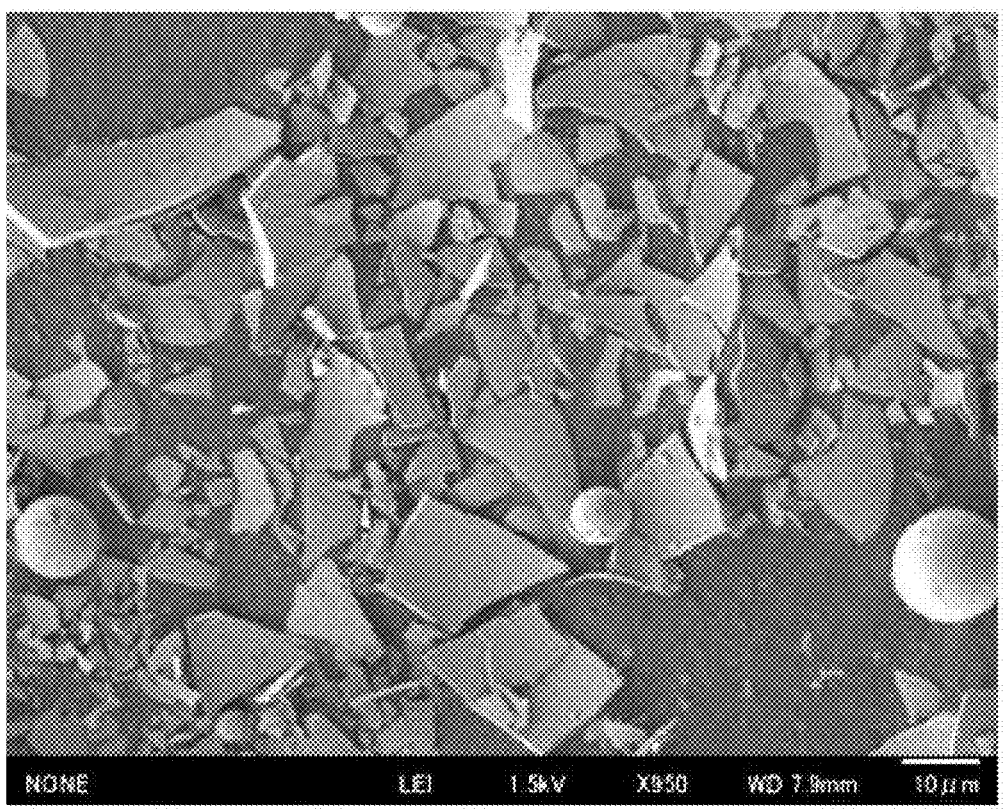
FIG. 27 illustrates the state after a breaking strength test at 500 kg/cm² of a hollow filler in Comparative Example e3.

For reference, FIG. 26 shows the state after the breaking strength test of the lightweight filler prepared in Example e1 with 2,000 kg/cm$^2$, while FIG. 27 shows the state after the breaking strength test of the hollow filler in Comparative Example e3 with 500 kg/cm$^2$.

○: Shape retention ratio of not less than 80%
Δ: Shape retention ratio of from 50% to 80%
x: Shape retention ratio of not more than 50%

Example F

Synthesis Example of Terminally Branched Copolymer

The number average molecular weight (Mn), the weight average molecular weight (Mw) and the molecular weight distribution (Mw/Mn) were measured using GPC according to the method as described herein. For the melting point (Tm), the peak top temperature obtained by measuring with DSC was used. Incidentally, the melting point of the polyalkylene glycol portion is also confirmed under the measurement conditions, but melting point indicates the melting point of the polyolefin portion unless otherwise particularly noted. The measurement by $^1$H-NMR was carried out at 120 degrees centigrade after completely dissolving the polymer in deuterated-1,1,2,2-tetrachloroethane, which functioned both as the lock solvent and the solvent, in a sample tube for measurement. For the chemical shift, the peak of deuterated-1,1,2,2-tetrachloroethane was set at 5.92 ppm, and the chemical shift values of other peaks were determined on this basis. For the particle size of the particles in the dispersion solution, the average particle size of 50% by volume was measured with a Microtrack UPA (a product of Honeywell, Inc.). The shape of the particles in the dispersion solution was observed under the condition of 100 kV with a transmission electron microscope (TEM, H-7650, commercially available from Hitachi, Ltd.), after diluting the sample by 200 to 500 times and performing negative staining with phosphotungstic acid.

Synthesis Example f1

Synthesis of Polyolefin Based Terminally Branched Copolymer (T-1)

In accordance with the following procedure (see, for example, Synthesis Example 2 of Japanese Laid-open Patent Publication No. 2006-131870), an epoxy-terminated ethylenic polymer (E-1) was synthesized.

To a 2000-ml stainless steel autoclave thoroughly purged with nitrogen, 1,000 ml of heptane was charged at room temperature, and the system was heated to 150 degrees centigrade. Subsequently, the autoclave was pressurized with ethylene to 30 kg/cm$^2$G and the temperature was maintained. To the autoclave, 0.5 ml (0.5 mmol) of a hexane solution (1.00 mmol/ml in terms of aluminum atoms) of MMAO (a product of Tosoh Finechem Corporation) was fed with pressure, and then 0.5 ml (0.0001 mmol) of a toluene solution (0.0002 mmol/ml) of a compound of the following formula was fed with pressure to initiate polymerization. Under ethylene gas TABLE e1

| | Particle size (μm) | Bulk specific gravity (g/ml) | Thermal conductivity (W/mK) | Porous structure | Mesopore size (nm) | Breaking strength (kg/cm$^2$) | | |
|---|---|---|---|---|---|---|---|---|
| | | | | | | 500 | 1000 | 2000 |
| Example e1 | 1 to 5 | 0.18 | 0.148 | ○ | 22 | ○ | ○ | Δ |
| Example e2 | 1 to 5 | 0.15 | 0.130 | ○ | 20 | ○ | ○ | Δ |
| Example e3 | 1 to 5 | 0.16 | 0.127 | ○ | 18 | ○ | ○ | Δ |
| Example e4 | 1 to 5 | 0.18 | 0.146 | ○ | 24 | ○ | ○ | Δ |
| Comparative Example e1 | 1 to 5 | 0.20 | 0.240 | Δ | 8 | ○ | Δ | x |
| Comparative Example e2 | 0.4 to 0.6 | 0.26 | 1.210 | — | — | ○ | ○ | Δ |
| Comparative Example e3 | 40 | 0.60 | 0.060 to 0.200 | — | — | x | — | — | atmosphere, polymerization was carried out at 150 degrees centigrade for 30 minutes, and then the polymerization was terminated by feeding a small amount of methanol with pressure. The obtained polymer solution was added to 3 liters of methanol containing a small amount of hydrochloric acid to precipitate out the polymer. The polymer was washed with methanol, and then dried at 80 degrees centigrade under reduced pressure for 10 hours, whereby a double bond-terminated ethylenic polymer (P-1) was obtained.

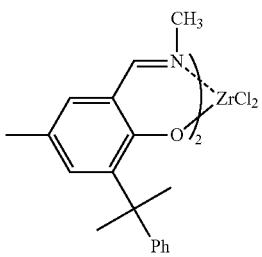

100 g of the double bond-terminated ethylenic polymer (P-1) (108 mmol of vinyl group in terms of Mn 850), 300 g of toluene, 0.85 g (2.6 mmol) of Na $WO_4$, 0.60 g (1.3 mmol) of $CH_3(nC_8H_{17})_3NHSO_4$ and 0.11 g (1.3 mmol) of phosphoric acid were introduced into a 500-mL separable flask, and the system was heated under reflux with stirring for 30 minutes to completely melt the polymer product. After adjusting the internal temperature to 90 degrees centigrade, 37 g (326 mmol) of aqueous 30% hydrogen peroxide was added dropwise over 3 hours and then stirred at an internal temperature of 90 to degrees centigrade for 3 hours. Thereafter, with the temperature being maintained at 90 degrees centigrade, 34.4 g (54.4 mmol) of an aqueous solution of 25% sodium thiosulfate was added and stirred for 30 minutes, and it was confirmed that the peroxide in the reaction system was completely decomposed with a peroxide test paper. Subsequently, at an internal temperature of 90 degrees centigrade, 200 g of dioxane was added to crystallize the product, and the solids were collected by filtration and washed with dioxane. The obtained solids were stirred in an aqueous solution of 50% methanol at room temperature, and the solids were collected by filtration and washed with methanol. The aforementioned solids were further stirred in 400 g of methanol, collected by filtration and washed with methanol. The solids were dried at room temperature under reduced pressure of 1 to 2 hPa, whereby 96.3 g of an epoxy-terminated ethylenic polymer (E-1) as a white solid (yield: 99%, conversion rate of olefin: 100%) was obtained.

The obtained epoxy-terminated ethylenic polymer (E-1) showed Mw=2,058, Mn=1,118 and Mw/Mn=1.84 (GPC) (content of terminal epoxy group: 90 mol %).

$^1$H-NMR: δ (C2D2C14) 0.88 (t, 3H, J=6.92 Hz), 1.18-1.66 (m), 2.38 (dd, 1H, J=2.64, 5.28 Hz), 2.66 (dd, 1H, J=4.29, 5.28 Hz), 2.80-2.87 (m, 1H)

Melting point (Tm): 121 degrees centigrade
Mw=2,058, Mn=1,118, Mw/Mn=1.84 (GPC)

84 parts by weight of the epoxy-terminated ethylenic polymer (E-1), 39.4 parts by weight of diethanolamine and 150 parts by weight of toluene were introduced into a 1,000-mL flask, and the system was stirred at 150 degrees centigrade for 4 hours. Thereafter, acetone was added while cooling the mixture to precipitate the reaction product, and the solids were collected by filtration. The obtained solids were stirred and washed with an aqueous acetone solution one time and further with acetone three times, and then the solids were collected by filtration. Thereafter, the solids were dried at room temperature under reduced pressure to obtain a polymer (I-1) (Mn: 1,223, in the general formula (9), A: a group formed by polymerization of ethylene (Mn: 1,075), $R^1$ and $R^2$: a hydrogen atom, one of $Y^1$ and $Y^2$: a hydroxyl group, the other of $Y^1$ and $Y^2$: a bis(2-hydroxyethyl)amino group).

$^1$H-NMR: δ (C2D2C14) 0.88 (t, 3H, J=6.6 Hz), 0.95-1.92 (m), 2.38-2.85 (m, 6H), 3.54-3.71 (m, 5H)

Melting point (Tm): 121 degrees centigrade 20.0 parts by weight of the polymer (I-1) and 100 parts by weight of toluene were introduced into a 500-mL flask equipped with a nitrogen inlet tube, a thermometer, a condenser tube and a stirring rod, and the system was heated in an oil bath at 125 degrees centigrade with stirring to completely dissolve the solids. After cooling to 90 degrees centigrade, 0.323 parts by weight of 85% KOH that had been dissolved in 5.0 parts by weight of water in advance was added to the flask, and the contents were mixed under reflux condition for 2 hours. Subsequently, the temperature in the flask was slowly increased to 120 degrees centigrade, and water and toluene were distilled off. Water and toluene in the flask were further distilled off by reducing the pressure in the flask while supplying minimal nitrogen into the flask, increasing the internal temperature to 150 degrees centigrade, and then keeping the temperature for 4 hours. After cooling to room temperature, the solids solidified in the flask were broken and taken out.

18.0 parts by weight of the obtained solids and 200 parts by weight of dehydrated toluene were introduced into a 1.5-L stainless steel pressurized reactor equipped with a heating device, a stirring rod, a thermometer, a manometer and a safety valve, and after purging the gas phase with nitrogen, the system was heated to 130 degrees centigrade with stirring. After 30 minutes, 9.0 parts by weight of ethylene oxide was added thereto. After further maintaining at 130 degrees centigrade for 5 hours, the contents were cooled to room temperature to obtain a reactant. The solvent was removed by drying from the resulting reactant to obtain a terminally branched copolymer (T-1) (Mn: 1,835, in the general formula (1), A: a group formed by polymerization of ethylene (Mn: 1,075), $R^1$=$R^2$=a hydrogen atom, one of $X^1$ and $X^2$: a group represented by the general formula (6) ($X^{11}$: a polyethylene glycol group), the other of $X^1$ and $X^2$: a group represented by the general formula (5) ($Q^1$ and $Q^2$: an ethylene group, $X^9$ and $X^{10}$: a polyethylene glycol group)).

$^1$H-NMR: δ (C2D2C14) 0.88 (3H, t, J=6.8 Hz), 1.06-1.50 (m), 2.80-3.20 (m), 3.33-3.72 (m)

Melting point (Tm): −16 degrees centigrade (polyethylene glycol), 116 degrees centigrade Synthesis Example f2

A terminally branched copolymer (T-2) (Mn=2,446) was obtained in the same method as in Synthesis Example f1, except that the amount of ethylene oxide in use was changed to 18.0 parts by weight.

Melting point (Tm): 27 degrees centigrade (polyethylene glycol), 118 degrees centigrade Preparation Example of Aqueous Dispersion of Terminally Branched Copolymer Preparation Example f1

Preparation of Aqueous Dispersion Solution of 10 weight % Polyolefin Based Terminally Branched Copolymer (T-1)

10 parts by weight of the polyolefin based terminally branched copolymer (T-1) constituting the polymer particles (A) of Synthesis Example f1 and 40 parts by weight of distilled water as the solvent (C) were charged to a 100-ml autoclave, and the system was heated with stirring at a rate of 800 rpm at 140 degrees centigrade for 30 minutes, and then cooled to room temperature while stirring. The average particle size of 50% by volume of the obtained dispersion system was 0.018 μm (average particle size of 10% by volume: 0.014 μm, average particle size of 90% by volume: 0.022 μm). The observation results of the obtained dispersion system measured by using a transmission electron microscope are shown in FIG. 5. The particle size measured from FIG. 5 was from 0.015 to 0.030 μm. Furthermore, 75 parts by weight of distilled water was added to 75 parts by weight of this T-1 aqueous dispersion solution (solid content: 20 weight %), whereby a 10 weight % T-1 aqueous dispersion solution was obtained.

Preparation Example f2

10 weight % of a T-2 aqueous dispersion solution was obtained in the same method as in Preparation Example f1, except for use of the polyolefin based terminally branched copolymer (T-2). The average particle size of 50% by volume of the obtained dispersion system was 0.017 μm (average particle size of 10% by volume: 0.013 μm, average particle size of 90% by volume: 0.024 μm).

Example f1

Preparation of Solution of Polyolefin Based Terminally Branched Copolymer and TTIP Dehydration Condensate 1.32 parts by weight of an aqueous solution of hydrochloric acid (37%) as the catalyst was added dropwise to 2.0 parts by weight of titanium tetraisopropoxide (TTIP), and then stirred at room temperature for 10 minutes, whereby a TTIP dehydrated condensate was obtained. 2.4 parts by weight of an aqueous dispersion (solid content: 10 weight %) of the polyolefin based terminally branched copolymer (T-1) was further added dropwise to the obtained TTIP dehydrated condensate, and stirred at room temperature, whereby a solution of the polyolefin based terminally branched copolymer and TTIP dehydrated condensate was prepared (weight ratio of the polyolefin based terminally branched copolymer to $TiO_2$: 30/70).

The titania content in the polyolefin based terminally branched copolymer and TTIP dehydrated condensate was calculated on the assumption that 100 weight % of TTIP as the component (B) in the above Example f1 reacted to become $TiO_2$.

Thus, from
TTIP: Mw=284,
$TiO_2$: Mw=80,
$TiO_2$/TTIP=80/284=0.282.

That is, the value obtained by multiplying the amount of TTIP by 0.282 is the $TiO_2$ content in the film.

Formation of Composite Film of Polyolefin Based Terminally Branched Copolymer and Titania The obtained solution was spin-coated on a silicon substrate and a quartz substrate, and heated at 50 degrees centigrade for 30 minutes and further heated at 110 degrees centigrade for 1.5 hours, whereby a composite film of the polyolefin based terminally branched copolymer and titania having a film thickness of 400 nm was obtained.

Formation of Titania Porous Body

The obtained composite film of the polyolefin based terminally branched copolymer and titania was calcinated at 500 degrees centigrade for 1 hour using an electric furnace, whereby a titania porous body having a thickness of 350 nm was obtained.

Incidentally, the film thickness of the composite film and the film thickness of the titania porous body were measured using an ellipsometer (JASCO M-150).

Example f2

A titania porous body having a thickness of 350 nm on a silicon substrate and a quartz substrate was obtained in the same method as in Example f1, except that the polyolefin based terminally branched copolymer (T-1) was changed to (T-2).

Comparative Example f1

1.32 parts by weight of an aqueous solution of hydrochloric acid (37%) was added to 2 parts by weight of titanium tetraisopropoxide (TTIP), and stirred at room temperature for 10 minutes, whereby a TTIP dehydrated condensate solution was obtained. The obtained solution was spin-coated on a silicon substrate and a quartz substrate, and calcinated at 500 degrees centigrade for 1 hour, whereby a titania film having a thickness of 200 nm was obtained.

Comparative Example f2

Preparation of Solution of Surfactant Pluronic P123 and TTIP Dehydrated Condensate 0.74 parts by weight of an aqueous solution of hydrochloric acid (37%) as the catalyst was added dropwise to 1.05 parts by weight of titanium tetraisopropoxide (TTIP), and then stirred at room temperature for 10 minutes, whereby a TTIP dehydrated condensate was obtained. Meanwhile, a solution obtained by dissolving 0.275 parts by weight of Pluronic P123 in 1.6 parts by weight of ethanol was added dropwise thereto and stirred at room temperature, whereby a solution of P123 and TEOS dehydrated condensate was prepared.

Formation of Composite Film of Surfactant Pluronic P123 and Titania

The obtained solution was spin-coated on a silicon substrate and a quartz substrate, and heated at 50 degrees centigrade for 30 minutes and further heated at 110 degrees centigrade for 1.5 hours, whereby a composite film of P123 and titania having a film thickness of 400 nm was obtained (weight ratio of P123 to $TiO_2$: 30/70).

Formation of Titania Porous Body

The obtained composite film of the polyolefin based terminally branched copolymer and titania was calcinated at 500 degrees centigrade for 1 hour using an electric furnace, whereby a titania porous body having a thickness of 350 nm was obtained.

Comparative Example f3

A photocatalyst coating agent, Bistrator NDH-510C (a product of Nippon Soda Co., Ltd.), mainly composed of titanium tetraisopropoxide (TTIP) was coated on a silicon substrate and a quartz substrate, and calcinated at 500 degrees centigrade for 1 hour, a whereby a photocatalytic film having a thickness of 200 nm was obtained.

Films each prepared in Examples f1 and f2 and Comparative Examples f1 and f2 obtained as described above were evaluated in the following manner.

1. Film Quality

The films prepared in Examples f1 and f2 and Comparative Examples f1 and f2 were observed with naked eyes and with an optical microscope (450 magnifications).

The evaluation results are shown in the following Table f1. The evaluation criteria are as follows.

⊙: No defects such as cracks or the like were found by observation with naked eyes and observation with an optical microscope.

○: No defects such as cracks or the like were found by observation with naked eyes, but defects were found by observation with an optical microscope in a part of the film.

Δ: No defects such as cracks or the like were found by observation with naked eyes, but defects were found by observation with an optical microscope in the entire film.

x: Defects such as cracks or the like were observed with naked eyes.

2. Transmittance

For the films each prepared on a quartz substrate in Examples f1 and f2 and Comparative Examples f1 and f2, the transmittance was measured in the wavelength range of 400 to 600 nm using a UV spectrophotometer UV2200, commercially available from Shimadzu Corporation. The evaluation results are shown in the following Table f1.

⊙: Transmittance is not less than 80% in the wavelength range of 400 to 600 nm.

○: Transmittance is not less than 80% and less than 85% in the wavelength range of 400 to 600 nm.

Δ: Transmittance is not less than 70% and less than 80% in the wavelength range of 400 to 600 nm x: Transmittance is less than 70% in the wavelength range of 400 to 600 nm.

TABLE f1

|  | Organic compound/ titanium (weight ratio) | Organic compound (template) | Evaluation results | |
|---|---|---|---|---|
|  |  |  | Film quality | Transmittance |
| Example f1 | 30/70 | T-1 | ⊙ | ⊙ |
| Example f2 | 30/70 | T-2 | ⊙ | ⊙ |
| Comparative Example f1 | 0/100 | — | x | ⊙ |
| Comparative Example f2 | 30/70 | Pluronic P123 | ⊙ | Δ |

In all Examples f1 and f2, both film quality and transmittance were excellent. On the other hand, in Comparative Example f1, micro crack was observed. In Comparative Example f2, the film quality was excellent, whereas the transmittance was low.

3. Evaluation of Porous Structure

The films each prepared in Examples f1 and f2 and Comparative Examples f1 and f2 were observed in the following manner.

(1) Mesoporous Structure of Film Surface

Figure 28:
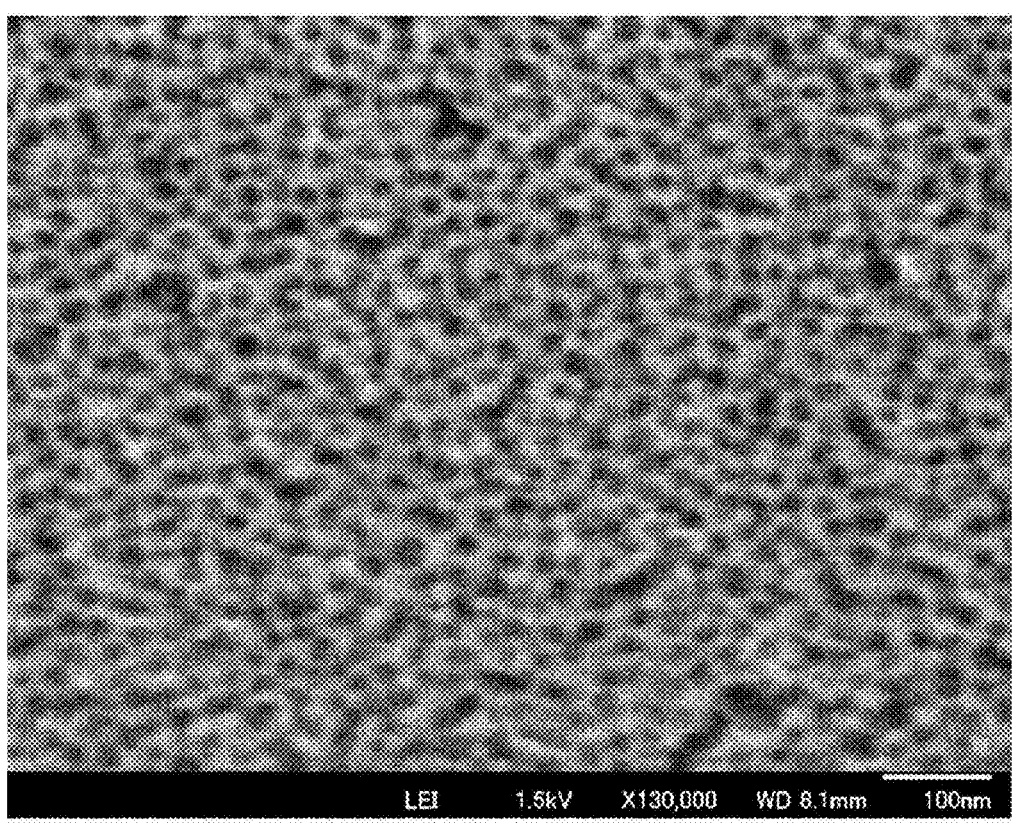
FIG. 28 is a SEM image of a surface of a titania porous body in Example f1.
Figure 29:
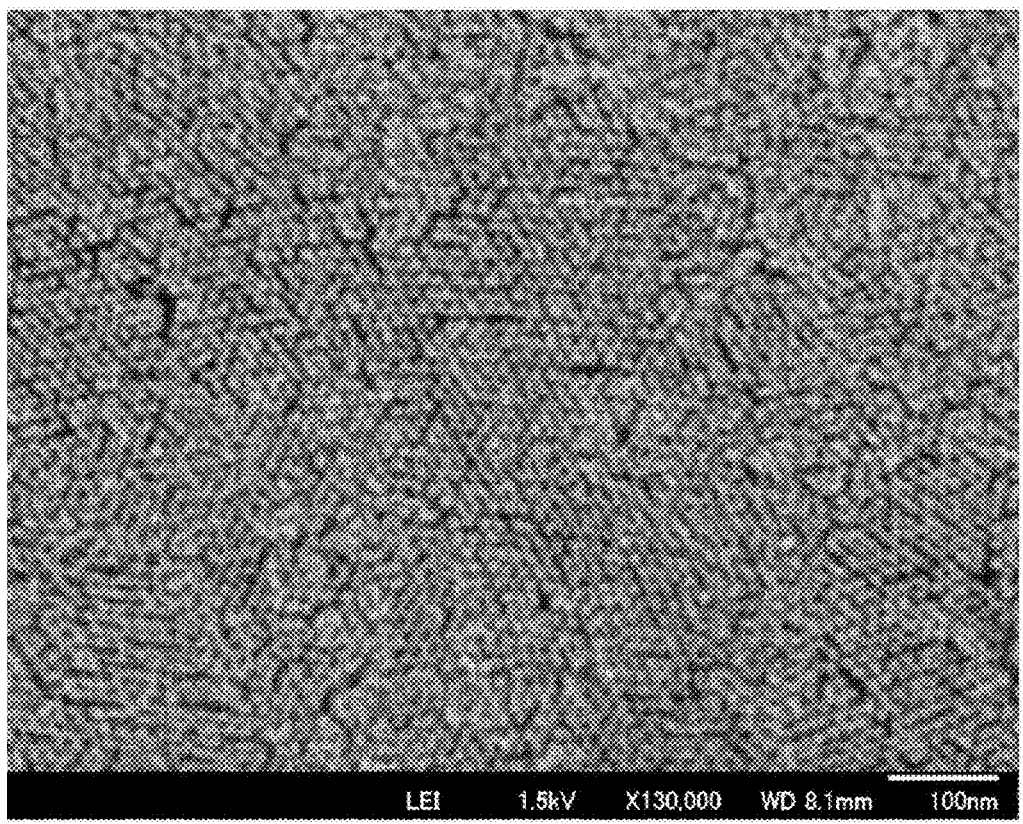
FIG. 29 is a SEM image of a surface of a titania porous body in Comparative Example f2.

Surfaces of the films prepared in Examples f1 and f2 and Comparative Examples f1 and f2 were observed under the condition of 1.5 kV using a scanning electron microscope (SEM, JSM-6701F, commercially available from JEOL). The evaluation results are shown in the following Table f2 according to the following criteria. Also, SEM images of the film surfaces of Example f1 and Comparative Example f2 are shown in FIGS. 28 and 29.

Evaluation of Mesoporous Structure of Film Surface

○: A mesoporous structure having a diameter of 5 to 30 nm is present.

Δ: Although a mesoporous structure is present, the pore diameter is out of the range of 5 to 30 nm.

x: No mesoporous structure is present.

(2) Pore Diameter of Mesopores of Film Surface

The pore diameter of mesopores of the film surface was calculated from an average value obtained by measuring pore diameters of randomly selected 20 pores under the condition of 1.5 kV using a scanning electron microscope (SEM, JSM-6701F, commercially available from JEOL). The results are shown in the following Table f2.

(3) Mesopores Inside Film

The average pore diameter of mesopores inside the film was calculated from an average value obtained by measuring pore diameters of randomly selected 20 pores under the condition of 200 kV using a transmission electron microscope (TEM, H-7650, commercially available from Hitachi, Ltd.).

In Example f1, a cubic phase structure with mesopores having an average pore diameter of 20 nm was formed. In Example f2, a cubic phase structure with mesopores having an average pore diameter of 30 nm was formed.

(4) Mesoporous Structure Inside Film

The films prepared in Examples f1 and f2 and Comparative Examples f1 and f2 were fixed with a resin, and cut into pieces by focused ion beam (FIB) processing. Subsequently, the shape of the cross section of this film was observed under the condition of 200 kV using a transmission electron microscope (TEM, H-7650, commercially available from Hitachi, Ltd.). The evaluation results are shown in the following Table f2. A TEM image inside the film of Example f1 and the results of elemental analysis by the electron energy loss spectroscopy (EELS) method are shown in FIGS. 30A and 30B.

Evaluation of Mesoporous Structure Inside Film

○: A mesoporous structure is present.

Δ: Although a mesoporous structure is present, there is an unclear portion or a portion with mesopores and a portion without mesopores.

x: No mesoporous structure is present.

TABLE f2

|  | Organic compound/ titanium (weight ratio) | Organic compound (template) | Evaluation results | | |
|---|---|---|---|---|---|
|  |  |  | Mesoporous structure of film surface (SEM) | | Mesoporous structure inside film (TEM) |
|  |  |  | Mesoporous structure | Pore size (nm) | Mesoporous structure |
| Example f1 | 30/70 | T-1 | ○ | 20 | ○ |
| Example f2 | 30/70 | T-2 | ○ | 20 | ○ |

TABLE f2-continued

| | Organic compound/ titanium (weight ratio) | Organic compound (template) | Evaluation results | | |
|---|---|---|---|---|---|
| | | | Mesoporous structure of film surface (SEM) | | Mesoporous structure inside film (TEM) Mesoporous structure |
| | | | Mesoporous structure | Pore size (nm) | |
| Comparative Example f1 | 0/100 | — | x | — | x |
| Comparative Example f2 | 30/70 | Pluronic P123 | ○ | <10 | Δ |

When the polyolefin based terminally branched copolymer particles were used as the template, mesopores having a particle size of 20 to 30 nm on the surface and a mesoporous structure inside the film were confirmed. Pores were bonded inside the film and a structure having a vertical orientation was observed. On the other hand, when the Pluronic P123 was used as the template, mesopores were small and a structure inside of the film was not clear.

4. Evaluation of Photocatalyst Activity

The photocatalyst activity was examined by the photolysis of acetaldehyde (AA).

Figure 31:
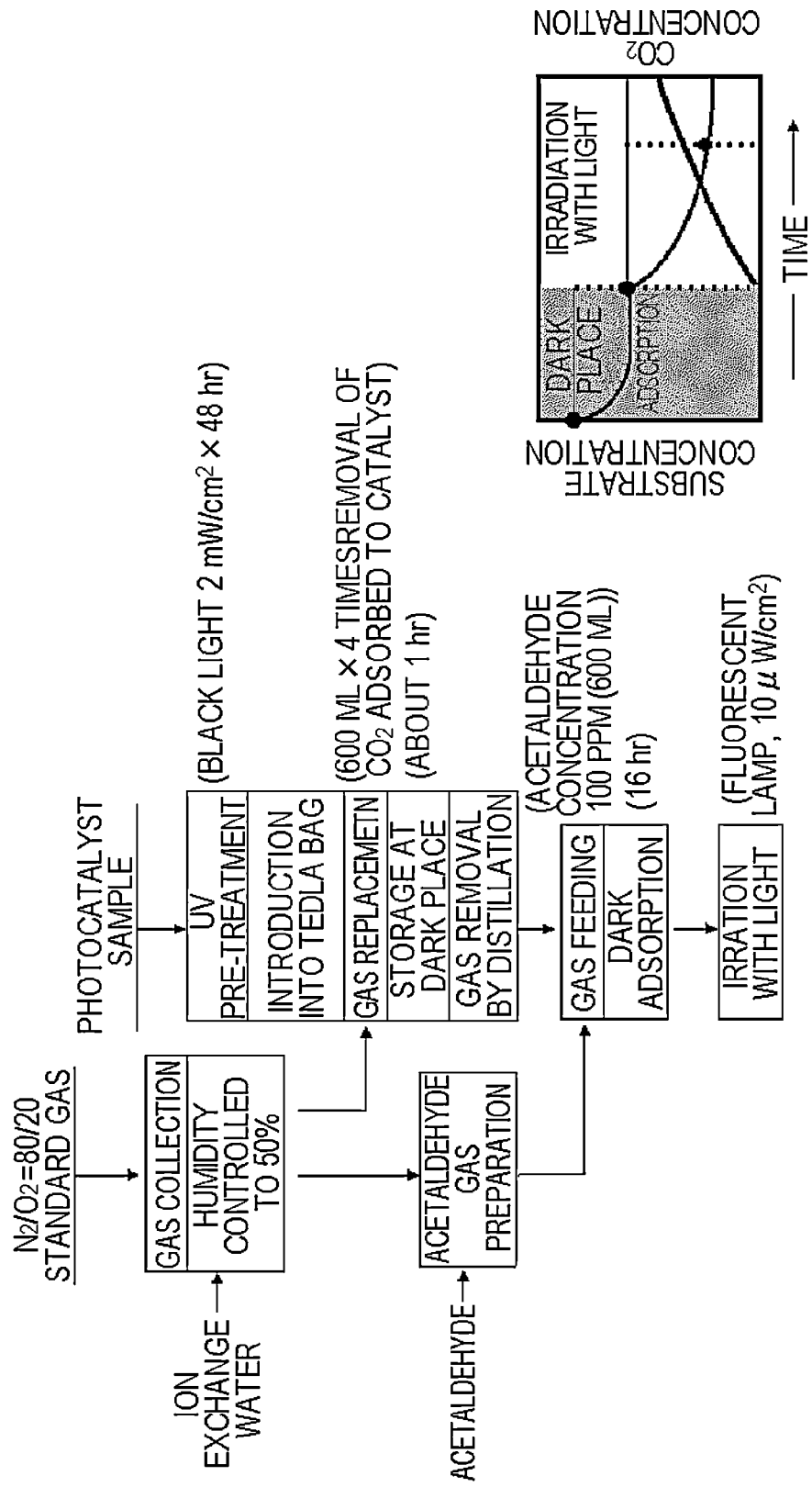
FIG. 31 is a schematic view of the evaluation method of photocatalytic properties in Example f1 and Comparative Example f3.
Figure 32A:
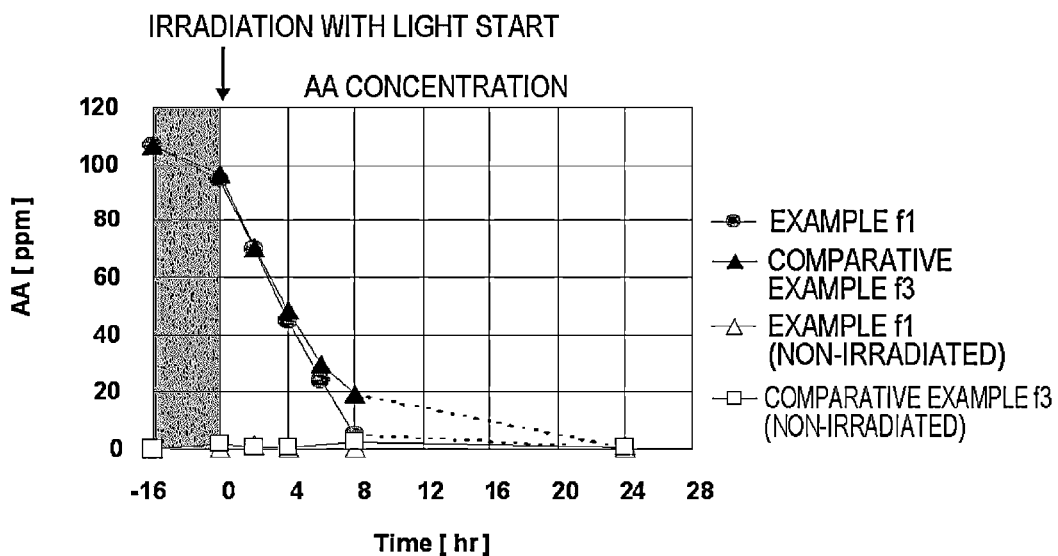
FIGS. 32A and 32B are the evaluation results of the photocatalytic properties in Example f1 and Comparative Example f3.
Figure 32B:
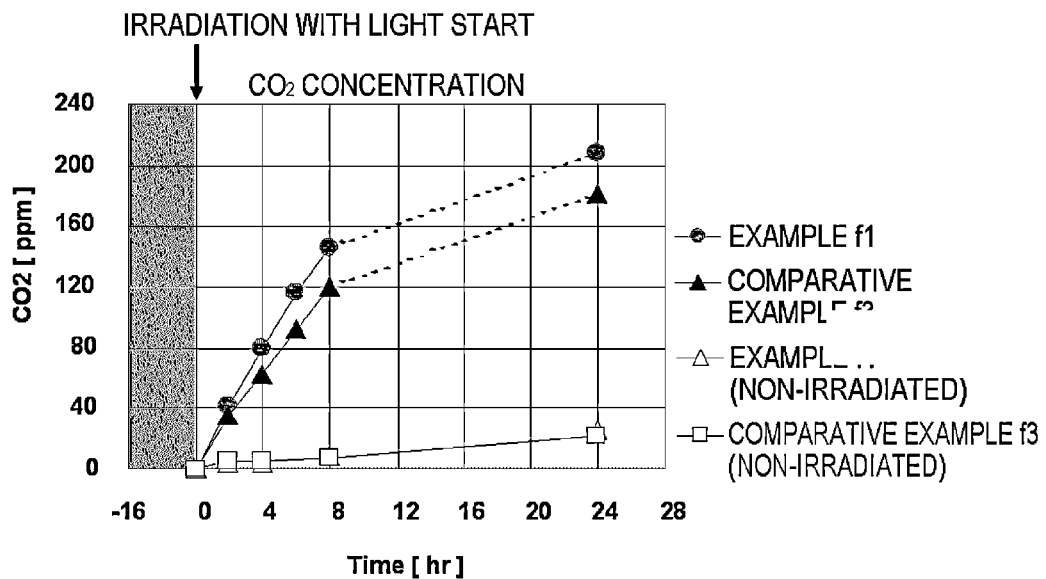

The films each in Example f1 and Comparative Example f1 were irradiated with a black light of ultraviolet intensity of 2 mW/cm² for 48 hours in advance, thus to remove an adsorbate by photolysis. Thereafter, the sample was charged into a Tedla bag. Ion exchange water was added to a standard gas in the ratio of nitrogen to oxygen of 80/20 which was separately prepared in advance, and the gas in the Tedla bag was replaced using the gas with its humidity controlled to 50% RH. Acetaldehyde was added so as to be 100 ppm at the end. The bag was kept at a dark place for 16 hours and subsequently irradiated with light of a fluorescent lamp with ultraviolet intensity of 10 μW/cm². The concentration of acetaldehyde gas inside the container and $CO_2$ generated by decomposition of aldehyde were measured by gas chromatography, and the photocatalyst activity was evaluated by the decrease. For a blank where light was not irradiated, the acetaldehyde gas concentration and $CO_2$ were respectively measured. A schematic view of the evaluation method of the photocatalyst activity is shown in FIG. 31. These results were shown in FIGS. 32A and 32B. In Example f1, the acetaldehyde gas concentration became 10% or less over 8 hours after irradiation with ultraviolet light. In addition, the same results were obtained in Example f2. The porous films in Examples f1 and f2 exhibited higher photocatalyst activity than the photocatalyst coating agent, Bistrator NDH-510C, in Comparative Example f3.

5. Evaluation of Photo-induced Hydrophilicity

Figure 33A:
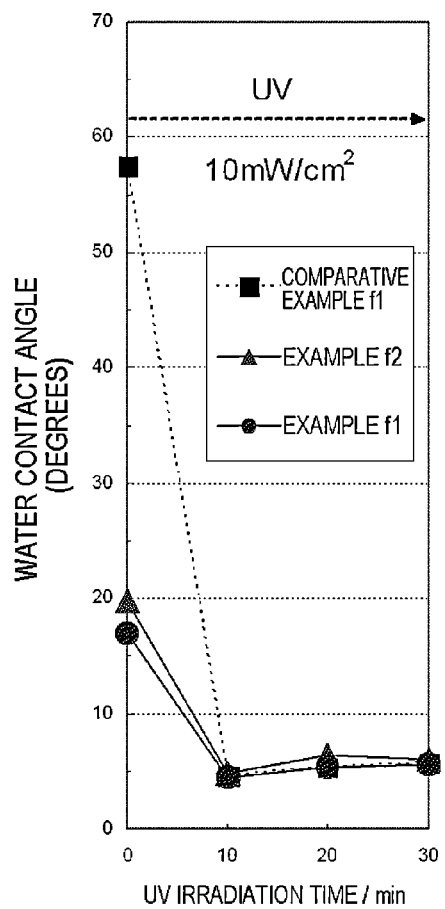
FIGS. 33A and 33B are a view illustrating a change in water contact angle of photo-induced hydrophilic effects in Examples f1 and f2 and Comparative Example f1.
Figure 33B:
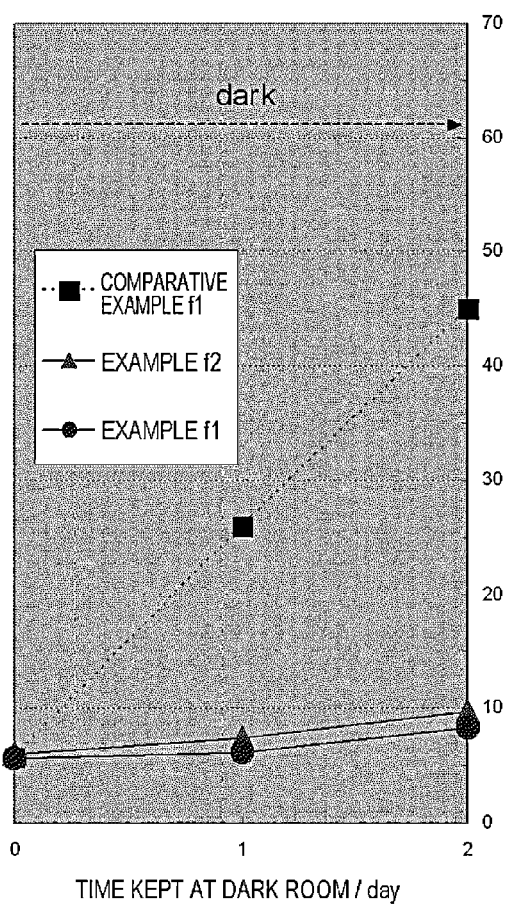

The films in Examples f1 and f2 and Comparative Example f1 were irradiated with a high pressure mercury lamp (USHIO U1501C, having a strong line spectrum at 365 nm and 250 to 320 nm) under the condition of 10 mW/cm² (365 nm) every 10 minutes for 30 minutes, and kept at a dark room after terminating irradiation with light, and the static water contact angle on the surface after 1 day and 2 days later was measured using CA-X150 (a product of Kyowa Interface Science Co., Ltd.). The results were shown in FIGS. 33A and 33B. When all films in Examples f1 and f2 and Comparative Example f1 were irradiated with light, the water contact angle became not more than 5 degrees and super hydrophilicity was exhibited. The porous titania film of the present invention exhibited hydrophilicity of about 20 degrees even at an initial state. Even after light was cut off, hydrophilicity of not more than 10 degrees was maintained.

6. Titanium Crystalline Structure of Titanium Porous Body of the Present Invention For the film in Example f1, a crystalline structure was identified from XRD measurement and FFT image of the TEM image. The results were shown in FIGS. 34A and 34B. In all analysis, an anatase crystalline structure was shown. Using a crystal axis (101) in XRD, a crystallite size of the titania crystal determined by the Debye-Scherrer method was 14 nm.

Example G

Synthesis Example of Terminally Branched Copolymer

The number average molecular weight (Mn), the weight average molecular weight (Mw) and the molecular weight distribution (Mw/Mn) were measured using GPC according to the method as described herein. For the melting point (Tm), the peak top temperature obtained by measuring with DSC was used. Incidentally, the melting point of the polyalkylene glycol portion is also confirmed under the measurement conditions, but melting point indicates the melting point of the polyolefin portion unless otherwise particularly noted. The measurement by ¹H-NMR was carried out at 120 degrees centigrade after completely dissolving the polymer in deuterated-1,1,2,2-tetrachloroethane, which functioned both as the lock solvent and the solvent, in a sample tube for measurement. For the chemical shift, the peak of deuterated-1,1,2,2-tetrachloroethane was set at 5.92 ppm, and the chemical shift values of other peaks were determined on this basis. For the particle size of the particles in the dispersion solution, the average particle size of 50% by volume was measured with a Microtrack UPA (a product of Honeywell, Inc.). The shape of the particles in the dispersion solution was observed under the condition of 100 kV with a transmission electron microscope (TEM, H-7650, commercially available from Hitachi, Ltd.), after diluting the sample by 200 to 500 times and performing negative staining with phosphotungstic acid.

Synthesis Example g1

Synthesis of Polyolefin Based Terminally Branched Copolymer (T-1)

In accordance with the following procedure (see, for example, Synthesis Example 2 of Japanese Laid-open Patent Publication No. 2006-131870), an epoxy-terminated ethylenic polymer (E-1) was synthesized.

To a 2000-ml stainless steel autoclave thoroughly purged with nitrogen, 1,000 ml of heptane was charged at room temperature, and the system was heated to 150 degrees centigrade. Subsequently, the autoclave was pressurized with ethylene to 30 kg/cm²G and the temperature was maintained.

To the autoclave, 0.5 ml (0.5 mmol) of a hexane solution (1.00 mmol/ml in terms of aluminum atoms) of MMAO (a product of Tosoh Finechem Corporation) was fed with pressure, and then 0.5 ml (0.0001 mmol) of a toluene solution (0.0002 mmol/ml) of a compound of the following formula was fed with pressure to initiate polymerization. Under ethylene gas atmosphere, polymerization was carried out at 150 degrees centigrade for 30 minutes, and then the polymerization was terminated by feeding a small amount of methanol with pressure. The obtained polymer solution was added to 3 liters of methanol containing a small amount of hydrochloric acid to precipitate out the polymer. The polymer was washed with methanol, and then dried at 80 degrees centigrade under reduced pressure for 10 hours, whereby a double bond-terminated ethylenic polymer (P-1) was obtained.

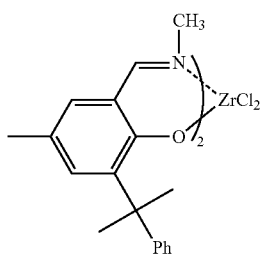

100 g of the double bond-terminated ethylenic polymer (P-1) (108 mmol of vinyl group in terms of Mn 850), 300 g of toluene, 0.85 g (2.6 mmol) of $Na_2WO_4$, 0.60 g (1.3 mmol) of $CH_3(nC_8H_{17})_3NHSO_4$ and 0.11 g (1.3 mmol) of phosphoric acid were introduced into a 500-mL separable flask, and the system was heated under reflux with stirring for 30 minutes to completely melt the polymer product. After adjusting the internal temperature to 90 degrees centigrade, 37 g (326 mmol) of aqueous 30% hydrogen peroxide was added dropwise over 3 hours and then stirred at an internal temperature of 90 to degrees centigrade for 3 hours. Thereafter, with the temperature being maintained at 90 degrees centigrade, 34.4 g (54.4 mmol) of an aqueous solution of 25% sodium thiosulfate was added and stirred for 30 minutes, and it was confirmed that the peroxide in the reaction system was completely decomposed with a peroxide test paper. Subsequently, at an internal temperature of 90 degrees centigrade, 200 g of dioxane was added to crystallize the product, and the solids were collected by filtration and washed with dioxane. The obtained solids were stirred in an aqueous solution of 50% methanol at room temperature, and the solids were collected by filtration and washed with methanol. The aforementioned solids were further stirred in 400 g of methanol, collected by filtration and washed with methanol. The solids were dried at room temperature under reduced pressure of 1 to 2 hPa, whereby 96.3 g of an epoxy-terminated ethylenic polymer (E-1) as a white solid (yield: 99%, conversion rate of olefin: 100%) was obtained.

The obtained epoxy-terminated ethylenic polymer (E-1) showed Mw=2,058, Mn=1,118 and Mw/Mn=1.84 (GPC) (content of terminal epoxy group: 90 mol %).

$^1$H-NMR: δ (C2D2Cl4) 0.88 (t, 3H, J=6.92 Hz), 1.18-1.66 (m), 2.38 (dd, 1H, J=2.64, 5.28 Hz), 2.66 (dd, 1H, J=4.29, 5.28 Hz), 2.80-2.87 (m, 1H)

Melting point (Tm): 121 degrees centigrade
Mw=2,058, Mn=1,118, Mw/Mn=1.84 (GPC)

84 parts by weight of the epoxy-terminated ethylenic polymer (E-1), 39.4 parts by weight of diethanolamine and 150 parts by weight of toluene were introduced into a 1,000-mL flask, and the system was stirred at 150 degrees centigrade for 4 hours. Thereafter, acetone was added while cooling the mixture to precipitate the reaction product, and the solids were collected by filtration. The obtained solids were stirred and washed with an aqueous acetone solution one time and further with acetone three times, and then the solids were collected by filtration. Thereafter, the solids were dried at room temperature under reduced pressure to obtain a polymer (I-1) (Mn: 1,223, in the general formula (9), A: a group formed by polymerization of ethylene (Mn: 1,075), $R^1$=$R^2$=a hydrogen atom, one of $Y^1$ and $Y^2$: a hydroxyl group, the other of $Y^1$ and $Y^2$: a bis(2-hydroxyethyl)amino group).

$^1$H-NMR: δ (C2D2Cl4) 0.88 (t, 3H, J=6.6 Hz), 0.95-1.92 (m), 2.38-2.85 (m, 6H), 3.54-3.71 (m, 5H)

Melting point (Tm): 121 degrees centigrade 20.0 parts by weight of the polymer (I-1) and 100 parts by weight of toluene were introduced into a 500-mL flask equipped with a nitrogen inlet tube, a thermometer, a condenser tube and a stirring rod, and the system was heated in an oil bath at 125 degrees centigrade with stirring to completely dissolve the solids. After cooling to 90 degrees centigrade, 0.323 parts by weight of 85% KOH that had been dissolved in 5.0 parts by weight of water in advance was added to the flask, and the contents were mixed under reflux condition for 2 hours. Subsequently, the temperature in the flask was slowly increased to 120 degrees centigrade, and water and toluene were distilled off. Water and toluene in the flask were further distilled off by reducing the pressure in the flask while supplying minimal nitrogen into the flask, increasing the internal temperature to 150 degrees centigrade, and then keeping the temperature for 4 hours. After cooling to room temperature, the solids solidified in the flask were broken and taken out.

18.0 parts by weight of the obtained solids and 200 parts by weight of dehydrated toluene were introduced into a 1.5-L stainless steel pressurized reactor equipped with a heating device, a stirring rod, a thermometer, a manometer and a safety valve, and after purging the gas phase with nitrogen, the system was heated to 130 degrees centigrade with stirring. After 30 minutes, 9.0 parts by weight of ethylene oxide was added thereto. After further maintaining at 130 degrees centigrade for 5 hours, the contents were cooled to room temperature to obtain a reactant. The solvent was removed by drying from the resulting reactant to obtain a terminally branched copolymer (T-1) (Mn: 1,835, in the general formula (1), A: a group formed by polymerization of ethylene (Mn: 1,075), $R^1$=$R^2$=a hydrogen atom, one of $X^1$ and $X^2$: a group represented by the general formula (6) ($X^{11}$: a polyethylene glycol group), the other of $X^1$ and $X^2$: a group represented by the general formula (5) ($Q^1$ and $Q^2$: an ethylene group, $X^9$ and $X^{10}$: a polyethylene glycol group)).

$^1$H-NMR: δ (C2D2Cl4) 0.88 (3H, t, J=6.8 Hz), 1.06-1.50 (m), 2.80-3.20 (m), 3.33-3.72 (m)

Melting point (Tm): −16 degrees centigrade (polyethylene glycol), 116 degrees centigrade Preparation Example of Aqueous Dispersion of Terminally Branched Copolymer Preparation Example g1

Preparation of Aqueous Dispersion Solution of 10 weight % Polyolefin Based Terminally Branched Copolymer (T-1)

10 parts by weight of the polyolefin based terminally branched copolymer (T-1) constituting the polymer particles (A) of Synthesis Example e1 and 40 parts by weight of distilled water as the solvent (C) were charged to a 100-ml autoclave, and the system was heated with stirring at a rate of 800 rpm at 140 degrees centigrade for 30 minutes, and then cooled to room temperature while stirring. The average particle size of 50% by volume of the obtained dispersion system was 0.018 μm (average particle size of 10% by volume: 0.014 μm, average particle size of 90% by volume: 0.022 μm). The particle size of the obtained dispersion system measured by using a transmission electron microscope was from 0.015 to 0.030 μm. Furthermore, 75 parts by weight of distilled water was added to 75 parts by weight of this T-1 aqueous dispersion solution (solid content: 20 weight %), whereby a 10 weight % T-1 aqueous dispersion solution was obtained.

Example g1

Preparation of Solution of Polyolefin Based Terminally Branched Copolymer and TMOS Dehydrated Condensate 15 parts by weight of methanol as the solvent was added to 10 parts by weight of tetramethoxysilane (TMOS), and stirred at room temperature. 2.6 parts by weight of an aqueous 1M oxalic acid solution was further added dropwise thereto, and then stirred at room temperature for 30 minutes, whereby a TMOS dehydrated condensate was obtained. Furthermore, 73.1 parts by weight of an aqueous dispersion (solid content: 10 weight %) of the polyolefin based terminally branched copolymer (T-1) was added dropwise thereto, and stirred at room temperature, whereby a solution of the polyolefin based terminally branched copolymer and TMOS dehydrated condensate was prepared (weight ratio of the polyolefin based terminally branched copolymer to silica in terms of $SiO_2$: 65/35).

The silica content represents the proportion of silica contained in the composite particles, and was calculated in the following method.

The silica content was calculated on the assumption that 100 weight % of TMOS as the component (B) in the above Example g1 reacted to become $SiO_2$.

Thus, from
TMOS: Mw=152,
$SiO_2$: Mw=60,
$SiO_2$/TMOS=60/152=0.395.

That is, the value obtained by multiplying the amount of TMOS by 0.395 is the $SiO_2$ content in the particles.

Formation of Composite Particles of Polyolefin Based Terminally Branched Copolymer and Silica This composition was poured into a spray dryer apparatus (a spray dryer, ADL311S-A, a product of Yamato Scientific Co., Ltd.) at a flow rate of 6 cc/min and pressurized (2.6 kg/cm$^2$) at a nozzle outlet temperature of 120 degrees centigrade for spraying, whereby composite fine particles of the polyolefin based terminally branched copolymer and silica were obtained.

Formation of Porous Silica Particles

The obtained composite particles of the polyolefin based terminally branched copolymer and silica were calcinated at 500 degrees centigrade for 1 hour using the electric furnace, whereby porous silica particles were obtained.

Furthermore, the particle size of porous silica particles was observed under the condition of 1.5 kV using a scanning electron microscope (SEM, JSM-6701F, commercially available from JEOL). As a result, the particle size was from 1 to 10 μm.

Evaluation of Porous Structure

A mesoporous structure inside porous particles of Example g1 was observed in the following method.

(1) Measurement of Average Pore Diameter

The porous silica particles of Example g1 were fixed with a resin, and cut into pieces by focused ion beam (FIB) processing. Subsequently, the shape of the cross section of this particle was observed under the condition of 200 kV using a transmission electron microscope (TEM, H-7650, commercially available from Hitachi, Ltd.). As a result, the pore diameter inside particles was from 10 to 20 nm.

(2) X-Ray Diffraction Measurement

The X-ray diffraction measurement was carried out using porous silica particles in Example g1 as a sample.

It was confirmed that the resulting diffraction image had a plurality of annular patterns.

From this fact, it was found that porous particles in Example g1 had a cubic phase structure. Meanwhile, from the analysis results of the above annular patterns, a cubic phase structure in Example g1 was considered to be an Im3n structure.

(3) Evaluation of Breaking Strength

Loads of 500 kg/cm$^2$, 1,000 kg/cm$^2$ and 2,000 kg/cm$^2$ were added to porous particles prepared in Examples g1 which were uniformly packed in 1 cm$^2$, and the shape retention ratio was observed under the condition of 1.5 kV using a scanning electron microscope (SEM, JSM-6701F, commercially available from JEOL). As a result, breaking strength was not less than 1,000 kg/cm$^2$.

(4) Moisture Absorption (Humidity Controlling) Properties

For moisture absorption (moisture controlling) properties, commercial activated carbon (Kuraray Coal GG, commercially available from Kuraray Chemical Co., Ltd.) and silica gel (Fuji Silica Gel B, commercially available from Fuji Silysia Chemical Ltd.) were used for a comparison.

A water vapor adsorption-desorption isotherm was measured using BELSORP-aqua33 (a product of Bel Japan, Inc.). Porous particles of the present invention exhibited higher water adsorption amount and higher moisture absorption properties at a relative pressure of 0.9 (humidity: 90%), as compared to commercial activated carbon and silica gel (Table g1).

Figure 35:
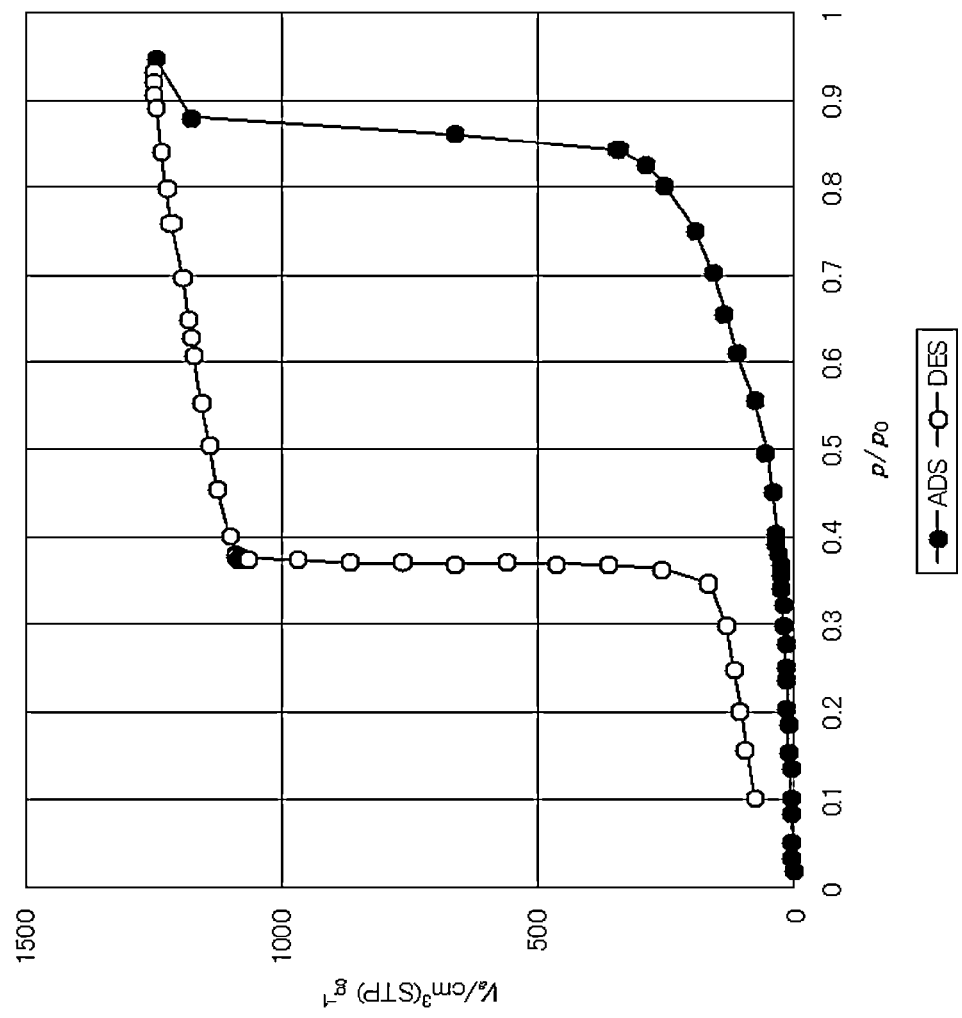
FIG. 35 illustrates a water vapor adsorption-desorption isotherm curve of porous particles in Example g1.

The water vapor adsorption-desorption isotherm of porous particles of Example g1 is shown in FIG. 35. In the water vapor adsorption-desorption isotherm, water vapor adsorption was small in the vicinity of 0.1 to 0.8 of adsorption of low P/P0, while water vapor adsorption amount was suddenly increased at 0.8 or higher. From the desorption side, sudden water vapor desorption was caused in the vicinity of 0.4. This shows that moisture controlling function is exhibited at a relative humidity of 40 to 80%.

TABLE g1

| | Water vapor adsorption amount (cm$^3$(STP)/g) | | |
|---|---|---|---|
| | Relative pressure (P/P0) = 0.1 | Relative pressure (P/P0) = 0.5 | Relative pressure (P/P0) = 0.9 |
| Example g1 | 6.3 | 54.5 | 1178 |
| Activated carbon | 1.8 | 31.4 | 440 |
| Silica gel | 61 | 180 | 760 |

For porous particles of the present invention, mechanical strength is high, water vapor adsorption amount is high, and moisture controlling function is high, so that it is very useful as a moisture absorption (conditioning) material.

From the above-mentioned adsorption performance, it is considered that the porous metal oxide of the present invention can be used for a deodorant, a filtration film, a separation film and the like.

Furthermore, the present invention also includes the following embodiments.

[a1] A porous metal oxide obtained by subjecting metal alkoxide and/or a partially hydrolyzed condensate of the metal alkoxide to a sol-gel reaction in the presence of terminally branched copolymer particles represented by the following general formula (1) and having a number average molecular weight of not more than $2.5 \times 10^4$ to obtain an organic-inorganic composite and removing the terminally branched copolymer particles from the composite,

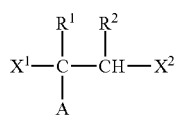
(1)

wherein, in the formula, A represents a polyolefin chain; $R^1$ and $R^2$ each represents a hydrogen atom or an alkyl group having 1 to 18 carbon atoms, and at least one of $R^1$ and $R^2$ is a hydrogen atom; and $X^1$ and $X^2$ are the same or different from each other, and each represents a linear or branched polyalkylene glycol group.

[a2] The porous metal oxide according to [a1], wherein the porous metal oxide has mesopores and a pore structure thereof is a cubic phase structure.

[a3] The porous metal oxide according to [a2], wherein the average pore diameter of the mesopores is from 10 to 30 nm.

[a4] The porous metal oxide according to anyone of [a1] to [a3], containing one or more metals selected from the group consisting of silicon, titanium, zirconium and aluminum.

[a5] The porous metal oxide according to anyone of [a1] to [a4], wherein, in the terminally branched copolymer represented by the general formula (1), $X^1$ and $X^2$ are the same or different from each other, and are each the general formula (2) or the general formula (4),

(2)

wherein, in the formula, E represents an oxygen atom or a sulfur atom; and $X^3$ represents a polyalkylene glycol group or a group represented by the following general formula (3),

(3)

wherein, in the formula, $R^3$ represents an (m+1)-valent hydrocarbon group; G may be the same or different from each other, and each represents a group represented by —$OX^4$ or —$NX^5X^6$ ($X^4$ to $X^6$ each represents a polyalkylene glycol group); and m is the bonding number of $R^3$ and G, and represents an integer of 1 to 10,

(4)

wherein, in the formula, $X^7$ and $X^8$ are the same or different from each other, and each represents a polyalkylene glycol group or a group represented by the above general formula (3).

[a6] The porous metal oxide according to any one of [a1] to [a5], wherein the terminally branched copolymer is represented by the following general formula (1a) or (1b),

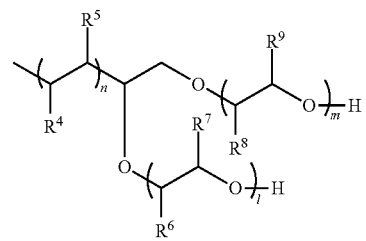
(1a)

wherein, in the formula, $R^4$ and $R^5$ each represents a hydrogen atom or an alkyl group having 1 to 18 carbon atoms, and at least one of $R^4$ and $R^5$ is a hydrogen atom; $R^6$ and $R^7$ each represents a hydrogen atom or a methyl group, and at least one of $R^6$ and $R^7$ is a hydrogen atom; $R^8$ and $R^9$ each represents a hydrogen atom or a methyl group, and at least one of $R^8$ and $R^9$ is a hydrogen atom; l+m represents an integer of 2 to 450; and n represents an integer of 20 to 300,

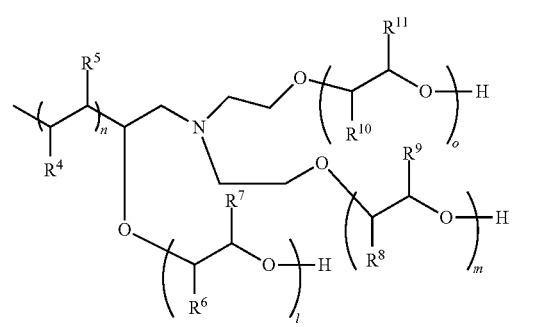
(1b)

wherein, in the formula, $R^4$ and $R^5$ each represents a hydrogen atom or an alkyl group having 1 to 18 carbon atoms, and at least one of $R^4$ and $R^5$ is a hydrogen atom; $R^6$ and $R^7$ each represents a hydrogen atom or a methyl group, and at least one of $R^6$ and $R^7$ is a hydrogen atom; $R^8$ and $R^9$ each represents a hydrogen atom or a methyl group, and at least one of $R^8$ and $R^9$ is a hydrogen atom; $R^{10}$ and $R^{11}$ each represents a hydrogen atom or a methyl group, and at least one of $R^{10}$ and $R^{11}$ is hydrogen atom; l+m+o represents an integer of 3 to 450; and n represents an integer of 20 to 300.

[a7] The porous metal oxide according to anyone of [a1] to [a6], wherein the porous metal oxide is in the form of a particle or a film.

[a8] The porous metal oxide according to anyone of [a1] to [a7], wherein the organic-inorganic composite is obtained from a mixed composition containing the following (A) to (D), (A) the above-mentioned terminally branched copolymer particles;

(B) the above-mentioned metal alkoxide and/or a partially hydrolyzed condensate of the metal alkoxide;

(C) water and/or a solvent dissolving a part of water or entire water in any proportions; and (D) a catalyst to be used for a sol-gel reaction.

[a9] A porous metal oxide, wherein the porous metal oxide has mesopores having an average pore diameter of 10 to 30 nm and a pore structure thereof is a cubic phase structure.

[a10] A method for producing a porous metal oxide, comprising a step of subjecting metal alkoxide and/or a partially hydrolyzed condensate of the metal alkoxide to a sol-gel reaction in the presence of terminally branched copolymer particles represented by the following general formula (1), a step of obtaining an organic-inorganic composite by drying the reaction solution obtained in the above step, and a step of producing a porous metal oxide by removing the terminally branched copolymer particles from the organic-inorganic composite,

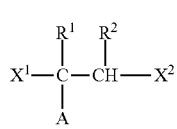
(1)

wherein, in the formula, A represents a polyolefin chain; $R^1$ and $R^2$ each represents a hydrogen atom or an alkyl group having 1 to 18 carbon atoms, and at least one of $R^1$ and $R^2$ is a hydrogen atom; and $X^1$ and $X^2$ are the same or different from each other, and each represents a linear or branched polyalkylene glycol group.

[a11] The method for producing a porous metal oxide according to [a10], in which the above step of subjecting the metal alkoxide and/or a partially hydrolyzed condensate of the metal alkoxide to a sol-gel reaction is a step of producing a mixed composition by mixing the terminally branched copolymer particles, the metal alkoxide and/or a partially hydrolyzed condensate of the metal alkoxide, water and/or a solvent dissolving a part of water or entire water in any proportions, and a catalyst to be used for a sol-gel reaction and subjecting the metal alkoxide and/or a partially hydrolyzed condensate of the metal alkoxide to a sol-gel reaction in the presence of the catalyst to be used for a sol-gel reaction.

[a12] The method for producing a porous metal oxide according to [a10] or [a11], in which the above step of subjecting the metal alkoxide and/or a partially hydrolyzed condensate of the metal alkoxide to a sol-gel reaction includes a step of mixing the metal alkoxide and/or a partially hydrolyzed condensate of the metal alkoxide, water and/or a solvent dissolving a part of water or entire water in any proportions, and a catalyst to be used for a sol-gel reaction, and subjecting the metal alkoxide and/or a partially hydrolyzed condensate of the metal alkoxide to a sol-gel reaction, and a step of adding the terminally branched copolymer particles while continuing the sol-gel reaction in the above step.

[a13] The method for producing a porous metal oxide according to any one of [a10] to [a12], in which the above step of obtaining an organic-inorganic composite comprises a step of forming a particulate organic-inorganic composite by drying the reaction solution by the spray dryer method.

[a14] The method for producing a porous metal oxide according to any one of [a10] to [a12], in which the above step of obtaining an organic-inorganic composite comprises a step of forming a film-like organic-inorganic composite by applying the reaction solution over a substrate and drying the resulting material.

[a15] The method for producing a porous metal oxide according to any one of [a10] to [a14], in which, in the terminally branched copolymer represented by the general formula (1), $X^1$ and $X^2$ are the same or different from each other, and are each the general formula (2) or the general formula (4),

(2)

wherein, in the formula, E represents an oxygen atom or a sulfur atom; and $X^3$ represents a polyalkylene glycol group or a group represented by the following general formula (3),

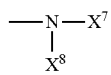
(3)

wherein, in the formula, $R^3$ represents an (m+1)-valent hydrocarbon group; G may be the same or different from each other, and each represents a group represented by $-OX^4$ or $-NX^5X^6$ ($X^4$ to $X^6$ each represents a polyalkylene glycol group); and m is the bonding number of $R^3$ and G, and represents an integer of 1 to 10, $$-\underset{\underset{X^8}{|}}{\overset{}{N}}-X^7 \qquad (4)$$

wherein, in the formula, $X^7$ and $X^8$ are the same or different from each other, and each represents a polyalkylene glycol group or a group represented by the above general formula (3).

[a16] The method for producing a porous metal oxide according to any one of [a10] to [a15], in which the terminally branched copolymer is represented by the following general formula (1a) or (1b),

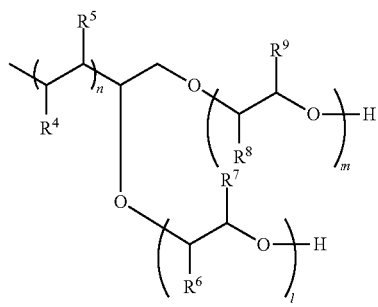
(1a)

wherein, in the formula, $R^4$ and $R^5$ each represents a hydrogen atom or an alkyl group having 1 to 18 carbon atoms, and at least one of $R^4$ and $R^5$ is a hydrogen atom; $R^6$ and $R^7$ each represents a hydrogen atom or a methyl group, and at least one of $R^6$ and $R^7$ is a hydrogen atom; $R^8$ and $R^9$ each represents a hydrogen atom or a methyl group, and at least one of $R^8$ and $R^9$ is a hydrogen atom; l+m represents an integer of 2 to 450; and n represents an integer of 20 to 300,

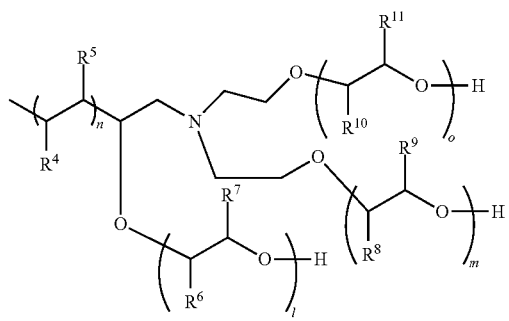
(1b)

wherein, in the formula, $R^4$ and $R^5$ each represents a hydrogen atom or an alkyl group having 1 to 18 carbon atoms, and at least one of $R^4$ and $R^5$ is a hydrogen atom; $R^6$ and $R^7$ each represents a hydrogen atom or a methyl group, and at least one of $R^6$ and $R^7$ is a hydrogen atom; $R^8$ and $R^9$ each represents a hydrogen atom or a methyl group, and at least one of $R^8$ and $R^9$ is a hydrogen atom; $R^{10}$ and $R^{11}$ each represents a hydrogen atom or a methyl group, and at least one of $R^{10}$ and $R^{11}$ is hydrogen atom; l+m+o represents an integer of 3 to 450; and n represents an integer of 20 to 300.

[a17] A catalyst or a catalyst carrier comprising the porous metal oxide according to any one of [a1] to [a9].

[a18] A material carrier comprising the porous metal oxide according to any one of [a1] to [a9].

[a19] A solid electrolyte film comprising the porous metal oxide according to any one of [a1] to [a9].

[a20] A deodorant comprising the porous metal oxide according to any one of [a1] to [a9].

[a21] A filtration film comprising the porous metal oxide according to any one of [a1] to [a9].

[a22] A separation film comprising the porous metal oxide according to any one of [a1] to [a9].

[a23] A release-controlling material comprising the porous metal oxide according to any one of [a1] to [a9].

[b1] An insulating film used as a substrate constituting a circuit board or an interlayer insulating film, wherein the insulating layer comprises a porous metal oxide having a mesoporous structure, and the porous metal oxide has a cubic phase structure.

[b2] The insulating film according to [b1], wherein the dielectric constant measured at 10 MHz by the static capacitor method is not more than 2.0.

[b3] The insulating film according to [b1] or [b2], wherein the elastic modulus is not less than 8 GPa.

[b4] The insulating film according to any one of [b1] to [b3], wherein the hardness is not less than 0.5 GPa.

[b5] The insulating film according to any one of [b1] to [b4], wherein the average pore diameter of mesopores in the porous metal oxide is from 10 to 30 nm.

[b6] The insulating film according to any one of [b1] to [b5], wherein the surface of the porous metal oxide and the inside of pores are hydrophobized.

[b7] The insulating film according to any one of [b1] to [b6], wherein the porous metal oxide is obtained by subjecting metal alkoxide and/or a partially hydrolyzed condensate of the metal alkoxide to a sol-gel reaction in the presence of terminally branched copolymer particles represented by the following general formula (1) to obtain an organic-inorganic composite and removing the terminally branched copolymer particles from the composite,

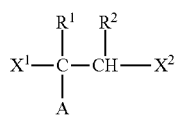

(1)

wherein, in the formula, A represents a polyolefin chain; $R^1$ and $R^2$ each represents a hydrogen atom or an alkyl group having 1 to 18 carbon atoms, and at least one of $R^1$ and $R^2$ is a hydrogen atom; and $X^1$ and $X^2$ may be the same or different from each other, and each represents a linear or branched polyalkylene glycol group.

[b8] The insulating film according to any one of [b1] to [b7], wherein the metal oxide of the porous metal oxide is silicon (silica).

[b9] The insulating film according to [b7] or [b8], wherein, in the terminally branched copolymer represented by the aforementioned general formula (1), $X^1$ and $X^2$ are the same or different from each other, and are each the general formula (2) or the general formula (4),

(2)

wherein, in the formula, E represents an oxygen atom or a sulfur atom; and $X^3$ represents a polyalkylene glycol group or a group represented by the following general formula (3),

(3)

wherein, in the formula, $R^3$ represents an (m+1)-valent hydrocarbon group; G may be the same or different from each other, and each represents a group represented by —$OX^4$ or —$NX^5X^6$ ($X^4$ to $X^6$ each represents a polyalkylene glycol group); and m is the bonding number of $R^3$ and G, and represents an integer of 1 to 10, (4)

wherein, in the formula, $X^7$ and $X^8$ are the same or different from each other, and each represents a polyalkylene glycol group or a group represented by the above general formula (3).

[b10] The insulating film according to any one of [b7] to [b9], wherein the terminally branched copolymer is represented by the following general formula (1a) or (1b),

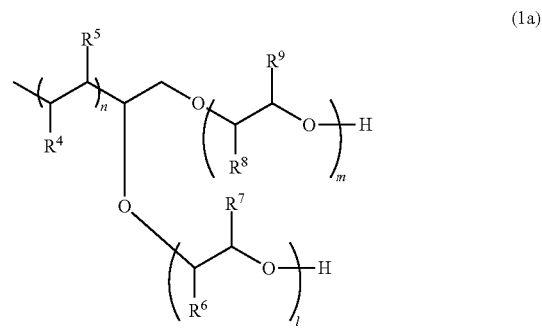

(1a)

wherein, in the formula, $R^4$ and $R^5$ each represents a hydrogen atom or an alkyl group having 1 to 18 carbon atoms, and at least one of $R^4$ and $R^5$ is a hydrogen atom; $R^6$ and $R^7$ each represents a hydrogen atom or a methyl group, and at least one of $R^6$ and $R^7$ is a hydrogen atom; $R^8$ and $R^9$ each represents a hydrogen atom or a methyl group, and at least one of $R^8$ and $R^9$ is a hydrogen atom; l+m represents an integer of 2 to 450; and n represents an integer of 20 to 300,

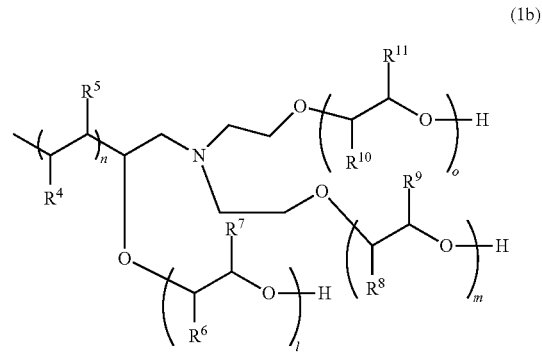

(1b)

wherein, in the formula, $R^4$ and $R^5$ each represents a hydrogen atom or an alkyl group having 1 to 18 carbon atoms, and at least one of $R^4$ and $R^5$ is a hydrogen atom; $R^6$ and $R^7$ each represents a hydrogen atom or a methyl group, and at least one of $R^6$ and $R^7$ is a hydrogen atom; $R^8$ and $R^9$ each represents a hydrogen atom or a methyl group, and at least one of $R^8$ and $R^9$ is a hydrogen atom; $R^{10}$ and $R^{11}$ each represents a hydrogen atom or a methyl group, and at least one of $R^{10}$ and $R^{11}$ is hydrogen atom; l+m+o represents an integer of 3 to 450; and n represents an integer of 20 to 300.

[b11] The insulating film according to any one of [b7] to [b10], wherein the organic-inorganic composite is obtained from a mixed composition comprising the following (A) to (D), (A) the above-mentioned terminally branched copolymer particles;

(B) the above-mentioned metal alkoxide and/or a partially hydrolyzed condensate of the metal alkoxide;

(C) water and/or a solvent dissolving a part of water or entire water in any proportions; and (D) a catalyst to be used for a sol-gel reaction.

[b12] A substrate constituting a circuit board, comprising the insulating layer according to any one of [b1] to [b11].

[b13] An interlayer insulating film comprising the insulating layer according to any one of [b1] to [b11].

[c1] A filler used for filling in a substrate constituting a circuit board or an interlayer insulating film, wherein the filler comprises metal oxide particles having a mesoporous structure, and the metal oxide particles have a cubic phase structure.

[c2] The filler according to [c1], wherein the pore volume of mesopores in the metal oxide particles is not less than 0.1 ml/g.

[c3] The filler according to [c1] or [c2], wherein the specific surface area by the BET method is not less than 100 $m^2/g$.

[c4] The filler according to any one of [c1] to [c3], wherein the dielectric constant measured at 1 MHz by the static capacitor method is not more than 2.0.

[c5] The filler according to any one of [c1] to [c4], wherein the average pore diameter of mesopores in the metal oxide particles is from 10 to 30 nm.

[c6] The filler according to any one of [c1] to [c5], wherein the surface of the metal oxide particles and the inside of pores are hydrophobized.

[c7] The filler according to any one of [c1] to [c6], wherein the metal oxide particles are obtained by subjecting metal alkoxide and/or a partially hydrolyzed condensate of the metal alkoxide to a sol-gel reaction in the presence of terminally branched copolymer particles represented by the following general formula (1) to obtain an organic-inorganic composite and removing the terminally branched copolymer particles from the composite,

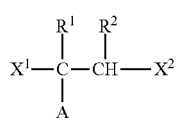
(1)

wherein, in the formula, A represents a polyolefin chain; $R^1$ and $R^2$ each represents a hydrogen atom or an alkyl group having 1 to 18 carbon atoms, and at least one of $R^1$ and $R^2$ is a hydrogen atom; and $X^1$ and $X^2$ are the same or different from each other, and each represents a linear or branched polyalkylene glycol group.

[c8] The filler according to any one of [c1] to [c7], wherein the metal oxide of the metal oxide particles is silicon (silica).

[c9] The filler according to [c7] or [c8], wherein, in the terminally branched copolymer particles represented by the aforementioned general formula (1), $X^1$ and $X^2$ are the same or different from each other, and are each the general formula (2) or the general formula (4),

(2)

wherein, in the formula, E represents an oxygen atom or a sulfur atom; and $X^3$ represents a polyalkylene glycol group or a group represented by the following general formula (3),

(3)

wherein, in the formula, $R^3$ represents an (m+1)-valent hydrocarbon group; G may be the same or different from each other, and each represents a group represented by —$OX^4$ or —$NX^5X^6$ ($X^4$ to $X^6$ each represents a polyalkylene glycol group); and m is the bonding number of $R^3$ and G, and represents an integer of 1 to 10,

(4)

wherein, in the formula, $X^7$ and $X^8$ are the same or different from each other, and each represents a polyalkylene glycol group or a group represented by the above general formula (3).

[c10] The filler according to any one of [c7] to [c9], wherein the terminally branched copolymer particles are represented by the following general formula (1a) or (1b),

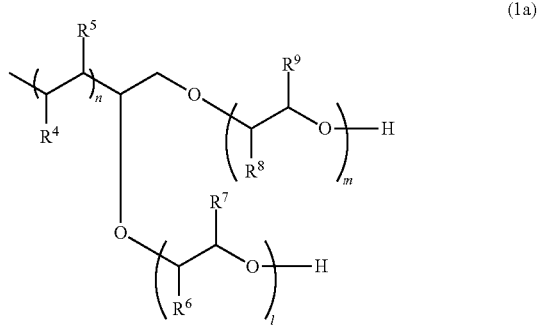
(1a)

wherein, in the formula, $R^4$ and $R^5$ each represents a hydrogen atom or an alkyl group having 1 to 18 carbon atoms, and at least one of $R^4$ and $R^5$ is a hydrogen atom; $R^6$ and $R^7$ each represents a hydrogen atom or a methyl group, and at least one of $R^6$ and $R^7$ is a hydrogen atom; $R^8$ and $R^9$ each represents a hydrogen atom or a methyl group, and at least one of $R^8$ and $R^9$ is a hydrogen atom; l+m represents an integer of 2 to 450; and n represents an integer of 20 to 300,

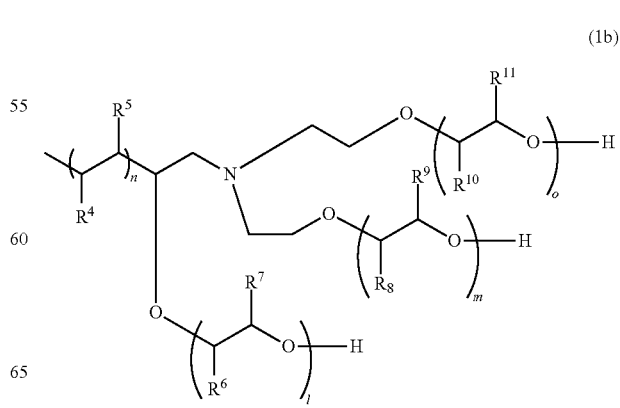
(1b)

wherein, in the formula, $R^4$ and $R^5$ each represents a hydrogen atom or an alkyl group having 1 to 18 carbon atoms, and at least one of $R^4$ and $R^5$ is a hydrogen atom; $R^6$ and $R^7$ each represents a hydrogen atom or a methyl group, and at least one of $R^6$ and $R^7$ is a hydrogen atom; $R^8$ and $R^9$ each represents a hydrogen atom or a methyl group, and at least one of $R^8$ and $R^9$ is a hydrogen atom; $R^{10}$ and $R^{11}$ each represents a hydrogen atom or a methyl group, and at least one of $R^{10}$ and $R^{11}$ is hydrogen atom; l+m+o represents an integer of 3 to 450; and n represents an integer of 20 to 300.

[c11] The filler according to any one of [c7] to [c10], wherein the organic-inorganic composite is obtained from a mixed composition comprising the following (A) to (D), (A) the above-mentioned terminally branched copolymer particles;

(B) the above-mentioned metal alkoxide and/or a partially hydrolyzed condensate of the metal alkoxide;

(C) water and/or a solvent dissolving a part of water or entire water in any proportions; and (D) a catalyst to be used for a sol-gel reaction.

[c12] A film obtained by dispersing the filler according to any one of [c1] to [c11] in a matrix resin.

[c13] A substrate constituting a circuit board comprising the film according to [c12].

[c14] An interlayer insulating film comprising the film according to [c12].

[d1] An antireflection film comprising a porous metal oxide having a mesoporous structure, wherein the porous metal oxide has a cubic phase structure.

[d2] The antireflection film according to [d1], wherein the refractive index at a wavelength of 590 nm is not more than 1.4.

[d3] The antireflection film according to [d1] or [d2], wherein the elastic modulus is not less than 8 GPa.

[d4] The antireflection film according to any one of [d1] to [d3], wherein the hardness is not less than 0.5 GPa.

[d5] The antireflection film according to any one of [d1] to [d4], wherein the average pore diameter of mesopores in the porous metal oxide is from 10 to 30 nm.

[d6] The antireflection film according to any one of [d1] to [d5], arranged on a surface of a display screen comprising a transparent base material.

[d7] The antireflection film according to any one of [d1] to [d6], wherein the porous metal oxide is obtained by subjecting metal alkoxide and/or a partially hydrolyzed condensate of the metal alkoxide to a sol-gel reaction in the presence of terminally branched copolymer particles represented by the following general formula (1) to obtain an organic-inorganic composite and removing the terminally branched copolymer particles from the composite,

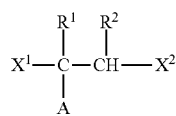
(1)

wherein, in the formula, A represents a polyolefin chain; $R^1$ and $R^2$ each represents a hydrogen atom or an alkyl group having 1 to 18 carbon atoms, and at least one of $R^1$ and $R^2$ is a hydrogen atom; and $X^1$ and $X^2$ may be the same or different from each other, and each represents a linear or branched polyalkylene glycol group.

[d8] The antireflection film according to any one of [d1] to [d7], wherein the metal oxide of the porous metal oxide is silicon (silica).

[d9] The antireflection film according to [d7] or [d8], wherein, in the terminally branched copolymer represented by the above general formula (1), $X^1$ and $X^2$ are the same or different from each other, and are each the general formula (2) or the general formula (4),

(2)

wherein, in the formula, E represents an oxygen atom or a sulfur atom; and $X^3$ represents a polyalkylene glycol group or a group represented by the following general formula (3),

(3)

wherein, in the formula, $R^3$ represents an (m+1)-valent hydrocarbon group; G may be the same or different from each other, and each represents a group represented by $-OX^4$ or $-NX^5X^6$ ($X^4$ to $X^6$ each represents a polyalkylene glycol group); and m is the bonding number of $R^3$ and G, and represents an integer of 1 to 10,

(4)

wherein, in the formula, $X^7$ and $X^8$ are the same or different from each other, and each represents a polyalkylene glycol group or a group represented by the above general formula (3).

[d10] The antireflection film according to any one of [d7] to [d9], wherein the terminally branched copolymer is represented by the following general formula (1a) or (1b),

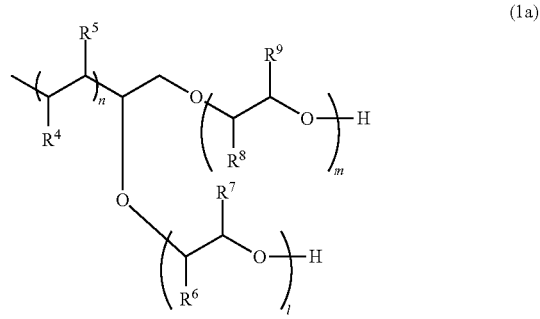
(1a)

wherein, in the formula, $R^4$ and $R^5$ each represents a hydrogen atom or an alkyl group having 1 to 18 carbon atoms, and at least one of $R^4$ and $R^5$ is a hydrogen atom; $R^6$ and $R^7$ each represents a hydrogen atom or a methyl group, and at least one of $R^6$ and $R^7$ is a hydrogen atom; $R^8$ and $R^9$ each represents a hydrogen atom or a methyl group, and at least one of $R^8$ and $R^9$ is a hydrogen atom; l+m represents an integer of 2 to 450; and n represents an integer of 20 to 300,

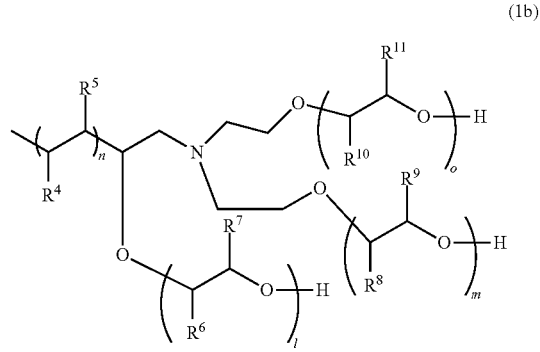
(1b)

wherein, in the formula, R⁴ and R⁵ each represents a hydrogen atom or an alkyl group having 1 to 18 carbon atoms, and at least one of R⁴ and R⁵ is a hydrogen atom; R⁶ and R⁷ each represents a hydrogen atom or a methyl group, and at least one of R⁶ and R⁷ is a hydrogen atom; R⁸ and R⁹ each represents a hydrogen atom or a methyl group, and at least one of R⁸ and R⁹ is a hydrogen atom; R¹⁰ and R¹¹ each represents a hydrogen atom or a methyl group, and at least one of R¹⁰ and R¹¹ is hydrogen atom; l+m+o represents an integer of 3 to 450; and n represents an integer of 20 to 300.

[d11] The antireflection film according to any one of [d7] to [d10], wherein the organic-inorganic composite is obtained from a mixed composition comprising the following (A) to (D), (A) the above-mentioned terminally branched copolymer particles;

(B) the above-mentioned metal alkoxide and/or a partially hydrolyzed condensate of the metal alkoxide;

(C) water and/or a solvent dissolving a part of water or entire water in any proportions; and (D) a catalyst to be used for a sol-gel reaction.

[d12] An optical material using the antireflection film according to any one of [d1] to [d11].

[e1] A lightweight filler comprising metal oxide particles, wherein the metal oxide particles have mesopores and a pore structure thereof is a cubic phase structure.

[e2] The lightweight filler according to [e1], wherein the average particle size of the metal oxide particles is from 0.1 to 100 μm.

[e3] The lightweight filler according to [e1] or [e2], wherein the bulk specific gravity determined by the tapping method is not more than 0.2 g/ml.

[e4] The lightweight filler according to anyone of [e1] to [e3], wherein the thermal conductivity determined by the laser flash method is not more than 0.15 W/mK.

[e5] The lightweight filler according to anyone of [e1] to [e4], wherein the metal constituting the metal oxide particles is silicon.

[e6] The lightweight filler according to anyone of [e1] to [e5], wherein the average pore diameter of the mesopores is from 10 to 30 nm.

[e7] The lightweight filler according to any one of [e1] to [e6] comprising the metal oxide particles, obtained by subjecting metal alkoxide and/or a partially hydrolyzed condensate of the metal alkoxide to a sol-gel reaction in the presence of terminally branched copolymer particles represented by the following general formula (1) to obtain an organic-inorganic composite and removing the terminally branched copolymer particles from the composite,

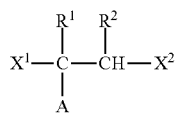

(1)

wherein, in the formula, A represents a polyolefin chain; R¹ and R² each represents a hydrogen atom or an alkyl group having 1 to 18 carbon atoms, and at least one of R¹ and R² is a hydrogen atom; and X¹ and X² are the same or different from each other, and each represents a linear or branched polyalkylene glycol group.

[e8] The lightweight filler according to [e7], wherein, in the terminally branched copolymer represented by the above general formula (1), X¹ and X² are the same or different from each other, and are each the general formula (2) or the general formula (4),

(2)

wherein, in the formula, E represents an oxygen atom or a sulfur atom; and X³ represents a polyalkylene glycol group or a group represented by the following general formula (3),

(3)

wherein, in the formula, R³ represents an (m+1)-valent hydrocarbon group; G may be the same or different from each other, and each represents a group represented by —OX⁴ or —NX⁵X⁶ (X⁴ to X⁶ each represents a polyalkylene glycol group); and m is the bonding number of R³ and G, and represents an integer of 1 to 10,

(4)

wherein, in the formula, X⁷ and X⁸ are the same or different from each other, and each represents a polyalkylene glycol group or a group represented by the above general formula (3).

[e9] The lightweight filler according to [e7] or [e8], wherein the terminally branched copolymer is represented by the following general formula (1a) or (1b),

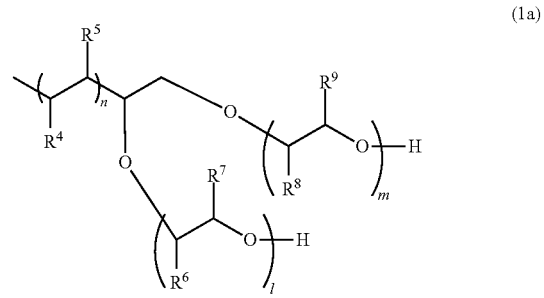

(1a)

wherein, in the formula, R⁴ and R⁵ each represents a hydrogen atom or an alkyl group having 1 to 18 carbon atoms, and at least one of R⁴ and R⁵ is a hydrogen atom; R⁶ and R⁷ each represents a hydrogen atom or a methyl group, and at least one of R⁶ and R⁷ is a hydrogen atom; R⁸ and R⁹ each represents a hydrogen atom or a methyl group, and at least one of R⁸ and R⁹ is a hydrogen atom; l+m represents an integer of 2 to 450; and n represents an integer of 20 to 300,

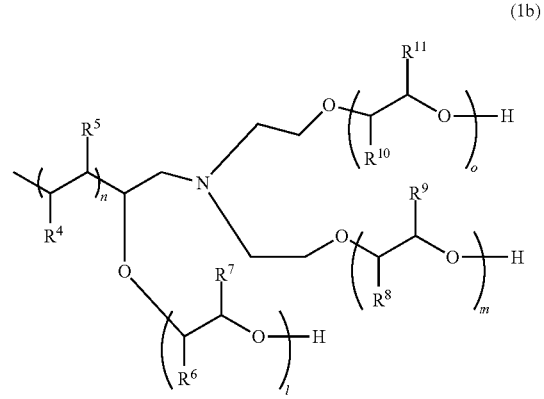

(1b)

wherein, in the formula, R⁴ and R⁵ each represents a hydrogen atom or an alkyl group having 1 to 18 carbon atoms, and at least one of R⁴ and R⁵ is a hydrogen atom; R⁶ and R⁷ each represents a hydrogen atom or a methyl group, and at least one of $R^6$ and $R^7$ is a hydrogen atom; $R^8$ and $R^9$ each represents a hydrogen atom or a methyl group, and at least one of $R^8$ and $R^9$ is a hydrogen atom; $R^{10}$ and $R^{11}$ each represents a hydrogen atom or a methyl group, and at least one of $R^{10}$ and $R^{11}$ is hydrogen atom; l+m+o represents an integer of 3 to 450; and n represents an integer of 20 to 300.

[e10] The lightweight filler according to any one of [e7] to [e9], wherein the organic-inorganic composite is obtained from a mixed composition comprising the following (A) to (D), (A) the above-mentioned terminally branched copolymer particles;

(B) the above-mentioned metal alkoxide and/or a partially hydrolyzed condensate of the metal alkoxide;

(C) water and/or a solvent dissolving a part of water or entire water in any proportions; and (D) a catalyst to be used for a sol-gel reaction.

[f1] A photocatalyst comprising a titania porous body having a mesoporous structure.

[f2] The photocatalyst according to [f1], wherein the mesopores in the titania porous body have a vertical orientation.

[f3] The photocatalyst according to [f1] or [f2], wherein the transmittance in the wavelength range of 400 to 600 nm is not less than 80%.

[f4] The photocatalyst according to any one of [f1] to [f3], wherein the average pore diameter of the mesopores in the titania porous body is from 10 to 30 nm.

[f5] The photocatalyst according to any one of [f1] to [f4], wherein the photocatalyst is in the form of a film.

[f6] The photocatalyst according to any one of [f1] to [f5], wherein the water contact angle on the catalyst immediately before irradiation with ultraviolet light is not more than 20 degrees.

[f7] The photocatalyst according to any one of [f1] to [f6], wherein the water contact angle on the catalyst kept at a dark place for 1 day after irradiation with ultraviolet light is not more than 10 degrees.

[f8] The photocatalyst according to any one of [f1] to [f7], wherein the titania porous body is obtained by subjecting titanium alkoxide and/or a partially hydrolyzed condensate of the titanium alkoxide to a sol-gel reaction in the presence of terminally branched copolymer particles represented by the following general formula (1) to obtain an organic-inorganic composite and removing the terminally branched copolymer particles from the composite,

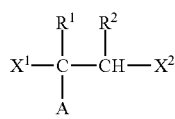

(1)

wherein, in the formula, A represents a polyolefin chain; $R^1$ and $R^2$ each represents a hydrogen atom or an alkyl group having 1 to 18 carbon atoms, and at least one of $R^1$ and $R^2$ is a hydrogen atom; and $X^1$ and $X^2$ are the same or different from each other, and each represents a linear or branched polyalkylene glycol group.

[f9] The photocatalyst according to [f8], wherein, in the terminally branched copolymer represented by the general formula (1), $X^1$ and $X^2$ are the same or different from each other, and are each the general formula (2) or the general formula (4), $$-E-X^3 \qquad (2)$$

wherein, in the formula, E represents an oxygen atom or a sulfur atom; and $X^3$ represents a polyalkylene glycol group or a group represented by the following general formula (3),

(3)

wherein, in the formula, $R^3$ represents an (m+1)-valent hydrocarbon group; G may be the same or different from each other, and each represents a group represented by $-OX^4$ or $-NX^5X^6$ ($X^4$ to $X^6$ each represents a polyalkylene glycol group); and m is the bonding number of $R^3$ and G, and represents an integer of 1 to 10,

(4)

wherein, in the formula, $X^7$ and $X^8$ are the same or different from each other, and each represents a polyalkylene glycol group or a group represented by the above general formula (3).

[f10] The photocatalyst according to [f8] or [f9], wherein the terminally branched copolymer is represented by the following general formula (1a) or (1b),

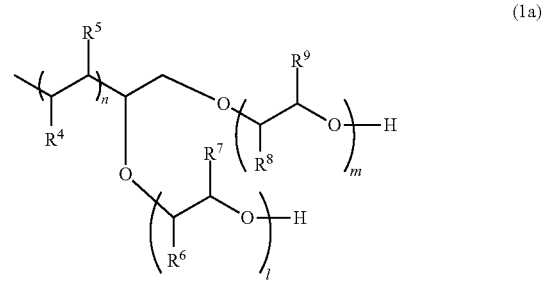

(1a)

wherein, in the formula, $R^4$ and $R^5$ each represents a hydrogen atom or an alkyl group having 1 to 18 carbon atoms, and at least one of $R^4$ and $R^5$ is a hydrogen atom; $R^6$ and $R^7$ each represents a hydrogen atom or a methyl group, and at least one of $R^6$ and $R^7$ is a hydrogen atom; $R^8$ and $R^9$ each represents a hydrogen atom or a methyl group, and at least one of $R^8$ and $R^9$ is a hydrogen atom; l+m represents an integer of 2 to 450; and n represents an integer of 20 to 300,

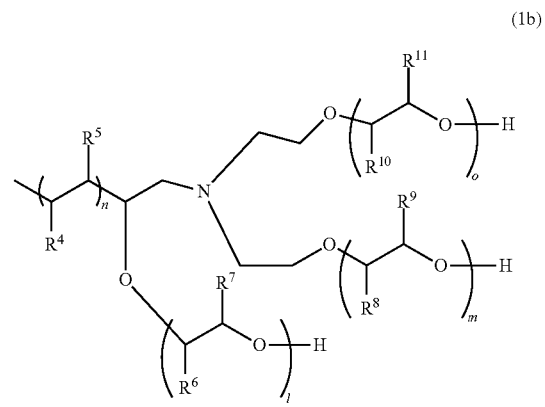

(1b)

wherein, in the formula, $R^4$ and $R^5$ each represents a hydrogen atom or an alkyl group having 1 to 18 carbon atoms, and at least one of $R^4$ and $R^5$ is a hydrogen atom; $R^6$ and $R^7$ each represents a hydrogen atom or a methyl group, and at least one of $R^6$ and $R^7$ is a hydrogen atom; $R^8$ and $R^9$ each represents a hydrogen atom or a methyl group, and at least one of $R^8$ and $R^9$ is a hydrogen atom; $R^{10}$ and $R^{11}$ each represents a hydrogen atom or a methyl group, and at least one of $R^{10}$ and $R^{11}$ is hydrogen atom; l+m+o represents an integer of 3 to 450; and n represents an integer of 20 to 300.

[f11] The photocatalyst according to any one of [f1] to [f10], used for an electrode material for a dye-sensitized solar cell.

[f12] The photocatalyst according to any one of [f8] to [f11], wherein the organic-inorganic composite is obtained from a mixed composition comprising the following (A) to (D), (A) the above-mentioned terminally branched copolymer particles;

(B) the above-mentioned titanium alkoxide and/or a partially hydrolyzed condensate of the titanium alkoxide;

(C) water and/or a solvent dissolving a part of water or entire water in any proportions; and (D) a catalyst to be used for a sol-gel reaction.

The invention claimed is:

1. A method for producing a porous metal oxide, comprising a step of subjecting a metal oxide precursor selected from metal alkoxide and/or a partially hydrolyzed condensate of the metal alkoxide, metal halide, metal acetate and metal nitrate to a sol-gel reaction in the presence of terminally branched copolymer particles represented by the following general formula (1) and having a number average molecular weight of not more than $2.5 \times 10^4$, a step of obtaining an organic-inorganic composite by drying the reaction solution obtained in the above step, and a step of producing a porous metal oxide by removing said terminally branched copolymer particles from the organic-inorganic composite,

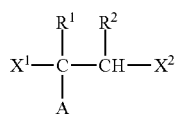

(1)

wherein, in the formula, A represents a polyolefin chain; $R^1$ and $R^2$ each represents a hydrogen atom or an alkyl group having 1 to 18 carbon atoms, and at least one of $R^1$ and $R^2$ is a hydrogen atom; $X^1$ and $X^2$ are the same or different from each other, and each represents a linear or branched polyalkylene glycol group; and $X^1$ and $X^2$ may be bonded to a carbon atom through a hydrocarbon group, an oxygen atom, a sulfur atom or a nitrogen atom.

2. The method for producing a porous metal oxide according to claim 1, in which, in the terminally branched copolymer represented by the general formula (1), $X^1$ and $X^2$ are the same or different from each other, and are each the general formula (2) or the general formula (4),

-E-$X^3$ (2)

wherein, in the formula, E represents an oxygen atom or a sulfur atom; and $X^3$ represents a polyalkylene glycol group or a group represented by the following general formula (3), —$R^3$-(G)$_m$ (3)

wherein, in the formula, $R^3$ represents an (m+1)-valent hydrocarbon group; G may be the same or different from each other, and each represents a group represented by —$OX^4$ or —$NX^5X^6$ ($X^4$ to $X^6$ each represents a polyalkylene glycol group); and m is the bonding number of $R^3$ and G, and represents an integer of 1 to 10,

(4)

wherein, in the formula, $X^7$ and $X^8$ are the same or different from each other, and each represents a polyalkylene glycol group or a group represented by the above general formula (3).

3. The method for producing a porous metal oxide according to claim 1, in which the terminally branched copolymer is represented by the following general formula (1a) or (1b),

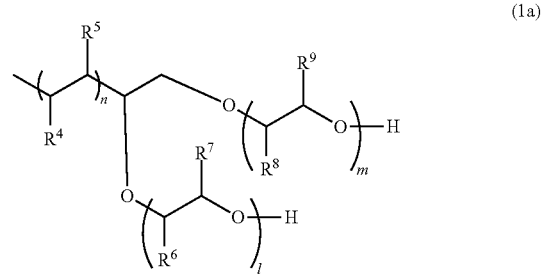

(1a)

wherein, in the formula, $R^4$ and $R^5$ each represents a hydrogen atom or an alkyl group having 1 to 18 carbon atoms, and at least one of $R^4$ and $R^5$ is a hydrogen atom; $R^6$ and $R^7$ each represents a hydrogen atom or a methyl group, and at least one of $R^6$ and $R^7$ is a hydrogen atom; $R^8$ and $R^9$ each represents a hydrogen atom or a methyl group, and at least one of $R^8$ and $R^9$ is a hydrogen atom; l+m represents an integer of 2 to 450; and n represents an integer of 20 to 300,

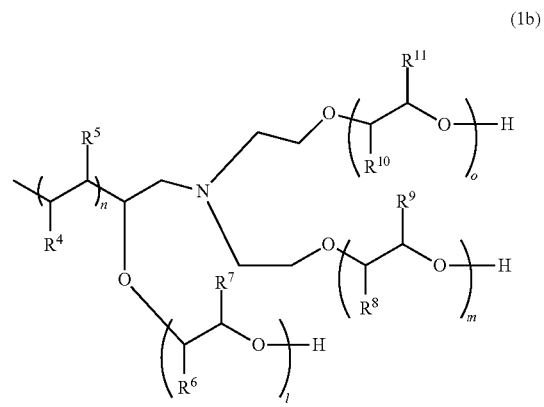

(1b)

wherein, in the formula, $R^4$ and $R^5$ each represents a hydrogen atom or an alkyl group having 1 to 18 carbon atoms, and at least one of $R^4$ and $R^5$ is a hydrogen atom; $R^6$ and $R^7$ each represents a hydrogen atom or a methyl group, and at least one of $R^6$ and $R^7$ is a hydrogen atom; $R^8$ and $R^9$ each represents a hydrogen atom or a methyl group, and at least one of $R^8$ and $R^9$ is a hydrogen atom; $R^{10}$ and $R^{11}$ each represents a hydrogen atom or a methyl group, and at least one of $R^{10}$ and $R^{11}$ is hydrogen atom; l+m+o represents an integer of 3 to 450; and n represents an integer of 20 to 300.

4. The method for producing a porous metal oxide according to claim 1, wherein the porous metal oxide has mesopores and a pore structure thereof is a cubic phase structure.

5. The method for producing a porous metal oxide according to claim 4, wherein the average pore diameter of the mesopores is from 5 to 30 nm.

6. The method for producing a porous metal oxide according to claim 1, wherein a porosity of the porous metal oxide is from 1 to 80% by volume.

7. The method for producing a porous metal oxide according to claim 1, wherein
the porous metal oxide has mesopores,
a porosity of the porous metal oxide is from 1 to 80% by volume,
a pore structure formed from the mesopore is a cubic phase structure, and
a pore diameter of the mesopore is in a range of 5 to 30 nm.

8. The method for producing a porous metal oxide according to claim 1, wherein the porous metal oxide comprises one or more metals selected from the group consisting of silicon, titanium, zirconium, aluminum, cobalt, lithium, iron, manganese and barium.

* * * * *